(12) United States Patent
Kutsovsky et al.

(10) Patent No.: US 12,275,834 B2
(45) Date of Patent: Apr. 15, 2025

(54) METHODS OF PREPARING A COMPOSITE HAVING ELASTOMER AND FILLER

(71) Applicant: Beyond Lotus LLC, Wilmington, DE (US)

(72) Inventors: Yakov E. Kutsovsky, Arlington, MA (US); Martin C. Green, Boxborough, MA (US); Ping Zhang, Westford, MA (US); Dhaval A. Doshi, Lexington, MA (US); Jiaxi Li, Nashua, NH (US); Michael D. Morris, Nashua, NH (US); Brian N. Hult, Arlington, MA (US); Ralph E. Dickinson, Dracut, MA (US); Irina S. Yurovskaya, Corpus Christi, TX (US); Frederick H. Rumpf, Billerica, MA (US); Satyan Choudhary, Billerica, MA (US); Hassan M. Ali, Andover, MA (US); Ani T. Nikova, Winchester, MA (US); Jincheng Xiong, Boxborough, MA (US); Michael Beaulieu, Bolton, MA (US)

(73) Assignee: Beyond Lotus LLC, Wilmington, DE (US)

(*) Notice: Subject to any disclaimer, the term of this patent is extended or adjusted under 35 U.S.C. 154(b) by 0 days.

(21) Appl. No.: 18/958,298

(22) Filed: Nov. 25, 2024

(65) Prior Publication Data

US 2025/0084234 A1 Mar. 13, 2025

Related U.S. Application Data

(62) Division of application No. 17/616,285, filed as application No. PCT/US2020/036168 on Jun. 4, 2020, now Pat. No. 12,209,170.

(60) Provisional application No. 62/857,779, filed on Jun. 5, 2019.

(51) Int. Cl.
| | |
|---|---|
| *C08K 3/36* | (2006.01) |
| *B29B 7/48* | (2006.01) |
| *B29B 7/72* | (2006.01) |
| *B29B 7/74* | (2006.01) |
| *B29B 7/82* | (2006.01) |
| *B29B 7/90* | (2006.01) |
| *B60C 1/00* | (2006.01) |
| *B60C 11/00* | (2006.01) |
| *C08K 3/04* | (2006.01) |

(52) U.S. Cl.
CPC ............... *C08K 3/36* (2013.01); *B29B 7/48* (2013.01); *B29B 7/726* (2013.01); *B29B 7/7495* (2013.01); *B29B 7/823* (2013.01); *B29B 7/826* (2013.01); *B29B 7/90* (2013.01); *B60C 1/0016* (2013.01); *B60C 11/00* (2013.01); *C08K 3/04* (2013.01); *B60C 2011/0025* (2013.01); *C08K 2201/006* (2013.01)

(58) Field of Classification Search
CPC ........................................................ C08K 3/36
USPC ........................................................ 524/459
See application file for complete search history.

(56) References Cited

U.S. PATENT DOCUMENTS

| | | |
|---|---|---|
| 2,820,836 A | 1/1958 | Smith |
| 3,294,720 A | 12/1966 | Beber et al. |
| 4,073,840 A | 2/1978 | Saidla |
| 5,108,188 A | 4/1992 | Peter et al. |
| 5,183,640 A | 2/1993 | Peter et al. |
| 5,251,977 A | 10/1993 | Peter et al. |
| 5,368,383 A | 11/1994 | Peter et al. |
| 5,599,868 A | 2/1997 | Bohm et al. |
| 5,633,296 A | 5/1997 | Peter |
| 5,990,211 A | 11/1999 | Yano |
| 6,068,922 A | 5/2000 | Vercesi et al. |
| 6,136,913 A | 10/2000 | Nahmias et al. |
| 6,372,822 B1 | 4/2002 | Chung et al. |
| 6,646,028 B2 | 11/2003 | Lopez-Serrano Ramos et al. |
| 6,828,361 B2 | 12/2004 | Peter et al. |
| 6,902,312 B2 | 6/2005 | Peter |
| 6,929,783 B2 | 8/2005 | Chung et al. |
| 8,586,651 B2 | 11/2013 | Wang et al. |
| 9,115,258 B2 | 8/2015 | De Gaudemaris et al. |
| 9,701,161 B2 | 7/2017 | Bondu et al. |
| 9,713,942 B2 | 7/2017 | Bondu et al. |
| 9,714,325 B2 | 7/2017 | Miyasaka |
| 9,758,627 B2 | 9/2017 | Wang et al. |
| 9,834,658 B2 | 12/2017 | Yanagi |

(Continued)

FOREIGN PATENT DOCUMENTS

| | | |
|---|---|---|
| CN | 101214706 A | 7/2008 |
| CN | 101851360 A | 10/2010 |

(Continued)

OTHER PUBLICATIONS

Kim, Kwang-Jea, et al., "Moisture Effects on Improved Hydrolysis Reaction for TESPT and TESPD-Silica Compounds", Composite Interfaces, 11:7, pp. 471-488 (2004).

(Continued)

*Primary Examiner* — Deve V Hall

(57) ABSTRACT

Disclosed herein are methods of preparing composites from solid elastomer(s) and wet filler(s), as well as products, including composites, vulcanizates, and articles therefrom. The wet filler can have a liquid content of at least 15%. A resulting composite comprises the filler dispersed in the elastomer at a loading of at least 20 phr with a filler yield loss of no more than 10%, wherein the composite has a liquid content of no more than 10% by weight based on total weight of said composite.

9 Claims, No Drawings

(56) References Cited

U.S. PATENT DOCUMENTS

| | | | |
|---|---|---|---|
| 10,017,612 | B2 | 7/2018 | Tanaka et al. |
| 10,023,723 | B2 | 7/2018 | Jiang et al. |
| 10,308,073 | B2 | 6/2019 | Gervais et al. |
| 2005/0080179 | A1 | 4/2005 | Kim et al. |
| 2005/0239946 | A1 | 10/2005 | Lin et al. |
| 2008/0110552 | A1* | 5/2008 | Arnold ............... B60C 1/0016 524/847 |
| 2011/0021664 | A1 | 1/2011 | Wang et al. |
| 2011/0265923 | A1 | 11/2011 | Arnold et al. |
| 2012/0172517 | A1 | 7/2012 | Zhang et al. |
| 2013/0231417 | A1 | 9/2013 | Vasseur et al. |
| 2016/0075836 | A1 | 3/2016 | Adler et al. |
| 2018/0282523 | A1 | 10/2018 | Sandstrom |
| 2018/0371181 | A1 | 12/2018 | Ghosal et al. |
| 2019/0002702 | A1 | 1/2019 | Herd et al. |
| 2020/0317823 | A1 | 10/2020 | Dussillols et al. |

FOREIGN PATENT DOCUMENTS

| | | |
|---|---|---|
| CN | 106674631 A | 5/2017 |
| CN | 107457933 A | 12/2017 |
| DE | 10149163 A1 | 4/2003 |
| DE | 102017212387 A1 | 1/2019 |
| DE | 102017223554 A1 | 6/2019 |
| EP | 1110691 A2 | 6/2001 |
| EP | 1191058 A1 | 3/2002 |
| EP | 1425338 B1 | 8/2011 |
| EP | 2410003 B1 | 4/2014 |
| EP | 3494173 B1 | 6/2021 |
| GB | 770773 | 3/1957 |
| GB | 940632 | 10/1963 |
| GB | 981836 | 1/1965 |
| JP | 4278765 B2 | 6/2009 |
| JP | 2012/062393 A | 3/2012 |
| JP | 2013/018315 A | 1/2013 |
| JP | 2014/227542 | 12/2014 |
| JP | 2014227540 A | 12/2014 |
| JP | 2017008244 A | 1/2017 |
| WO | WO 99/16600 | 4/1999 |
| WO | WO 2015/067970 A1 | 5/2015 |
| WO | WO 2017/008244 A1 | 1/2017 |
| WO | WO 2017/011570 A1 | 1/2017 |
| WO | WO 2018/219630 A1 | 12/2018 |
| WO | WO 2018/219631 A1 | 12/2018 |
| WO | WO 2019/133442 A1 | 7/2019 |
| WO | WO 2020/001823 A1 | 1/2020 |

OTHER PUBLICATIONS

Kim, Kwang-Jea, et al., "Moisture Effects on TESPD-Silica/CB/SBR Compounds", Spring Rubber Division, ACS, Meeting (San Franscisco), Apr. 28-30, 2003, revised Jan. 2005, pp. 84-104.

Kim, Kwang-Jea, et al., "Temperature Effects of Silane Coupling on Moisture Treated Silica Surface", Journal of Applied Polymer Science, vol. 95, pp. 623-633 (2005).

Wang, M.J., et al., "NR/Carbon Black Masterbatch Produced with Continuous Liquid Phase Mixing," KGK Kautschuk Gummi Kunststoffe 55. Jahrgang, Nr. Jul. 8, 2002, pp. 388-396.

The International Search Report and the Written Opinion of Internationl Application No. PCT/US2020/036168, mailed Nov. 9, 2020.

* cited by examiner

METHODS OF PREPARING A COMPOSITE HAVING ELASTOMER AND FILLER

BACKGROUND

There is always a desire in the rubber industry to develop methods to disperse filler in elastomer and it is especially desirable to develop methods which can do so efficiently with respect to filler dispersion quality, time, effort, and/or cost.

Numerous products of commercial significance are formed of elastomeric compositions wherein reinforcing filler material is dispersed in any of various synthetic elastomers, natural rubber or elastomer blends. Carbon black and silica, for example, are widely used to reinforce natural rubber and other elastomers. It is common to produce a masterbatch, that is, a premixture of reinforcing material, elastomer, and various optional additives, such as extender oil. Such masterbatches are then compounded with processing and curing additives and upon curing, generate numerous products of commercial significance. Such products include, for example, pneumatic and non-pneumatic or solid tires for vehicles, including the tread portion including cap and base, undertread, innerliner, sidewall, wire skim, carcass and others. Other products include, for example, engine mounts, bushings, conveyor belts, windshield wipers, rubber components for aerospace and marine equipment, vehicle track elements, seals, liners, gaskets, wheels, bumpers, anti-vibration systems and the like.

A good dispersion of reinforcing filler in rubber compounds has been recognized as a factor in achieving mechanical strength and consistent elastomer composite and rubber compound performance. Considerable effort has been devoted to the development of methods to improve dispersion quality, and various solutions have been offered to address this challenge. For example, more intensive mixing can improve reinforcing filler dispersion, but can degrade the elastomer into which the filler is being dispersed. This is especially problematic in the case of natural rubber, which is highly susceptible to mechanical/thermal degradation, especially under dry mixing conditions.

As an alternative to dry mixing techniques, it is known to feed elastomer latex or polymer solution and a carbon black or silica slurry to a liquid mixing system, e.g., an agitated tank. Such "liquid masterbatch" techniques can be used with natural rubber latex and emulsified synthetic elastomers, such as styrene butadiene rubber (SBR), or other elastomeric polymers in liquid form. However, while wet mixing techniques have shown promise, batch wet mixing can pose challenges in manufacturing operations. Continuous or semi-continuous techniques for producing liquid masterbatch, such as those disclosed in U.S. Pat. Nos. 6,048,923 and 8,586,651, the contents of which are incorporated by reference herein, have been effective for producing elastomer-filler composites characterized by high quality. However, these processes are limited to liquid forms of rubber such as elastomer latex or solution forms of rubber.

Accordingly, there is a need to develop methods to incorporate filler into solid elastomer to achieve acceptable or enhanced elastomer composite dispersion quality and functionality from elastomer composite masterbatches, which can translate into acceptable or enhanced properties in the corresponding vulcanized rubber compounds and rubber articles.

SUMMARY

Disclosed herein are methods of preparing composites from solid elastomer(s) and wet filler(s), as well as products, including composites, vulcanizates, and articles therefrom.

One aspect is a method of preparing a composite, comprising: (a) charging a mixer having one or more rotors with at least a solid elastomer and a wet filler comprising a filler and a liquid present in an amount ranging from 15% to 65% by weight based on total weight of wet filler; (b) in one or more mixing steps, mixing the at least the solid elastomer and the wet filler to form a mixture, and in at least one of said mixing steps conducting said mixing wherein the mixer has at least one temperature-control means that is set to a temperature, $T_z$, of 65° C. or higher, and removing at least a portion of the liquid from the mixture by evaporation; and (c) discharging, from the mixer, the composite comprising the filler dispersed in the elastomer at a loading of at least 20 phr with a filler yield loss of no more than 10% (e.g., no more than 5%), wherein the composite has a liquid content of no more than 10% by weight based on total weight of said composite.

Another aspect is a method of preparing a composite, comprising: (a) charging a mixer with at least a solid elastomer comprising at least 50 wt % natural rubber and a wet filler comprising a filler and a liquid present in an amount of at least 15% by weight based on total weight of wet filler, wherein a fill factor, on a dry weight basis, of the at least the solid elastomer and the wet filler is no more than 68%, (b) in one or more mixing steps, mixing the at least the solid elastomer and the wet filler to form a mixture, and in at least one of said mixing steps, conducting said mixing at mixer temperatures controlled by at least one temperature-control means, and removing at least a portion of the liquid from the mixture by evaporation; and (c) discharging, from the mixer, the composite comprising the filler dispersed in the elastomer at a loading of at least 20 phr with a filler yield loss of no more than 10%, wherein the composite has a liquid content of no more than 10% by weight based on total weight of said composite.

Another aspect is a method of preparing a composite, comprising (a) charging a mixer having one or more rotors with at least a solid elastomer and a wet filler comprising a filler and a liquid present in an amount of at least 15% by weight based on total weight of wet filler; (b) in one or more mixing steps, mixing in the mixer, the at least the solid elastomer and the wet filler to form a mixture, and in at least one of said mixing steps, conducting said mixing at mixer temperatures controlled by at least one temperature-control means with the one or more rotors operating at a tip speed of at least 0.6 m/s for at least 50% of mixing time, and removing at least a portion of the liquid from the mixture by evaporation; (c) discharging, from the mixer, the composite comprising the filler dispersed in the elastomer at a loading of at least 20 phr with a filler yield loss of no more than 10%, wherein the composite has a liquid content of no more than 10% by weight based on total weight of said composite.

Another aspect is a method is a method of preparing a composite, comprising: (a) charging a first mixer having one or more rotors with at least a solid elastomer and a wet filler comprising a filler and a liquid present in an amount of at least 15% by weight based on total weight of wet filler; (b) in one or more mixing steps, mixing the at least the solid elastomer and the wet filler to form a mixture, and in at least one of said mixing steps, conducting said mixing at mixer temperatures controlled by at least one temperature-control means with the one or more rotors operating at a tip speed of at least 0.6 m/s for at least 50% of the mixing time, and removing at least a portion of the liquid from the mixture by evaporation; (c) discharging, from the first mixer, the mixture comprising the filler dispersed in the elastomer at a loading of at least 20 phr, wherein the mixture has a liquid content that is reduced to an amount less than the liquid content at the beginning of step (b), and wherein the mixture has a material temperature ranging from 100° C. to 180° C.; (d) mixing the mixture from (c) in a second mixer to obtain the composite, wherein the second mixer is operated under at least one of the following conditions: (i) a ram pressure of 5 psi or less; (ii) a ram raised to at least 75% of its highest level; (iii) a ram operated in floating mode; (iv) a ram positioned such that it does not substantially contact the mixture; (v) the mixer is ram-less; and (vi) a fill factor of the mixture ranges from 25% to 70%; and (e) discharging, from the second mixer, the composite having a liquid content of less than 3% by weight based on total weight of said composite.

Another aspect is a method of preparing a composite, comprising: (a) charging a first mixer having one or more rotors with at least a solid elastomer and a wet filler comprising a filler and a liquid present in an amount of at least 15% by weight based on total weight of wet filler; (b) in one or more mixing steps, mixing the at least the solid elastomer and the wet filler to form a mixture, and in at least one of said mixing steps, conducting said mixing at mixer temperatures controlled by at least one temperature-control means and applying an average specific power of at least 2.5 kW/kg over mixing time, and removing at least a portion of the liquid from the mixture by evaporation; (c) discharging, from the first mixer, the mixture comprising the filler dispersed in the elastomer at a loading of at least 20 phr, wherein the mixture has a liquid content that is reduced to an amount less than the liquid content at the beginning of step (b), and wherein the mixture has a material temperature ranging from 100° C. to 180° C.; (d) mixing the mixture from (c) in a second mixer to obtain the composite, wherein the second mixer is operated under at least one of the following conditions: (i) a ram pressure of 5 psi or less; (ii) a ram raised to at least 75% of its highest level; (iii) a ram operated in floating mode; (iv) a ram positioned such that it does not substantially contact the mixture; (v) the mixer is ram-less; and (vi) a fill factor of the mixture ranges from 25% to 70%; and (e) discharging, from the second mixer, the composite having a liquid content of less than 3% by weight based on total weight of said composite.

Another aspect method is a method of a method of preparing a composite, comprising: (a) charging a continuous flow of at least a solid elastomer and a pelletized wet filler to an input end of a continuous mixer, wherein the wet filler comprises a filler and a liquid present in an amount of at least 15% by weight based on total weight of wet filler; (b) conveying the solid elastomer and the wet filler along a length of the continuous mixer, wherein during the conveying, mixing occurs with removal of at least a portion of the liquid by evaporation; and (c) discharging from a discharge end of the continuous mixer a composite comprising the filler dispersed in the elastomer at a loading of at least 20 phr with a filler yield loss of no more than 10%, wherein the composite has a liquid content of no more than 10% by weight based on total weight of said composite. One or more embodiments can apply including: the continuous mixer has an elongate chamber; the mixing in (b) can occur by contacting the solid elastomer and the wet filler with one or more rotors axially oriented in the elongate chamber; the temperature of the one or more rotors can be controlled; the mixer can be a continuous mixer, e.g., a continuous compounder; the conveying (b) can be performed with at least one rotatable screw, through which mixing also occurs; the mixer can be a twin-screw extruder; the charging in (a) can comprise charging a substantially continuous flow of a pre-blend of the at least a solid elastomer and pelletized wet filler; the charging in (a) can comprise charging, separately, a first substantially continuous flow of the solid elastomer and a second substantially continuous flow of the pelletized wet filler.

Another aspect is a method of preparing a composite, comprising: (a) charging a mixer with a solid elastomer and a wet filler comprising a filler and a liquid present in an amount of at least 15% by weight based on total weight of wet filler; (b) in one or more mixing steps, mixing the at least the solid elastomer and the wet filler to form a mixture, and in at least one of said mixing steps, conducting said mixing at mixer temperatures controlled by at least one temperature-control means and removing at least a portion of the liquid from the mixture by evaporation, wherein during said mixing the mixer reaches an indicated temperature of 120° C. or higher; (c) optionally adding at least one additive selected from antidegradants and coupling agents during said charging (a) or said mixing (b), and optionally adding one or more rubber chemicals after the mixer reaches the indicated temperature; and (d) discharging, from the mixer, the composite comprising the filler dispersed in the elastomer at a loading of at least 20 phr with a filler yield loss of no more than 10%, wherein the composite has a liquid content of no more than 10% by weight based on total weight of said composite, and said charging (a) and said mixing (b) prior to the mixer reaching the indicated temperature are carried out in the substantial absence of the one or more rubber chemicals.

With regard to any aspect or method or embodiment disclosed herein, where applicable, the method can further comprise any one or more of the following embodiments: the at least one temperature-control means heats at least a wall of the mixer; the at least one temperature-control means comprises a jacket having fluid flow means; in one or more mixing steps (step (b)) and optionally during the charging (step (a)), the at least one temperature-control means is set to a temperature, $T_z$, that is 50° C. or higher, or 60° C. or higher, or 65° C. or higher, or 70° C. or higher, or ranging from 30° C. to 150° C., or ranging from 50° C. to 100° C., or ranging from 60° C. to 100° C., or ranging from 65° C. to 100° C., or ranging from 70° C. to 100° C.; at least 50% of the filler is carbon black and/or silicon-treated carbon black and in one or more mixing steps (step (b)) and optionally during the charging (step (a)), the at least one temperature-control means is set to a temperature, $T_z$, that is 65° C. or higher, or 70° C. or higher, or ranging from 65° C. to 100° C., or ranging from 70° C. to 100° C.; at least 50% of the filler is silica and in one or more mixing steps (step (b)) and optionally during the charging (step (a)), the at least one temperature-control means is set to a temperature, $T_z$, that is 50° C. or higher, or 60° C. or higher, or 65° C. or higher, or 70° C. or higher, or ranging from 30° C. to 150° C., or ranging from 50° C. to 100° C., or ranging from 60° C. to 100° C., or ranging from 65° C. to 100° C., or ranging from 70° C. to 100° C.

With regard to any aspect or method or embodiment disclosed herein, where applicable, the method can further comprise any one or more of the following embodiments: in at least one of said mixing steps, conducting said mixing at mixer temperatures controlled by at least one temperature-control means with the one or more rotors operating at a tip speed of at least 0.6 m/s for at least 50% of mixing time; the tip speed is at least 0.7 m/s, or at least 1 m/s, or ranges from 0.6 m/s to 10 m/s.

With regard to any aspect or method or embodiment disclosed herein, where applicable, the method can further comprise any one or more of the following embodiments: a resulting total specific energy for the mixing is at least 1,100 kJ/kg composite; a resulting total specific energy for the mixing is at least 1,100 kJ/kg composite and the filler comprises silica; a resulting total specific energy for the mixing is at least 1,400 kJ/kg composite; a resulting total specific energy for the mixing is at least 1,500 kJ/kg composite; after substantially all of the wet filler has been charged to the mixer, a resulting specific energy for the mixing, $E_{100\% \ Filler}$, is at least 1,100 kJ/kg composite; after at least 75% by weight of the total wet filler has been charged to the mixer, a resulting specific energy for the mixing, $E_{75\% \ Filler}$, is at least 1,300 kJ/kg composite; the mixing of step (b) (in one or more mixing steps) comprises applying an energy to at least one rotor of the mixer, $E_R$, at an energy efficiency ranging from 20% to 80% according to the following equation: Energy Efficiency=Heat Duty/$E_R$× 100%, wherein the Heat Duty is the energy required to remove the liquid from 1 kg of composite at 100% efficiency; the Energy Efficiency ranges from 40% to 55%; a time average release rate of the liquid per kg of the composite on a dry weight basis ranges from 0.01 to 0.14 kg/(min·kg) or from 0.01 to 0.07 kg/(min·kg); and the one or more mixing steps comprises applying an average specific power of at least 2.5 kW/kg over the mixing time, which can be the ram down time.

With regard to any aspect or method or embodiment disclosed herein, where applicable, the method can further comprise any one or more of the following embodiments: a fill factor of the mixture is no more than 72%, no more than 70%, no more than 68%, or ranges from 50% to 70%, or from 50% to 68%; the mixer is a batch mixer comprising a ram capable of downward vertical movement to a lowermost position, wherein during the mixing, the mixer is operated with a maximum ram deflection from the lowermost position by a distance of no more than 30% of the diameter of the one or more rotors.

With regard to any aspect or method or embodiment disclosed herein, where applicable, the method can further comprise any one or more of the following embodiments: the wet filler has a liquid present in an amount of at least 15% by weight, at least 20% by weight, at least 30% by weight; the wet filler has a liquid present in an amount ranging from 30% to 65% by weight, or from 40% to 65% by weight; the wet filler has a liquid present in an amount determined as a function of OAN of the filler according to the equation: k*OAN/(100+OAN)*100, wherein for carbon black k ranges from 0.6 to 1.1, or from 0.8 to 1.05, or from 0.9 to 1; the mixture further comprises non-wet filler; the wet filler is in the form of a powder, paste, pellet, or cake, e.g., in the form of a powder or pellet; at least 30% by weight of the total filler charged into the mixer is the wet filler; at least 90% by weight of the total filler charged into the mixer is the wet filler.

With regard to any aspect or method or embodiment disclosed herein, where applicable, the method can further comprise any one or more of the following embodiments: the mixing comprises removing at least 50% by weight of the liquid by evaporation; the mixing also comprises removing the liquid from the mixture by expression, compaction, wringing, or any combinations thereof; the liquid comprises water; the liquid further comprises at least one component selected from bases, acids, salts, surfactants, and processing aides.

With regard to any aspect or method or embodiment disclosed herein, where applicable, the method can further comprise any one or more of the following embodiments: the charging comprises charging the mixer with at least a portion of the solid elastomer followed by charging the mixer with at least a portion of the wet filler; the charging comprises multiple additions of the filler; upon charging the mixer with at least a portion of the solid elastomer, the elastomer is heated to a temperature of 90° C. or higher prior to charging the mixer with at least a portion of the wet filler; during the charging or mixing, the method further comprises adding at least one antidegradant; the at least one antidegradant is N-(1,3-dimethylbutyl)-N'-phenyl-p-phenylenediamine.

With regard to any aspect or method or embodiment disclosed herein, where applicable, the method can further comprise any one or more of the following embodiments: the composite discharged has a liquid content of no more than 5% by weight; the composite discharged has a liquid content of no more than 3% by weight; the composite discharged has a liquid content of no more than 2% by weight; the composite discharged has a liquid content ranging from 0.1% to 10% by weight; and the composite has a filler yield loss of no more than 5%, or no more than 3% by weight.

With regard to any aspect or method or embodiment disclosed herein, where applicable, the method can further comprise any one or more of the following embodiments: one or more rubber chemicals are absent from the discharged composite (in step (c)); the one or more rubber chemicals are selected from processing aids and activators; the one or more rubber chemicals are selected from zinc oxide, fatty acids, zinc salts of fatty acids, wax, accelerators, resins, and processing oil; the mixture consists essentially of the solid elastomer and the wet filler; the mixture consists essentially of the solid elastomer, the wet filler, and the antidegradant; the composite consists essentially of the filler dispersed in the elastomer and the antidegradant; the composite consists of the filler dispersed in the elastomer; the composite consists of the filler dispersed in the elastomer and the antidegradant.

With regard to any aspect or method or embodiment disclosed herein, where applicable, the mixing is performed in one mixing step.

With regard to any aspect or method or embodiment disclosed herein, where applicable, the method can further comprise any one or more of the following embodiments: the mixing is performed in two or more mixing steps; the mixer is a first mixer and the method further comprises, after said mixing, and before said discharging, further mixing said mixture in said first mixer or a second mixer or both, to obtain the composite; prior to the further mixing, after said mixing the method further comprises stopping said mixing to obtain said mixture; the said further mixing reduces the liquid content of said mixture as compared to the liquid content of said mixture after said mixing; the mixture formed in step (b), by standing time or by cooling or both, obtains a material temperature of less than 180° C. before said further mixing begins; a second mixer, different from said first mixer in step (a), is utilized for said further mixing; after said further mixing, and before said discharging, further mixing in a third mixer to obtain the composite; the first mixer is a tangential mixer or an intermesh mixer, and said second mixer is a tangential mixer, an intermesh mixer, a kneader, or a roll mill; the first mixer is a tangential mixer or an intermesh mixer, and said second mixer is a kneader, a single screw extruder, a twin-screw extruder, a multiple-screw extruder, a continuous compounder, or a roll mill; the first mixer is a first tangential mixer and said second mixer is a second tangential mixer; the second mixer is operated under at least one of the following conditions: (i) a ram pressure of 5 psi or less; (ii) a ram raised to at least 75% of its highest level; (iii) a ram operated in floating mode; (iv) a ram positioned such that it does not substantially contact the mixture; (v) the mixer is ram-less; and (vi) a fill factor of the mixture ranges from 25% to 70%; the method further comprises discharging said composite from said first mixer into said second mixer; the mixing and the said further mixing are performed as a batch process, a continuous process, a semi-continuous process, or a combination thereof.

With regard to any aspect or method or embodiment disclosed herein, where applicable, the method can further comprise any one or more of the following embodiments: a time period between the start of the mixing and the discharging is less than 30 min., less than 15 min., ranges from 3 min. to 30 min, ranges from 5 min. to 15 min; a ram down time is less than 30 min., less than 15 min., less than 10 min., ranges from 3 min. to 30 min or from 5 min. to 15 min, or from 5 min. to 10 min.

With regard to any aspect or method or embodiment disclosed herein, where applicable, the method can further comprise any one or more of the following embodiments: upon the discharging, the temperature of the mixer ranges from 120° C. to 180° C. or from 130° C. to 170° C.

With regard to any aspect or method or embodiment disclosed herein, where applicable, the method can further comprise any one or more of the following embodiments: the method can be a continuous process; the mixing can be performed in a continuous mixer; the method can be a batch process; the mixer is an internal mixer; the mixer is a tangential mixer or intermesh mixer; the mixer has a chamber capacity of at least 10 L; the mixing is performed with at least one rotor selected from two-wing rotors, four-wing rotors, six-wing rotors, eight wing rotors, and one or more screw rotors.

With regard to any aspect or method or embodiment disclosed herein, where applicable, the method can further comprise any one or more of the following embodiments: the composite has an oil content of less than 5% by weight based on the total weight of the composite or less than 1% by weight based on the total weight of the composite, and optionally the filler comprises silica.

With regard to any aspect or method or embodiment disclosed herein, where applicable, the method can further comprise any one or more of the following embodiments: further comprising at least one additional or post processing step selected from extruding, calendaring, milling, granulating, baling, compounding, and sheeting; the at least one additional processing step is performed with one or more of a kneader, a roll mill, a screw extruder, a twin-screw extruder, a multiple-screw extruder, a continuous compounder, and a twin-screw sheeter.

With regard to any aspect or method or embodiment disclosed herein, where applicable, the method can further comprise any one or more of the following embodiments: the filler comprises at least one material selected from carbonaceous materials, carbon black, silica, nanocellulose, lignin, clays, nanoclays, metal oxides, metal carbonates, pyrolysis carbon, graphenes, graphene oxides, reduced graphene oxide, carbon nanotubes, single-wall carbon nanotubes, multi-wall carbon nanotubes, or combinations thereof, and coated and treated materials thereof; the filler comprises at least one material selected from carbon black, and coated and treated materials thereof (e.g., carbon black and/or silicon-treated carbon black); at least 50 wt % of the filler is selected from carbon black, and coated and treated materials thereof; at least 90 wt % of the filler is carbon black.

With regard to any aspect or method or embodiment disclosed herein, where applicable, the method can further comprise any one or more of the following embodiments: the filler comprises carbon black dispersed in the elastomer at a loading ranging from 30 phr to 150 phr, e.g., ranging from 20 phr to 100 phr, from 30 phr to 70 phr, or from 40 phr to 65 phr; the filler comprises carbon black having an STSA ranging from 30 $m^2/g$ to 200 $m^2/g$; the filler comprises carbon black having an STSA ranging from 60 $m^2/g$ to 200 $m^2/g$; the filler comprises carbon black having a COAN ranging from 60 mL/100 g to 120 mL/100 g; the filler comprises carbon black having an STSA ranging from 60 $m^2/g$ to 170 $m^2/g$ and a COAN ranging from 70 mL/100 g to 115 mL/100 g.

With regard to any aspect or method or embodiment disclosed herein, where applicable, the method can further comprise any one or more of the following embodiments: the wet filler comprises never-dried carbon black; the wet filler comprises dry carbon black that has been rewetted; the wet filler comprises dry carbon black that was rewetted in a pelletizer, a fluidized bed, a sprayer, a mixer, or a rotating drum; prior to being rewetted, the dry carbon black pellets were subjected to at least one process selected from milling, granulating, grinding, and classifying; the wet filler comprises carbon black pellets; the wet filler comprises one or more of granulated, agglomerated, or fluffy carbon black;

With regard to any aspect or method or embodiment disclosed herein, where applicable, the method can further comprise any one or more of the following embodiments: at least one filler selected from carbon black, silica, and silicon-treated carbon black, and the elastomer comprises natural rubber; at least one filler selected from carbon black, silica, and silicon-treated carbon black, and the elastomer comprises natural rubber and at least one additional elastomer; and the at least one additional elastomer is selected from polybutadiene and styrene-butadiene rubber.

With regard to any aspect or method or embodiment disclosed herein, where applicable, the method can further comprise any one or more of the following embodiments: the filler comprises silica; at least 50% of the filler is silica; at least 90% of the filler is silica; the silica is selected from precipitated silica, fumed silica, silica gel, and colloidal silica; the filler further comprises carbon black; the filler further comprises carbon black in an amount ranging from 1% to 10% by weight, relative to the total weight of the filler; the method further comprises charging the mixer with a coupling agent; the coupling agent is charged with at least a portion of the wet filler.

With regard to any aspect or method or embodiment disclosed herein, where applicable, the method can further comprise any one or more of the following embodiments: the filler comprises silica; wherein during one or more mixing steps (step (b)) and optionally during the charging step (step (a)), the at least one temperature-control means is set to a temperature, $T_z$, ranging from 40° C. to 110° C., from 40° C. to 100° C., from 40° C. to 90° C., from 40° C. to 75° C., or ranging from 50° C. to 110° C., from 50° C. to 100° C., from 50° C. to 90° C., or from 50° C. to 75° C.; the wet filler has a liquid present in an amount of at least 20% by weight, at least 30% by weight, ranging from 20% to 75% by weight, from 20% to 65% by weight, from 20% to 60% by weight, an amount ranging from 20% to 50%, or from 40% to 65% by weight, by weight.

With regard to any aspect or method or embodiment disclosed herein, where applicable, the method can further comprise any one or more of the following embodiments: the filler comprises silica; the silica is dispersed in the elastomer at a loading ranging from 30 phr to 180 phr, or ranging from 30 phr to 150 phr, or ranging from 30 phr to 100 phr; or ranging from 40 phr to 75 phr; the silica has an STSA ranging from 80 m$^2$/g to 250 m$^2$/g; the silica has an STSA ranging from 80 m$^2$/g to 200 m$^2$/g; the wet filler comprises never-dried silica.

With regard to any aspect or method or embodiment disclosed herein, where applicable, the method can further comprise any one or more of the following embodiments: the solid elastomer is selected from natural rubber, functionalized natural rubber, styrene-butadiene rubber, functionalized styrene-butadiene rubber, polybutadiene rubber, functionalized polybutadiene rubber, polyisoprene rubber, ethylene-propylene rubber, isobutylene-based elastomers, polychloroprene rubber, nitrile rubber, hydrogenated nitrile rubber, polysulfide rubber, polyacrylate elastomers, fluoroelastomers, perfluoroelastomers, silicone elastomers, and blends thereof; the solid elastomer is selected from natural rubber, functionalized natural rubber, styrene-butadiene rubber, functionalized styrene-butadiene rubber, polybutadiene rubber, polyisoprene rubber, ethylene-propylene rubber, nitrile rubber, hydrogenated nitrile rubber, and blends thereof; the elastomer comprises natural rubber, e.g., at least 50 wt. % or at least 70 wt. % or at least 90 wt. % of the solid elastomer is natural rubber; the elastomer is selected from one or more of natural rubber, styrene-butadiene rubber, and oil-extended styrene-butadiene rubber.

With regard to any aspect or method or embodiment disclosed herein, where applicable, the method can further comprise any one or more of the following embodiments: further comprising mixing the discharged composite with at least one additional elastomer; the at least one additional elastomer is the same as the solid elastomer; the at least one additional elastomer is different from the solid elastomer to form a composite comprising an elastomer blend; the solid elastomer is natural rubber and the at least one additional elastomer is selected from polybutadiene and styrene-butadiene rubber; the solid elastomer is a first solid elastomer and the charging further comprises charging the mixer with at least one additional solid elastomer; the at least one additional elastomer is the same as the first solid elastomer; the at least one additional elastomer is different from the first solid elastomer; the solid elastomer is a blend comprising a first solid elastomer and at least one additional elastomer; the first solid elastomer is natural rubber and the at least one additional elastomer is selected from polybutadiene rubber and styrene-butadiene rubber.

With regard to any aspect or method or embodiment disclosed herein, including methods relating to a first and second mixer, where applicable, the method can further comprise any one or more of the following embodiments: the mixture (discharged from the first mixer) has a liquid content that is reduced to an amount less than 50 wt % of the liquid content of the mixture at the beginning of the one or more mixing steps (step (b)), e.g., a liquid content ranging from 1% to 20% by weight, or ranging from 2% to 15% by weight, or ranging from 5% to 15% by weight, or ranging from 7% to 15% by weight, or ranging from 2% to 5% by weight; the mixture has a material temperature ranging from 100° C. to 170° C.; a fill factor of the mixture in the first mixer ranges from 50% to 70%; the tip speed is at least 0.6 m/s, or at least 0.7 m/s, or at least 1 m/s.

With regard to any aspect or method or embodiment disclosed herein, including methods relating to a first and second mixer, where applicable, the method can further comprise any one or more of the following embodiments: at least 50 wt % of the filler is carbon black; the wet filler has a liquid present in an amount of at least 20% by weight, or at least 30% by weight, or ranging from 40% to 65% by weight; in one or more mixing steps of the first mixer (step (b)) and optionally during the charging (step (a)) the at least one temperature-control means is set to a temperature, $T_z$, ranging from 40° C. to 110° C., or ranging from 50° C. to 110° C., or ranging from 60° C. to 110° C., or 60° C. or higher, or 65° C. or higher, or ranging from 65° C. to 100° C., or ranging from 75° C. to 90°; the mixture (discharged from the first mixer) has a material temperature ranging from 120° C. to 150° C., or ranging from 130° C. to 140° C., e.g., where the solid elastomer comprises natural rubber; the elastomer is selected from natural rubber, styrene-butadiene rubber, butadiene rubber, and blends thereof, and the mixture has a material temperature ranging from 120° C. to 170° C.

With regard to any aspect or method or embodiment disclosed herein, including methods relating to a first and second mixer, where applicable, the method can further comprise any one or more of the following embodiments: a resulting total specific energy of the mixing in the first mixer (in (b)) ranges from 1000 to 2500 kJ/kg.

With regard to any aspect or method or embodiment disclosed herein, including methods relating to a first and second mixer, where applicable, the method can further comprise any one or more of the following embodiments: at least 50 wt % of the filler is silica; further comprising charging the first mixer with a coupling agent; the coupling agent is charged with at least a portion of the wet filler; in one or more mixing steps of the first mixer (step (b)) and optionally during the charging (step (a)) the at least one temperature-control means is set to a temperature, $T_z$, ranging from 40° C. to 100° C., or from 40° C. to 75° C., or ranging from 50° C. to 90° C., or ranging from 50° C. to 75° C.; the wet filler has a liquid present in an amount of at least 20% by weight, or an amount ranging from 20% to 65% by weight; the discharged mixture (in (c)) has a liquid content ranging from 1% to 10% by weight, or a liquid content ranging from 2% to 15% by weight; the composite has an oil content of less than 5% or less than 1% by weight based on the total weight of the composite; the mixture has a material temperature ranging from 100° C. to 140° C., or from 110° C. to 140° C., or from 130° C. to 150° C., or from 130° C. to 140° C.

With regard to any aspect or method or embodiment disclosed herein regarding a first and second mixer, where applicable, the method can further comprise any one or more of the following embodiments: the second mixer is a tangential mixer; a fill factor of the mixture in the second mixer ranges from 25% to 60%; a fill factor of the mixture in the second mixer ranges from 25% to 50%.

With regard to any aspect or method or embodiment disclosed herein, where applicable, the method can further comprise any one or more of the following embodiments: the composite has a Payne difference index of at least 105, or at least 110, and optionally the at least 50% of the filler is silica.

With regard to any aspect or method or embodiment disclosed herein, where applicable, the method can further comprise any one or more of the following embodiments: the filler comprises silicon-treated carbon black; at least 90% of the filler is silicon-treated carbon black; the silicon-treated carbon black is dispersed in the elastomer at a loading ranging from 30 phr to 150 phr; the silicon-treated carbon black is dispersed in the elastomer at a loading ranging from 40 phr to 100 phr; the silicon-treated carbon black is dispersed in the elastomer at a loading ranging from 40 phr to 65 phr; the silicon-treated carbon black has an STSA ranging from 60 m$^2$/g to 200 m$^2$/g; the silicon-treated carbon black has an STSA ranging from 60 m$^2$/g to 150 m$^2$/g; the silicon-treated carbon black has a COAN ranging from 60 mL/100 g to 120 mL/100 g; the silicon-treated carbon black has a COAN ranging from 70 mL/100 g to 115 mL/100 g.

With regard to any aspect or method or embodiment disclosed herein, where applicable, the method can further comprise any one or more of the following embodiments: the filler comprises a blend of at least two fillers selected from carbon black, treated carbon black, silica, and silicon-treated carbon black.

With regard to any aspect or method or embodiment disclosed herein relating to continuous mixing, where applicable, the method can further comprise any one or more of the following embodiments: the mixing in (b) occurs by contacting the solid elastomer and the wet filler with one or more rotors axially oriented in the elongate chamber; the temperature of the one or more rotors is controlled; the mixer is a continuous compounder; the conveying (b) is performed with at least one rotatable screw, through which mixing also occurs; the mixer is a twin-screw extruder; the charging in (a) comprises charging a substantially continuous flow of a pre-blend of the at least a solid elastomer and pelletized wet filler; the charging in (a) comprises charging, separately, a first substantially continuous flow of the solid elastomer and a second substantially continuous flow of the pelletized wet filler; the charging in (a) further comprises charging a substantially continuous flow of an antidegradant; the pelletized wet filler is a never-dried filler; the pelletized wet filler comprises dry filler that has been rewetted; the pelletized wet filler comprises carbon black; the pelletized wet filler comprises silica; the solid elastomer is selected from natural rubber, functionalized natural rubber, styrene-butadiene rubber, functionalized styrene-butadiene rubber, polybutadiene rubber, polyisoprene rubber, ethylene-propylene rubber, isobutylene-based elastomers, and blends thereof.

Another aspect is a composite comprising a filler dispersed in an elastomer, wherein the filler comprises carbon black in an amount of at least 50% by weight relative to the total weight of the filler and the elastomer comprises at least 50% by weight of natural rubber relative to the total weight of the elastomer, and the composite has the following properties:

(a) the filler has a state of dispersion in the elastomer according to equation (1):

$$A \leq 1.25*B + x \quad (1)$$

wherein:
A is d$_{90}$ of the area-equivalent diameter (μm) of filler particles in the composite, and t,?
 wherein B≥1%,
A and B are determined by optical microscopy in transmission mode of microtomed sections, and
x is a number ranging from 15 to 20; and (b) the composite has a property according to equation (2):

$$G'(0.1\%)/G'(200\%) \leq 0.1*G'(50\%) - y \quad (2)$$

wherein G'(0.1%) is a dynamic storage modulus measured at 0.1% strain amplitude, G'(200%) is a dynamic storage modulus measured at 200% strain amplitude, G'(50%) is a dynamic storage modulus measured at 50% strain amplitude, the dynamic storage modulus is measured at 100° C. at a frequency of 1 Hz, and y is a number ranging from 7 to 10.

With regards to the composite, any one or more of the following embodiments can apply: the filler comprises carbon black in an amount of at least 90% by weight relative to the total weight of the filler; the elastomer further comprises at least one rubber selected from polybutadiene rubber and styrene-butadiene rubber; x=15; y=10; the carbon black has an STSA of at least 60 m$^2$/g; the carbon black has an STSA ranging from 60 m$^2$/g to 210 m$^2$/g; the carbon black has a COAN of at least 75 mL/100 g; the carbon black has a ratio of BET/STSA ranging from 1 to 1.2; the composite has a carbon black loading of 60 phr or less, e.g., a loading ranging from 30 phr to 60 phr or from 40 phr to 60 phr; the filler further comprises silica; the composite consists of, or consists essentially of, the filler dispersed in the elastomer at a loading of at least 20 phr; the composite consists of, or consists essentially of, the filler dispersed in the elastomer at a loading of at least 20 phr and an antidegradant.

Another aspect is a method of making a vulcanizate, comprising mixing any of the composites disclosed herein with at least one curing agent and/or curing any of the composites disclosed herein in the presence of at least one curing agent.

Another aspect is a vulcanizate prepared from any of the composites disclosed herein.

Another aspect is a vulcanizate comprising a filler dispersed in an elastomer, wherein the filler comprises carbon black in an amount of at least 50% by weight relative to the total weight of the filler and the elastomer comprises at least 50% by weight of natural rubber relative to the total weight of the elastomer, and wherein:
the carbon black has an STSA of at least 60 m$^2$/g and a ratio of BET/STSA ranging from 1 to 1.2; and
the vulcanizate has resistivity and dispersion properties satisfying equation (3)

$$[\ln(R) - 3.8]/[0.28*\delta] \geq 0.0004*v + 0.9 \quad (3)$$

wherein:
R is resistivity in ohm·cm;
$\delta = (6000 \cdot [0.806 \cdot \phi^{-1/3} \beta^{-1/3} - 1]/\rho S) \times \beta^{1.43}$
wherein:
$\phi$ = volume fraction of carbon black in the composite,
S = BET surface area of the carbon black in m$^2$/g,
$\rho$ = carbon black density, assumed to be 1.8 g/cm$^3$,
$\beta = \phi_{eff}/\phi$,
$\phi_{eff}$ is the effective volume fraction of carbon black taking into account occluded rubber calculated from: $\phi_{eff} = \phi[1 + (0.0181*COAN)]/1.59$, wherein COAN is the compressed oil absorption number of the carbon black as determined by ASTM D3493; and
v ≥ 65, wherein v is a number of particles/mm$^2$ having an area-equivalent diameter of at least 4 μm as determined by optical microscopy in transmission mode of microtomed sections.

With regards to the vulcanizate, any one or more of the following embodiments can apply: the filler comprises carbon black in an amount of at least 90% by weight relative to the total weight of the filler; the elastomer further comprises at least one rubber selected from polybutadiene rubber and styrene-butadiene rubber; the carbon black has an STSA ranging from 60 m$^2$/g to 210 m$^2$/g; the carbon black has an STSA ranging from 60 m²/g to 190 m²/g; the carbon black has a COAN of at least 75 mL/100 g; the vulcanizate has a carbon black loading of 60 phr or less; the filler further comprises silica; the vulcanizate has a tensile stress ratio M300/M100 of at least 5.9, at least 6.0, at least 6.1, or at least 6.2, wherein M100 and M300 refer to the tensile stress at 100% and 300% elongation, respectively; the vulcanizate has a maximum tan δ (60° C.) of no greater than 0.22 (e.g., no greater than 0.21, no greater than 0.2, no greater than 0.19, or no greater than 0.18); the vulcanizate has a resistivity index of at least 105; the vulcanizate has a tan δ value that is less than a tan δ value of a vulcanizate prepared from a dry mix composite having the same composition ("dry mix equivalent"); the vulcanizate has a tensile stress ratio, M300/M100, that is greater than a tensile stress ratio of a vulcanizate prepared from a dry mix composite having the same composition, wherein M100 and M300 refer to the tensile stress at 100% and 300% elongation, respectively.

With regards to the vulcanizate prepared from a composite, in which the method of preparing the composite comprises a first and second mixer, the vulcanizate can have a tan δ value that is less than a tan δ value of a vulcanizate prepared from the mixture discharged in step (c); the vulcanizate has a tensile stress ratio, M300/M100, that is greater than a tensile stress ratio of a vulcanizate prepared from the mixture discharged in step (b), wherein M100 and M300 refer to the tensile stress at 100% and 300% elongation, respectively.

Another aspect is an article comprising any of the vulcanizates disclosed herein; the article can be selected from tire treads, undertread, innerliners, sidewalls, sidewall inserts, wire-skim, and cushion gum for retread tires; the article can be selected from hoses, linings, liners, seals, gaskets, anti-vibration articles, tracks, track pads for track-propelled vehicle equipment, engine mounts, earthquake stabilizers, mining equipment screens, mining equipment linings, conveyor belts, chute liners, slurry pump liners, mud pump impellers, valve seats, valve bodies, piston hubs, piston rods, plungers, impellers for mixing slurries and slurry pump impellers, grinding mill liners, cyclones and hydrocyclones, expansion joints, linings for dredge pumps and outboard motor pumps for marine equipment, shaft seals for marine, and propeller shafts.

Another aspect is a method of preparing a composite in an integrated manufacturing operation, comprising: (a) manufacturing a filler in a filler manufacturing facility, by a process wherein a final product that is a wet filler comprises a filler and a liquid present in an amount of at least at least 20% by weight based on total weight of wet filler; (b) conveying said wet filler to at least one mixer; (c) charging said at least one mixer with at least a solid elastomer and said wet filler, wherein the at least one mixer has at least one temperature-control means; (d) in one or more mixing steps, mixing the at least the solid elastomer and the wet filler to form a mixture, and in at least one of said mixing steps conducting said mixing at mixer temperatures controlled by at least one temperature-control means and removing at least a portion of the liquid from the mixture by evaporation; and (e) discharging, from the at least one mixer, the composite comprising the filler dispersed in the elastomer at a loading of at least 20 phr with a filler yield loss of no more than 10%, wherein the composite has a liquid content of no more than 10% by weight based on total weight of said composite.

With regard to the integrated manufacturing operation, where applicable, the method can further comprise any one or more of the following embodiments: the wet filler is never-dried filler; the filler manufacturing facility is a carbon black manufacturing facility, and said wet filler is never-dried carbon black; the filler manufacturing facility is a precipitated silica manufacturing facility, and said wet filler is never-dried precipitated silica; the filler manufacturing facility is a silicon-treated carbon black manufacturing facility; further comprising preparing a vulcanizate comprising the elastomer composite, and optionally forming articles that comprise the vulcanizate or the elastomer composite;

With regard to the integrated manufacturing operation, where applicable, the method can further comprise any one or more of the following parameters during the method: the at least one temperature-control means is set to a temperature, Tz, of 65° C. or higher during said mixing; and/or during said mixing, the one or more rotors operate, for at least 50% the mixing time, at a tip speed of at least 0.6 m/s; and/or charging a mixer with at least a solid elastomer comprising at least 50 wt. % natural rubber and a wet filler wherein a fill factor, on a dry weight basis, of the at least the solid elastomer and the wet filler is no more than 68%; and/or conducting said mixing at mixer temperatures controlled by at least one temperature-control means and applying an average specific power of at least 2.5 kW/kg over mixing time; and/or the mixing is a continuous mixing step and the charging comprises charging a continuous flow of at least a solid elastomer and a wet filler to a continuous mixer; and/or a second mixer to obtain the composite, wherein the second mixer is operated under at least one of the following conditions: (i) a ram pressure of 5 psi or less; (ii) a ram raised to at least 75% of its highest level; (iii) a ram operated in floating mode; (iv) a ram positioned such that it does not substantially contact the mixture; (v) the mixer is ram-less; and (vi) a fill factor of the mixture ranges from 25% to 70%; and/or the one or more rotors operate, for at least 50% the mixing time, at a tip speed of at least 0.5 m/s, resulting in a resulting total specific energy of at least 1500 kJ/kg composite, and wherein the wet filler is a wet particulate filler; and/or optionally adding at least one additive selected from antidegradants and coupling agents during said charging (a) or said mixing (b), and optionally adding one or more rubber chemicals after the mixer reaches a temperature of 120° C. or higher.

One skilled in the art can readily appreciate that where applicable, any of the aspects or embodiment disclosed herein can be combined, e.g., any two, three, four, etc. can be combined.

DETAILED DESCRIPTION

Disclosed herein, in part, are methods of preparing or forming a composite by mixing a solid elastomer with a wet filler. Also disclosed herein, in part, are composites, vulcanizates, and articles formed therefrom.

When mixing fillers and elastomers, a challenge is to ensure the mixing time is long enough to ensure sufficient filler incorporation and dispersion before the elastomer in the mixture experiences high temperatures and undergoes degradation. In typical dry mix methods, the mix time and temperature are controlled to avoid such degradation and the ability to optimize filler incorporation and dispersion is often not possible.

With the presently claimed methods, sufficient liquid is present in the mixture by utilizing a wet filler (e.g., comprising a filler and a liquid) to enable the batch time and temperature to be controlled beyond that attainable with known dry mixing processes. Other benefits may be attained, such as enhancing filler dispersion and/or facilitating rubber-filler interactions and/or improving rubber compound properties.

Wet fillers are typically not used for commercial production, because of the longer mixing times that are inherently required to evaporate the liquid as well as to disperse the filler in the elastomer (compared with "dry" mixing or dry mix or dry-mixed, i.e., dry filler mixed with solid elastomer).

In general, and as described here, the mixing process can be managed by controlling one or more mixer or process parameters, such as controlled mixer surface temperatures, rotor speeds, fill factor, ram pressure, the incorporation of rubber chemicals (if any) at later times of the mixing cycle, composite discharge temperatures, specific power, and/or the number of mixing steps or stages, e.g., application of two or more mixing stages.

The composite formed by the methods disclosed herein can be considered an uncured mixture of filler(s) and elastomer(s), optionally with one or more additives, in which the additives are discussed in further detail herein. The composite formed can be considered a mixture or masterbatch. The composite formed can be, as an option, an intermediate product that can be used in subsequent rubber compounding and one or more vulcanization processes. The composite, prior to the compounding and vulcanization, can also be subjected to additional processes, such as one or more holding steps or further mixing step(s), one or more additional drying steps, one or more extruding steps, one or more calendaring steps, one or more milling steps, one or more granulating steps, one or more baling steps, one or more twin-screw discharge extruding steps, or one or more rubber working steps to obtain a rubber compound or a rubber article.

The methods for preparing a composite include the step of charging or introducing into a mixer at least a solid elastomer and a wet filler, e.g., a) one or more solid elastomers and b) one or more fillers wherein at least one filler or a portion of at least one filler has been wetted with a liquid prior to mixing with the solid elastomer (wet filler). The combining of the solid elastomer with wet filler forms a mixture during the mixing step(s).

Wet Filler

The method further includes, in one or more mixing steps, conducting said mixing wherein at least a portion of the liquid is removed by evaporation or an evaporation process that occurs during the mixing. The liquid of the wet filler is capable of being removed by evaporation (and at least a portion is capable of being removed under the recited mixing conditions) and can be a volatile liquid, e.g., volatile at bulk mixture temperatures. The volatile liquid can be or include water, e.g., at least 50 wt. % water, at least 75 wt. % water, at least 90 wt. % water, at least 95 wt. % water, at least 99 wt. % water. For example, the liquid can have a boiling point at 1 atm. of 180° C. or less, e.g., 170° C. or less, 160° C. or less, 150° C. or less, 140° C. or less, 130° C. or less, 120° C. or less, 110° C. or less, or 105° C. or less, such as having a boiling point of from 60° C. to 180° C., from 60° C. to 170° C., from 60° C. to 160° C., from 60° C. to 150° C., from 60° C. to 140° C., from 60° C. to 130° C., from 60° C. to 120° C., from 60° C. to 110° C., from 60° C. to 100° C., from 60° C. to 90° C., from 90° C. to 180° C., from 90° C. to 170° C., from 90° C. to 160° C., from 90° C. to 150° C., from 90° C. to 140° C., from 90° C. to 130° C., from 90° C. to 120° C., from 90° C. to 110° C., from 90° C. to 100° C., from 95° C. to 120° C., or from 95° C. to 110° C. For example, a volatile liquid can be distinguished from oils (e.g., extender oils, process oils) which can be present during at least a portion of the mixing as such oils are meant to be present in the composite that is discharged and thus, do not evaporate during a substantial portion of the mixing time.

With respect to the wet filler, in one embodiment, the wet filler has the consistency of a solid. As an option, a dry filler is wetted only to an extent such that the resulting wet filler maintains the form of a powder, particulates, pellet, cake, or paste, or similar consistency and/or has the appearance of a powder, particulates, pellet, cake, or paste. The wet filler does not flow like a liquid (at zero applied stress). As an option, the wet filler can maintain a shape at 25° C. when molded into such a shape, whether it be the individual particles, agglomerates, pellets, cakes, or pastes. The wet filler is not a composite made by a liquid masterbatch process and is not any other pre-blended composite of filler dispersed in a solid elastomer (from elastomer in a liquid state) in which the elastomer is the continuous phase. In another embodiment, the wet filler can be a slurry. In yet another embodiment, the wet filler is not a slurry of filler and does not have the consistency of a liquid or slurry.

In their dry state, fillers may contain no or small amounts of liquid (e.g. water or moisture) adsorbed onto its surfaces. For example, carbon black can have 0 wt. %, or 0.1 wt. % to 1 wt. % or up to 3 wt. % or up to 4 wt. % of liquid and precipitated silica can have a liquid (e.g., water or moisture) content of from 4 wt. % to 7 wt. % liquid, e.g., from 4 wt. % to 6 wt. % liquid. Such fillers, are referred to herein as dry or non-wetted fillers. For the present wet fillers, liquid or additional liquid can be added to the filler and is present on a substantial portion or substantially all the surfaces of the filler, which can include inner surfaces or pores accessible to the liquid. Thus, sufficient liquid is provided to wet a substantial portion or substantially all of the surfaces of the filler prior to mixing with solid elastomer During mixing, at least a portion of the liquid can also be removed by evaporation as the wet filler is being dispersed in the solid elastomer, and the surfaces of the filler can then become available to interact with the solid elastomer. The wet filler can have a liquid content of at least 15% by weight relative to the total weight of the wet filler, e.g., at least 20%, at least 25%, at least 30%, at least 40%, at least 50% by weight, or from 15% to 99%, from 15% to 95%, from 15% to 90%, from 15% to 80%, from 15% to 70%, from 15% to 60%, from 15% to 65%, from 20% to 99%, from 20% to 95%, from 20% to 90%, from 20% to 80%, from 20% to 70%, from 20% to 60%, from 30% to 99%, from 30% to 95%, from 30% to 90%, from 30% to 80%, from 30% to 70%, from 30% to 60%, from 40% to 99%, from 40% to 95%, from 40% to 90%, from 40% to 80%, from 40% to 70%, from 40% to 60%, from 45% to 99%, from 45% to 95%, from 45% to 90%, from 45% to 80%, from 45% to 70%, from 45% to 60%, from 50% to 99%, from 50% to 95%, from 50% to 90%, from 50% to 80%, from 50% to 70%, or from 50% to 60% by weight, relative to the total weight of the wet filler. Liquid content of filler can be expressed as weight percent: 100*[mass of liquid]/[mass of liquid+mass of dry filler]. As another option, the amount of liquid can be determined based on the oil adsorption number (OAN) of the filler, where OAN is determined based on ASTM D1765-10. OAN is a measure of filler structure and can be used in determining the amount of liquid to wet the filler. For example, a wet filler such as a wet carbon black, wet silica (e.g., precipitated silica), or wet silicon-treated carbon black can have a liquid content determined according to the equation: k*OAN/(100+OAN)*100. In one embodiment, k ranges from 0.3 to 1.1, or from 0.5 to 1.05, or from 0.6 to 1.1, or from 0.7 to 1.1, or from 0.8 to 1.1, or from 0.9 to 1.1, or from 0.6 to 1.0, or from 0.7 to 1.0, or from 0.8 to 1.0, or from 0.8 to 1.05, or from 0.9 to 1.0, or from 0.95 to 1, or from 0.95 to 1.1, or from 1.0 to 1.1.

The liquid used to wet the filler can be, or include, an aqueous liquid, such as, but not limited to, water. The liquid can include at least one other component, such as, but not limited to, a base(s), an acid(s), a salt(s), a solvent(s), a surfactant(s), a coupling agent(s), and/or a processing aid(s) and/or any combinations thereof. More specific examples of the component are NaOH, KOH, acetic acid, formic acid, citric acid, phosphoric acid, sulfuric acid, or any combinations thereof. For example, the base can be selected from NaOH, KOH, and mixtures thereof, or the acids can be selected from acetic acid, formic acid, citric acid, phosphoric acid, or sulfuric acid, and combinations thereof. The liquid can be or include a solvent(s) that is immiscible with the elastomer used (e.g., alcohols such as ethanol). Alternatively, the liquid consists of from about 80 wt. % to 100 wt. % water or from 90 wt. % to 99 wt. % water based on the total weight of the liquid.

Solid Elastomer

With regard to the solid elastomer that is used and mixed with the wet filler, the solid elastomer can be considered a dry elastomer or substantially dry elastomer. The solid elastomer can have a liquid content (e.g., solvent or water content) of 5 wt. % or less, based on the total weight of the solid elastomer, such as 4 wt. % or less, 3 wt. % or less, 2 wt. % or less, 1 wt. % or less, or from 0.1 wt. % to 5 wt. %, 0.5 wt. % to 5 wt. %, 1 wt. % to 5 wt. %, 0.5 wt. % to 4 wt. %, and the like. The solid elastomer (e.g., the starting solid elastomer) can be entirely elastomer (with the starting liquid, e.g., water, content of 5 wt. % or less) or can be an elastomer that also includes one or more fillers and/or other components. For instance, the solid elastomer can be from 50 wt. % to 99.9 wt. % elastomer with 0.1 wt. % to 50 wt. % filler predispersed in the elastomer in which the predispersed filler is in addition to the wet filler. Such elastomers can be prepared by dry mixing processes between non-wetted filler and solid elastomers. Alternatively, a composite made by mixing a wet filler and solid elastomer (e.g., according to the processes disclosed herein) can be used as the solid elastomer and further mixed with a wet filler according to the processes disclosed herein. However, the solid elastomer is not a composite, mixture or compound made by a liquid masterbatch process and is not any other pre-blended composite of filler dispersed in an elastomer while the elastomer is in a liquid state, e.g., a latex, suspension or solution.

The wet filler can be separately charged to the mixer and ultimately mixed with the elastomer in the mixer. The solid elastomer can be one piece or multiple pieces or a bulk particulate material. Multiple pieces (e.g., strips, sheets, lumps) of the elastomer or bulk particulate material can be attained by cutting or grinding the solid elastomer using methods well known in the art. The size of these pieces can have dimensions of at least 1 μm e.g., at least 10 μm or at least 100 μm up to 10 cm, up to 5 cm, or up to 1 cm.

Examples of the solid elastomer include, but are not limited to, any solid form of natural elastomers or synthetic elastomers.

After the composite is formed and discharged, the method can include the further optional step of mixing the composite with additional elastomer to form a composite comprising a blend of elastomers. The "additional elastomer" can be the same or different from the solid elastomer used in the mixing step and can be any elastomer described herein, and dry composites thereof, such as natural rubbers or synthetic elastomers (e.g., styrene butadiene rubbers (SBR), polybutadiene (BR) and polyisoprene rubbers (IR), ethylene-propylene rubber (e.g., EPDM), isobutylene-based elastomers (e.g., butyl rubber), polychloroprene rubber (CR), nitrile rubbers (NBR), hydrogenated nitrile rubbers (HNBR), polysulfide rubbers, polyacrylate elastomers, fluoroelastomers, perfluoroelastomers, and silicone elastomers). Blends of two or more types of elastomers (blends of first and second solid elastomers), including blends of synthetic elastomers and natural rubbers or with two or more types of synthetic or natural rubber, may be used as well. For example, the mixer can be charged with two or more charges of different elastomers to form a composite blend. Alternatively, the mixer can be charged with an elastomer blend. As another option, the process can comprise mixing the discharged composite with additional elastomer to form the blend. Alternatively, the process can comprise mixing the discharged composite with additional elastomer, where the additional elastomer is the same as the solid elastomer that was initially charged to the mixer, to form a composite in which the filler loading is diluted. Alternatively, the process can comprise blending a first discharged composite with a second discharged composite, each of the first and second discharged composite made from wet filler and solid elastomer), in which the first and second discharged composite can have the same or different fillers (e.g., to form a blend of fillers) or can have the same or different elastomers (e.g., to form a blend of elastomers).

Charging the Mixer

In the methods disclosed herein, at least the solid elastomer and wet filler are charged (e.g. fed, introduced) into the mixer. For example, the charging of the solid elastomer and wet filler can be a step wherein the solid elastomer and wet filler are introduced to the mixer. The charging of the solid elastomer and/or the filler can occur in one or multiple steps or additions. The charging can occur in any fashion including, but not limited to, conveying, metering, dumping and/or feeding in a batch, semi-continuous, or continuous flow of the solid elastomer and the wet filler into the mixer. The solid elastomer and wet filler are not introduced as a pre-mixture to the mixer, in which the pre-mixture was prepared by means other than combining solid elastomer and wet filler. The solid elastomer and wet filler can be added together but not as a mixture prepared by means other than combining solid elastomer and wet filler (e.g., not where the wet filler is pre-dispersed into the elastomer by means other than combining solid elastomer and wet filler, in which the elastomer is the continuous phase). A mixture or pre-mixture or pre-blend from solid elastomer and wet filler can be charged to the mixer and can be prepared by any number of known methods, e.g., in a mixer or a container. The charging of the solid elastomer and the charging of the wet filler can occur all at once, or sequentially, and can occur in any sequence. For example, (a) all solid elastomer added first, (b) all wet filler added first, (c) all solid elastomer added first with a portion of wet filler followed by the addition of one or more remaining portions of wet filler, (d) a portion of solid elastomer added and then a portion of wet filler added, (e) at least a portion of the wet filler is added first followed by at least a portion of the solid elastomer, or (f) at the same time or about the same time, a portion of solid elastomer and a portion of wet filler are added as separate charges to the mixer.

As an option of the charging step, the solid elastomer can be masticated until the solid elastomer reaches a predetermined temperature, e.g., a temperature of about 90° C. or 100° C. or higher prior to charging the wet filler into the mixer. This temperature can be from 90° C. to 180° C., from 100° C. to 180° C., from 110° C. to 170° C., from 120° C. to 160° C., or from 130° C. to 160° C. The elastomer can be masticated using an internal mixer such as a Banbury or Brabender mixer, an extruder, a roll mill, a continuous compounder, or other rubber mixing equipment.

As an option, the charging can be such that dry filler is introduced into the mixer and wetted by adding the liquid (e.g., water, either sequentially or simultaneously or near simultaneously) to form the wet filler in the mixer, and then the solid elastomer can be added to the mixer. The introduction of dry filler to be wetted can be performed with all of the filler intended to be used or a portion thereof (e.g., wherein one or more additional portions of the wet filler are further added to the mixer to obtain the intended total amount of starting wet filler).

As an option, the solid elastomer (all or part) or wet filler (all or part) can be added to the mixer separately but within 20 minutes of each other or within 15 minutes or within 10 minutes or within 5 minutes, or within 1 minute, within 30 seconds of each other, or within 15 seconds of each other.

Mixing

With regard to mixing, the mixing can be performed in one or more mixing steps. Mixing commences when at least the solid elastomer and wet filler are charged to the mixer and energy is applied to a mixing system that drives one or more rotors of the mixer. The one or more mixing steps can occur after the charging step is completed or can overlap with the charging step for any length of time. For example, a portion of one or more of the solid elastomers and/or wet filler can be charged into the mixer before or after mixing commences. The mixer can then be charged with one or more additional portions of the solid elastomer and/or filler. For batch mixing, the charging step is completed before the mixing step is completed.

By "one or more mixing steps," it is understood that the steps disclosed herein (e.g., with the recited parameters of tip speed, $T_z$, fill factor, specific energy, specific power, etc.) may be a first mixing step followed by further mixing steps prior to discharging. Alternatively, the steps disclosed herein (e.g., with the recited parameters of tip speed, $T_z$, fill factor, specific energy, specific power, etc.) need not necessarily be performed as the first mixing step. For example, the one or more mixing steps can comprise a first mixing step in which the solid elastomer and wet filler are mixed under conditions in which minimal amounts of liquid are removed by evaporation. For example, the first mixing step can form a preblend. The mixture from this first mixing step can then be subjected to a second or further mixing step that is performed with the disclosed processes (e.g., with the recited parameters of tip speed, $T_z$, fill factor, specific energy, specific power, etc.). As understood in the art, a mixing step is equivalent to a mixing stage.

As indicated, during the one or more mixing steps, in any of the methods disclosed herein, at least some liquid present in the mixture and/or wet filler introduced is removed at least in part by evaporation. As an option, the majority (by wt. %) of any liquid removed from the mixture occurs by evaporation. For example, at least 50 wt. % of liquid is removed by evaporation, based on total weight of liquid removed during the mixing. The total weight of liquid removed can be determined from the difference between liquid content of the wet filler and any liquid remaining in the composite when discharged from the mixer plus any liquid present in, or drained from, the mixer when the composite is discharged from the mixer. For example, when the composite is discharged, additional liquid (e.g., unevaporated liquid) may also be discharged, either with or within the composite or through outlets provided in the mixer. Liquid removal by evaporation can represent at least 30 wt. %, at least 40 wt. %, at least 50 wt. %, at least 60 wt. %, at least 70 wt. %, at least 80 wt. %, or from 51 wt. % to 100 wt. %, from 51 wt. % to 95 wt. %, from 51 wt. % to 90 wt. %, from 51 wt. % to 80 wt. %, from 51 wt. % to 70 wt. %, from 60 wt. % to 100 wt. %, from 60 wt. % to 95 wt. %, from 60 wt. % to 90 wt. %, or from 60 wt. % to 80 wt. % of the total liquid contained in the wet filler that is charged to the mixer.

As an option, the one or more mixing steps or stages can further remove a portion of the liquid from the mixture by expression, compaction, and/or wringing, or any combinations thereof. Alternatively, a portion of the liquid can be drained from the mixer after or while the composite is discharged.

With regard to the mixer that can be used in any of the methods disclosed herein, any suitable mixer can be utilized that is capable of combining (e.g., mixing together or compounding together) a filler with solid elastomer. The mixer(s) can be a batch mixer or a continuous mixer. A combination of mixers and processes can be utilized in any of the methods disclosed herein, and the mixers can be used sequentially, in tandem, and/or integrated with other processing equipment. The mixer can be an internal or closed mixer or an open mixer, or an extruder or a continuous compounder or a kneading mixer or a combination thereof. The mixer can be capable of incorporating filler into solid elastomer and/or capable of dispersing the filler in the elastomer and/or distributing the filler in the elastomer. Any one or combination of commercial mixers to produce rubber compounds can be used in the present methods.

The mixer can be capable of batch processing, continuous processing, or semi-continuous processing. The mixer can have any chamber capacity. An internal mixer generally includes an enclosed mixing chamber. For batch mixers, the chamber capacity can be at least 1 L, at least 2 L, at least 5 L, at least 10 L, at least 20 L, at least 50 L, at least 100 L, at least 250 L, at least 300 L, at least 600 L, or at least 1000 L, such as from 1 L to 1500 L, 10 L to 1200 L, 10 L to 1000 L, 10 L to 750 L, 10 L to 500 L, 10 L to 300 L, 10 L to 100 L, 20 L to 1500 L, 20 L to 1200 L, 20 L to 1000 L, 20 L to 750 L, 20 L to 500 L, 20 L to 300 L, 20 L to 100 L, 50 L to 1500 L, 50 L to 1200 L, 50 L to 1000 L, 50 L to 750 L, 50 L to 500 L, 50 L to 300 L, or 50 L to 100 L.

The top of a typical batch mixing chamber can be raised and lowered by a pneumatic or hydraulic piston, commonly referred to as a "floating weight" or a "ram". The ram operates within a housing known as the "feed hopper," which has a charge door, through which the materials to be mixed are introduced. The ram is raised to feed the materials (e.g., at least solid elastomer and wet filler) and lowered to apply pressure to the mixture and confine the mixture within the mixing chamber. Typically, the fill factor of the batch and the ram pressure are selected so the ram can reach its lowermost position to minimize the clearance between the ram and the rotors, which can enable good filler dispersion. The vertical distance of the ram above its minimum position is known as the "ram deflection." The bottom of a typical batch mixer can be lowered on a pivot and is known as the "drop door". It is used to discharge or "dump" the contents of the mixer.

The mixer can have one or more rotors (at least one rotor). For example, each rotor can rotate inside its own cylindrical chamber, which can be connected to the chamber(s) of the other rotor(s). Typically, for a batch mixer, two rotors are utilized. The bodies of the one or more rotors are attached to shafts and can form one integral component. The shafts are controlled by a mixing system to which energy (electrical energy) is applied. A rotor can be considered a device that imparts energy to the mixture and/or the components that form the mixture. The rotors can be designed with inner circuits or channels of steam or water or other fluid for cooling and/or heating. If there are two rotors, they generally revolve in same or opposite directions, and can revolve at the same or different speeds (e.g. within 20 rpm of each other or within 10 rpm of each other). The acute convergence of the rotors with the chamber walls and/or between the rotors, impart a shearing action to the mixture and the resulting intensive working produces a generally homogeneous mixture. The at least one rotor or the one or more rotors can be screw-type rotors, intermeshing rotors, tangential rotors, kneading rotor(s), rotors used for extruders, a roll mill that imparts significant total specific energy, or a creper mill. Generally, one or more rotors are utilized in the mixer, for example, the mixer can incorporate one rotor (e.g., a screw type rotor), two, four, six, eight, or more rotors. Sets of rotors can be positioned in parallel and/or in sequential orientation within a given mixer configuration.

The liquid that evaporates from the mixture can leave the mixer in one case from a gap between the ram and the body and/or a port or outlet or vent designed to release evaporated liquid (e.g., steam). For example, in continuous mixers (such as devolatizing extruders), the evaporated liquid can be released through vent stuffers or through a piston that periodically clears materials (e.g., evaporated liquid) through vents or outlets or ports.

The one or more mixing steps can be a single mixing step, e.g., a one-stage or single stage mixing step or process, in which the mixing is performed under one or more of the following conditions: at least one of the mixer temperatures are controlled by temperature controlled means with one or more rotors operating at a tips speed of at least 0.6 m/s for at least 50% of mixing time, and/or the at least one temperature-control means that is set to a temperature, Tz, of 65° C. or higher, the fill factor is 68% or less, an average specific power of at least 2.5 kW/kg is applied over mixing time, and/or continuous mixing, and/or the mixing is carried out in the substantial absence of the one or more rubber chemicals prior to the mixer reaching an indicated temperature; each is described in further detail herein. In certain instances, in a single stage or single mixing step the composite can be discharged with a liquid content of no more than 10% by weight. In other embodiments, two or more mixing steps or mixing stages can be performed so long as one of the mixing steps is performed under one or more of the stated conditions.

With multi-stage mixing, as an option, a second or any number of subsequent stages of mixing can provide a composite that improves the corresponding compound properties compared to a compound prepared from a composite mixed with only single-stage mixing. Put another way, a composite formed from single stage mixing can be compared to a composite formed from additional stage mixing processes, e.g., subjected to a second stage. When such multi-stage mixing is utilized, one or more of the corresponding compound properties (e.g., tan delta and/or tensile stress ratio) can be improved. The improvement can be a 5%, 10%, or 15% or more improvement in one or more properties as compared to a compound prepared from a composite subjected to single stage mixing. This improvement can be obtained independent of the type of filler used and independent of the type of elastomers used. For example, the second stage can be performed with a second mixer operated under at least one of the following conditions: (i) a ram pressure of 5 psi or less; (ii) a ram raised to at least 75% of its highest level; (iii) a ram operated in floating mode; (iv) a ram positioned such that it does not substantially contact the mixture; (v) the mixer is ram-less; and (vi) a fill factor of the mixture ranges from 25% to 70%.

The process can utilize one or more mixing steps and/or one or more mixers. For example, mixing the at least solid elastomer and wet filler to form a mixture, removing at least a portion of the liquid from the mixture by evaporation, and discharging from the mixer the composite having a liquid content of no more than 10% by weight can occur as one mixing step in one mixer. In the context of more than one mixing step, the discharged product, while a composite, can also be referred to as a mixture as it will be subjected to further processing or mixing to form the final composite. In another example, a first mixing step comprises mixing the at least solid elastomer and wet filler to form a mixture, and the second mixing step comprises discharging from the mixer the composite (or mixture) having a liquid content of no more than 10% by weight. In this option, the first and second mixing steps can be performed in the same or different mixers. In yet another example, mixing the at least solid elastomer and wet filler to form a mixture, removing at least a portion of the liquid from the mixture by evaporation, and discharging from the mixer the composite (or mixture) having a liquid content of no more than 10% by weight can occur as one mixing step, and a second mixing step (in the same or a second mixer) can be performed to further dry the composite (or mixture). In other words, the process can include using more than one mixer such that the mixture is mixed in a first mixer in a first mixing step and then taken out and charged into a second mixer in a second mixing step, and so on as desired. Each mixer, if more than one is utilized, can be the same or different from the other mixers that are used in the method. For example, the composite (or mixture) can be discharged from a first mixer and otherwise conveyed to a second mixer. In another example, the composite (or mixture) can be discharged from a mixer and then charged back to the same mixer (e.g., after allowing to cool). These processes, which can be known as multi-stage mixing, can be repeated as many times as needed. Each stage can be mixed with the same or one or more different operating parameters.

During typical dry mixing processes with filler (non-wetted) and solid elastomer, the temperature of the mixture increases at least in part due to viscous flow of the elastomer, e.g., during mastication of the elastomer and/or the mixing as the filler is incorporated into the elastomer. This increase can be quite rapid, and the mixture is typically discharged before substantial thermal degradation of the rubber occurs, whether or not adequate filler dispersion has been achieved.

It has been discovered that by incorporating a wet filler in the mixing process, the presence of and subsequent evaporation of the liquid can enable improved dispersion of the filler in the elastomer. To obtain a suitable final composite, the amount of liquid is reduced (e.g., to an amount of 10% or less, based on total composite weight). Without wishing to be bound by any theory, the presence of liquid can cool and/or lubricate the mixture, which can reduce the overall rate of temperature increase which enables an increase of the mixing or residence time and improved filler dispersion without substantial degradation of the elastomer. Further these can result in improved composite and vulcanizate properties.

Temperature Control

In certain embodiments, in at least one of the mixing steps, the method comprises conducting the mixing at mixer temperatures controlled by at least one temperature-control means. Alternatively stated, the method can comprise conducting the mixing at controlled mixer temperatures, such as by use of a temperature controller. Controlling mixer temperatures refers to controlling temperatures of at least one surface of the mixer. As an option, mixer temperatures can be controlled during both the charging and at least one of the mixing steps. The temperature-control means can be a temperature-controlling device on and/or within the mixer or otherwise associated with the mixer (e.g., connected to the mixer) that heats or cools at least one surface, and/or one or more parts of the mixer. Without wishing to be bound by any theory, by controlling the mixer temperature, e.g., mixer surface temperature, through temperature-control means, mixing characteristics such as slippage and gripping of the mixture at mixer surfaces can be influenced, which can influence the shear and viscous flow of mixture within the mixer, and can in turn influence heat generation by the mixture.

Slippage can be an issue when liquid is present in the mixture. Without wishing to be bound by any theory, the risk of excessive slippage (lubrication) can be more likely when the surface temperature of the mixer surface is too low. Such excessive slippage can lead to less viscous flow and subsequently low heat generation, which in turn can decrease the rate of liquid removal by evaporation and cause inefficient or inadequate mixing, inefficient or inadequate drying, and/or long mix times. There can be slow filler incorporation and/or inferior filler dispersion in the elastomer. In typical mixing with dry filler, slippage is not a significant issue; however, the viscous flow of mixture can be more pronounced and can result in faster heat generation, which can degrade the elastomer. Such rapid heat generation, which results in rapid temperature rise of the mixture, requires short residence or mixing times to avoid rubber degradation. Insufficient mixing and inadequate filler dispersion can result.

Without wishing to be bound by any theory, without temperature control of at least one surface of the mixer while mixing wet filler and solid elastomer (e.g., mixing in the absence of at least one temperature control means), there may be less opportunity to control slippage and resulting temperature properties, e.g., temperature profile. At the initial stages of the mixing, the mixer surface temperature can have a wide range of surface temperatures, e.g., from room temperature to, e.g., high temperatures of 180° C. or more when operating sequential mixing processes or batches. Charging the solid elastomer and wet filler into a mixer at room temperature may cause inefficient mixing as excessive slippage is more likely to occur and heat generation of the mixture can be delayed or may not even occur. As a result, the mixing may be inefficient, or the mixture can be discharged with a high liquid content and/or unincorporated fillers at the mixture surface. Charging the solid elastomer and wet filler into a mixer at high temperatures in the absence of temperature-control means can cause too rapid evaporation of the liquid and the benefits of using wet filler are not realized. Without a temperature control means, the mixing characteristics and mixture qualities may be difficult to control and could change between mixing process. At temperatures above the boiling point of the liquid, flashing and loss of liquid may occur. If loss of liquid takes the form of vapor, the vapor may convey filler, leading to filler yield loss. In some situations, high surface temperature of the mixer parts may create safety hazards.

Without wishing to be bound by any theory, if the mixer surface temperature is controlled (such as by a temperature control means), slippage between the mixture and mixer surface can be controlled, which in turn can influence the mixture viscous flow and resulting heat generation. In addition, or in the alternative, controlled mixer surface temperatures can enable better gripping of the mixer surface by the mixture. By controlling the mixer surface temperature, it may be possible to control the viscous flow heat generation and mix time to reach the target discharge temperature.

Without wishing to be bound by any theory, in the alternative or in addition to any other mechanism, controlling the mixer surface temperature by at least one temperature control means can enable control of the surface or bulk temperature of the mixture. At the beginning of mixing, the solid elastomer in the mixture is typically at room temperature, and in the situation where the mixer surface temperature is greater than that of the mixture, the mixer surface can transfer heat to at least a portion of the mixture such that the mixture surface temperature can increase. Without wishing to be bound by any theory, in the alternative or in addition to any other mechanism, the increase in mixture surface temperature can enable the mixture to grip the mixer surface, reducing slippage, and allowing the mixer to input more energy to the mixture and generate enough heat via viscous flow, eventually removing the liquid. Once the mixture temperature exceeds the mixer surface temperature, the mixer surface can allow the transfer of heat from the mixture. In other words, the mixer cools at least a portion of the mixture, e.g., cools the surface or bulk. This cooling can delay rapid temperature rise and permit longer mixing or residence times at temperatures that do not degrade the rubber.

This control over mixer surface temperatures, by whichever mechanism(s), can provide an opportunity for longer mixing or residence times, which can result in improved filler dispersion and/or improved rubber-filler interactions and/or consistent mixing and/or efficient mixing, compared to mixing processes without temperature control of at least one mixer surface.

The temperature-control means can be, but is not limited to, the flow or circulation of a heat transfer fluid through channels in one or more parts of the mixer. For example, the heat transfer fluid can be water or heat transfer oil. For example, the heat transfer fluid can flow through the rotors, the mixing chamber walls, the ram, and the drop door. In other embodiments, the heat transfer fluid can flow in a jacket (e.g., a jacket having fluid flow means) or coils around one or more parts of the mixer. As another option, the temperature control means (e.g., supplying heat) can be electrical elements embedded in the mixer. The system to provide temperature-control means can further include means to measure either the temperature of the heat transfer fluid or the temperature of one or more parts of the mixer. The temperature measurements can be fed to systems used to control the heating and cooling of the heat transfer fluid. For example, the desired temperature of at least one surface of the mixer can be controlled by setting the temperature of the heat transfer fluid located within channels adjacent one or more parts of the mixer, e.g., walls, doors, rotors, etc.

The temperature of the at least one temperature-control means can be set and maintained, as an example, by one or more temperature control units ("TCU"). This set temperature, or TCU temperature, is also referred to herein as "$T_z$." In the case of temperature-control means incorporating heat transfer fluids, $T_z$ is an indication of the temperature of the fluid itself. The heating or cooling provided by the temperature control means, depending on $T_z$, is transferred to at least one surface of the mixer or one or more parts of the mixer; heat is transferred to or from the at least one surface and then to or from the material in the mixer to influence a bulk temperature of the mixture or a portion thereof e.g., local temperature of the mixture. If the flow of the heat transfer fluid is sufficient, the transferred heating or cooling should result in a temperature of the mixer part that is reasonably close to $T_z$. As an option, the velocity of the heat transfer fluid in the channels is at least 1 m/s.

The mixer can have thermocouples located at different parts of the mixer to provide a more accurate measurement of the temperature of the mixer part(s) or the mixture. Typical thermocouples installed in commercial mixers are effective in measuring temperature of the mixture. The temperature of the at least one surface may deviate from $T_z$ but should still reasonably approximate $T_z$, e.g., the average surface temperature of at least one surface deviates from $T_z$ by +/−5%, +/−10%+/−20%.

In alternative or additional embodiments, the temperature-control means or device includes a communication link between the temperature monitor/setting device and the heating/cooling device, such as a heater chiller or a combined heater-chiller that has the ability to heat a fluid or chill a fluid to maintain the set temperature.

The mixer can have more than one temperature-control means or devices, such as two, three, or more that each provide a region of temperature control within the mixer or section of the mixer. When more than one temperature-control means or devices are utilized, each temperature-control device or means can utilize the same or different $T_z$ temperatures. As a further example, when two or more temperature-control devices or means are utilized, the temperature difference between each temperature setting can be 0° C. or about 0° C., or can be a temperature difference of from 1° C. to 100° C. or from 1° C. to 50° C., such as from 5° C. to 50° C. (e.g. $T_{Z1}$, $T_{Z2}$, $T_{Z3}$ are ±0° C. or ±5° C. or ±10° C. or ±20° C. or ±30° C., 40° C. and the like). The one or more temperature-control means or device(s) can be located at any portion or part of the mixer(s). For instance, a wall(s) or all walls of the mixer or mixer chamber, and/or the ram, and/or the drop door(s), and/or the one or more rotors, and/or extrusion head can be temperature controlled to form one or multiple temperature-control regions. As an option, the at least one temperature-control means heats at least a wall of the mixer.

As stated, the mixer temperature or mixer temperatures can be controlled by at least one temperature-control means. As an option, and in general, the temperature-control means can be set to a temperature, $T_z$, ranging from 5° C. to 150° C. or ranging from 5° C. to 155° C. For instance, if the mixer is equipped with a fluid jacket, the heat transfer fluid passing through the fluid jacket prior to any heat transfer with material in the mixer is at $T_z$ or about $T_z$, e.g., within 5° C. or within 2° C. or within 1° C. of $T_z$. As an option, the temperature-control means can be set to a temperature, $T_z$, ranging from 30° C. to 150° C., from 40° C. to 150° C., from 50° C. to 150° C., or from 60° C. to 150° C., e.g., from 30° C. to 155° C., from 30° C. to 125° C., from 40° C. to 125° C., from 50° C. to 125° C., from 60° C. to 125° C., from 30° C. to 110° C., from 40° C. to 110° C., from 50° C. to 110° C., 60° C. to 110° C., from 30° C. to 100° C., from 40° C. to 100° C., from 50° C. to 100° C., 60° C. to 100° C., from 30° C. to 95° C., from 40° C. to 95° C., from 50° C. to 95° C., 50° C. to 95° C., from 30° C. to 90° C., from 40° C. to 90° C., from 50° C. to 90° C., from 65° C. to 95° C., from 60° C. to 90° C., from 70° C. to 110° C., from 70° C. to 100° C., from 70° C. to 95° C., 70° C. to 90° C., from 75° C. to 110° C., from 75° C. to 100° C., from 75° C. to 95° C., or from 75° C. to 90° C. Other ranges are possible with equipment available in the art. The temperature-control means can be set to any of these temperatures, Tz, during the charging step.

In other embodiments, the temperature-control means can be set to a temperature higher than typically used for dry mixing, e.g., a temperature of 65° C. ($T_z$) or higher. The $T_z$ is imparted by the temperature-control means. For instance, if the mixer is equipped with a fluid jacket, the heat transfer fluid passing through the fluid jacket prior to any heat transfer with material in the mixer is at this temperature or about this temperature, e.g., within 5° C. or within 2° C. or within 1° C. The ($T_z$) can be set to a temperature in the range of from 65° C. to 140° C., or from 65° C. to 130° C., or from 65° C. to 120° C., or from 65° C. to 110° C., or from 65° C. to 100° C., or from 65° C. to 95° C., or from 70° C. to 130° C., or from 70° C. to 120° C., or from 70° C. to 110° C., or from 70° C. to 100° C., or from 80° C. to 140° C., or from 80° C. to 130° C., or from 80° C. to 120° C., or from 80° C. to 110° C., or from 80° C. to 100° C., or other temperatures within or above or below these ranges.

Optimal $T_z$ values can selected based on filler type. For example, for fillers comprising carbon black and silicon-treated carbon black (e.g., at least 50 wt. %, at least 75 wt. %, at least 90 wt. %, or all or substantially all of the filler is carbon black or silicon-treated carbon black), $T_z$ can have the values described herein e.g., 65° C. or greater or 65° C. to 100° C. When the filler is silica, Tz values can range from 40° C. to 110° C., from 40° C. to 100° C., e.g., from 40° C. to 90° C., from 40° C. to 80°, from 40° C. to 75° C., from 50° C. to 110° C., from 50° C. to 100° C., from 50° C. to 90° C., from 50° C. to 80°, from 50° C. to 75° C., from 60° C. to 110° C., or from 60° C. to 100° C.

As an option, e.g., where the mixer conditions generate sufficient mechanical energy input, the upper limit of $T_z$ should not substantially exceed the boiling point of the liquid in the wet filler. If too rapid evaporation occurs, this can result in the liquid removal before sufficient mixing has occurred and in addition, some of the filler can escape through mixer vents along with the vapors (e.g., steam), resulting in insufficient loading of filler in the discharged composite and high filler yield loss. Moreover, some of the loose filler can coat the surface of the composite. As an option, the upper limit of Tz may be selected to approximate the boiling point of the liquid, such as +10° C., or +5° C., or +1° C., or −1° C., or −5° C., or −10° C. of the boiling point of the liquid.

An option to prevent the temperature of the mixture from surpassing the boiling point of the liquid during charging or in the early stages of the mix, is to stage the addition of the wet filler to the mixer. For example, a fraction or portion of the filler can be added at the start and the remainder added later in the mixing cycle (in one or more steps of addition). Another option is to select a mixer condition that permits all of the wet filler to be added at or near the start of the cycle. Another option is to add additional liquid (e.g., water) to the mixer (e.g., the mixer chamber) to cool the mixture.

Total Specific Energy

Compared to dry mixing, under similar situations of filler type, elastomer type, and mixer type, the present processes can allow higher energy input. Controlled removal of the liquid from the wet filler enables longer mixing times and consequently improves the dispersion of the filler. The energy input can be indicated by a resulting total specific energy imparted to the composite during the mixing process.

For example, mixing occurs when at least the wet filler and solid elastomer are charged to the mixer and energy is applied to at least one rotor. For example, in a batch mixer, total specific energy takes into account energy applied to the rotor(s) between the charge of solid elastomer and/or wet filler and the discharge per kg of composite on a dry weight basis. For a continuous mixer, total specific energy is the power input per kg of output on a dry weight basis at steady state conditions. For processes that have multiple stage mixing, the total specific energy is the sum of the specific energies from each mixing process. The determination of total specific energy preferably does not include the amount of energy used for shaping or forming the discharged composite (e.g., excludes energy of roll milling of the composite). The resulting "total specific energy," as defined herein is the energy, $E_R$ (e.g., electrical energy) applied to a mixing system that drives the one or more rotors per mass of composite on a dry weight basis. This total specific energy can also be designated at $E_{TOTAL}$. As described herein, the present processes provide a total specific energy under selected operating conditions that balance longer mixing times with evaporation or removal of water in a reasonable amount of time.

As an option, the process comprises, in at least one of the mixing steps, conducting the mixing such that a resulting total specific energy is at least 1,100 kJ/kg, at least 1,200 kJ/kg, at least 1,300 kJ/kg, or at least 1,400 kJ/kg or at least 1,500 kJ per kg composite, e.g., at least 1,600 kJ/kg, at least 1,700 kJ/kg, at least 1,800 kJ/kg, at least 1,900 kJ/kg, at least 2,000 kJ/kg, at least 2,500 kJ/kg, or at least 3,000 kJ/kg. As an alternative for certain systems, the total specific energy can range from 1,000 kJ/kg to 3,000 kJ/kg, e.g., from 1,000 kJ/to 2,500 kJ/kg, from 1,100 kJ/to 2,500 kJ/kg, etc. As an option, the total specific energy can range from about 1,400 kJ/kg composite or about 1,500 kJ/kg composite (or per kg mixture present in the mixer) to about 10,000 kJ/kg composite (or per kg mixture present in the mixer), such as from 2,000 kJ/kg to about 5,000 kJ or 1,500 kJ/kg to 8,000 kJ/kg, 1,500 kJ/kg to 7,000 kJ/kg, 1,500 kJ/kg to 6,000 kJ/kg, 1,500 kJ/kg to 5,000 kJ/kg, 1,500 kJ/kg to 3,000 kJ/kg, 1,600 kJ/kg to 8,000 kJ/kg, 1,600 kJ/kg to 7,000 kJ/kg, 1,600 kJ/kg to 6,000 kJ/kg, 1,600 kJ/kg to 5,000 kJ/kg, 1,600 kJ/kg to 4,000 kJ/kg, 1,600 kJ/kg to 3,000 kJ/kg, or other values in any of these ranges.

Specific Energy After Filler Addition

Besides total specific energy, an understanding of $E_{100\% \ Filler}$ and $E_{75\% \ Filler}$ and how they compared to total specific energy can be useful in one or more aspects disclosed herein. The $E_{100\% \ Filler}$ is the amount of specific energy (kJ per kg of dry composite) that is utilized once 100% (by weight) of all filler is added or present during mixing (in the mixer) and until the composite is discharged and has a liquid content of no more than 10% by weight, e.g. no more than 5% by weight, no more than 4% by weight, no more than 3% by weight, or no more than 2% by weight. Further, $E_{75\% \ Filler}$ is the amount of energy (kJ per kg of dry composite) that is utilized once 75% (wt.) of all filler is added or present during mixing until the composite is discharged and has a liquid content of no more than 10% by weight, e.g. no more than 5% by weight, no more than 4% by weight, no more than 3% by weight, or no more than 2% by weight. The manner in which $E_{100\% \ Filler}$ and $E_{75\% \ Filler}$ are measured is no different from total specific energy except for the time point when the amount of energy inputted to mixing is calculated.

$E_{100\% \ Filler}$ and $E_{75\% \ Filler}$ can be measured from the point in time when the ram is lowered after the filler has been charged to the mixer to commence or recommence mixing (the latter being the case where two or more filler addition steps are performed). Thus, if the filler is not added all at once, then $E_{100\% \ Filler}$ will be different from $E_{75\% \ Filler}$. And, unless all of the filler is added prior to any mixing, the total specific energy will be higher than $E_{100\% \ Filler}$ and $E_{75\% \ Filler}$. From various experiments, as an option, a preference can be understood for a minimum $E_{100\% \ Filler}$ and a minimum $E_{75\% \ Filler}$ that is not necessarily the same as a minimum total specific energy. Sometimes, a better understanding of the filler-elastomer interaction can be achieved by studying and appreciating the $E_{100\% \ Filler}$ and/or $E_{75\% \ Filler}$ in connection with one or more of the methods disclosed herein.

The properties of rubber compounds can, in part, be driven by formulation (choice of elastomer, the type of filler, etc.) and how these ingredients are brought together (e.g. through mixing). For a given material choice and filler loading, properties can be influenced by (a) extent of filler dispersion and its distribution in the elastomer matrix, (b) adhesion (interaction) between the filler and the polymer, (c) polymer properties, and other factors. The challenge is to increase the dispersion by mixing without negatively impacting interaction and/or degrading the polymer. Degradation from high energy inputs can be viewed as breakdown of polymer chains and oxidation for elastomers, such as natural rubber, or gel formation for synthetic rubbers. Without wishing to be bound by any theory, compared to mixing with dry filler, with wet filler more specific energy can be applied to the mixture and be available for dispersion. This energy can then be released, in part, by evaporation of the liquid. This contrast dry mixing, in which the majority of the energy input results in temperature increase, and subsequently potential degradation of the elastomer.

For fillers, e.g., when the filler includes or is carbon black or a carbon based-filler (such as a dual phase carbon black-silica or carbon black-silicon aggregate, e.g., silicon-treated carbon black), or when the filler is primarily (by weight of total filler) carbon black or a carbon based filler, there can be a preferred minimum amount of specific energy (E) to disperse the wet filler after a substantial amount of filler (at least 75% by weight of the total wet filler in the composite) (has been charged into the mixer), in order to obtain desirable improvement in the properties of the resulting rubber compound.

For instance, as at least one option, a minimum energy value of 1100 kJ/kg ($E_{100\% \ Filler}$) or 1300 kJ/kg ($E_{75\% \ Filler}$) has be found to be useful in achieving desirable one or more reinforcement properties of a resulting vulcanizate, or other elastomer properties (e.g., M300/M100 and/or hysteresis (tan delta)). Thus, below these energy values, for systems with predominantly wet carbon-based fillers, such as carbon black or silicon-treated carbon black, the composite can result in vulcanizates with properties that are less than optimal.

As an option, the process comprises, in at least one of the mixing steps, conducting the mixing such that a resulting $E_{100\% \ Filler}$ is at least 1,100 kJ per kg composite, e.g., at least 1,150 kJ/kg, at least 1,200 kJ/kg, at least 1,300 kJ/kg, at least 1,400 kJ/kg, at least 1,500 kJ/kg, at least 2,000 kJ/kg, or at least 3,000 kJ/kg. As an option, the $E_{100\% \ Filler}$ can range from about 1,100 kJ/kg composite (or per kg mixture present in the mixer) to about 10,000 kJ/kg composite (or per kg mixture present in the mixer), such as from 1,100 kJ/kg to about 5,000 kJ or 1,200 kJ/kg to 8,000 kJ/kg, 1,300 kJ/kg to 7,000 kJ/kg, 1,400 kJ/kg to 6,000 kJ/kg, 1,500 kJ/kg to 5,000 kJ/kg, 1,500 kJ/kg to 3,000 kJ/kg, 1,600 kJ/kg to 8,000 kJ/kg, 1,600 kJ/kg to 7,000 kJ/kg, 1,600 kJ/kg to 6,000 kJ/kg, 1,600 kJ/kg to 5,000 kJ/kg, 1,600 kJ/kg to 3,000 kJ/kg, or other values in any of these ranges.

As an option, the process comprises, in at least one of the mixing steps, conducting the mixing such that a resulting $E_{75\% \, Filler}$ is at least 1,300 kJ per kg composite, e.g., at least 1,350 kJ/kg, at least 1,400 kJ/kg, at least 1,500 kJ/kg, at least 1,600 kJ/kg, at least 1,700 kJ/kg, at least 1,800 kJ/kg, or at least 2,000 kJ/kg or at least 3,000 kJ/kg. As an option, the $E_{75\% \, Filler}$ can range from about 1,300 kJ/kg composite (or per kg mixture present in the mixer) to about 10,000 kJ/kg composite (or per kg mixture present in the mixer), such as from 1,350 kJ/kg to about 5,000 kJ or 1,400 kJ/kg to 8,000 kJ/kg, 1,500 kJ/kg to 7,000 kJ/kg, 1,600 kJ/kg to 6,000 kJ/kg, 1,700 kJ/kg to 5,000 kJ/kg, 1,800 kJ/kg to 3,000 kJ/kg, 1,900 kJ/kg to 8,000 kJ/kg, 1,600 kJ/kg to 7,000 kJ/kg, 1,600 kJ/kg to 6,000 kJ/kg, 1,600 kJ/kg to 5,000 kJ/kg, 1,600 kJ/kg to 3,000 kJ/kg, or other values in any of these ranges.

Specific Power

As an option, the method comprises applying an average specific power (specific energy/mix time, kW/kg) during the one or more mixing steps. Average specific power can be reported for a single mixing step such as a first stage mix, in which average specific power for the mixing stage=specific energy/mix time. The mix time can be the ram down time. For continuous mixing, the average specific power can be calculated by the average specific energy divided by the mixer residence time. Alternatively, for continuous mixing, average specific power can be calculated over a defined period of time (kW) divided by the mass of material inside the mixer a certain point in time (kg).

As an option, the average specific power that is applied is at least 2.5 kW/kg over mixing time, e.g., at least 3 kW/kg, at least 3.5 kW/kg, at least 4 kW/kg, at least 4.5 kW/kg, from 2.5 kW/kg to 10 kW/kg, from 2.5 kW/kg to 9 kW/kg, from 2.5 kW/kg to 8 kW/kg, or from 2.5 kW/kg to 10 kW/kg over ram down time. As an option, one or more parameters can be selected to attain a desired specific power, including but not limited to, liquid content in the filler, Tz, fill factor, and/or tip speed.

If sufficiently high average specific power is employed during the mixing with wet fillers, the mixing time, e.g., ram down time, can be reduced to an amount that is suitable for both efficiency and product properties. Accordingly, as an option, the method comprises, in at least one or more mixing steps, applying an average specific power of at least 2.5 kW/kg (or other ranges disclosed herein) over ram down time that is 10 minutes or less, e.g., 8 minutes or less, or 6 minutes or less.

The energy that is applied, for instance imparted by one or more rotors in the mixer, can be constant or relatively constant. As an option, the instantaneous specific energy per unit time (kJ/(min·kg)) (specific power) can be within 10% of the mean specific energy per unit time (average specific power) during the mixing process.

Tip Speed

As an option, the process comprises, in at least one of the mixing steps, conducting the mixing such that one or more rotors operate at a tip speed of at least 0.5 m/s for at least 50% of the mixing time or a tip speed of at least 0.6 m/s for at least 50% of the mixing time. The energy inputted into the mixing system is a function, at least in part, of the speed of the at least one rotor and rotor type. Tip speed, which takes into account rotor diameter and rotor speed, can be calculated according to the formula:

Tip speed,m/s=π×(rotor diameter,m)×(rotational speed,rpm)/60.

As tip speeds can vary over the course of the mixing, as an option, the tip speed of at least 0.5 m/s or at least 0.6 m/s is achieved for at least 50% of the mixing time, e.g., at least 60%, at least 70%, at least 75%, at least 80%, at least 85%, at least 90%, at least 95%, or substantially all of the mixing time. The tip speed can be at least 0.6 m/s, at least 0.7 m/s, at least 0.8 m/s, at least 0.9 m/s, at least 1.0 m/s, at least 1.1 m/s, at least 1.2 m/s, at least 1.5 m/s or at least 2 m/s for at least 50% of the mixing time, or other portions of the mixing listed above. The tip speeds can be selected to minimize the mixing time, or can be from 0.6 m/s to 10 m/s, from 0.6 m/s to 8 m/s, from 0.6 to 6 m/s, from 0.6 m/s to 4 m/s, from 0.6 m/s to 3 m/s, from 0.6 m/s to 2 m/s, from 0.7 m/s to 4 m/s, from 0.7 m/s to 3 m/s, from 0.7 m/s to 2 m/s, from 0.7 m/s to 10 m/s, from 0.7 m/s to 8 m/s, from 0.7 to 6 m/s, from 1 m/s to 10 m/s, from 1 m/s to 8 m/s, from 1 m/s to 6 m/s, from 1 m/s to 4 m/s, from 1 m/s to 3 m/s, or from 1 m/s to 2 m/s, (e.g., for at least 50% of the mixing time or other mixing times described herein). In the alternative or in addition, the tip speeds can be selected to maximize throughput. The time/throughput considerations may take into account that as mixing time decreases, the liquid level in the discharged composite may increase. In certain situations, it may be beneficial to perform the mixing at high tip speed for higher throughput balanced with the desired liquid content of the discharged composite, (e.g. excessively high tip speeds may cause shorter residence or mixing times that may not allow sufficient filler dispersion or sufficient removal of the liquid from the composite).

Discharging, Mixing Time, and Dump or Mixer Temperature

In any of the methods disclosed herein, the discharging step from the mixer occurs and results in a composite comprising the filler dispersed in the elastomer at a loading of at least 1 phr with a filler yield loss of no more than 10%, wherein the composite has a liquid content of no more than 10% by weight. During the mixing cycle, after much of the liquid has been released from the composite and the filler incorporated, the mixture experiences an increase in temperature. It is desired to avoid excessive temperature increases that would degrade the elastomer. Discharging, (e.g., "dumping" in batch mixing), can occur on the basis of time or temperature or specific energy or power parameters selected to minimize such degradation.

In one embodiment, the mixing time can be determined from the period that charging is complete to discharge. For batch internal mixers, mixing time can be determined from the ram down time, e.g., the time that the ram is operated at a lowermost position, e.g., the ram is fully closed or seated. In other embodiments, the lowermost position of the ram can allow a certain amount of ram deflection (as disclosed herein), e.g., a maximum ram deflection from the lowermost position is a distance of no more than 30% of the diameter of rotor. The mixing time does not encompass the time periods when charging additional components, such as the charging of one or more additional portions of elastomer and/or filler. As an option, for continuous mixers a nominal mixing time (or residence time) can be calculated from the mixer chamber volume and the volumetric production rate.

As an option, discharging occurs on the basis of a defined mixing time. The mixing time between the start of the mixing and discharging can be about 1 minute or more, such as from about 1 minute to 40 minutes, from about 1 minute to 30 minutes, from about 1 minute to 20 minutes, or from 1 minute to 15 minutes, or from 5 minutes to 30 minutes, or from 5 minutes to 20 minutes, or from 5 minutes to 15 minutes, or from 1 minute to 12 minutes, from 1 minute to 10 minutes, or from 3 minutes to 30 minutes, or other times. Alternatively, for batch internal mixers, ram down time can be used as a parameter to monitor batch mixing times, e.g., the time that the mixer is operated with the ram in its lowermost position e.g., fully seated position or with ram deflection as described herein. For example, the ram down time can range from 3 minutes to 30 minutes, from 3 minutes to 20 minutes, from 3 minutes to 10 minutes, from 5 minutes to 30 minutes, from 5 minutes to 20 minutes, from 5 minutes to 10 minutes.

As an option, discharging occurs on the basis of dump or discharge temperature (mixer temperature). For example, the mixer can have a dump temperature ranging from 120° C. to 180° C., 120° C. to 190° C., 130° C. to 180° C., such as from 140° C. to 180° C., from 150° C. to 180° C., from 130° C. to 170° C., from 140° C. to 170° C., from 150° C. to 170° C., or other temperatures within or outside of these ranges.

Liquid Content of Composite

The methods further include discharging from the mixer the composite that is formed. The discharged composite can have a liquid content of no more than 10% by weight based on the total weight of the composite, as outlined in the following equation:

Liquid content of composite %=100*[mass of liquid]/[mass of liquid+mass of dry composite]

In any of the methods disclosed herein, the discharged composite can have a liquid content of no more than 10% by weight based on total weight of the composite, such as no more than 9 wt. %, no more than 8 wt. %, no more than 7 wt. %, no more than 6 wt. %, no more than 5 wt. %, no more than 2 wt. %, or no more than 1 wt. %, based on the total weight of the composite. This amount can range from about 0.1 wt. % to 10 wt. % or from about 0.5 wt. % to 9 wt. % or from about 0.5 wt. % to about 7 wt. %, based on the total weight of the composite discharged from the mixer at the end of the process. In any of the methods disclosed herein, the liquid content (e.g., "moisture content") can be the measured weight % of liquid present in the composite based on the total weight of the composite.

In any of the methods disclosed herein, while the discharged composite can have a liquid content of 10% by weight or less, there optionally may be liquid (e.g., water) present in the mixer which is not held in the composite that is discharged. This excess liquid is not part of the composite and is not part of any liquid content calculated for the composite.

In any of the methods disclosed herein, the total liquid content (or total water content or total moisture content) of the material charged into the mixer is higher than the liquid content of the composite discharged at the end of the process. For instance, the liquid content of the composite discharged can be lower than the liquid content of the material charged into the mixer by an amount of from 10% to 99.9% (wt. % vs wt. %), from 10% to 95%, or from 10% to 50%.

Filler Loading

In any of the methods disclosed herein, as part of the method, at the discharging step, the elastomer upon being discharged from the mixer, has a filler loading (in parts per hundred of rubber, or phr) of at least 1 phr, at least 10 phr, at least 15 phr, at least 20 phr, at least 30 phr, at least 40 phr, and has a filler yield loss of no more than 10% on a dry weight basis. For instance, the filler loading can range from 20 phr to 250 phr, from 20 phr to 200 phr, from 20 phr to 180 phr, from 20 phr to 150 phr, from 20 phr to 100 phr, from 20 phr to 90 phr, from 20 phr to 80 phr, 30 phr to 200 phr, from 30 phr to 180 phr, from 30 phr to 150 phr, from 30 phr to 100 phr, from 30 phr to 80 phr, from 30 phr to 70 phr, 40 phr to 200 phr, from 40 phr to 180 phr, from 40 phr to 150 phr, from 40 phr to 100 phr, from 40 phr to 80 phr, from 35 phr to 65 phr, or from 30 phr to 55 phr. With these loadings, the filler a filler yield loss of no more than 10% on a dry weight basis. As an option, other filler loadings and filler yield loss values are applicable and disclosed herein. Fillers include carbon black, silica, silicon-treated carbon black, and other fillers disclosed herein, and blends thereof.

In certain embodiments at least 50% of the filler (e.g., at least 75% or at least 90% of the filler) is selected from carbon black, and coated and treated materials thereof. In certain embodiments at least 50% of the filler (e.g., at least 75% or at least 90% of the filler) is silica. In certain embodiments at least 50% of the filler (e.g., at least 75% or at least 90% of the filler) is silicon-treated carbon black.

As an example, the carbon black can be dispersed in the elastomer at a loading ranging from 30 phr to 200 phr, from 30 phr to 70 phr, or from 40 phr to 65 phr, or from 40 phr to 60 phr. As a more specific example, with the elastomer being natural rubber alone or with one or more other elastomers, and the filler being carbon black alone or with one or more other fillers (e.g., silica or silicon-treated carbon black), the carbon black can be dispersed in the natural rubber at a loading ranging from 30 phr to 70 phr, or from 40 phr to 65 phr, or from 40 phr to 60 phr.

The amount of silica present in the elastomer composite formed can be from 20 phr to 250 phr, from 20 phr to 200 phr, from 20 phr to 150 phr, from 20 phr to from 100 phr, from 30 phr to from 150 phr, from 30 phr to from 100 phr, from 25 phr to 100 phr, from 25 phr to 80 phr, from 35 phr to 115 phr, from 35 phr to 100 phr, from 40 phr to 110 phr, from 40 phr to 100 phr, from 40 phr to 90 phr, from 40 phr to 80 phr, and the like. Filler blends comprising silica can include 10 wt. % carbon black and/or silicon-treated carbon black.

The amount of silicon-treated carbon black present in the elastomer composite formed can be from 20 phr to 250 phr, from 20 phr to 200 phr, from 30 phr to 150 phr, from 40 phr to 100 phr, or from 50 phr to 65 phr.

Other loadings, filler types, and blends are disclosed herein.

Filler Yield Loss

The filler yield loss is determined based on the theoretical maximum phr of filler in the elastomer (assuming all filler charged to the mixer is incorporated into the composite) minus the measured phr of filler in the composite discharged. This measured amount can be obtained from thermogravimetric analysis (TGA). Thus, filler yield loss (%) is calculated as:

$$\left[\frac{(\text{Theoretical } phr \text{ filler}) - (\text{measured } phr \text{ filler})}{(\text{Theoretical } phr \text{ filler})}\right] \times 100$$

Loose filler present on the surface of the composite due to poor incorporation of the filler into the elastomer is included in the filler yield loss. As an option, the process of any of the methods disclosed herein does not result in a significant loss of the filler that is originally charged into the mixer. In any of the methods disclosed herein, the filler yield loss can be no more than 10%, such as no more than 9% or no more than 8% or no more than 7% or no more than 6% or no more than 5% or no more than 4% or no more than 3% or no more than 2% or no more than 1%, for instance a filler yield loss ranging from 0.1% to 10%, from 0.1% to 5%, from 0.1% to 2%, from 0.5% to 10%, from 0.5% to 5%, from 0.5% to 2%, from 1% to 10%, from 1% to 5%, or from 1% to 2%.

Fill Factor

When mixing dry filler with solid elastomer, it is typical practice to maximize fill factor to maximize the amount of composite produced. Fill Factor (%)=(Volume of material charged to the mixer)/net mixer chamber volume. Net mixer chamber volume includes taking into account the design of the mixer, e.g., volume of the rotors. Fill factor is often chosen to ensure that the ram remains seated by the end of the mix, and typical fill factor values are about 72% for dry mix.

In any of the methods disclosed herein, the charging of at least the solid elastomer and wet filler can be such that the mixing chamber of the mixer has a fill factor of from about 25 percent to about 90 percent of volume capacity (on a dry weight basis). In any of the methods disclosed herein, the charging of at least the solid elastomer and wet filler can be such that the mixing chamber of the mixer has a fill factor of from about 50 percent to about 80 percent of volume capacity, e.g., from about 50% to about 72%, from about 50% to about 70%, from about 50% to about 68%, from about 60% to about 75%, from about 60% to about 72%, from about 60% to about 70%, or from about 60% to about 68% of volume capacity.

As an option of any of the methods disclosed herein, the method can be conducted wherein the charging into the mixer (e.g. an internal mixer such as a batch mixer or other mixer) with at least a solid elastomer and a wet filler can be such that the fill factor, on a dry weight basis, of the at least the solid elastomer and the wet filler is no more than 72%, no more than 70%, or no more than 68%, or no more than 66%, such as from about 30% to 72%, from 40% to 70%, from 45% to 70%, from 30% to 60%, from 50 to 72%, from 50 to 70%, from 50 to 68%, from 60 to 72%, from 60 to 70%, from 60 to 68%, from 65 to 72%, from 65 to 70%, from 65 to 68%, or from 40 to 60% or from 50 to 60% and the like. A more specific example is charging into the mixer at least a solid elastomer and a wet filler such that the fill factor is no more than 68% and the solid elastomer comprises at least 50 wt. % natural rubber.

During mixing with a wet filler, it was observed that certain elastomers swell, e.g., natural rubber. As mixing proceeds, the temperature of the mixture increases, superheating the moisture incorporated in the mixture. This results in swelling of the mixture, thereby increasing the overall volume of the mixture. If the initial fill factor is too high, the swelling can be sufficient to overpower the ram (also known as the floating weight), causing the ram to be lifted above its fully seated position. In this situation, the part of the mixture immediately underneath the ram becomes partially isolated from the bulk of the mixture, reducing the effectiveness of its mixing. In addition, this isolated mixture can form a "plug" under the deflected ram, inhibiting steam release from the mixer. Consequently, such ram deflections can lengthen batch cycle time and compromise filler dispersion. Safety issues may also be a consideration, if the ram is raised by the batch sequence when a plug is occurring (e.g. to add 6PPD), an excessive amount of steam can suddenly be released.

Accordingly, where the elastomer is swellable in the presence of a liquid capable of evaporation, such as natural rubber, a fill factor of the wet filler and solid elastomer (on a dry weight basis) comprising natural rubber can be no more than 70% or no more than 68%, no more than 66%, e.g., ranging from 60% to 70%, from 60% to 68%, from 60% to 66%, or from 65% to 68%. The solid elastomer can comprise at least 50%, at least 75%, at least 90%, or at least 95% natural rubber. For example, the solid elastomer can be a blend of natural rubber and at least one additional elastomer, such as polybutadiene and/or styrene-butadiene rubber, or other elastomers as disclosed herein. The filler can be any filler disclosed herein, e.g., carbon black, silicon-treated carbon black, and silica.

As an option, in such a method with the controlled fill factor of 72% or less, or 70% or less, or 68% or less, or in any of the methods disclosed herein that utilizes a batch mixer or similar type of mixer, the mixer can comprise a ram capable of downward vertical movement to a lowermost position in which the ram is seated adjacent one or more rotors in the mixer. During the mixing, the mixer can be operated with a maximum ram deflection from the lowermost position by a distance of no more than 30% of the diameter of the one or more rotors. Alternatively, this distance can be no more than 25%, or no more than 20%, or no more than 15%, or no more than 10%, or no more than 5% of the diameter of the one or more rotors. As an option for any of the methods of the disclosed herein, during the mixing step, the fill factor is optimized to minimize ram deflection.

In certain embodiments, the fill factor can be a function of one or more variables. For example, fill factor can be determined on the basis of the rotor type. For example, where a batch mixer (e.g., a tangential mixer) is used, for a two-wing rotor, the fill factor can be 72% or less; for a two- or four-wing rotor, the fill factor can be 70% or less; for a two-, four-, or six-wing rotor, the fill factor can be 68% or less. In other embodiments, e.g., where an intermeshing mixer is used, the fill factor can be 60% or less.

In certain embodiments, the use of wet fillers can enable the use of higher tip speeds, compared to typical dry mixing processes. Such high tip speeds can increase the tendency to over-power the ram, as they increase the average pressure applied to the ram. As an option, the lower fill factors disclosed herein in combination with increased tip speeds can be desirable for commercial production. With the higher fill factors typically used in the industry for dry mixing, the associated problems that can ensue when mixing with wet filler could render commercial production unviable. Accordingly, in certain embodiments, the fill factors disclosed herein, e.g., fill factors of 70% or less, 68% or less, or 66% or less, can be employed with higher tip speeds, e.g., tip speeds of 0.6 m/s for at least 50% of the mixing time, and other tip speeds disclosed herein.

Time Average Release Rate

As described herein, the present process provides operating conditions that balance longer mixing times (relative to dry mixing processes) with liquid evaporation or removal in a reasonable amount of time. If there is insufficient specific power input or if $T_z$ is too low, liquid may stay in the mixture longer than preferred resulting in inefficient mixing. In another case, liquid may evaporate or be removed too quickly, rendering the mixture similar to a dry mix and thereby preventing the benefits associated with longer effective mixing times and sufficient energy input. In any of the methods disclosed herein, the rate of liquid release, including, but not necessarily limited to rate of evaporation of the liquid, from the composite during the mixing can be measured as a time average release rate of the liquid per kg of composite, and this rate can be from 0.01 to 0.14 kg/(min·kg) or from 0.01 to 0.07 kg/(min·kg) or other rates below or above this range. This release rate can be the overall release rate of liquid removal by any means during mixing or can be the release rate by evaporation only. In the case of an aqueous liquid, the evaporation rate can be considered a steam release or steam evolution rate.

As an option, time average release rate (kg/kg·min) can be calculated from the equation:

Time average release rate=Total liquid removed/(release time×composite weight)

wherein:
composite weight is determined on a dry weight basis;
total liquid removed (kg)=liquid in wet filler−liquid content in discharged composite;
release time=ram down time (min)−rubber-only mastication time (min).

As discussed herein, ram down time is the time (time period or amount of time) the ram is operated at a lowermost position.

It is believed that an optimized time average release rate of liquid (e.g., time average release rate of evaporated liquid) can provide improved dispersion of the filler in the elastomer, balanced with suitable mix times. A release rate of less than 0.01 kg/(min·kg) may generally reflect a longer time period to remove liquid, e.g., at $T_z$ less than 65° C. and/or specific energy levels less than 1,500 kJ/kg, and/or tip speed less than 0.5 m/s or less than 0.6 m/s. Release rates greater than 0.15 kg/(min·kg) can reflect shorter mixing times. A non-optimized time average release rate can result in poor rubber properties or result in mixing conditions similar to a dry mix that could deteriorate the elastomer.

Energy Efficiency

During the mixing of at least the solid elastomer and wet filler, the mixing (via one or more mixing steps) comprises applying an energy ($E_R$) to at least one rotor, or to one or more rotors of the mixer (e.g. at least two rotors, four rotors, and the like) at an energy efficiency ranging from 20% to 80%, wherein the energy efficiency is based on the following equation:

Energy Efficiency=Heat Duty/$E_R$×100%, wherein:
Heat Duty (kJ/kg) is the energy (kJ) required to remove the liquid from 1 kg of composite at 100% efficiency
Heat duty is the (Heat of vaporization)+(Sensible Heat)
Heat of vaporization=Liquid Removed (kg)*Latent Heat of Vaporization of the liquid (2260 kJ/kg for water)
Sensible Heat=Liquid Removed (kg)*Specific Heat capacity of the liquid (4.1855 kJ/kg/K for water)*(100−ambient temperature ° C.)
The amount of liquid removed (kg)=total liquid added to the mixer (kg)−liquid content of the discharged composite (kg).

Typically, the amount of liquid content at the time of charging can be determined from the amount of liquid in the wet filler.

Energy efficiencies ranging from 20% to 80% would be, by definition, greater than that for dry mix processes (e.g., <5%). In certain embodiments, energy efficiency can range from 30% to 80%, 40% to 80%, 50% to 80%, 30% to 70%, 40% to 70%, 50% to 70%, 30% to 60%, 40% to 60%, 50% to 60%, or 40% to 55%. It is believed that energy efficiencies greater than 80% are associated with insufficient mixing.

Other operating parameters to be considered include the maximum pressure that can be used. Pressure affects the temperature of the filler and rubber mixture. If the mixer is a batch mixer with a ram, the pressure inside the mixer chamber can be influenced by controlling the pressure applied to the ram cylinder.

Multi-Stage or Multi-Step Mixing

Any of the methods disclosed herein relates, in part, to methods of preparing a composite that involves at least two mixing steps or stages. These two (or more) mixing steps can be considered multi-step or multi-stage mixing with a first mixing step or stage and at least a second mixing step or stage. One or more of the multi-stage mixing processes can be batch, continuous, semi-continuous, and combinations thereof.

For the multi-stage process, the methods for preparing the composite include the step of charging or introducing into a first mixer at least a) one or more solid elastomers and b) one or more fillers wherein at least one filler or a portion of at least one filler is wet filler as described herein (e.g. a wet filler that comprises a filler and a liquid present in an amount of at least 15% by weight based on the total weight of the wet filler). The combining of the solid elastomer with wet filler forms a mixture or composite during this mixing step(s), which can be considered as a first mixing step or stage. The method further includes mixing the mixture, in this first mixing step, to an extent that at least a portion of the liquid is removed by evaporation or an evaporation process that occurs during the mixing. This first mixing step (in one or more mixing steps) or stage is conducted using one or more of the processes described earlier that forms a composite with the understanding that, after completion of the first mixing, it is not necessary for the mixture discharged from the mixer after the first mixing step (e.g., a discharged mixture) to have a liquid content of no more than 10 wt. %. In other words, with the multi-stage process(es), the mixture resulting from the completion of the first mixing from the first mixer (or first mixing step) can have a liquid content above 10 wt. %, but does have a liquid content that is reduced (by wt. %) as compared to the liquid content of the combined solid elastomer and wet filler at the start of the first mixing step.

The method then includes mixing or further mixing the mixture in at least a second mixing step or stage utilizing the same mixer (i.e., the first mixer) and/or utilizing a second mixer(s) that is different from the first mixer. The mixing with the second mixer can be such that the second mixer or second mixing is operated at a ram pressure of 5 psi or less and/or with the ram raised to at least 75% of the ram's highest level (such as at least 85%, at least 90%, at least 95%, or at least 99% or 100% of the ram's highest level), and/or a ram operated in floating mode, and/or a ram positioned such that it does not substantially contact the mixture; and/or a ram-less mixer; and/or a fill factor of the mixture ranges from 25% to 70%. The method then includes discharging from the last used mixer the composite that is formed such that the composite has a liquid content of no more than 10% by weight based on the total weight of the composite.

After the first mixing, the further mixing step(s) conducted for the multi-stage mixing can utilize any one or more of the mixing procedures or parameters or steps utilized in the first mixing step as described herein. Thus, in conducting the further mixing step or stage, the same or different mixer design and/or same or different operating parameters as for the first mixer can be used in the further mixing stage. The mixers and their options described earlier for the first mixing step and/or the operating parameters described earlier for the mixing step can be optionally used in the further or second mixing step (e.g. the mixing steps, as described herein, that include a tip speed of at least 0.5 m/s for at least 50% of the time or at least 0.6 m/s for at least 50% of the time, and/or a resulting specific energy of at least 1100, at least 1400, at least 1500 kJ/kg composite, and/or mixing to an indicated temperature of at least 120° C., and/or a fill factor of no more than 7%, and/or $T_Z$ of 40° C. or higher, 50° C. or higher, 60° C. or higher, or 65° C. or higher, and/or evaporation rate and/or number of rotors, and/or type or rotors, and/or temperature-controlled means, and/or an average specific power of at least 2.5 kW/kg is applied over mixing time, and/or continuous mixing, and the like). Any one or more or all of these options can be utilized with respect to the further mixing step(s) as described earlier. The second or more mixing steps can utilize a different process parameter than used in the first mixing step. Any combination of these mixing parameters can be used in the multi-stage mixing. Thus, any of the methods disclosed herein further includes a method of preparing a composite in a multi-stage mixing, wherein one or more of the following parameters can be utilized in at least one of the mixing steps, at least two of the mixing steps, or all of the mixing steps, i. the at least one temperature-control means is set to a temperature, Tz, of 65° C. or higher during said mixing; and/or
ii. during said mixing, the one or more rotors operate, for at least 50% the mixing time, at a tip speed of at least 0.6 m/s; and/or
iii. applying an average specific power of at least 2.5 kW/kg over mixing time; and/or
iv. the charging (a) comprises charging a mixer with at least a solid elastomer comprising at least 50 wt % natural rubber and a wet filler, wherein a fill factor, on a dry weight basis, of the at least the solid elastomer and the wet filler is no more than 68%; and/or
v. the mixing is continuous; and/or
vi. optionally adding at least one additive selected from antidegradants and coupling agents during said charging (a) or said mixing (b), and optionally adding one or more rubber chemicals after the mixer reaches a temperature of 120° C. or higher; and/or
vii. said charging (a) and said mixing (b) prior to the mixer reaching the indicated temperature are carried out in the substantial absence of the one or more rubber chemicals; and/or
viii. the mixer has a fill factor, and the fill factor, on a dry weight basis, of the at least solid elastomer and the wet filler is no more than 72%, no more than 70%, or no more than 68%.

In such a multi-stage mixing process, at least one of the above-mentioned parameters can be utilized in the first mixing step, at least two of above-mentioned parameters can be utilized in the first mixing step, or at least three of said above-mentioned parameters can be utilized in the first mixing step, or at least four of above-mentioned parameters can be utilized in the first mixing step, or all of the above-mentioned parameters can be utilized in the first mixing step. And, in such a multi-stage mixing process, at least one of the above-mentioned parameters can be utilized in the second or further mixing step(s), at least two of above-mentioned parameters can be utilized in the second or further mixing step(s), or at least three of said above-mentioned parameters can be utilized in the second or further mixing step(s), or at least four of above-mentioned parameters can be utilized in the second or further mixing step(s), or all of the above-mentioned parameters can be utilized in the second or further mixing step(s). The parameters used in the first mixing step or stage can be the same or different from the parameters used in the second or further mixing step(s). The mixer used in the first mixing step can be the same or different from the second or further mixing step(s).

Thus, for the multi-stage mixing process(es), in at least one option, the first mixer used in the first mixing step is utilized in the further or second mixing step. Before the first mixer or other mixer is used in the second mixing step, as a further option, there can be a standing time wherein the composite formed from the first mixing rests or cools or both in the first mixer or in another container or location (e.g., mixing, stopping, and then mixing further). For instance, this standing time can be such that the mixture obtains a material temperature of less than 180° C. before the further mixing step commences (e.g., a the discharged mixture can have a material temperature ranging from about 100° C. to about 180° C., of from about 70° C. to 179° C., or from about 100° C. to about 170° C., or from about 120° C. to about 160° C.). Or, the standing time before the further mixing step commences, can be from about 1 minute to 60 minutes or more. The material temperature can be obtained by a number of methods known in the art, e.g., by inserting a thermocouple or other temperature measuring device into the mixture or composite.

In the multi-stage processes, a second mixing step (second stage mix) can comprise charging the mixer with other components in addition to the mixture discharged from the first mixing step. For example, the method can comprise charging additional filler, such as dry filler, wet filler (e.g., having a liquid present in an amount of at least 15% by weight), or a blend thereof prior to or during the second mixing step. The additional filler can be the same or different from the filler already present in the mixture. For example, the mixture discharged from the first mixer can be considered a masterbatch in which either all or a portion is combined with additional filler.

For the multi-stage mixing process(es), in at least one option, at least a second mixer is used in the further mixing step(s). When this option is used, the second mixer can have the same or different design as the first mixer, and/or can have the same or one or more different operating parameters as the first mixer. Specific examples, not meant to be limiting, are provided below with respect to first mixer and second mixer options.

For instance, the first mixer can be a tangential mixer or an intermesh mixer, and the second mixer can be a tangential mixer, an intermesh mixer, an extruder, a kneader, or a roll mill.

For instance, the first mixer can be an internal mixer and the second mixer can be a kneader, a single screw extruder, a twin-screw extruder, a multiple-screw extruder, a continuous compounder, or a roll mill.

For instance, the first mixer can be a first tangential mixer, and the second mixer can be a second (different) tangential mixer.

For instance, the first mixer can be operated at a ram pressure above 0 psi, and the second mixer is operated at a ram pressure of 5 psi or less, e.g., 3 psi or less, or even at 0 psi. This option can also be utilized when the second mixing step utilizes the same mixer from the first mixing step. For instance, the first mixer is operated with a ram, and the second mixer is operated without a ram.

For instance, the second mixer is utilized and is operated at a fill factor of the mixture, on a dry weight basis, ranging from 25% to 70%, from 25% to 60%, from 25% to 50%, from 30% to 50%, or other fill factor amounts described herein.

When a second mixer is utilized, any of the methods disclosed herein can include the additional step of discharging the mixture from the first mixer into a second mixer to perform the second mixing step. As an option, the discharging can occur directly into the second mixer, or the discharging can occur such that the mixture is discharged into a holding container (e.g., bin, table) and then is transferred or conveyed to the second mixer (e.g., using a conveyer belt or other feeding device).

As a further option, a third mixer or more can be utilized in any of the methods disclosed herein. When this option is used, the third or more mixer can have the same or different design as the first mixer and/or second mixer, and/or can have the same or have one or more different operating parameters as the first mixer and/or second mixer.

In any of the multi-stage processes disclosed herein, the final discharged composite (e.g., the composite discharged after the second or third, or more mixing step) can have a liquid content of no more than 5%, more than 4%, no more than 3%, no more than 2%, or no more than 1% by weight, based on the total weight of the composite. This amount can range from 0.1% to 5%, from 0.1% to 4%, from 0.1% to 3%, from 0.1% to 2%, from 0.1% to 1%, from 0.5% to 5%, from 0.5% to 4%, from 0.5% to 3%, from 0.5% to 2%, or from 0.5% to 1% by weight based on the total weight of the composite discharged from the mixer at the end of the process.

In any of the multi-stage processes disclosed herein, the total liquid content (or total water content or total moisture content) of the material charged into the mixer at the start of the process is higher than the liquid content of the composite when the first mixing step is stopped. For instance, the liquid content of the mixture when the first mixing step is stopped can be from 10% to 50% lower (wt. % vs wt. %), or can be 25% or more lower, or 10% or more lower than at the start of the first mixing step.

Further, in any of the multi-stage processes disclosed herein, the total liquid content (or total water content or total moisture content) of the mixture at the end of the first mixing step is higher than the liquid content of the final composite discharged at the end of the process (after the last mixing step). For instance, the liquid content of the composite discharged can be from 10% to 50% lower (wt. % vs wt. %), or can be 25% or more lower, or 10% or more lower than after the completion of the first mixing step.

In any of the multi-stage processes disclosed herein, upon being discharged from the last mixer, the temperature (e.g., dump temperature) of the composite can range from 130° C. to 180° C., such as from 140° C. to 170° C. Alternatively, the multi-stage process can be monitored by material temperature, or probe temperature, which is the temperature of the mixture or composite taken or measured immediately upon discharging (within 5 min., within 3 min. or within 60 seconds) and can be considered an average temperature of the composite material.

In the multi-stage process, examples of preferred components or parameters include, but are not limited to, where the filler includes carbon black and the elastomer includes natural rubber, and/or the filler includes silica and the elastomer includes natural rubber, and/or the mixture from the first mixing that is discharged has a material temperature of from 100° C. to 140° C., 110° C. to 140° C., 130° C. to 150° C., 120° C. to 150° C. or from 130° C. to 140° C., and/or the resulting total specific energy of the mixing from the first mixer (the first mixing) ranges from 1,000 kJ/kg to 2,500 kJ/kg. Any one or more of these preferred components or parameters can be used in combination for any of the multi-stage processes disclosed herein.

Other multi-stage processes include a method of preparing a composite, comprising:
  (a) charging a first mixer having one or more rotors with at least a solid elastomer and a wet filler comprising a filler and a liquid present in an amount of at least 15% by weight based on total weight of wet filler; and
  (b) in one or more mixing steps, mixing the at least the solid elastomer and the wet filler to form a mixture, and in at least one of said mixing steps, conducting said mixing at mixer temperatures controlled by at least one temperature-control means with the one or more rotors operating at a tip speed of at least 0.6 m/s for at least 50% of the mixing time, and removing at least a portion of the liquid from the mixture by evaporation.

The tip speed can have other values as disclosed herein.

As an option, instead of controlling the tip speed, the process can take advantage of applying a suitable average specific power that allows a reasonable ram down time for the mixing in the first mixer. Accordingly, the method can comprise:
  (a) charging a first mixer having one or more rotors with at least a solid elastomer and a wet filler comprising a filler and a liquid present in an amount of at least 15% by weight based on total weight of wet filler; and
  (b) in one or more mixing steps, mixing the at least the solid elastomer and the wet filler to form a mixture, and in at least one of said mixing steps, conducting said mixing at mixer temperatures controlled by at least one temperature-control means and applying an average specific power of at least 2.5 kW/kg over ram down time, and removing at least a portion of the liquid from the mixture by evaporation.

For example, the method can comprise applying an average specific power of at least 3 kW/kg over ram down time, at least 3.5 kW/kg over ram down time, at least 4 kW/kg over ram down time, at least 4.5 kW/kg over ram down time, or at least 5 kW/kg over ram down time, e.g., ram down times ranging from 2.5 to 10 kW/kg, from 3 to 10 kW/kg, from 3.5 to 10 kW/kg, from 3 to 10 kW/kg, from 4.5 to 10 kW/kg, from 5 to 10 kW/kg, 2.5 to 8 kW/kg, from 3 to 8 kW/kg, from 3.5 to 8 kW/kg, from 3 to 8 kW/kg, from 4.5 to 8 kW/kg, or from 5 to 8 kW/kg. The ram down time can be 15 min or less, 12 min or less, 10 min or less, 8 min or less, or 6 min or less.

With either option, i.e., tip speed or specific power, the method can further comprise:
  (c) discharging, from the first mixer, the mixture comprising the filler dispersed in the elastomer at a loading of at least 20 phr, wherein the mixture has a liquid content that is reduced to an amount less than the liquid content at the beginning of step (b), and wherein the mixture has a material temperature ranging from 100° C. to 180° C.;
  (d) mixing the mixture from (c) in a second mixer to obtain the composite, wherein the second mixer is operated under at least one of the following conditions:
    (i) a ram pressure of 5 psi or less;
    (ii) a ram raised to at least 75% of its highest level;
    (iii) a ram operated in floating mode;

(iv) a ram positioned such that it does not substantially contact the mixture;
(v) the mixer is ram-less; and/or
(vi) a fill factor of the mixture ranges from 25% to 70%; and
(e) discharging, from the second mixer, the composite having a liquid content of less than 3% by weight based on total weight of said composite.

The multi-stage method provides additional parameters for dispersing the filler into the elastomer. Control of batch mixing times, expressed as ram down time, in the first mixer can allow dispersion of filler into the elastomer to a certain extent, followed by mixing in a second mixer under conditions that would minimize substantial or any degradation the solid elastomer, such as natural rubber. Accordingly, the one or more steps of mixing in the first mixer is accompanied by the evaporation of at least some of the liquid, such that the mixture that is discharged from the first mixer has a liquid content that is reduced to an amount less than the liquid content at the beginning of step (b), e.g., the liquid present in the wet filler. The liquid content can be reduced by 50 wt. %, by 60 wt. %, by 70 wt. %, or more. The amount of liquid content remaining in the discharged mixer can depend on the filler type, elastomer type, filler loading, etc. In certain embodiments, it may be desired to have a certain amount of moisture remaining in the mixture to employ a wet mixing process, and its benefits, in the mixing occurring in the second mixer. Alternatively, with other filler and/or elastomer types, it may be desirable to remove the majority of liquid during the one or more mixing steps in the first mixer. Thus, the discharged mixture can have a liquid content (depending, in part, on the liquid content of the wet filler) ranging from 0.5% to 20% by weight relative to the weight of the mixture, e.g., from 0.5% to 17%, from 0.5% to 15%, from 0.5% to 12%, from 0.5% to 10%, from 0.5% to 7%, from 0.5% to 5%, from 0.5% to 3%, from 0.5% to 2%, from 1% to 20%, from 1% to 17%, from 1% to 15%, from 1% to 12%, from 1% to 10%, from 1% to 7%, from 1% to 5%, from 1% to 3%, from 1% to 2%, from 2% to 20%, from 2% to 17%, from 2% to 15%, from 2% to 12%, from 2% to 10%, from 2% to 7%, from 2% to 5%, from 2% to 3%, from 3% to 20%, from 3% to 17%, from 3% to 15%, from 3% to 12%, from 3% to 10%, from 3% to 7%, from 3% to 5%, from 5% to 20%, from 5% to 17%, from 5% to 15%, from 5% to 12%, from 5% to 10%, or from 5% to 7%.

The material temperature (aka probe temperature) of the mixture upon discharging in (c) can be measured, e.g., by inserting a thermocouple or other temperature measuring device into the mixture or composite. The material temperature can be a gauge for moisture content as generally, a drier mixture discharged from the first mixer would have a higher material temperature. Discharging the mixture when the material temperature is within a certain range, e.g., ranging from 100° C. to 180° C. could ensure that a certain amount of moisture remains in the mixture. As it may not always be possible to obtain the material temperature of the mixture during the mixing process, the temperature of the mixer can be monitored. The relevant mixer temperature can be obtained, e.g., by inserting a thermocouple into the chamber. Such mixer temperatures can be calibrated so as to reasonably approximate or correlate with the material temperatures. For example, the mixer temperature can differ from the material temperature by as much as 40° C. or less, 30° C. or less, 20° C. or less, 10° C. or less, or 5° C. or less. The difference between mixer temperature and material temperature may not be essential, so long as this difference is reasonably consistent for each mix.

For example, the material temperature of the mixture can range from 100° C. to 150° C., e.g., from 100° C. to 145° C., from 100° C. to 140° C., from 110° C. to 150° C., from 110° C. to 145° C., from 110° C. to 140° C., from 120° C. to 150° C., from 120° C. to 145° C., from 120° C. to 120° C., from 125° C. to 150° C., from 125° C. to 145° C., from 125° C. to 140° C., from 130° C. to 150° C., from 130° C. to 145° C., from 130° C. to 140° C., from 135° C. to 150° C., from 135° C. to 145° C., or from 135° C. to 140° C. In certain embodiments, the stated material temperatures can be suitable when the elastomer is natural rubber.

For synthetic elastomers such as butadiene rubber or styrene-butadiene rubber, the material temperature of the solid elastomer comprising such synthetic elastomers can range from 100° C. to 170° C., from 110° C. to 170° C., from 120° C. to 170° C., from 130° C. to 170° C., from 140° C. to 170° C., or from 150° C. to 170° C.

As an option, the filler comprises at least one material selected from carbon black, and coated and treated materials thereof (e.g., at least 50 wt %, at least 75 wt. %, or at least 90 wt. % of the filler is selected from carbon black and silicon-treated carbon black). The wet filler can have a liquid present in an amount of at least 20% by weight, at least 30% by weight, an amount ranging from 40% to 65% by weight. In step (b) and optionally in step (a), the at least one temperature-control means is set to a temperature, $T_z$, ranging from 60° C. to 110° C., e.g., 65° C. or higher, ranging from 65° C. to 100° C., ranging from 75° C. to 90° C.

As an option, at least 50% (at least 75%, or at least 90%) of the filler is silica. The charging can further comprise charging the mixer with a coupling agent, e.g., with at least a portion (or a first portion) of the wet filler. In step (b) and optionally in step (a), the at least one temperature-control means is set to a temperature, $T_z$, ranging from 40° C. to 100° C., or ranging from 40° C. to 75° C., or ranging from 50° C. to 90° C., or ranging from 50° C. to 75° C. The wet filler can have a liquid present in an amount of at least 20% by weight or an amount ranging from 20% to 65% by weight.

As an option for the first mixer, the mixing time is ram down time, e.g., a ram down time of no more than 15 min., no more than 10 min., no more than 8 min., e.g., ranging from 3 min. to 15 min., or from 3 min. to 10 min, or from 5 min. to 10 min. Other ranges are disclosed herein. As another option, for the second mixer, the mixing time is a time period between the start of the mixing and the discharging.

The total specific energy of the mixing process in the first mixer can be similar to those previously described herein, or can be different, e.g., to ensure shorter batch times. Additionally, the filler type can influence the total specific energy. As an option, a resulting total specific energy of the mixing in the first mixer, i.e., the mixing in (b) ranges from 1000 kJ/kg to 2500 kJ/kg.

For the mixing in the second mixer, it is desired to operate the mixing under conditions that would not degrade the elastomer. Under typical mixing conditions, after the material is charged to the mixer chamber, the ram is pushed downward to its fully seated position, thereby applying pressure to the material during the mixing process. During mixing in the second mixer, it is desired that this pressure is alleviated, which can occur under one or more of the following conditions. (i) For example, the ram can be seated but essentially no pressure is applied to the ram, e.g., a pressure of 5 psi or less. (ii) The ram is raised to at least 75% of its highest level. Some mixers allow the ram to be positioned at certain heights. A ram in the fully seated position is at 0% of its highest level in contrast to the ram being raised to its highest level or the fully open position, which is the typical position of the ram when material is charged into the mixer. A ram positioned at a height of at least 75% of its highest level is e.g., at least 80%, at least 85%, at least 90%, at least 95%, or fully raised to its highest level (100%), ensures minimal contact between the ram and the elastomer charged to the mixer. (iii) When pressure is not applied to the mixing chamber, certain rams can operate as a floating weight, e.g., floating mode. While the ram may contact the elastomer, the pressure applied is minimal. (iv) a ram is positioned such that it does not substantially contact the mixture. If the contents have a low fill factor, e.g., as low as 25%, then positioning the ram height to at least 75% of its highest level may not be necessary. The ram can be positioned at a height such that it does not substantially contact the mixture, e.g., no more than 10% of the surface of the ram (by area) contacts the mixture, e.g., no more than 5% of the surface of the ram, or 0% of the surface of the ram does not contact the mixture. (v) Certain mixers are ramless, i.e., do not contain a ram. Examples of a ram-less mixer are model no. IM550ET, IM1000ET from Harburg Freudenberger Maschinenbau GmbH (HF). (vi) a fill factor of the mixture, on a dry weight basis, ranges from 25% to 70%, e.g., from 25% to 60%, from 25% to 55%, from 25% to 50%, from 25% to 45%, from 25% to 40%, from 30% to 70%, from 30% to 60%, from 30% to 55%, from 30% to 50%, from 30% to 45%, from 30% to 40%, from 35% to 70%, from 35% to 60%, from 35% to 55%, from 35% to 50%, from 35% to 45%, or from 35% to 40%. By controlling the fill factor, it may not be necessary to manipulate ram operation or position.

Material temperatures of the final composite discharged from the second mixer (e.g., the composite discharged from step (e)), can also be monitored, again to minimize degradation of the elastomer. Such material temperatures can be similar to those previously described for the mixtures discharged from the first mixer.

The mixture discharged from (c), while an intermediate in the multi-stage or multi-step process, can also be considered a composite. In certain instances, vulcanizates formed from the mixture in step (c) can have certain rubber properties that are improved over vulcanizates prepared from composites that resulted from dry mixing processes, for a given composition (e.g., elastomer type, filler type, filler loading, and optionally, compounding and curing agents). Such vulcanizates are discussed in greater detail below.

It is understood that additional mixers or mixing steps can be used, as discussed herein. For example, after the composite is discharged from the second mixer, the composite can be subjected to additional mastication, e.g., by mixing in either the first or second mixer, or a third mixer.

Continuous Mixing

As an option, the process is a continuous mixing process where at least the solid elastomer and wet filler (e.g., wet carbon black pellets) are mixed in a continuous mixer. Continuous mixers can allow control of feed rate of the solid elastomer, wet filler, and other components, and/or control of water evaporation. Such control can in turn lead to a process that is amenable to automation.

For example, a method of preparing a composite comprises:
  (a) charging a continuous flow of at least a solid elastomer and a pelletized wet filler to an input end of a continuous mixer, wherein the wet filler comprises a filler and a liquid present in an amount of at least 15% by weight based on total weight of wet filler;
  (b) conveying the solid elastomer and the wet filler along a length of the continuous mixer, wherein during the conveying, mixing occurs with removal of at least a portion of the liquid by evaporation; and
  (c) discharging from a discharge end of the continuous mixer a composite comprising the filler dispersed in the elastomer at a loading of at least 20 phr with a filler yield loss of no more than 10%, wherein the composite has a liquid content of no more than 10% by weight based on total weight of said composite.

The at least one solid elastomer and wet filler can be fed to the continuous mixer with mechanisms well known in the art, e.g., conveyors, hoppers, screw feeders, and combinations thereof. For example, the filler can be fed into a hopper that subsequently feeds into a screw feeder and ultimately to an inlet port at one end of the elongate chamber of the mixer. The solid elastomer can be provided as lumps, strips, pellets, or other solid forms, and fed to the mixer via a conveyor. Thus, charging a "continuous flow" of elastomer does not necessarily require a single continuous length of polymer, so long as the charging can be measured as a rate of elastomer or filler per unit time.

The continuous mixer can have, for example, an elongate chamber. As an option, the solid elastomer, wet filler, and/or mixture comprising solid elastomer and wet filler is continuously transported or continuously conveyed along a length of the continuous mixer. For example, the material is continuously conveyed from an input end of an elongate chamber and along a length of the chamber until the material contacts one or more rotors axially oriented in the elongate chamber. The mixture may diverge from the path along the length of the mixer, however, the net path of the mixture is along the length of the mixer. The material can be conveyed through the one or more rotors whereby mixing occurs and is subsequently discharged from the discharge end. An example of such a mixer is a continuous compounder, e.g., an FCM™ Farrel Continuous Mixer manufactured by Farrel-Pomini. Other continuous mixers include a Unimix Continuous Mixer and MVX (Mixing, Venting, eXtruding) Machine from Farrel Pomini Corporation of Ansonia, CT, USA, a long continuous mixer from Pomini, Inc., a Pomini Continuous Mixer, twin rotor co-rotating intermeshing extruders, twin rotor counter-rotating non-intermeshing extruders, continuous compounding extruders, the biaxial milling extruder produced by Kobe Steel, Ltd., and a Kobe Continuous Mixer.

The continuous mixer can be, for example, an extruder having a rotatable screw, e.g., a twin-screw extruder. The rotatable screw can simultaneously transport and mix the solid elastomer, wet filler, and/or mixture comprising solid elastomer and wet filler along the chamber to a discharge end.

As an additional option, the continuous mixer, e.g., twin-screw extruder or other mixer, can have multiple zones. The zones can be defined based on temperature. For example, upon initially entering the continuous mixer, at least the solid elastomer and filler can be mixed in a first zone at temperatures in which little or no evaporation occurs. As an option, this first zone can be operated at temperatures ranging from 100° C. to 140° C. The first zone can have a constant temperature range throughout the first zone or can increase in temperature as the elastomer and filler mixture passes through the zone. A second zone downstream of the first zone can be a water evaporation zone in which the mixture is subjected to higher temperatures and/or reduced pressures to reduce the water content. Such liquid (e.g., water) evaporation zone(s), also known as steam stripping zone(s), are commercially available for twin screw extruders and can comprise one or more pumping systems and/or one or more heating systems, either or both which can facilitate evaporation of the liquid. The steam stripping zone can include one or more vents to facilitate removal of the liquid vapor. A rotatable screw can be present in the continuous mixer to transport the mixture through each zone.

The temperature of the various zones can be controlled as described herein, e.g., as described for Tz.

One or more zones can be provided downstream the water evaporation zone to allow for the addition of antioxidants, rubber chemicals, and/or curing agents in desired amounts (e.g., an addition zone) and/or for cooling (e.g., one or more cooling zones).

Examples of suitable twin-screw extruders have been described in patent publication numbers WO 2018/219630, WO 2018/219631, and WO 2020/001823, the disclosures of which are incorporated herein by reference. For example, WO2018/219630 describes an extruder as part of a continuous process for drying coagulated wet masterbatch that can be adopted as a continuous mixer. This extruder comprises eleven zones, the first five of which are mixing zones and the sixth is a water evaporation (water stripping) zone, which is capable of removing essentially all of the water content from a mixture.

The continuous mixing process can further include presses, rollers, extruders, and the like to receive the dried composite and shape the resulting composite into sheets, strips, etc.

As disclosed herein, "continuous" with respect to the process or method or any step, involves an operation of a process or method (or a segment or portion thereof) where steps or actions occur without any interruption or stoppage, which do occur in a batch processing method. A 'continuous process' or 'continuous method' can involve a process or method such that a composite and/or vulcanizate and/or a precursor of a composite is produced in a continuous operation without forming an intermediate product that is used at a later time. A 'continuous process' or 'continuous method' can be where a continuous flow or input of raw materials occurs such that the processing of the raw materials is continuous and the production of the resulting material occurs on a continuous basis without any interruptions except for maintenance and normal stops in production (e.g., end of shift, end of production lot, etc.).

As another option, prior to the continuous mixing, the wet filler and solid elastomer can be combined (e.g., as a pre-blend) to simplify the charging of the material into the continuous mixer. For example, the wet filler and solid elastomer can be combined in a batch process (e.g., in an internal mixer) prior to being charged to the continuous mixer. This entire process with a pre-blend or prior mixing step can be considered a semi-continuous process; however, the step of mixing the wet filler and solid elastomer with removal of at least a portion of the liquid by evaporation is performed in a continuous mixer and is a continuous process. The composite that is discharged from the continuous mixer can be further processed with post-processing steps as disclosed herein, or further masticated or mixed in subsequent mixers, whether batch or continuous.

As an option, the wet filler is charged in pellet form, which can facilitate continuous charging. For example, a pelletized wet filler can minimize filler yield loss. The pelletized wet filler can be any pelletized filler as described herein, e.g., carbon black, silicon-treated black, silica, and blends thereof.

Integrated Manufacturing

As an option, any one of the methods disclosed herein lends itself to implementation as a unit operation within a multi-unit manufacturing plant, such as a plant for manufacturing filler, elastomer and/or elastomer compounds, vulcanizates and rubber articles, or a combination thereof. With respect to filler, there is a need to optimize filler manufacturing processes that have intermediate steps requiring formation of wet filler with subsequent drying steps to produce dry granules with low dust and good handling. These steps often require complex and expensive drying equipment to produce granules that are easy to transport but hard to disperse in the rubber. The integrated plant option can be feasible where the filler, e.g., carbon black or silica, or any filler described herein and combinations thereof, is made and/or where the wet filler is filler comprising process water or other liquid from the process used to manufacture the filler, e.g., never dried carbon black pellets or never dried silica.

In one integrated manufacturing option, wherein carbon black filler and/or silicon-treated carbon black filler is manufactured by a furnace process (e.g., carbon black manufacturing facility), water is used to densify fluffy carbon black by wet-granulating this fluff, resulting in the carbon black as produced comprising water. Typically, the wet carbon black as produced is conveyed to a dryer where it is dried before packaging and shipping to reduce dust and minimize cost and handling issues associated with transport and storage of a wet, low-density fluffy carbon black particulate material. With the integrated manufacturing process, never-dried carbon black, as produced, may be conveyed directly to a mixer as the wet filler for mixing with a solid elastomer in the mixing processes described herein. In multi-stage or step mixing processes, the composite made from such never-dried carbon black may be subjected to one or more additional integrated unit operations, including, but not limited to, being compounded with or without added materials, e.g., more of the same or different elastomer and filler, and/or oils, resins, polymers and other typical rubber chemicals and additives; further mixed or worked, cured to form vulcanizate, and fabricated into rubber articles.

In another integrated manufacturing option, wherein silica filler is manufactured by a precipitation process (e.g., a precipitated silica manufacturing facility), the precipitated silica is generally produced by acidifying a solution of silicate, which leads to polymerization, nucleation and growth of silica particles in an aqueous medium. The growing particles can collide, leading to aggregation, which can be consolidated by further deposition of silica on particle surfaces. The final size, surface area and structure of the particles are controlled by controlling silicate concentration, temperature, pH and metal ion content. At the end of the particle-forming process, an aqueous slurry of particles is obtained. This slurry undergoes a solid-liquid separation, usually comprising filtration such as by means of a filter press, belt filter or vacuum filter. The filtered particles are then washed to remove salt and other soluble substances and further filtered to give a filter cake. The filter cake typically contains 60-90% water by weight and 10-40% silica on a total filter cake weight basis. A typical production process is described in U.S. Pat. No. 7,250,463, incorporated in its entirety by reference herein.

Conventionally the wet filter cake is dried relatively slowly in ovens, or rotating dryers. Silica produced that way is generally considered difficult to disperse in rubber. An alternative drying process involves rapid heating to high temperatures for a short period of time, for example in a spray dryer. Precipitated silica produced with this alternative drying process generally gives much better dispersibility in rubber. It is thought that during conventional drying, a combination of high capillary forces exerted by thin layers of water and chemical reactions between silanol groups on adjacent particles, leads to compact agglomerates with strong bonds between particles. The most significant chemical reaction is condensation, leading to siloxane bonds. This reaction is accelerated by heat and by removal of water. The strong bonds that are formed between particles cannot be easily broken during rubber mixing and hence, dispersion tends to be poor. During the rapid drying process, the residence time of the particles at high temperature is much shorter, providing less time for particle rearrangement or compaction and fewer condensation reactions. This leads to a lower number of bonds or strong contacts between silica particles, and therefore better rubber dispersion. However, it is not thought that silica particle-particle bonding is completely eliminated in the rapid-drying process, just reduced relative to the conventional process.

It could be beneficial to use never-dried silica (e.g., slurry or cake) in the integrated manufacturing option and thus avoid or reduce the conventional silica drying processes and incorporate silica wet filler into solid elastomer. Advantages of such a multi-unit manufacturing operation include those enumerated herein, together with obtaining a higher quality silica-elastomer composite, a streamlined, simplified manufacturing process for producing composites from never-dried silica and significant cost savings.

With such multi-unit, integrated manufacturing operations, the never-dried filler can be manufactured and can be used immediately or within hours or days of manufacturing in the elastomer mixing operations. The never-dried filler can be transported by conveyer line, bins, rail, truck or other means to the elastomer mixing operations. The never-dried filler can be in a cake or paste, a fluidized state or in a pelletized form. With such a process, the filler can be manufactured in the filler plant and then transported or conveyed to an adjacent elastomer plant where elastomeric materials are synthesized, purified, blended or otherwise processed into a solid elastomer desired for use in one or more of the processes of the present integrated manufacturing option as described herein and as option, the elastomer plant can further proceed to take the composite formed and conduct further steps including, but not limited to, preparing a vulcanizate, and forming tires or one or more tire components or other articles that comprise the present vulcanizate or composite.

Since the integrated manufacturing process utilizes a wet filler, the ability to use never-dried filler such as never-dried carbon black or never-dried silica or other never-dried fiber, particle or elastomer reinforcing material, and combinations thereof, can potentially create a more efficient operation and may permit a turn-key type of operation. The use of any never-dried filler is possible in such integrated processes as described herein.

One example of a method utilizing an integrated manufacturing operation can involve manufacturing a filler in a filler manufacturing facility, by a process wherein a final product that is a wet filler comprises a filler and a liquid present in an amount of at least at least 15% by weight based on total weight of wet filler; conveying said wet filler to at least one mixer; charging said at least one mixer with at least a solid elastomer and said wet filler, wherein the at least one mixer has at least one temperature-control means; in one or more mixing steps, mixing the at least the solid elastomer and the wet filler to form a mixture, and in at least one of said mixing steps conducting said mixing at mixer temperatures controlled by at least one temperature-control means and removing at least a portion of the liquid from the mixture by evaporation; and discharging, from the at least one mixer, the composite comprising the filler dispersed in the elastomer at a loading of at least 20 phr with a filler yield loss of no more than 10%, wherein the composite has a liquid content of no more than 20% by weight based on total weight of said composite.

With regard to the integrated manufacturing operation, the method can further comprise any one or more of the following embodiments: the wet filler is never-dried filler; the filler manufacturing facility is a carbon black manufacturing facility, and said wet filler is never-dried carbon black; the filler manufacturing facility is a precipitated silica manufacturing facility, and said wet filler is never-dried precipitated silica; the filler manufacturing facility is a silicon-treated carbon black manufacturing facility; further comprising preparing a vulcanizate comprising the elastomer composite, and optionally forming articles that comprise the vulcanizate or the elastomer composite;

With regard to the integrated manufacturing operation, the method can further comprise any one or more of the following parameters during the method: the at least one temperature-control means is set to a temperature, Tz, of 65° C. or higher during said mixing; and/or during said mixing, the one or more rotors operate, for at least 50% the mixing time, at a tip speed of at least 0.6 m/s; and/or charging a mixer with at least a solid elastomer comprising at least 50 wt. % natural rubber and a wet filler wherein a fill factor, on a dry weight basis, of the at least the solid elastomer and the wet filler is no more than 68%; and/or conducting said mixing at mixer temperatures controlled by at least one temperature-control means and applying an average specific power of at least 2.5 kW/kg over mixing time; and/or the mixing is a continuous mixing step and the charging comprises charging a continuous flow of at least a solid elastomer and a wet filler to a continuous mixer; and/or a second mixer to obtain the composite, wherein the second mixer is operated under at least one of the following conditions: (i) a ram pressure of 5 psi or less; (ii) a ram raised to at least 75% of its highest level; (iii) a ram operated in floating mode; (iv) a ram positioned such that it does not substantially contact the mixture; (v) the mixer is ram-less; and (vi) a fill factor of the mixture ranges from 25% to 70%; and/or the one or more rotors operate, for at least 50% the mixing time, at a tip speed of at least 0.5 m/s, resulting in a resulting total specific energy of at least 1500 kJ/kg composite, and wherein the wet filler is a wet particulate filler; and/or optionally adding at least one additive selected from antidegradants and coupling agents during said charging (a) or said mixing (b), and optionally adding one or more rubber chemicals after the mixer reaches a temperature of 120° C. or higher.

The prior description of amounts, types of fillers, and other parameters apply equally here (e.g., for instance, various examples and ranges for the loading were provided earlier and would apply here as well).

Filler Types

The wet filler that is used in any of the methods disclosed herein can be a solid material, e.g., a solid bulk material, in the form of a powder, paste, pellet or cake. In the methods, the wet filler can be dispersed in the elastomer at a loading ranging from 1 phr to 100 phr on a dry weight basis, or a loading ranging from 20 phr to 250 phr, from 20 phr to 200 phr, e.g., from 20 phr to 180 phr, from 20 phr to 150 phr, from 20 phr to 120 phr, or from 20 phr to 100 phr, as well as other ranges disclosed herein.

In any of the methods disclosed herein, a wet filler, such as a wet carbon black, wet silica, or wet silicon-treated carbon black (described in further detail herein), can be described with respect to a liquid content determined as a function of its oil absorption number (OAN). A wet filler such as a wet carbon black that can be used herein can satisfy the equation: k*OAN/(100+OAN)*100, wherein k ranges from 0.3 to 1.1, or from 0.5 to 1.05, or from 0.6 to 1.1, or from 0.95 to 1, or from 0.95 to 1.1, or from 1.0 to 1.1.

As a more specific example, such a wet filler having this type of 'wet' form as a solid can contain, for instance, up to 80% by weight liquid (e.g., water and/or other aqueous liquid) based on the total weight of the wet filler. The wet filler can have a liquid content (e.g., water content) of 80% by weight or less, such as 70% or less, 60% or less, 50% or less, 40% or less, 30% or less, such as from about 15% to about 80%, by weight, from about 20% to about 80%, from about 25% to about 80%, from about 30% to about 80%, from about 35% to about 80%, from about 40% to about 80%, from about 15 wt. % to about 70%, from about 20 wt. % to about 70%, from about 25% to 70%, from about 30% to 70%, from about 35% to about 80%, from about 40% to 70%, from about 15 wt. % to about 65%, from about 20% to about 65%, from about 25% to about 65%, from about 30 wt. % to about 65%, from about 35% to about 65%, from about 40% to about 65%, from about 15% to about 60%, from about 20% to about 60%, from about 25% to about 60%, from about 30% to about 60%, from about 35% to about 60%, or from about 40% to 60% by weight relative to the total weight of the filler, or any other ranges from these various values given herein. The wet filler can have a liquid content in an amount of at least 30% by weight (based on the weight of the filler), or at least 40% by weight, or from 20% to 80% by weight.

As a more specific example, a wet carbon black can have a liquid content ranging from about 20% to about 70% by weight, relative to the total weight of the wet carbon black, e.g., from about 25% to about 70%, from about 30% to about 70%, from about 35% to about 70%, from about 40% to about 70%, from about 45% to about 70%, from about 50% to about 70%, from about 20% to about 65% by weight.

The filler that is wetted can be any conventional filler used with elastomers such as reinforcing fillers including, but not limited to, carbon black, silica, a filler comprising carbon black, a filler comprising silica, and/or any combinations thereof. The filler can be particulate or fibrous or plate-like, e.g., a wet particulate filler. For example, a particulate filler is made of discrete bodies. Such fillers can often have an aspect ratio (e.g., length to diameter) of 3:1 or less, or 2:1 or less, or 1.5:1 or less. Fibrous fillers can have an aspect ratio of, e.g., 2:1 or more, 3:1 or more, 4:1 or more, or higher. Typically, fillers used for reinforcing elastomers have dimensions that are microscopic (e.g., hundreds of microns or less) or nanoscale (e.g., less than 1 micron). In the case of carbon black, the discrete bodies of particulate carbon black refer to the aggregates or agglomerates formed from primary particles, and not to the primary particles themselves. In other embodiments, the filler can have a platelike structure such as graphenes and reduced graphene oxides.

The filler can be chemically treated (e.g. chemically treated carbon black, chemically treated silica, silicon-treated carbon black) and/or chemically modified. The filler can be or include carbon black having an attached organic group(s). The filler can have one or more coatings present on the filler (e.g. silicon-coated materials, silica-coated material, carbon-coated material). The filler can be oxidized and/or have other surface treatments. The filler can comprise at least one material that is selected from carbonaceous materials, carbon black, silica, nanocellulose, lignin, clays, nanoclays, metal oxides, metal carbonates, pyrolysis carbon, reclaimed carbon, recovered carbon black (e.g., as defined in ASTM D8178-19, rCB, graphenes, graphene oxides, reduced graphene oxide (e.g., reduced graphene oxide worms as disclosed in PCT Publ. No. WO 2019/070514A1, or densified reduced graphene oxide granules as disclosed in U.S. Prov. Appl. No. 62/857,296, filed Jun. 5, 2019, the disclosures of which are incorporated herein by reference), carbon nanotubes, single-wall carbon nanotubes, multi-wall carbon nanotubes, or combinations thereof, or corresponding coated materials or chemically-treated materials thereof (e.g., chemically-treated carbon black). There is no limitation with respect to the type of silica, carbon black, or other filler that can be used. More details concerning the filler are provided in other sections herein.

The filler can be or include a blend of carbon black and silica in any weight ratio, such as weight ratio ranges of from 1:99 to 99:1 or from 25:75 to 75:25 or from 45:55 to 55:45. As an option, a blend of carbon black and at least one other filler (e.g., silica and/or silicon-treated carbon black) can contain at least 1 wt. % carbon black (i.e., no more than 99 wt. % silica), at least 5 wt. % carbon black, at least 10 wt. % carbon black, at least 20 wt. % carbon black, at least 30 wt. % carbon black, at least 50 wt. % carbon black, at least 66 wt. % carbon black, at least 75 wt. % carbon black, at least 90 wt. % carbon black, at least 95 wt. % carbon black, or at least 99 wt. % carbon black (i.e., no more than 1 wt. % silica), where wt. % values are based on total weight of blend on a dry basis. The filler can be a blend of at least two fillers, such as ones selected from carbon black, silica, and silicon-treated carbon black.

As an option a blend of silica and at least one other filler (e.g., carbon black and/or silicon-treated carbon black) can contain at least 1 wt. % silica (i.e., no more than 99 wt. % carbon black), at least 5 wt. % silica, at least 10 wt. % silica, at least 20 wt. % silica, at least 30 wt. % silica, at least 50 wt. % silica, at least 66 wt. % silica, at least 75 wt. % silica, at least 90 wt. % silica, at least 95 wt. % silica, or at least 98 wt. % silica or at least 99 wt. % silica (i.e., no more than 1 wt. % carbon black or any other filler) or at least 99.8 wt. % silica, where wt. % values are based on total weight of blend on dry basis.

As an option, the mixture can further include one or more non-wetted filler (e.g., any of the fillers that is not wetted as described herein, such as dry filler, such as a filler having no more than 10% liquid by weight.) When non-wetted filler is present, the total amount of filler can be such that at least 10 wt. %, at least 20 wt. %, at least 30 wt. %, at least 40 wt. %, at least 50 wt. % or at least 60 wt. %, or at least 70 wt. % or at least 80 wt. %, or at least 90 wt. % or at least 95 wt. % of the filler is a wet filler, such as from about 10 wt. % to 99.5 wt. %, from about 20 wt. % to 99.5 wt. %, from about 30 wt. % to 99.5 wt. %, from about 40 wt. % to 99.5 wt. %, from about 50 wt. % to 99.5 wt. %, or from about 50 wt. % to 99 wt. %, 60 wt. % to 99 wt. %, or from 70 wt. % to 99 wt. % or from 80 wt. % to 99 wt. % of the total amount of filler can be wet filler, with the balance of the filler being in a non-wetted state or not being considered a wet filler.

The amount of filler (e.g. wet filler alone or wet filler with other filler) that is loaded into the mixture can be targeted (on a dry weight basis) to range from 1 phr to 200 phr, from 1 phr to 150 phr, from 1 phr to 100 phr, or from 30 phr to 150 phr, such as from about 5 phr to 100 phr, 10 phr to 100 phr, 20 phr to 100 phr, 30 phr to 100 phr, 40 phr to 100 phr, 50 phr to 100 phr, or 5 phr to 70 phr, 10 phr to 70 phr, 20 phr to 70 phr, 30 phr to 70 phr, 35 phr to 70 phr, 40 phr to 70 phr, 5 phr to 65 phr, 10 phr to 65 phr, 20 phr to 65 phr, 30 phr to 65 phr, 35 phr to 65 phr, 40 phr to 65 phr, 5 phr to 60 phr, 10 phr to 60 phr, 20 phr to 60 phr, 30 phr to 60 phr, 35 phr to 60 phr, 40 phr to 60 phr, 5 phr to 50 phr, or other amounts within or outside of one or more of these ranges. Other ranges include from about 15 phr to about 180 phr, from about 20 phr to about 200 phr, from about 20 phr to about 180 phr, from about 20 phr to about 150 phr, from about 20 phr to about 100 phr, about 25 phr to about 80 phr, about 30 phr to about 150 phr, about 35 phr to about 115 phr, about 35 phr to about 100 phr, about 40 phr to about 100 phr, about 40 phr to about 90 phr, about 40 phr to about 80 phr, about 29 phr to about 175 phr, about 40 phr to about 110 phr, about 50 phr to about 175 phr, about 60 phr to about 175 phr, and the like. The filler can be any filler disclosed herein, such as carbon black, silica, or silicon-treated carbon black, whether alone or with one or more other fillers. The above phr amounts can also apply to filler dispersed in the elastomer (filler loading).

For graphenes, graphene oxides, reduced graphene oxide, carbon nanotubes, single-wall carbon nanotubes, multi-wall carbon nanotubes, these fillers can be dispersed in the elastomer at a loading ranging from 1 phr to 100 phr, e.g., from 1 phr to 50 phr, from 1 phr to 25 phr, from 1 phr to 20 phr, or from 1 phr to 10 phr. When combined with other fillers, such as carbon black, the graphenes, graphene oxides, reduced graphene oxide, carbon nanotubes, single-wall carbon nanotubes, and multi-wall carbon nanotubes can be dispersed in the elastomer at a loading ranging from 0.5 phr to 99 phr, e.g., from 0.5 phr to 50 phr, from 0.5 phr to 25 phr, from 0.5 phr to 20 phr, or from 0.5 phr to 10 phr. In such combinations, the graphenes, graphene oxides, reduced graphene oxide, carbon nanotubes, single-wall carbon nanotubes, and multi-wall carbon nanotubes can be present in an amount of at least 1%, at least 2%, at least 5%, at least 10%, at least 15%, at least 20%, at least 30%, at least 40%, or at least 50% by weight of the total amount of filler dispersed in the elastomer. In certain cases, for e.g. for graphenes, graphene oxides, reduced graphene oxide (e.g., reduced graphene oxide worms and densified reduced graphene oxide granules), carbon nanotubes, single-wall carbon nanotubes, multi-wall carbon nanotubes the loading of these fillers in the total filler is much smaller, their loading in the composite can range from 0.01 phr to 10 phr, from 0.1 to 5 phr, from 0.1 to 2 phr.

For example, for oil-extended elastomers or formulations with oil added, the filler loadings are typically higher and can range from 20 phr to 250 phr, from 50 phr to 250 phr, from 70 phr to 250 phr, from 60 phr to 150 phr.

The carbon black can be untreated carbon black or treated carbon black or a mixture thereof. The filler can be or include wet carbon black in the form of pellets, fluffy powder, granules, and/or agglomerates. Wet carbon black can be formed into pellets, granules, or agglomerates in, e.g., a pelletizer, a fluidized bed or other equipment to make the wet filler.

The wet carbon black can be one or more of the following:
  never-dried carbon black; and/or
  never-dried carbon black pellets; and/or
  dried carbon black pellets that have been rewetted, such as with water in a pelletizer; and/or
  dried carbon black pellets that have been ground and then rewetted with water in a pelletizer; and/or
  dried carbon black pellets combined with water; and/or
  fluffy powder, granules, or agglomerates combined with water.

In typical carbon black manufacturing, carbon black is initially prepared as dry, fine particulate (fluffy) material. The fluffy carbon black can be densified by a conventional pelletizing process, e.g., by combining the carbon black with a liquid such as adding water and feeding the mixture to a pin pelletizer. Pin pelletizers are well known in the art and include the pin pelletizer described in U.S. Pat. No. 3,528,785. The resulting wet pellets are then heated under controlled temperature and time parameters to remove liquid from the pellets before further handling and shipping. In an alternative process, carbon black pellets can be manufactured by a process that omits a drying step. In such a process, pelletized carbon black contains process water of at least 20% by weight based on a total weight of wet carbon black, e.g., at least 30% by weight, or at least 40% by weight. These "never-dried carbon black" pellets and can be used directly in the claimed processes after pelletizing. As used herein, "never-dried" refers to pellets that were prepared from fluffy carbon black, were not subjected to a drying step, and retain a water content greater than 15 wt. % of total weight of the filler (pellet), e.g., greater than 20 wt. %, greater than 30 wt. %, greater than 40 wt. %, or ranging from 20 to 65 wt. %, from 20 to 60 wt. %, from 30 to 65 wt. %, from 30 to 60 wt. %, from 40 to 65 wt. %, or from 40 to 60 wt. %. For example, never-dried pellets can refer to pellets formed from fluffy carbon black is densified by conventional pelletizing processes and used as is, i.e., no drying step has been performed. During storage and/or transport, the never-dried pellet may lose some water. However, it is understood that the "never-dried" pellet maintains or has the water contents as disclosed herein.

Alternatively, carbon black pellets that have been dried (such as commercially available carbon black pellets) can be rewetted in a pelletizer. The pellets can be granulated, ground, classified, and/or milled, e.g., in a jet mill. The resulting carbon black is in fluffy form and can be repelletized in a pelletizer or otherwise compressed or agglomerated in the presence of water to wet the carbon black. Alternatively, the fluffy carbon black can be compressed into other forms, e.g., in a brick form, with equipment known in the art. As another option, carbon black, such as the carbon black pellets or the fluffy carbon black can be wetted, e.g., by using a fluidized bed, sprayer, mixer, or rotating drum, and the like. Where the liquid is water, never-dried carbon black or carbon black that has been rewetted can achieve a water content ranging from 20% to 80%, from 30% to 70% by weight or other ranges, e.g., from 55% to 60% by weight, with respect to the total weight of the wet carbon black.

The carbon black used in any of the methods disclosed herein can be any grade of reinforcing carbon blacks and semi-reinforcing carbon blacks. Examples of ASTM grade reinforcing grades are N110, N121, N134, N220, N231, N234, N299, N326, N330, N339, N347, N351, N358, and N375 carbon blacks. Examples of ASTM grade semi-reinforcing grades are N539, N550, N650, N660, N683, N762, N765, N774, N787, N990 carbon blacks and/or N990 grade thermal blacks.

The carbon black can have any statistical thickness surface area (STSA) such as ranging from 20 $m^2/g$ to 250 $m^2/g$ or higher, for instance, at least 60 $m^2/g$, such as from 60 $m^2/g$ to 150 $m^2/g$, from 70 $m^2/g$ to 250 $m^2/g$, from 80 $m^2/g$ to 200 $m^2/g$, from 90 $m^2/g$ to 200 $m^2/g$, from 100 $m^2/g$ to 180 $m^2/g$, from 110 $m^2/g$ to 150 $m^2/g$, from 120 $m^2/g$ to 150 $m^2/g$, or from 30 $m^2/g$ to 200 $m^2/g$ and the like. STSA (statistical thickness surface area) is determined based on ASTM Test Procedure D-5816 (measured by nitrogen adsorption).

The carbon black can have a compressed oil absorption number (COAN) ranging from about 30 mL/100 g to about 150 mL/100 g, e.g., from about 30 mL/100 g to about 125 mL/100 g, from about 30 mL/100 g to about 115 mL/100 g, from about 50 mL/100 g to about 150 mL/100 g, from about 50 mL/100 g to about 125 mL/100 g, from about 50 mL/100 g to about 115 mL/100 g, from about 60 mL/100 g to about 120 mL/100 g, from about 70 mL/100 g to about 150 mL/100 g, from about 70 mL/100 g to about 125 mL/100 g, from about 70 mL/100 g to about 115 mL/100 g, from about 80 mL/100 g to about 150 mL/100 g, from about 80 mL/100 g to about 125 mL/100 g, from about 80 mL/100 g to about 115 mL/100 g or from about 80 mL/100 g to about 100 mL/100 g. Compressed oil absorption number (COAN) is determined according to ASTM D3493. As an option, the carbon black can have a STSA ranging from 60 $m^2/g$ to 150 $m^2/g$ with a COAN of from 70 mL/100 g to 115 mL/100 g.

As stated, the carbon black can be a rubber black, and especially a reinforcing grade of carbon black or a semi-reinforcing grade of carbon black. Carbon blacks sold under the Regal®, Black Pearls®, Spheron®, Sterling®, Propel®, Endure®, and Vulcan® trademarks available from Cabot Corporation, the Raven®, Statex®, Furnex®, and Neotex® trademarks and the CD and HV lines available from Birla Carbon (formerly available from Columbian Chemicals), and the Corax®, Durax®, Ecorax®, and Purex® trademarks and the CK line available from Orion Engineered Carbons (formerly Evonik and Degussa Industries), and other fillers suitable for use in rubber or tire applications, may also be exploited for use with various implementations. Suitable chemically functionalized carbon blacks include those disclosed in WO 96/18688 and US2013/0165560, the disclosures of which are hereby incorporated by reference. Mixtures of any of these carbon blacks may be employed. Carbon blacks having surface areas and structures beyond the ASTM grades and typical values selected for mixing with rubber, such as those described in U.S. Patent Application Publ. No. 2018/0282523, the disclosure of which is incorporated herein by reference, may be used in the wet filler and in the composite made by any of the methods disclosed herein.

The carbon black can be an oxidized carbon black, such as a carbon black that has been surface treated using an oxidizing agent. Oxidizing agents include, but are not limited to, air, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may be used, particularly mixtures of gaseous oxidants such as oxygen and ozone. In addition, carbon blacks prepared using other surface modification methods to introduce ionic or ionizable groups onto a pigment surface, such as chlorination and sulfonation, may also be used. Processes that can be employed to generate oxidized carbon blacks are known in the art and several types of oxidized carbon black are commercially available.

The carbon black can be a furnace black, a gas black, a thermal black, an acetylene black, or a lamp black, a plasma black, a recovered carbon black (e.g., as defined in ASTM D8178-19), or a carbon product containing silicon-containing species, and/or metal containing species and the like. The carbon black can be a multi-phase aggregate comprising at least one carbon phase and at least one metal-containing species phase or silicon-containing species phase, i.e., silicon-treated carbon black. In silicon-treated carbon black, a silicon containing species, such as an oxide or carbide of silicon, is distributed through at least a portion of the carbon black aggregate as an intrinsic part of the carbon black. Silicon-treated carbon blacks are not carbon black aggregates which have been coated or otherwise modified, but actually represent dual-phase aggregate particles. One phase is carbon, which will still be present as graphitic crystallite and/or amorphous carbon, while the second phase is silica, and possibly other silicon-containing species). Thus, the silicon-containing species phase of the silicon treated carbon black is an intrinsic part of the aggregate, distributed throughout at least a portion of the aggregate. Ecoblack™ silicon-treated carbon blacks are available from Cabot Corporation. The manufacture and properties of these silicon-treated carbon blacks are described in U.S. Pat. No. 6,028,137, the disclosure of which is incorporated herein by reference.

The silicon-treated carbon black can include silicon-containing regions primarily at the aggregate surface of the carbon black, but still be part of the carbon black and/or the silicon-treated carbon black can include silicon-containing regions distributed throughout the carbon black aggregate. The silicon-treated carbon black can be oxidized. The silicon-treated carbon black can contain from about 0.1% to about 50% silicon by weight, e.g., from about 0.1% to about 46.6%, from about 0.1% to about 46%, from about 0.1% to about 45%, from about 0.1% to about 40%, from about 0.1% to about 35%, from about 0.1% to about 30%, from about 0.1% to about 25%, from about 0.1% to about 20%, from about 0.1% to about 15%, from about 0.1% to about 10%, from about 0.1% to about 5%, or from about 0.1% to about 2% by weight, based on the weight of the silicon-treated carbon black. These amounts can be from about 0.5 wt. % to about 25 wt. %, from about 1 wt. % to about 15 wt. % silicon, from about 2 wt. % to about 10 wt. %, from about 3 wt. % to about 8 wt. %, from about 4 wt. % to about 5 wt. % or to about 6 wt. %, all based on the weight of the silicon-treated carbon black.

One of skill in the art will recognize that, separately from the silicon content of the silicon-treated carbon black, the surface of the particle may also have varying amounts of silica and carbon black. For example, the surface area of the silicon-treated carbon black may include from about 5% to about 95% silica, for example, from about 10% to about 90%, from about 15% to about 80%, from about 20% to about 70%, from about 25% to about 60%, from about 30% to about 50%, or from about 35% to about 40%, for example, up to about 20% or up to about 30% silica. The amount of silica at the surface may be determined by the difference between the surface areas of the particles as measured by iodine number (ASTM D-1510) and nitrogen adsorption (i.e., BET, ASTM D6556).

As another option, the filler, e.g., carbon black, can be chemically treated. For example, the carbon black can have attached at least one organic group. Attachment can occur via a diazonium reaction where the at least one organic group has a diazonium salt substituent as detailed, for instance, in U.S. Pat. Nos. 5,554,739; 5,630,868; 5,672,198; 5,707,432; 5,851,280; 5,885,335; 5,895,522; 5,900,029; 5,922,118, the disclosure of which are incorporated herein by reference.

With regard to the filler, as an option, being at least silica, one or more types of silica, or any combination of silica(s), can be used in any embodiment disclosed herein. The silica can include or be precipitated silica, fumed silica, silica gel, and/or colloidal silica. The silica can be or include untreated silica and/or chemically-treated silica. The silica can be suitable for reinforcing elastomer composites and can be characterized by a Brunaur Emmett Teller surface area (BET, as determined by multipoint BET nitrogen adsorption, ASTM D1993) of about 20 m$^2$/g to about 450 m$^2$/g; about 30 m$^2$/g to about 450 m$^2$/g; about 30 m$^2$/g to about 400 m$^2$/g; or about 60 m$^2$/g to about 250 m$^2$/g, from about 60 m$^2$/g to about 250 m$^2$/g, from about 80 m$^2$/g to about 200 m$^2$/g. The silica can have an STSA ranging from about 80 m$^2$/g to 250 m$^2$/g, such as from about 80 m$^2$/g to 200 m$^2$/g or from 90 m$^2$/g to 200 m$^2$/g, from 80 m$^2$/g to 175 m$^2$/g, or from 80 m$^2$/g to 150 m$^2$/g. Highly dispersible precipitated silica can be used as the filler in the present methods. Highly dispersible precipitated silica ("HDS") is understood to mean any silica having a substantial ability to dis-agglomerate and disperse in an elastomeric matrix. Such dispersion determinations may be observed in known manner by electron or optical microscopy on thin sections of elastomer composite. Examples of commercial grades of HDS include, Perkasil® GT 3000GRAN silica from WR Grace & Co, Ultrasil® 7000 silica from Evonik Industries, Zeosil® 1165 MP, 1115 MP, Premium, and 1200 MP silica from Solvay S.A., Hi-Sil® EZ 160G silica from PPG Industries, Inc., and Zeopol® 8741 or 8745 silica from Evonik Industries. Conventional non-HDS precipitated silica may be used as well. Examples of commercial grades of conventional precipitated silica include, Perkasil® KS 408 silica from WR Grace & Co, Zeosil® 175GR silica from Solvay S.A., Ultrasil® VN3 silica from Evonik Industries, and Hi-Sil® 243 silica from PPG Industries, Inc. Precipitated silica with surface attached silane coupling agents may also be used. Examples of commercial grades of chemically-treated precipitated silica include Agilon®400, 454, or 458 silica from PPG Industries, Inc. and Coupsil silicas from Evonik Industries, for example Coupsil® 6109 silica.

While the liquid amount in the filler as described above can equally apply to silica, as a more particular example, when silica is used as the wet filler in part or in whole as the wet filler, the silica can have liquid present in an amount of from about 25 wt. % to about 75 wt. %, e.g., from about 30% to about 75%, from about 40% to about 75%, from about 45% to about 75%, from about 50% to about 75%, from about 30% to about 70%, from about 40% to about 70%, from about 45% to about 70%, from about 50% to about 70%, from about 30% to about 65%, from about 40% to about 65%, from about 45% to about 65%, from about 50% to about 65%, from about 30% to about 60% by weight, from about 40% to about 60%, from about 45% to about 60%, or from about 50% to about 60% by weight, based on the weight of the total wet filler or based on the weight of just the wet silica present.

Typically the silica (e.g., silica particles) have a silica content of at least 20 wt. %, at least 25 wt. %, at least 30 wt. %, at least 35 wt. %, at least 40 wt. %, at least 50 wt. %, at least 60 wt. %, at least 70 wt. %, at least 80 wt. %, at least 90 wt. %, or almost 100 wt. % or 100 wt. %, or from about 20 wt. % to about 100 wt. %, all based on the total weight of the particle. Any of the silica(s) can be chemically functionalized, such as to have attached or adsorbed chemical groups, such as attached or adsorbed organic groups. Any combination of silica(s) can be used. The silica can be in part or entirely a silica having a hydrophobic surface, which can be a silica that is hydrophobic or a silica that becomes hydrophobic by rendering the surface of the silica hydrophobic by treatment (e.g., chemical treatment). The hydrophobic surface may be obtained by chemically modifying the silica particle with hydrophobizing silanes without ionic groups, e.g., bis-triethoxysilylpropyltetrasulfide. Suitable hydrophobic surface-treated silica particles for use herein may be obtained from commercial sources, such as Agilon® 454 silica and Agilon® 400 silica, from PPG Industries. Silica having low surface silanol density, e.g., silica obtained through dehydroxylation at temperatures over 150° C. via, for example, a calcination process, may be used herein. An intermediate form of silica obtained from a precipitation process in a cake or paste form, without drying (a never-dried silica) may be added directly to a mixer as the wet filler, thus eliminating complex drying and other downstream processing steps used in conventional manufacture of precipitated silicas.

In any embodiment and in any step, a coupling agent can be introduced in any of the steps (or in multiple steps or locations) as long as the coupling agent has an opportunity to become dispersed in the composite. The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl)tetrasulfane (e.g., Si 69 from Evonik Industries, Struktol SCA98 from Struktol Company), bis(3-triethoxysilylpropyl)disulfane (e.g., Si 75 and Si 266 from Evonik Industries, Struktol SCA985 from Struktol Company), 3-thiocyanatopropyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O, N,N'-bis(2-methyl-2-nitropropyl)-1,6-diaminohexane, S-(3-(triethoxysilyl)propyl) octanethioate (e.g., NXT coupling agent from Momentive, Friendly, WV), and/or coupling agents that are chemically similar or that have the one or more of the same chemical groups. Additional specific examples of coupling agents, by commercial names, include, but are not limited to, VP Si 363 from Evonik Industries, and NXT Z and NXT Z-50 silanes from Momentive. The coupling agents described herein could be used to provide hydrophobic surface modification of silica (precoupled or pretreated silica) before using it in any of the processes disclosed herein. It is to be appreciated that any combination of elastomers, additives, and additional composite may be added to the elastomer composite, for instance in a compounder.

Other fillers are disclosed in U.S. Patent Application Publ. No. 2018/0282523 and European Patent No. 2423253B1, the disclosures of which are incorporated herein by reference.

Solid Elastomer Types

The solid elastomer can be or include natural and/or synthetic elastomers and/or rubbers. Elastomer types include natural rubbers (NR), styrene butadiene rubbers (SBR), polybutadiene (BR) and polyisoprene rubbers (IR), ethylene-propylene rubber (e.g., EPDM), isobutylene-based elastomers (e.g., butyl rubber), polychloroprene rubber (CR), nitrile rubbers (NBR), hydrogenated nitrile rubbers (HNBR), polysulfide rubbers, polyacrylate elastomers, fluoroelastomers, perfluoroelastomers, and silicone elastomers.

Exemplary elastomers include natural rubber, SBR, BR, IR, functionalized SBR, functionalized BR, functionalized NR, EPDM, butyl rubber, halogenated butyl rubber, CR, NBR, HNBR, fluoroelastomers, perfluoroelastomers, and silicone rubber, e.g., natural rubber, functionalized natural rubber, styrene-butadiene rubber, functionalized styrene-butadiene rubber, polybutadiene rubber, functionalized polybutadiene rubber, polyisoprene rubber, ethylene-propylene rubber, nitrile rubber, hydrogenated nitrile rubber, and blends thereof, or e.g., natural rubber, styrene-butadiene rubber, polybutadiene rubber, and blends thereof, e.g., a blend of first and second solid elastomers. If two or more elastomers are used, the two or more elastomers can be charged into the mixer as a blend at the same time (as one charge or two or more charges) or the elastomers can be added separately in any sequence and amount. For example, the solid elastomer can comprise natural rubber blended with one or more of the elastomers disclosed herein, e.g., butadiene rubber and/or styrene-butadiene rubber. For instance, the additional solid elastomer can be added separately to the mixer and the natural rubber can be added separately to the mixer.

The solid elastomer can be or include natural rubber. The natural rubber may also be chemically modified in some manner. For example, it may be treated to chemically or enzymatically modify or reduce various non-rubber components, or the rubber molecules themselves may be modified with various monomers or other chemical groups such as chlorine. Other examples include epoxidized natural rubber and natural rubber having a nitrogen content of at most 0.3 wt. %, as described in PCT Publ. No. WO 2017/207912.

Other exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. Particular suitable synthetic rubbers include: copolymers of styrene and butadiene comprising from about 10 percent by weight to about 70 percent by weight of styrene and from about 90 to about 30 percent by weight of butadiene such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alpha-methylene carboxylic acids and the esters and amides thereof, such as acrylic acid and dialkylacrylic acid amide. Also suitable for use herein are copolymers of ethylene and other high alpha olefins such as propylene, 1-butene, and 1-pentene. Other polymers are disclosed in U.S. Patent Application Publ. No. 2018/0282523 and European Patent No. 2423253B1, the disclosures of which are incorporated herein by reference. Other polymers include silicone-based elastomers or hybrid systems that have silicones and hydrocarbon domains.

Rubber Chemicals

The composites prepared by any of the methods disclosed herein can consist of elastomer and filler, i.e., no rubber chemicals are present. Alternatively, in addition to filler and elastomer, the composite can comprise at least one additive selected from antidegradants and coupling agents. Alternatively, the composites can include one or more rubber chemicals. In another alternative, the composite can be curative-bearing compositions.

In a typical dry mixing process (solid elastomer and dry filler), it is often necessary to add certain additives; typical additives include anti-degradants, coupling agents, and one or more rubber chemicals to enable dispersion of filler into the elastomer. Rubber chemicals, as defined herein, include one or more of: processing aids (to provide ease in rubber mixing and processing, e.g. various oils and plasticizers, wax), activators (to activate the vulcanization process, e.g. zinc oxide and fatty acids), accelerators (to accelerate the vulcanization process, e.g. sulphenamides and thiazoles), vulcanizing agents (or curatives, to crosslink rubbers, e.g. sulfur, peroxides), and other rubber additives, such as, but not limit to, retarders, co-agents, peptizers, adhesion promoters, tackifiers, resins, flame retardants, colorants, and blowing agents. As an option, the rubber chemicals can comprise processing aids and activators. As another option, the one or more other rubber chemicals are selected from zinc oxide, fatty acids, zinc salts of fatty acids, wax, accelerators, resins, and processing oil.

In typical dry mixing processes, one or more rubber chemicals (e.g., processing aids) are charged early in the mix cycle to aid incorporation of the filler. Thus, rubber chemicals can be essential, yet they can interfere with binding or interaction between filler and elastomer surfaces and have a negative impact on vulcanizate properties. It has been discovered that the use of a wet filler enables the filler to be mixed with a solid elastomer in the absence of or substantial absence of such rubber chemicals. Without wishing to be bound by any theory, it is believed that the presence of a wet filler eliminates the need for rubber chemicals early in the mix cycle, or anytime during the mix cycle, because the liquid enables and improves filler incorporation into the solid rubber.

Accordingly, as an option, the method comprises charging a mixer with solid elastomer and wet filler and, in one or more mixing steps, mixing the solid elastomer and the wet filler to form a mixture in the substantial absence of rubber chemicals at mixer temperatures controlled by at least one temperature-control means. Optionally the process further comprises adding at least one additive selected from antidegradants and coupling agents during the charging or the mixing, i.e., during the one or more mixing steps. Examples of such antidegradants (e.g. antioxidants) and coupling agents are described herein.

In this process option, in at least one of the mixing steps and preferably in one of the mixing steps, the mixer reaches an indicated temperature of 120° C. or higher, e.g., at least 125° C. or higher, at least 130° C. or higher, at least 135° C. or higher, at least 140° C. or higher, at least 145° C. or higher, or at least at least 150° C. or higher. This indicated temperature can be measured by a temperature-measuring device within the mixing cavity. The indicated temperature of the mixer can be the same as or differ by 30 degrees or less, or 20 degrees or less, or 10 degrees or less (or 5 degrees or less or 3 degrees or less or 2 degrees or less) from the maximum temperature of the mixture or the composite achieved during the mixing stage (which can be determined by removing the composite from the mixer and inserting a thermocouple or other temperature measuring device into the composite). In this mixing method, as an option, one or more rubber chemicals can be added to the mixer when the mixer reaches the temperature of 120° C. or higher. In other embodiments, the indicated temperature can range from 120° C. to 190° C., from 125° C. to 190° C., from 130° C. to 190° C., from 135° C. to 190° C., from 140° C. to 190° C., from 145° C. to 190° C., from 150° C. to 190° C., from 120° C. to 180° C., from 125° C. to 180° C., from 130° C. to 180° C., from 135° C. to 180° C., from 140° C. to 180° C., from 145° C. to 180° C., from 150° C. to 180° C., from 120° C. to 170° C., from 125° C. to 170° C., from 130° C. to 170° C., from 135° C. to 170° C., from 140° C. to 170° C., from 145° C. to 170° C., from 150° C. to 170° C., and the like. The one or more rubber chemicals can be added at the indicated temperature of 120° C. or higher; at this point the filler has been distributed and incorporated into the elastomer, and the addition of rubber chemicals is not expected to interfere with the interaction between filler and elastomer.

In this process option, the charging step and the one or more mixing steps prior to the mixer reaching the indicated temperature are carried out in the absence of or substantial absence of the one or more rubber chemicals. As defined herein, "substantial absence" refers to a process wherein the charging step and the one or more mixing steps can be carried out in the presence of the one or more rubber chemicals in an amount less than 10% by weight of the total amount of rubber chemicals ultimately provided in a vulcanizate prepared from the composite, e.g., the cured composite, or the charging step and the one or more mixing steps can be carried out in the presence of the one or more rubber chemicals in an amount less than 5% or less than 1% by weight of the total amount of rubber chemicals ultimately in the composite. As it is optional to include the rubber chemicals in the composite, a suitable measure of determining "substantial absence" of the one or more rubber chemicals is to determine the amount targeted in the vulcanizate prepared from the composite, e.g., after curing the composite. Thus, a nominal amount of the one or more rubber chemicals may be added during said charging or mixing but not an amount sufficient to interfere with filler-elastomer interaction. As a further example of "substantial absence," the charging and mixing can be carried out in the presence of the one or more rubber chemicals in an amount or loading of 5 phr or less, 4 phr or less, 3 phr or less, 2 phr or less, 1 phr or less, or 0.5 phr or less, 0.2 phr or less, 0.1 phr or less, based on the resulting vulcanizate. As an option, the one or more rubber chemicals are absent (0 phr) from the composite discharged in step (d).

The composite, when discharged from the mixer, comprises the filler dispersed in the elastomer at a loading of at least 1 phr, e.g., at least 20 phr, with a filler yield loss of no more than 10%. With this process, the composite when discharged may be in the absence or substantial absence of the one or more rubber chemicals, e.g., with the exception of any antidegradant that may have been present at the start of mixing. Alternatively, the composite when discharged may contain at least one additive selected from antidegradants and coupling agents, which can be added at any time during the charging or mixing. Alternatively, the composite when discharged may contain or may be in the substantial absence of any rubber chemicals, e.g., if one or more antidegradants are not added at the start of the mixing process. Alternatively stated, as an option, the mixture consists essentially of or consists of the solid elastomer and the wet filler. As another option, the mixture consists of or consists essentially of the solid elastomer, the wet filler, and at least one antidegradant. As another option, the mixture consists of or consists essentially of the solid elastomer, the wet filler, at least one antidegradant, and coupling agents.

In any embodiment disclosed herein, as an option, after the mixing of at least the solid elastomer and wet filler has commenced and prior to the discharging step, the method can further include adding at least one antidegradant to the mixer so that the at least one antidegradant is mixed in with the solid elastomer and wet filler. The optional adding of the antidegradant(s) can occur at any time prior to the discharging step. For instance, the adding of the antidegradant(s) can occur prior to the composite being formed and having a liquid content of 10 wt. % or less, or 5 wt. % or less. Examples of an antidegradant that can be introduced is N-(1,3-dimethylbutyl)-N'-phenyl-p-phenylenediamine (6PPD), and others are described in other sections herein. The antidegradant can be introduced in an amount ranging from 0% to 5%, from 0.5% to 5%, from 1% to 5%, from 0% to 3%, from 0.5% to 3%, from 1% to 3%, from 0% to 2%, from 0.5% to 2%, or from 1% to 2% based on the weight of the composite that is formed. Antidegradants added during the charging step or the mixing step may help prevent elastomer degradation during the mixing; however, due to the presence of the liquid in the mixture, the rate of degradation of the elastomer is lower compared to dry mix processes and the addition of antidegradant can be delayed.

At least one additive can be included during the mixing method described herein or can be included after the composite is formed. The at least one additive can include a curative package or at least one curing agent. To create a vulcanizable composite, the curative package added can include a cross-linking agent, and any activators and accelerators. Where sulfur is used as a cross-linking agent, typical activators include zinc oxide and or stearic acid, and typical accelerators include sulfenamides such as N-tert-butyl-2-benzothiazole sulfenamide (TBBS) and N-cyclohexyl-2-benzothiazole sulfenamide (CBS). Other curatives used in rubber processing are peroxides, urethane crosslinkers, metallic oxides, acetoxysilane compounds, phenolic resins and so forth. Additional suitable components for sulfur-based and other cross-linking systems are well known to those of skill in the art.

Other rubber chemicals include anti-oxidants, processing aids, extender oils, wax, a variety of resins, coupling agents, and additional antidegradants. Anti-oxidants include N-(1, 3-dimethylbutyl)-N'-phenyl-p-phenylenediamine (6PPD) and those listed in WO2012/037244 the disclosure of which is incorporated herein by reference.

As an option, rubber chemicals can be combined with the composite in a mechanical mixer. Specifically, additives such as filler (which may be the same as, or different from, the filler used in the mixer; exemplary fillers include silica, carbon black, and/or zinc oxide), other elastomers, other or additional masterbatch, antidegradants (e.g., antioxidants), coupling agents, plasticizers, processing aids (e.g., stearic acid, which can also be used as a curing agent, liquid polymers, oils, waxes, and the like), resins, flame-retardants, extender oils, and/or lubricants, and a mixture of any of them, can be added in a mechanical mixer. Additional elastomers can be combined with the composite to produce elastomer blends. Suitable elastomers include any of the elastomers employed in the mixing process described above. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene, and the like. The antidegradant (an example of a degradation inhibitor) can be an amine type antidegradant, phenol type antidegradant, imidazole type antidegradant, metal salt of carbamate, para-phenylene diamine(s) and/or dihydrotrimethylquinoline(s), polymerized quinine antidegradant, and/or wax and/or other antidegradants used in elastomer formulations. Specific examples include, but are not limited to, N-(1,3-dimethylbutyl)-N'-phenyl-p-phenylenediamine (6-PPD, e.g., ANTIGENE 6C, available from Sumitomo Chemical Co., Ltd. and NOCLAC 6C, available from Ouchi Shinko Chemical Industrial Co., Ltd.), "Ozonon" 6C from Seiko Chemical Co., Ltd., polymerized 1,2-dihydro-2,2,4-trimethyl quinoline (TMQ, e.g., Agerite Resin D, available from R. T. Vanderbilt), 2,6-di-t-butyl-4-methylphenol (available as Vanox PC from Vanderbilt Chemicals LLC), butylhydroxytoluene (BHT), and butylhydroxyanisole (BHA), and the like. Other representative antidegradants may be, for example, diphenyl-p-phenylenediamine and others such as, for example, those disclosed in The Vanderbilt Rubber Handbook (1978), pages 344-346.

Mixers

Particular types of internal mixers are a Banbury mixer or a Brabender mixer, either of which can be used for the methods of forming a composite described herein. The internal mixer can be a tangential internal mixer. The internal mixer can be an intermeshing internal mixer. Other mixers include a kneading type internal mixer. Commercially available internal mixers from Farrel-Pomini, Harburg Freudenberger Maschinenbau GmbH (HF), Kobelco, or Pelmar Eng'r Ltd can be used. Besides the option to use inner circuits of steam or water or other fluid in the rotors, in addition or alternatively, the internal mixer can have cooling or heating jackets at one region or part or more than one region or part of the mixing chamber to control the temperature of the components being mixed therein. This can create one or more heating/cooling zones in a wall or portion of a wall of a mixer. The mixer can be a single stage mixer or a multi-stage mixer (e.g., two stages or more). Examples of mixers and designs that can be utilized are described in European Patent No. 2423253B1 and U.S. Pat. No. 7,556,419, the disclosures of which are incorporated herein by reference.

As another option, the mixer can be a continuous mixer. For example, the solid elastomer and wet filler may be mechanically worked by using one or more of a continuous internal mixer, a twin screw extruder, a single screw extruder, or a roll mill, such as those described in U.S. Pat. No. 9,855,686 B2, the disclosure of which is incorporated herein by reference. Suitable kneading and masticating devices are well known and commercially available, including for example, a Unimix Continuous Mixer and MVX (Mixing, Venting, eXtruding) Machine from Farrel Pomini Corporation of Ansonia, Conn., an FCM™ Farrel Continuous Mixer, a long continuous mixer from Pomini, Inc., a Pomini Continuous Mixer, twin rotor corotating intermeshing extruders, twin rotor counterrotating non-intermeshing extruders, continuous compounding extruders, the biaxial milling extruder produced by Kobe Steel, Ltd., and a Kobe Continuous Mixer. Alternative masticating apparatus suitable for use with one or more embodiments disclosed herein will be familiar to those of skill in the art.

The mixing can be performed with a mixer(s) having at least one rotor and the mixer can be one or more of the following: a kneader, a roll mill, a screw extruder, a twin-screw extruder, a multiple-screw extruder, a continuous compounder, and/or a twin-screw extruder.

The mixing can be performed with a mixer(s) having at least one rotor and the mixer can have two-wing rotors, four-wing rotors, six-wing rotors, eight-wing rotors, and/or one or more screw rotors.

Post-Processing Steps

The composite that is discharged can be subjected to one or more post-processing steps. Post-processing can be performed after any mixing step. For a multi-stage mix, post-processing can be performed after the first stage and/or after the second stage and so on. The composite can be post-processed to provide a composite that is dried, homogenized, extruded, calendared, milled, etc. One or more post-processing steps can shape or form or can allow for improved handling but preferably does not substantially disperse the filler. For example, the one or more post-processing steps can impart at most small amounts of energy, e.g., less than 300 kJ/kg composite, less than 200 kJ/kg composite, less than 100 kJ/kg composite, or less than 50 kJ/kg composite. For example, the one or more post-processing steps does not result in significant temperature rise of the composite (as a result of the low energy input).

As an option, the liquid content of the discharged composite can be 10% by weight or lower (e.g., 5% by weight or lower) when discharged and this liquid content can be further reduced by one or more additional liquid (e.g. water) removal steps, such as the use of a further mixing step(s), a compounding step(s), a dryer, or the application of heat, or other means to remove moisture or liquid from a mixture, so as to achieve the desired liquid content of the composite that is below the liquid content when discharged from the mixer. In general, the post processing steps can comprise compressing the composite to remove from 1 wt. % to about 50 wt., e.g., from % 1 wt. % to about 10 wt. %, of any remaining liquid phase, based on the total weight of the composite.

In any method of producing a composite disclosed herein, the method can further include one or more of the following steps, after formation of the composite:

one or more holding steps;
one or more drying steps can be used to further dry the composite to obtain a dried composite;
one or more extruding steps;
one or more calendaring steps;
one or more milling steps to obtain a milled composite;
one or more granulating steps;
one or more cutting steps;
one or more baling steps to obtain a bailed product or mixture;
the baled mixture or product can be broken apart to form a granulated mixture;
and/or
one or more mixing or compounding steps; and/or
one or more sheeting steps.

The one or more processing steps can be achieved with one or more of an internal mixer, a kneader, a roll mill, a screw extruder, a twin-screw extruder, a multiple-screw extruder, a continuous compounder, and/or a twin screw discharge extruder fitted with a roller die (e.g., twin-screw sheeter) or fitted with stationary knives.

As a further example, the following sequence of steps can occur and each step can be repeated any number of times (with the same or different settings), after formation of the composite:

one or more holding steps to develop further elasticity;
one or more cooling steps;
drying the composite further to obtain a further dried composite;
mixing or compounding the composite to obtain a compounded mixture;
milling the compounded mixture to obtain a milled mixture (e.g., roll milling);
granulating the milled mixture;
optionally baling the mixture after the granulating to obtain a baled mixture;
optionally breaking apart the baled mixture and mixing.

As an option, the composite can be further processed on an open mill. The composite can be discharged from a continuous compounder or extruder as a length of extrudate and may be cut into smaller lengths prior to entering the open mill. The composite may optionally be fed to the open mill via a conveyor. The conveyor may be a conveyor belt, conduit, pipe, or other suitable means for transporting the composite from a continuous compounder to an open mill. The open mill can include a pair of rollers that may optionally be heated or cooled to provide enhanced operation of the open mill. Other operating parameters of the open mill can include the gap distance between the rolls, the bank height, i.e., the reservoir of material in the gap between and on top of the rolls, and the speed of each roll. The speed of each roll and the temperature of the fluid used to cool each roll may be controlled independently for each roll. The gap distance may be from about 3 mm to about 10 mm or from about 6 mm to about 8 mm. The roll speed may be about 15 rpm to about 70 rpm, and the rollers may roll towards one another with respect to the inlet side of the mill. The friction ratio, the ratio of the speed of the collection roller, e.g., the roller on which the masticated product collects, to that of the back roller, may be from about 0.9 to about 1.1. The fluid employed to cool the rollers may be from about 35° C. to about 90° C., for example, from about 45° C. to about 60° C., from about 55° C. to about 75° C., or from about 70° C. to about 80° C. In addition to controlling the operation of the open mill to provide a desired level of mastication and desiccation to the masticated product, it is also desirable that the output of the open mill should collect on the collection roller as a smooth sheet. The residence time of the composite in the mill can be determined in part by the roller speed, the gap distance and the amount of mastication and drying desired and may be about 10 minutes to about 20 minutes for material that has already been masticated, for example, in a twin-rotor continuous mixer.

One skilled in the art will recognize that different combinations of devices may be employed. Depending on which devices are used, it may be desirable to operate them under different conditions than those described above to impart varying amounts of work and/or further desiccation to the material. In addition, it may be desirable to employ more than one particular kind of device, e.g., an open mill or internal mixer, in series or to pass masticated product through a given device more than one time. For example, the composite may be passed through an open mill two or three or more times or passed through two or three or more open mills in series. In the latter case, it may be desirable to operate each open mill under different operating conditions, e.g., speed, temperature, different (e.g. higher) energy input, etc. The composite can be passed through one, two, or three open mills after being mixed in an internal mixer.

Compounding

In addition, or alternatively, the composite can be compounded with one or more of antidegradants, rubber chemicals, and/or curing agents, and vulcanized to form a vulcanizate. Such vulcanized compounds can have one or more improved properties, such as one or more improved rubber properties, such as, but not limited to, an improved hysteresis, wear resistance and/or rolling resistance, e.g., in tires, or improved mechanical and/or tensile strength, or an improved tan delta and/or an improved tensile stress ratio, and the like.

As an example, in a compounding step (which also can be the initial mixing step), the ingredients of the curative package, with the exception of the sulfur or other cross-linking agent and accelerator, are combined with the neat composite in a mixing apparatus (the non-curatives, e.g., rubber chemicals and/or antidegradants, are often pre-mixed and collectively termed "smalls"). The most common mixing apparatus is the internal mixer, e.g., the Banbury or Brabender mixer, but other mixers, such as continuous mixers (e.g., extruders), may also be employed. Thereafter, in the compounding step, the cross-linking agent, e.g., sulfur, and accelerator (if necessary) (collectively termed curatives) are added. The compounding step is frequently performed in the same type of apparatus as the mixing step but may be performed on a different type of mixer or extruder or on a roll mill. One of skill in the art will recognize that, once the curatives have been added, vulcanization will commence once the proper activation conditions for the cross-linking agent are achieved. Thus, where sulfur is used, the temperature during mixing is preferably maintained substantially below the cure temperature.

As one option, any of the methods disclosed herein of preparing the composite can involve adding any rubber chemicals in the later stages of the process of forming the composite or avoiding adding rubber chemicals at any point in the process of forming the composite. With regard to the latter option, the rubber chemicals can be added to the composite during the compounding stage. For instance, the rubber chemicals can be added after the temperature of the composite reaches 120° C. or higher, e.g., 130° C. or higher, or 140° C. or higher. Alternatively, the rubber chemicals can be added in one or more compounding steps or the added after the composite is dumped from the initial mixing step(s) that form the composite. With respect to this option, adding rubber chemicals too early in the initial mixing step(s) can potentially interfere with lesser degree of contact between the rubber and filler and can lead in turn to overall poor filler dispersion in the composite and/or less rubber-filler interaction. For instance, in some scenarios, adding the rubber chemicals too early in the mixing process can lead vulcanizates exhibiting lower tensile properties, e.g., a lower tensile stress ratio (M300/M100), and poor filler dispersions compared to when adding the rubber chemicals after the temperature of the composite reaches 120° C. or higher (e.g., 130° C. or higher or 140° C. or higher), or adding the rubber chemicals during the one or more compounding steps. In certain instances, such undesirable effects of rubber chemicals if added too early can be seen when the elastomer is, e.g., natural rubber or the elastomer comprises natural rubber.

Composites and Vulcanizates

Traditionally, one can increase reinforcement (e.g., stiffness) in an elastomer composite by increasing loading, surface area, structure of the filler material. The final mechanical properties of the composite can also be determined by how the particles are dispersed and arranged in the composite. In tests conducted for the composites prepared by the present processes, and the ensuing vulcanizates, it has been discovered that certain dispersion states achieved desirable mechanical properties of the resulting vulcanizates.

The extent of filler distribution and dispersion in the elastomer network ("dispersion state" or "state of dispersion" or macrodispersion) for both composites and vulcanizates can be examined via optical microscopy in transmission mode of microtomed sections of the composite (e.g., 2 μm or less, e.g., 0.5 μm to 2 μm, 0.5 μm to 1.5 μm, about 1 μm thickness). Optical images (in transmission mode) of the microtomed sections typically show a light background populated by dark objects, each object the result of a collection of carbon black agglomerates. As the image is viewed in two-dimensional space, each dark object covers an area that can be likened to a type of "particle." (With regards to macrodispersion, the term "particle" is intended to represent an area coverage of carbon black agglomerates and is differentiated from "primary particles" that form a single carbon black aggregate. The aggregate has dimensions on the order of 0.1 μm scale, which is below the resolution of optical microscopy.) This particle "diameter" is defined herein as an "area-equivalent diameter" of the filler and is typically in the micron size range. Accordingly, the dispersion state can be indicated by a form of particle size distributions, whether by area coverage of the particles, or number of particles per unit area having a certain size.

For composites, the state of filler distribution and dispersion in the elastomer can also be evaluated at the micron and sub-micron level ("microdispersion") and can be evidenced by rheological properties, such as those measured by a rubber process analyzer (RPA).

RPA is a tool for analyzing rheological properties of elastomeric materials, such as the composites described herein, by subjecting the material to strain sweeps. A strain sweep test applies a series of strain amplitudes to the material, and a behavior known as the "Payne effect" can be observed, considered to be a measure of microdispersion. One way of evaluating such an effect is to measure the dynamic storage modulus, G', at low strain and at high strain, the ratio of which is defined as "Payne ratio". Payne effect can also be influenced by rubber chemical addition and rubber molecular weight.

Composites prepared from the present processes can be compared to composites prepared from dry mixing methods (dry filler and dry elastomer). By doing so, distinct rheological behaviors can be identified. At similar levels of reinforcement, determined by the measured G' at 50% strain amplitude or G'(50%), compared to dry mixing methods or comparative wet mix processes (e.g., comparative processes of combining wet filler with solid elastomer), any of the methods disclosed herein can achieve a composite having a lower Payne effect. A lower Payne effect is known to indicate desirable properties in the end product, such as rolling resistance of tires. Meanwhile, at a similar level of Payne effect, any of the methods disclosed herein can provide composites with higher reinforcement, G'(50%), than those achieved by dry mixing methods or comparative wet mix processes in which wet filler and solid elastomer are combined.

It has been discovered that with composites prepared by the present processes, the following relationship or equation can be achieved:

$$\text{Payne Ratio} \leq 0.1 * G'@50\% - y$$

wherein Payne Ratio is G'(0.1%)/G'(200%), G'(0.1%) is a dynamic storage modulus measured at 0.1% strain amplitude, G'(200%) is a dynamic storage modulus measured at 200% strain amplitude, G'(50%) is a dynamic storage modulus measured at 50% strain amplitude, the dynamic storage modulus is measured at 100° C. at a frequency of 1 Hz, and y is a number ranging from 7 to 10.

This relationship is not achieved by composites made by dry mixing methods or comparative wet mixing processes.

Further, composite macrodispersion can be evaluated with optical microscopy of microtomed sections, as discussed above. Macrodispersion indicators such as particle size distributions, area weighted, and % of area of filler particles that are larger than 2 μm can be obtained. With any of the methods disclosed herein, composites can be made so that there are low numbers of large particles relative to the total area, which characterizes the distribution of filler, such as carbon black, in an elastomer. As an option, dispersion state can be indicated by a "$d_{90}$" particle sizes in the distribution. As an option, the dispersion state can be measured by "% area contribution from particles >2 μm." Area contribution from particles can be reported for an imaging area. Total imaging area (μm$^2$) of an image can be determined from the number of pixels and the image resolution. An image can have dimensions of width and height, each reported in number of pixels, and the corresponding area can be reported as (pixels)$^2$. For an area, resolution can be reported as (μm/pixel)$^2$. The imaging area is the product of:

(area)*(resolution).

In certain embodiments, the filler has a state of dispersion in the elastomer according to the following equation:

$$A \leq 1.25 * B + x$$

wherein:

A is $d_{90}$ of the area-equivalent diameter (μm) of filler particles in the composite, and t,?

wherein B≥1%,

A and B are determined by optical microscopy in transmission mode of microtomed sections, and x is a number ranging from 15 to 20.

Alternatively stated, 90% of the undispersed particles in the composites made by the present processes ($d_{90}$) can have an area equivalent diameter less than 1.25B+x. By this relationship, the present composites can have a dispersion state characterized by a low number of large particles relative to composites prepared by dry mix and comparative wet mix methods.

Certain embodiments provide composites having (A) better microdispersion properties than composites made by prior methods of combining dry filler and solid elastomer, and (b) distinctly different macrodispersion properties from liquid masterbatches and comparative wet mixing processes (combining wet filler and solid elastomer elastomer). Alternatively stated, the combination of microdispersion and macrodispersion properties or signatures of at least some of the composites disclosed herein were unique and not seen with prior composites.

Various composites can be made from one or more methods disclosed herein. For instance, certain composites disclosed herein comprises elastomer, which can include or comprise at least 50% (by weight) natural rubber. Further, the composite includes filler dispersed in the natural rubber (or dispersed in the elastomer). The filler can comprise or include carbon black.

Accordingly, disclosed herein are composites having the following properties:

(a) the filler is dispersed in the natural rubber according to equation (1):

$$A \leq 1.25 \cdot B + x \qquad (1)$$

wherein:
A is $d_{90}$ of the area-equivalent diameter (μm) of filler particles in the composite, and t,?
wherein B≥1%,
A and B are determined by optical microscopy of microtomed sections, and
x=15-20; and
(b) the composite has a property according to equation (2):

$$G'(0.1\%)/G'(200\%) \leq 0.1 \cdot G'(50\%) - y \quad (2)$$

wherein G'(0.1%) is a dynamic storage modulus measured at 0.1% strain amplitude, G'(200%) is a dynamic storage modulus measured at 200% strain amplitude, G'(50%) is a dynamic storage modulus measured at 50% strain amplitude, the dynamic storage modulus is measured at 100° C. at a frequency of 1 Hz, and y=7 to 10.

The carbon black can be a carbon black as described earlier herein.

The variables x and y in the above equations can be integers or decimals (e.g., x can be 15, 16, 17, 18, 19 or 20, or 15.1, 15.2, 15.3, and so on for x, and/or y can be 7, 8, 9, or 10 or 7.1, 7.2, 7.3 and so on for y).

As an option, the carbon black present in the composite can have an STSA of at least 60 m²/g, such as an STSA ranging from 60 m²/g to 210 m2/g or 70 m²/g to 210 m²/g, or 80 m²/g to 210 m²/g, or 90 m²/g to 210 m²/g, or 100 m²/g to 210 m²/g, and the like.

As an option, the carbon black present in the composite can have a COAN of at least 75 mL/100 g, such as from 75 mL/100 g to 150 mL/100 g, 85 mL/100 g to 150 mL/100 g, 95 mL/100 g to 150 mL/100 g or 105 mL/100 g to 150 mL/100 g.

As an option, the composite can have a carbon black loading of 60 phr or less, such as 50 phr or less, or 40 phr or less, or 30 phr or less, or 20 phr or less, or from 1 phr to 60 phr or from 5 phr to 60 phr, or from 10 phr to 60 phr.

As an option, the carbon black present in the composite can have a ratio of BET/STSA ranging from 1 to 1.2, such as a BET/STSA ratio 1 to 1.15, from 1 to 1.1, or from 1 to 1.05.

As an option, with respect to total filler amount in the composite, the carbon black can comprise an amount of at least 50% by weight relative to the total weight of the filler, such as at least 60%, at least 70%, at least 80%, at least 90%, at least 99%, or 100% by weight, for instance from 50% to 100% or 60% to 95% by weight relative to the total weight of the filler. The carbon black can be the only filler or can be the predominant filler by weight.

As an option, while the majority of the filler is carbon black, the composite can have silica present if the filler comprised a blend of carbon black and silica, e.g., a blend of 90 wt % or more of carbon black and 10% or less of silica.

As an option, the elastomer comprises at least 50% by weight of natural rubber relative to the total weight of the elastomer. This amount can be at least 75 wt. %, at least 90 wt. %, at least 95 wt. % or 100 wt. % natural rubber. This option can be combined with the carbon black comprising an amount of at least 50% by weight relative to the total weight of the filler.

Also disclosed herein are vulcanizates prepared from composites disclosed herein. The vulcanizate can comprise or include a filler (as described herein) dispersed in an elastomer that is or includes natural rubber, e.g., a blend of natural rubber and polybutadiene rubber and/or styrene-butadiene rubber. The filler can comprise or include or be carbon black. The carbon black can be a carbon black as described earlier herein.

In vulcanized rubber composites comprising carbon black, electrical resistivity measurements can be used to characterize the state of microdispersion. Electrical resistivity depends on, among other factors, the loading of carbon black and its specific surface area and structure. To apply electrical resistivity as a characteristic of carbon black microdispersion, it is normalized through the parameter δ, which takes into account the carbon black loading, particle size, and structure. This parameter represents a theoretical average spacing between aggregates in a filled rubber system, assuming monodisperse particle size and perfectly random dispersion of particles (M-J. Wang, S. Wolff and E. H. Tan in Rubber Chemistry and Technology, 1993, Vol. 66, p 178).

For vulcanizates, macrodispersion is defined by the parameter v, i.e., the number of particles/mm² having an area-equivalent diameter of at least 4 m as determined by optical microscopy of microtomed sections. As discussed previously, each "particle" is defined by an area coverage of a dark object as viewed in the optical image. In vulcanized material, the area measurement can be distorted by a small number of very large non-carbon black entities, e.g., other compounding ingredients such as ZnO and the like. Thus, the approach here is to use the number of particles (and remove the contribution from single large particles) rather than an area to define total undispersed area, as it is considered more representative of the property attributes for the vulcanized material.

Certain embodiments provide vulcanizates that can have at least carbon black present as the filler, and the carbon black can have an STSA of at least 60 m²/g and a BET/STSA ratio ranging from 1 to 1.2; and the vulcanizate has resistivity and dispersion properties satisfying equation (3):

$$[\ln(R) - 3.8]/[0.28 \cdot \delta] \geq 0.0004 \cdot v + 0.9 \quad (3)$$

wherein:
R is resistivity in ohm·cm;
$\delta = (6000 \cdot [0.806 \cdot \phi - \tfrac{1}{3}\beta - \tfrac{1}{3} - 1]/\rho S) \times \beta 1.43$
wherein:
φ=volume fraction of carbon black in the composite,
S=BET surface area of the carbon black in m²/g,
ρ=carbon black density, assumed to be 1.8 g/cm³,
β=φeff/φ,
φeff is the effective volume fraction of carbon black taking into account occluded rubber calculated from: φeff=φ[1+(0.0181*COAN)]/1.59, wherein COAN is the compressed oil absorption number of the carbon black as determined by ASTM D3493; and
v≥65, wherein v is a number of particles/mm² having an area-equivalent diameter of at least 4 μm as determined by optical microscopy of microtomed sections.

With respect to this vulcanizate, the carbon black can have an STSA ranging from 60 m²/g to 210 m²/g, or from 60 m²/g to 190 m²/g.

With respect to this vulcanizate, the carbon black can have a COAN of at least 75 mL/100 g.

With respect to this vulcanizate, the vulcanizate can have a carbon black loading of 60 phr or less.

With respect to this vulcanizate, the filler can include or comprise carbon black in an amount of at least 50% by weight relative to the total weight of the filler, or at least 90% by weight relative to the total weight of the filler, or at least 99% by weight relative to the total weight of the filler. The filler can be only carbon black or can be the predominate filler by weight that is present.

With respect to this vulcanizate, the filler can also include silica.

With respect to this vulcanizate, the vulcanizate can have one or more elastomeric properties. For instance, the vulcanizate can have a tensile stress ratio M300/M100 of at least 5.9, e, g., at least 6.0, at least 6.1, at least 6.2, as evaluated by ASTM D412, wherein M100 and M300 refer to the tensile stress at 100% and 300% elongation, respectively.

Alternatively or in addition, the vulcanizate can have a maximum tan δ (60° C.) of no greater than 0.22, e.g., no greater than 0.21, no greater than 0.2, no greater than 0.19, no greater than 0.18.

Also disclosed herein are methods of making a vulcanizate. The method can include the steps of at least curing a composite in the presence of at least one curing agent. Curing can be accomplished by applying heat, pressure, or both, as known in the art.

In general, it has been found that the resistivity properties of vulcanizates comprising at least 50% carbon black (e.g., at least 75% carbon black, or at least 90% carbon black) made by the present composites are higher than those comparative vulcanizates made by dry mix processes for a given filler, loading (e.g., ±5 wt %, ±2 wt. %), elastomer type, and compound formulation (dry-mixed equivalent). Such resistivity properties can be expressed as a resistivity index, $\ln(R)_{index}$, which is a ratio of the ln(R) value of vulcanizates prepared from the composites disclosed herein, compared to the ln(R) value of the dry-mixed equivalent.

An index value greater than 100 indicates that the present vulcanizates have higher electrical resistivity than the dry-mixed equivalent of similar composition. For example, the present vulcanizate has a resistivity index that is at least 105, at least 110, or at least 120, indicating a ln(R) greater by at least 5%, at least 10%, and at least 20% over the dry-mixed equivalent. Alternatively, the present vulcanizate has a resistivity index ranging from 105 to 170, from 110 to 170, from 120 to 170, or from 130 to 170.

Another useful metric is Payne difference, which can be calculated from the difference of dynamic storage modulus (G') at 0.1% strain and G' at 200% strain, i.e., G'(0.1%)–G'(200%).

The Payne difference of the present composites can be normalized to the Payne difference of the corresponding composite made by dry mix processes. The result is termed a Payne Difference Index (Payne Diff Index). An index value greater than 100 indicates that the composite has a lower Payne difference value than the corresponding composite of a dry-mixed equivalent, e.g., same filler type (e.g., carbon black, silica, etc.), filler loading (e.g., ±5 wt %, ±2 wt. %), elastomer type, and compound formulation. Payne Difference is a measure of the state of the filler network in the elastomer. A lower Payne difference index indicates a more well distributed, less connected network of filler particles. Such an improved distribution is generally believed to be advantageous to lower dynamic losses in the resulting rubber (e.g. tan delta).

For example, the present composites in which the filler comprises at least 50% silica by weight relative to the total weight of the filler (e.g., the filler is at least 50 wt. % silica, at least 75 wt. % silica, or at least 90 wt. % silica) can exhibit improved rheological properties compared to composites made by its dry-mixed equivalent. Accordingly, disclosed herein are composites, such as those prepared by the present methods, having a Payne difference index of at least 105, at least 110, at least 120, at least 130, at least 140, or at least 150. For example, a Payne difference index of at least 140 or at least 150 represents a 40% lower or a 50% lower Payne difference value compared to the corresponding composites prepared by the dry-mixed equivalent (filler type, loading, elastomer type, and compound formulation). As another option, the present composites have a Payne Difference Index ranging from 105 to 180, from 110 to 160, from 120 to 160, or from 130 to 160.

Payne difference can be also be a metric for composites comprising carbon black and natural rubber as prepared by the methods disclosed herein. For example, the following relationship has been found:

$$\text{Payne Difference} \leq 13.5 * G'(50\%) - s$$

wherein Payne Difference is G'(0.1%)–G'(200%), G'(0.1%) is a dynamic storage modulus measured at 0.1% strain amplitude, G'(200%) is a dynamic storage modulus measured at 200% strain amplitude, G'(50%) is a dynamic storage modulus measured at 50% strain amplitude, the dynamic storage modulus is measured at 100° C. at a frequency of 1 Hz, and "s" is a number ranging from 1950 to 2100.

This relationship indicates an improvement in Payne Difference over the comparative wet mixing and dry mixing processes and can in turn contribute to improved hysteresis behavior in vulcanizates made from such composites.

The vulcanizates prepared from the present composites (e.g., those made by any of the presently disclosed processes between wet filler and solid elastomer under the disclosed mixing conditions of $T_z$, fill factor, tip speed, continuous, selective order of addition of rubber chemicals, whether single stage or multi-stage) can show improved properties. For example, vulcanizates prepared from the present composites can have improved properties over a vulcanizate prepared from a composite made by dry mixing solid elastomer and non-wetted filler ("dry mix composite"), particularly those dry mix composites having the same composition ("dry mix equivalent"). Thus, the comparison is made between dry mixes and the present mixing processes between comparable fillers, elastomers, filler loading (e.g., ±5 wt %, ±2 wt. %), and compound formulation, and optionally curing additives. Under these conditions, the vulcanizate has a tan δ value that is less than a tan δ value of a vulcanizate prepared from a dry mix composite having the same composition. In addition to or in the alternative, the vulcanizate has a tensile stress ratio, M300/M100, that is greater than a tensile stress ratio of a vulcanizate prepared from a dry mix composite having the same composition, wherein M100 and M300 refer to the tensile stress at 100% and 300% elongation, respectively.

In certain embodiments, a vulcanizate prepared from a composite made by a multi-mixing step or multi-stage process, has improved properties over a vulcanizate prepared from a composite made by a single mixing step or single stage process. As stated above, vulcanizates made by the present composites via a single mixing step having a liquid content of 10% or less, or 5% or less, or other low levels of liquid as disclosed herein, have improved properties over dry mix composites. In certain instances, these properties can be further improved with one or more additional mixing steps or stages. For example, the vulcanizate prepared by a multi-stage (e.g., two-stage) or multi-step (e.g. two mixing steps) process has a tan δ value that is less than a tan δ value of a vulcanizate prepared from a composite made by a single stage or single step process, e.g., the mixture discharged in step (c) as disclosed herein. In another example, the vulcanizate prepared by a multi-stage (e.g., two-stage) or multi-step (e.g. two mixing steps) has a tensile stress ratio, M300/M100, that is greater than a tensile stress ratio of a vulcanizate prepared from the mixture discharged in step (c), wherein M100 and M300 refer to the tensile stress at 100% and 300% elongation, respectively. Where the filler is silica, in certain instances, the Payne difference index is lower for a composite prepared by the multi-stage (e.g., two-stage) or multi-step (e.g. two mixing steps) process compared to a composite prepared by a single stage or single-step process.

While any filler or combination of fillers is possible in any of the methods disclosed herein, certain beneficial properties (or rubber properties) can be achieved when the filler is or includes carbon black (e.g., a reinforcing carbon black) or silicon-treated carbon black, e.g., when the carbon black was the sole filler present or was the predominant filler used (e.g., more than 50% by weight of all filler used was carbon black, such as more than 60 wt. %, more than 70 wt. %, more than 80 wt. %, or more than 90 wt. %). For example, promising property improvements can be obtained for tan delta (e.g. tan delta 60° C.) and/or tensile stress at 300% and 100% elongation, respectively (M300 and/or M100), and/or tensile stress ratio (M300/M100).

Certain combinations of filler and elastomer can also be effective in achieving property improvements. For instance, the filler can be or can comprise carbon black and the elastomer can be or can comprise natural rubber. As an example, the carbon black can be dispersed in the natural rubber at a loading ranging from 40 phr to 65 phr or other loading amounts as described herein. The carbon black can have an STSA ranging from 60 $m^2/g$ to 170 $m^2/g$ and/or a COAN ranging from 70 mL/100 g to 115 mL/100 g. The filler can further include silica.

Another example of a specific combination of filler and elastomer is where the filler is or comprises silica and the elastomer is or comprises natural rubber or the elastomer is or comprises styrene-butadiene rubber. The styrene-butadiene rubber can be or comprise oil-extended styrene-butadiene rubber. The silica can be dispersed in the natural rubber or styrene-butadiene rubber at a loading ranging from 40 phr to 75 phr or other loading amounts as described herein. The silica can have a BET surface area ranging from 80 $m^2/g$ to 250 $m^2/g$.

Another example of a specific combination of filler and elastomer is where the filler is or comprises silicon-treated carbon black and the elastomer is or comprises natural rubber. As an example, the silicon-treated carbon black can be dispersed in the natural rubber at a loading ranging from 40 phr to 65 phr or other loading amounts as described herein. The silicon-treated carbon black can have an STSA ranging from 60 $m^2/g$ to 170 $m^2/g$, e.g., from 60 $m^2/g$ to 150 $m^2/g$ and/or a COAN ranging from 70 mL/100 g to 130 mL/100 g, e.g., 70 mL/100 g to 125 mL/100 g, from 70 mL/100 g to 120 mL/100 g, or from 70 mL/100 g to 115 mL/100 g.

Also disclosed herein are articles made from or containing the composite or vulcanizates disclosed herein.

The composite may be used to produce an elastomer or rubber containing product. As an option, the elastomer composite may be used in or produced for use, e.g., to form a vulcanizate to be incorporated in various parts of a tire, for example, tire treads, including cap and base, undertread, innerliners, tire sidewalls, tire carcasses, tire sidewall inserts, wire-skim for tires, and cushion gum for retread tires, in pneumatic tires as well as non-pneumatic or solid tires. Alternatively or in addition, elastomer composite (and subsequently vulcanizate) may be used for hoses, seals, gaskets, weather stripping, windshield wipers, automotive components, liners, pads, housings, wheel and track elements, tire sidewall inserts, wire-skim for tires, and cushion gum for retread tires, in pneumatic tires as well as non-pneumatic or solid tires. Alternatively or in addition, elastomer composite (and subsequently vulcanizate) may be used for hoses, seals, gaskets, anti-vibration articles, tracks, track pads for track-propelled equipment such as bulldozers, etc., engine mounts, earthquake stabilizers, mining equipment such as screens, mining equipment linings, conveyor belts, chute liners, slurry pump liners, mud pump components such as impellers, valve seats, valve bodies, piston hubs, piston rods, plungers, impellers for various applications such as mixing slurries and slurry pump impellers, grinding mill liners, cyclones and hydrocyclones, expansion joints, marine equipment such as linings for pumps (e.g., dredge pumps and outboard motor pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other applications where abrasion resistance and/or enhanced dynamic properties are desired. Further the elastomer composite, via the vulcanized elastomer composite, may be used in rollers, cams, shafts, pipes, bushings for vehicles, or other applications where abrasion resistance and/or enhanced dynamic properties are desired.

Accordingly, articles include vehicle tire treads including cap and base, sidewalls, undertreads, innerliners, wire skim components, tire carcasses, engine mounts, bushings, conveyor belt, anti-vibration devices, weather stripping, windshield wipers, automotive components, seals, gaskets, hoses, liners, pads, housings, and wheel or track elements.

With respect to the present disclosure, any 'option' or 'optional feature' is combinable with other optional features. The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The entire contents of all cited references in this disclosure, to the extent that they are not inconsistent with the present disclosure, are incorporated herein by reference.

The present invention can include any combination of the various features or embodiments described above and/or in the claims below as set forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

EXAMPLES

The Examples describe the preparation of elastomer composite and corresponding vulcanizates from various elastomers and fillers.

All mixing and compounding were performed with one of the following mixers: BR-1600 Banbury® mixer ("BR1600"; Manufacturer: Farrel), a BB2 tangential mixer ("BB2", Kobelco Kobe Steel Group), a BB-16 tangential mixer ("BB-16"; Kobelco Kobe Steel Group), a BB-72 tangential mixer ("BB-72"; Kobelco Kobe Steel Group), and a FCM™-6 Farrel Continuous Mixer equipped with #7 and #15 rotors ("FCM"; Farrel-Pomini). The BR1600 mixer was operated with two 2-wing, tangential rotors (2WL), providing a capacity of 1.6 L. The BB2 mixer was operated with two 4-wing, tangential rotors, providing a capacity of 1.5 L. The BB-16 mixers were operated with two tangential rotors selected from the following types: 6WI 6-wing, ("6W"), 4WH 4-wing ("4WH"), 4WN 4-wing ("4WN"), and 2-wing 2S ("2W"). These rotors provide the following mixer capacities, respectively: 14.4 L, 16.0 L, 16.2 L, and 17.7 L. The BB-72 mixer was operated with two 4WN rotors, providing a mixer capacity of 66.2 L. For batch mixers ram pressure is defined as the pressure of the fluid powering the ram piston.

Water content in the discharged composite was measured using a moisture balance (Model: HE53, Manufacturer: Mettler Toledo NA, Ohio). The composite was sliced into small pieces (size: length, width, height <5 mm) and 2 to 2.5 g of material was placed on a disposable aluminum disc/plate which was placed inside the moisture balance. Weight loss was recorded for 30 mins at 125° C. At the end of 30 mins, moisture content for the composite was recorded as:

$$\text{moisture content of composite} = \left(\frac{\text{initial weight} - \text{final weight}}{\text{initial weight}}\right) * 100.$$

Small amounts of organic volatile content (<0.1 wt %) may be included in the moisture test values.

The carbon black loading in the composite was determined by Thermogravimetric Analysis (Model Q500 unit, Manufacturer: TA Instruments, DE). About 15-20 mg of rubber samples were used. Samples were first heated up under nitrogen atmosphere from room temperature to 125° C. at 30° C./min and isothermal for 30 min to remove moisture, then heated up to 550° C. at 30° C./min and isothermal for 5 min to determine the organic content, which is primarily the rubber content. After that the atmosphere was switched to air, samples were then heated up to 800° C. at 30° C./min and isothermal for 15 min to determine CB content and other inorganic residues. The CB loadings were then calculated based on the rubber and CB content data. For samples with silica or silicon-treated carbon black, the other inorganic residues were attributed to that component as well as zinc oxide and calculated based on the formulation.

The time average release rate of water for a particular mixing step was calculated from the amount of water lost per kg of composite per unit time. Specifically, time average release rate was calculated as follows:

Time average release rate(kg/kg·min)=Total water removed/(release time×composite weight)

wherein:
composite weight is determined on a dry weight basis;
total water removed (kg)=water in wet filler–water content in discharged composite;
release time=ram down time (min)–rubber-only mastication time (min).
Unless noted otherwise, the rubber-only mastication time was 0.5 min.

The Energy efficiency of applying an energy ($E_R$) to the rotors was calculated as follows:

Energy Efficiency=Heat Duty/$E_R$×100%, wherein:
Heat Duty (kJ/kg) is the energy (kJ) required to remove the water from 1 kg (dry basis) of composite at 100% efficiency
Heat duty is the (Heat of vaporization)+(Sensible Heat)
Heat of vaporization=Liquid Removed (kg)*Latent Heat of Vaporization of water (2260 kJ/kg)
Sensible Heat=Water Removed (kg)*Specific Heat capacity of water (4.1855 kJ/kg/K)*(100–ambient temperature ° C.)
The amount of water removed (kg)=total water added to the mixer (kg)–water content of the discharged composite (kg).

Typically, the amount of water content at the time of charging can be determined from the amount of water in the wet filler.

Specific energy (SE) is the energy applied to the rotor(s) between the charge of solid elastomer and/or wet filler and the discharge per kg of composite on a dry weight basis. Specific energy is the value over the mix time (ram down time for single stage and first stage batch mixes).

The following tests were used to obtain performance data on each of the vulcanizates:

Tensile stress at 100% elongation (M100) and tensile stress at 300% elongation (M300) were evaluated by ASTM D412 (Test Method A, Die C) at 23° C., 50% relative humidity and at crosshead speed of 500 mm/min. Extensometers were used to measure tensile strain. The ratio of M300/M100 is referred to as tensile stress ratio (or modulus ratio).

Max tan δ was measured with an ARES-G2 rheometer (Manufacturer: TA Instruments) using 8 mm diameter parallel plate geometry in torsional mode. The vulcanizate specimen diameter size was 8 mm diameter and about 2 mm in thickness. The rheometer was operated at a constant temperature of 60° C. and at constant frequency of 10 Hz. Strain sweeps were run from 0.1-68% strain amplitude. Measurements were taken at ten points per decade and the maximum measured tan δ ("max tan δ") was reported, also referred to as "tan δ" unless specified otherwise.

Example I: Natural Rubber/Carbon Black (1.6 L Capacity)

This section describes the preparation of composites and corresponding vulcanizates comprising natural rubber (NR) and carbon black. Properties of the carbon black fillers are shown in Table 1 below. ASTM grade N134, provided as VULCAN® 10HD carbon black ("V10HD"), ASTM grade N234, provided as VULCAN® 7H carbon black ("V7H"), ASTM grade N330, provided as VULCAN® 3 carbon black ("V3"), Propel® X25 carbon black ("X25"), Propel® X39 carbon black ("X39"), Propel® X22 carbon black ("X22"), ASTM grade N772, provided as Regal® SRF carbon black ("SRF"), ASTM grade N550, provided as Spheron® SOA carbon black ("SOA"), and ASTM grade N375, provided as Vulcan® J carbon black ("VJ"), all obtained from Cabot Corporation.

TABLE 1

| Carbon black | COAN (mL/100 g) | OAN (mL/100 g) | STSA (m$^2$/g) |
|---|---|---|---|
| V10HD | 101 | 126 | 129 |
| V7H | 102 | 124 | 112 |
| V3 | 88 | 102 | 76 |
| X25 | 103 | 133 | 155 |
| X22 | 102 | 121 | 173 |
| X39 | 105 | 134 | 207 |
| SRF | 60 | 65 | 31 |
| SOA | 85 | 121 | 39 |
| VJ | 96 | 114 | 67 |

This Example describes the claimed mixing processes and comparative mixing processes. Three types of comparative mixing processes were prepared:

1. Dry mix: prepared by mixing dry (non-wetted) carbon black with solid natural rubber (samples Dry 1 to Dry 19).
2. Wet Mix Comparative: carbon black having moisture contents ranging from 10% to 50% were prepared by spraying or adding water onto carbon black pellets in a container, followed by mixing this carbon black with solid natural rubber (SMR20) and rubber chemicals (see Formulation 2 of Table 5 below) at a TCU temperature ($T_z$) of 60° C. (samples Comp 1 to Comp 10.
3. Liquid Masterbatch ("LMB"): prepared by mixing a carbon black slurry with a natural rubber latex. Table 2 lists the fillers and loadings used.

TABLE 2

| Sample | CB | phr |
|---|---|---|
| LMB 1 | X25 | 41 |
| LMB 2 | V7H | 43 |
| LMB 3 | V7H | 50 |

Preparation of the liquid masterbatch samples were based on the methods disclosed in U.S. Pat. No. 8,586,651, example 2, except for the following: The latex elastomer (diluted and desludged MVL Field Latex) had a dry rubber content of 28% and the filler slurry contained 13-14 wt % carbon black. Flow rates were adjusted to yield the target, final carbon black loadings listed in Table 2 at the desired production rate. The dewatered composite was masticated, mixed with 2 phr antioxidant (6PPD) and dried in the FCM™ 6, and further masticated, cooled and dried on an open mill.

For the composites prepared according to the claimed invention, i.e., (Examples Ex. 1 to Ex. 28), wet carbon black was obtained either by mixing fluffy carbon black from a normal CB manufacturing process with water in a pin pelletizer at 60° C. (never-dried carbon black), or by rewetting dried carbon black in a pelletizer (rewetted carbon black). Both methods provided pellets having water concentrations in filler ranging from 50% to 60%. For rewetted carbon black, carbon black samples were first milled with an 8" model MicroJet mill to generate fluffy carbon black particles having a 99.5% particle size diameter less than 10 microns. This fluffy carbon black was then wetted with the pin pelletizer to regenerate the wetted pellets.

All mixing and compounding were performed with the BR1600 mixer with a ram pressure of 2.8 bar. Rubbers used were standard grade RSS1 and SMR20 natural rubber (Hokson Rubber, Malaysia). Technical descriptions of these natural rubbers are widely available, such as in Rubber World Magazine's Blue Book published by Lippincott and Peto, Inc. (Akron, Ohio, USA).

The mixing protocols for preparing the composites are outlined in Table 3. For all mixes, the total mastication time was 30 s. The time intervals listed in the mixing methods below refer to the time period from the start of the mixing, defined as "0 s." The term "smalls" refers to a combination of antioxidant and rubber chemicals.

TABLE 3

| Method | 1.6L A | 1.6L B | 1.6L C | 1.6L D | 1.6L E | 1.6L F | 1.6L G | 1.6L H |
|---|---|---|---|---|---|---|---|---|
| Elastomer added | 0 s | 0 s | 0 s | 0 s | 0 s | 0 s | 0 s | 0 s |
| Filler added | 1/2 filler at 30 s; 1/2 filler at 150 s or 121° C. | 3/4 filler at 30 s; 1/4 filler at 125° C. or 90 s | 2/3 filler at 30 s; 1/3 filler at 90 s | 1/2 filler preblended w/smalls at 30 s; 1/2 filler at 150 s | 1/2 filler preblended w/smalls at 30 s; 1/2 filler at 150 s | 1/2 filler preblended w/smalls at 30 s; 1/2 filler at 150 s | 3/4 filler at 30 s; 1/4 filler at 150 s or 125° C. | 1/2 filler at 91° C.; 1/2 filler 120 s after 1$^{st}$ filler addition |
| smalls added | 30 s | 140° C. or 180 s | 180 s | 30 s (see above) | 30 s (see above) | 30 s (see above) | 6PPD only at 140° C. | 91° C. |
| Sweep | 270 s | 140° C. or 180 s; 210 s | 180 s; 210 s | 270 s | 270 s | 173 s | 145° C. | 120 s after last CB addition |
| Dump | 171° C. or 360 s | 150° C. or 360 s | 300 s, not exceed 160° C. | 171° C. or 600 s | 171° C. or 450 s | 208 s | 160° C. | 600 s |

In Table 3, the first occurrence of a stated temperature or time is the preferred option (e.g., 140° C. or 180 s, whichever occurs first). For mixing method "1.6L C" the mix was performed for 300 s while ensuring that the temperature did not exceed 160° C. by reducing mixer rpm. For mixing method "1.6L H", the mixer was operated without cooling water.

After each mixing stage, the composites were sheeted on a 2-roll mill operated at 50° C. and about 37 rpm, followed by three or five pass-throughs with a nip gap about 5 mm, with a rest time before next stage of mixing of at least 3 hours.

Table 4 lists carbon black type, loading, mixing protocol, operating conditions, and resulting data for each sample. "FF" refers to fill factor. "Specific Energy" refers to total specific energy.

TABLE 4

| Sample | CB Type | CB (phr) | H$_2$O in CB (%) | Rubber | Mixing method | FF (%) | TCU temp (° C.) | Mix time (s) | Rotor speed (rpm) | Composite Moisture % | Energy Efficiency % | Avg Liquid Release Rate (kg/kg * min) | Specific Energy (kJ/kg) |
|---|---|---|---|---|---|---|---|---|---|---|---|---|---|
| Dry 1 | V10HD | 50 | — | SMR20 | 1.6L A | 75 | 60 | 208 | 77 | 0.8 | — | — | 916 |
| Dry 2 | V10HD | 50 | — | RSS1 | 1.6L B | 70 | 50 | 195 | 80 | 0.8 | — | — | 866 |
| Dry 3 | V10HD | 50 | — | RSS1 | 1.6L B' | 70 | 50 | 186 | 80 | 0.5 | — | — | 849 |
| Dry 4 | V10HD | 50 | — | SMR20 | 1.6L A | 75 | 60 | 270 | 77 | 1.4 | — | — | 1186 |
| Dry 5 | V10HD | 40 | — | SMR20 | 1.6L A | 75 | 60 | 360 | 77 | 0.6 | — | — | 1249 |
| Dry 6 | V10HD | 50 | — | SMR20 | 1.6L A | 75 | 60 | 350 | 77 | 0.7 | — | — | 1272 |
| Dry 7 | V7H | 40 | — | SMR20 | 1.6L A | 75 | 60 | 360 | 77 | 0.7 | — | — | 1222 |
| Dry 8 | V7H | 50 | — | SMR20 | 1.6L A | 75 | 60 | 340 | 77 | 0.7 | — | — | 1191 |
| Dry 9 | V7H | 50 | — | SMR20 | 1.6L A | 75 | 60 | 360 | 77 | 0.7 | — | — | 1245 |
| Dry 10 | V7H | 60 | — | SMR20 | 1.6L A | 75 | 60 | 213 | 77 | 0.5 | — | — | 899 |
| Dry 11 | V7H | 50 | — | SMR20 | 1.6L A | 75 | 60 | 360 | 77 | 0.5 | — | — | 1137 |
| Dry 12 | V10HD | 50 | — | SMR20 | 1.6L C | 70 | 50 | 300 | 80 | 0.8 | — | — | 1246 |
| Dry 13 | X25 | 50 | — | SMR20 | 1.6L C | 70 | 50 | 300 | 80 | 0.8 | — | — | 1246 |
| Dry 14 | X22 | 50 | — | SMR20 | 1.6L C | 70 | 50 | 300 | 80 | 0.7 | — | — | 1159 |
| Dry 15 | X39 | 50 | — | SMR20 | 1.6L C | 70 | 50 | 300 | 80 | 0.6 | — | — | 1217 |
| Dry 16 | SRF | 58 | — | SMR20 | 1.6L C | 70 | 50 | 300 | 80 | 0.3 | — | — | 1081 |
| Dry 17 | V7H | 50 | — | SMR20 | 1.6L C | 70 | 50 | 300 | 80 | 0.1 | — | — | 1246 |
| Dry 18 | SOA | 52 | — | SMR20 | 1.6L C | 70 | 50 | 300 | 80 | 0.1 | — | — | 1183 |
| Dry 19 | V3 | 40 | — | SMR20 | 1.6L C | 70 | 50 | 300 | 80 | 0.1 | — | — | 1131 |
| Comp 1 | V10HD | 50 | 50 | SMR20 | 1.6L A | 75 | 60 | 360 | 77 | 14.9 | 29 | 0.019 | 916 |
| Comp 2 | V10HD | 50 | 50 | SMR20 | 1.6L D | 85 | 60 | 600 | 77 | 4.5 | 15 | 0.008 | 1287 |
| Comp 3 | V10HD | 50 | 33 | SMR20 | 1.6L E | 85 | 60 | 450 | 77 | 8.0 | 8 | 0.007 | 1430 |
| Comp 4 | V10HD | 50 | 50 | SMR20 | 1.6L A' | 75 | 60 | 4717 | 77 | — | — | — | 10994 |
| Comp 5 | V10HD | 50 | 50 | SMR20 | 1.6L F | 75 | 60 | 208 | 77 | 15.6 | 32 | 0.028 | 674 |
| Comp 6 | V10HD | 40 | 50 | SMR20 | 1.6L F | 75 | 60 | 208 | 77 | 12.0 | 55 | 0.044 | 611 |
| Comp 7 | V10HD | 50 | 10 | SMR20 | 1.6L A | 75 | 60 | 360 | 77 | 0.8 | 5 | 0.005 | 1488 |
| Comp 8 | X25 | 50 | 10 | SMR20 | 1.6L A | 75 | 60 | 360 | 77 | 0.7 | 6 | 0.005 | 1217 |
| Comp 9 | SRF | 58 | 10 | SMR20 | 1.6L A | 75 | 60 | 360 | 77 | 1.8 | 5 | 0.004 | 1115 |
| Comp 10 | V7H | 50 | 10 | SMR20 | 1.6L A | 75 | 60 | 360 | 77 | 1.1 | 5 | 0.004 | 1352 |
| Comp 11 | V10HD | 50 | 50 | SMR20 | 1.6L H | 85 | N/A | 600 | 77 | 11.4 | 37 | 0.023 | 1335 |
| Comp 12 | V10HD | 50 | 50 | SMR20 | 1.6L H | 85 | N/A | 600 | 77 | 6.5 | 52 | 0.028 | 1239 |
| Comp 13 | V10HD | 50 | 50 | SMR20 | 1.6L H | 75 | N/A | 600 | 77 | 7.3 | 38 | 0.027 | 1617 |
| Ex. 1 | V10HD | 50 | 55-60 | RSS1 | 1.6L G | 70 | 85 | 471 | 105 | 1.5 | 49 | 0.047 | 1815 |
| Ex. 2 | V10HD | 50 | 55-60 | RSS1 | 1.6L G | 70 | 85 | 909 | 105 | 1.5 | 37 | 0.024 | 2401 |
| Ex. 3 | V10HD | 50 | 50 | RSS1 | 1.6L G | 70 | 85 | 677 | 105 | 1.5 | 40 | 0.029 | 2019 |
| Ex. 4 | V10HD | 40 | 55-60 | SMR20 | 1.6L G | 70 | 85 | 791 | 105 | 1.1 | 39 | 0.024 | 2046 |
| Ex. 5 | V10HD | 50 | 55-60 | SMR20 | 1.6L G | 70 | 85 | 579 | 105 | 1.3 | 50 | 0.039 | 1844 |
| Ex. 6 | V7H | 40 | 55-60 | SMR20 | 1.6L G | 70 | 85 | 817 | 105 | 1.1 | 51 | 0.029 | 1925 |
| Ex. 7 | V7H | 50 | 55-60 | SMR20 | 1.6L G | 70 | 85 | 653 | 105 | 0.9 | 67 | 0.043 | 1727 |
| Ex. 8 | V7H | 60 | 55-60 | SMR20 | 1.6L G | 70 | 85 | 541 | 105 | 1.5 | 79 | 0.059 | 1629 |
| Ex. 9 | V3 | 50 | 50 | SMR20 | 1.6L G | 70 | 85 | 734 | 105 | 0.7 | 49 | 0.028 | 1698 |
| Ex. 10 | V10HD | 50 | 55-60 | SMR20 | 1.6L G | 70 | 85 | 565 | 105 | 1.3 | 54 | 0.040 | 1699 |
| Ex. 11 | V7H | 50 | 55-60 | SMR20 | 1.6L G | 70 | 85 | 651 | 105 | 1.1 | 70 | 0.043 | 1640 |
| Ex. 12 | V10HD | 50 | 55-60 | SMR20 | 1.6L G | 70 | 85 | 590 | 105 | 1.2 | 54 | 0.038 | 1699 |
| Ex. 13 | V10HD | 50 | 55-60 | SMR20 | 1.6L G | 70 | 85 | 592 | 105 | 1.5 | 52 | 0.038 | 1757 |
| Ex. 14 | X25 | 41 | 55-60 | SMR20 | 1.6L G | 70 | 85 | 630 | 105 | 1.3 | 46 | 0.038 | 2160 |
| Ex. 15 | X25 | 41 | 55-60 | SMR20 | 1.6L G | 70 | 85 | 692 | 105 | 0.9 | 48 | 0.035 | 2070 |
| Ex. 16 | X22 | 50 | 55 | SMR20 | 1.6L G | 70 | 85 | 595 | 105 | 1.3 | 52 | 0.041 | 1933 |
| Ex. 17 | X22 | 50 | 55 | SMR20 | 1.6L G | 70 | 85 | 612 | 105 | 1.6 | 50 | 0.040 | 1992 |
| Ex. 18 | X39 | 50 | 55 | SMR20 | 1.6L G | 70 | 85 | 713 | 105 | 0.8 | 44 | 0.035 | 2285 |
| Ex. 19 | X39 | 50 | 55 | SMR20 | 1.6L G | 70 | 85 | 692 | 105 | 1.1 | 44 | 0.035 | 2314 |
| Ex. 20 | SRF | 58 | 35 | SMR20 | 1.6L G | 70 | 85 | 1066 | 105 | 0.4 | 27 | 0.011 | 1810 |
| Ex. 21 | SRF | 58 | 35 | SMR20 | 1.6L G | 70 | 85 | 873 | 105 | 0.8 | 29 | 0.013 | 1666 |
| Ex. 22 | V7H | 50 | 55-60 | SMR20 | 1.6L G | 70 | 85 | 535 | 105 | 0.7 | 65 | 0.049 | 1640 |
| Ex. 23 | V7H | 43 | 55-60 | SMR20 | 1.6L G | 70 | 85 | 623 | 105 | 0.7 | 54 | 0.039 | 1821 |
| Ex. 24 | V7H | 50 | 55-60 | SMR20 | 1.6L G | 70 | 85 | 599 | 105 | 0.9 | 56 | 0.045 | 1933 |
| Ex. 25 | V7H | 62 | 55-60 | SMR20 | 1.6L G | 70 | 85 | 487 | 105 | 0.7 | 71 | 0.065 | 1793 |
| Ex. 26 | SOA | 52 | 50 | SMR20 | 1.6L G | 70 | 85 | 663 | 105 | 0.4 | 51 | 0.032 | 1691 |
| Ex. 27 | V3 | 40 | 50 | SMR20 | 1.6L G | 70 | 85 | 840 | 105 | 0.5 | 39 | 0.021 | 1836 |
| Ex. 28 | V3 | 45 | 50 | SMR20 | 1.6L G | 70 | 85 | 733 | 105 | 0.6 | 43 | 0.026 | 1810 |

A' - mix until 171° C. and dump
B' - No smalls added in composite. Smalls added in compounding stage.

For each of Ex. 1-28, the carbon black yield loss was less than 5% by weight based on total weight of the composite.

Vulcanizates were prepared by compounding the composites in 1 or 2 stages with the addition of rubber chemicals containing various additives, such as antioxidants, zinc oxide, and stearic acid ("smalls") and curing agents, followed by curing. Formulations are listed in Table 5. The wax beads were Akrowax™ 5031 wax beads, CBS (N-cyclohexyl-2-benzothiazole sulfenamide) was Accelerator CBTS, and TBBS (N-tert-butyl-2 benzothiazole sulfenamide) was Accelerator BBTS, all available from Akrochem, Akron, Ohio.

TABLE 5

|  | Formulation 1 (phr) | | Formulation 2 (phr) | | Formulation 3 (phr) | |
|---|---|---|---|---|---|---|
|  | NR | 100 | NR | 100 | NR | 100 |
|  | CB | var | CB | var | CB | var |
| "smalls" | 6PPD | 2 | 6PPD | 1 | 6PPD | 2.0 |
|  | Zinc Oxide | 3 | Zinc Oxide | 3.5 | TMQ | 1.5 |
|  | Stearic Acid | 2.5 | Stearic Acid | 2 | Zinc Oxide | 3 |
|  |  |  | Wax beads | 0.5 | Stearic Acid | 2 |
|  |  |  |  |  | Wax beads | 1.5 |
| Curatives | CBS | 1.2 | TBBS | 1.2 | TBBS | 1.4 |
|  | Sulfur | 1.2 | Sulfur | 1 | Sulfur | 1.2 |

Compounding protocols are shown in Table 6. For composites containing all smalls, stage 1 compounding was omitted and subjected composites were subjected to the stage 2 compounding procedure of "1.6L Compounding C" only (referred to as "Stg 2" in Table 8.

TABLE 6

|  | 1.6 L Compounding A | 1.6 L Compounding B | 1.6 L Compounding C |
|---|---|---|---|
| Stage 1 | | | |
| fill factor (%) | 70 | 70 | 70 |
| TCU (° C.) | 60 | 60 | 50 |
| rotor speed (rpm) | 80 | 60 | 80 |
| ram pressure (bar) | 2.8 | 2.8 | 2.8 |
| Composite added | 0 s | 0 s | 0 s |
| smalls added | 60 s | 30 s | 30 s |
| Sweep | 90 s | 90 s | 90 s |
| Dump | 150 s | 150 s, not exceed 120° C. | 180 s or 160° C. |
| Stage 2 | | | |
| fill factor (%) | 65 | 65 | 65 |
| TCU (° C.) | 50 | 50 | 50 |
| rotor speed (rpm) | 60 | 60 | 60 |
| ram pressure (bar) | 2.8 | 2.8 | 2.8 |
| Composite or compound added | 0 s | 0 s | 0 s |
| Curatives | 0 s | 0 s | 0 s |
| Sweep | 30 s | 30 s | 30 s |
| Dump | 60 s | 60 s | 90 s |

After each compounding stage, the compounds were sheeted on a 2-roll mill operated at 50° C. and about 37 rpm, followed by three pass-throughs with a nip gap about 5 mm, with a rest time before next stage of mixing of at least 3 hours.

Curing of samples was carried out in a heated press for a time determined by a conventional rubber rheometer, e.g., T90+10% of T90, where T90 is the time to achieve 90% vulcanization. Curing conditions are outlined in Table 7 below.

TABLE 7

| Curing Method | Temp | Time | Pressure |
|---|---|---|---|
| C1 | 150° C. | T90 + 10% | 2500 lbs |
| C2 | 150° C. | 30 min | 2500 lbs |
| C3 | 160° C. | T90 + 10% | 2500 lbs |

Table 8 shows the mixing conditions and properties for each sample.

TABLE 8

| Sample | Formula | Compounding method | Cure | M100 (MPa) | M300 (MPa) | M300/M100 | Max tan δ |
|---|---|---|---|---|---|---|---|
| Dry 1 | F2 | Stg 2 | C3 | 2.35 | 13.24 | 5.6 | 0.213 |
| Dry 2 | F2 | 1.6L Comp C' | C3 | 2.57 | 14.41 | 5.6 | 0.232 |
| Dry 3 | F2 | 1.6L Comp C | C3 | 2.62 | 14.82 | 5.7 | 0.224 |
| Dry 4 | F2 | Stg 2 | C3 | 2.45 | 13.61 | 5.6 | 0.210 |
| Dry 5 | F3 | Stg 2 | C3 | 2.24 | 11.51 | 5.1 | 0.169 |
| Dry 6 | F3 | Stg 2 | C3 | 2.97 | 15.11 | 5.1 | 0.207 |
| Dry 7 | F3 | Stg 2 | C3 | 2.26 | 11.66 | 5.2 | 0.149 |
| Dry 8 | F3 | Stg 2 | C3 | 3.03 | 15.53 | 5.1 | 0.187 |
| Dry 9 | F3 | 1.6L Comp C' | C3 | 2.95 | 15.38 | 5.2 | 0.220 |
| Dry 10 | F3 | Stg 2 | C3 | 4.15 | 18.55 | 4.5 | 0.230 |
| Dry 11 | F3 | Stg 2 | C3 | 2.84 | 14.18 | 5.0 | 0.157 |
| Dry 12 | F1 | 1.6L Comp C' | C1 | 3.22 | 17.39 | 5.4 | 0.194 |
| Dry 13 | F1 | 1.6L Comp C' | C1 | 2.89 | 16.86 | 5.8 | 0.207 |
| Dry 14 | F1 | 1.6L Comp C' | C1 | 2.7 | 15.07 | 5.6 | 0.221 |
| Dry 15 | F1 | 1.6L Comp C' | C1 | 2.74 | 15.2 | 5.6 | 0.236 |
| Dry 16 | F1 | 1.6L Comp C' | C1 | 2.2 | 12.93 | 5.9 | 0.091 |
| Dry 17 | F1 | 1.6L Comp C' | C1 | 2.94 | 16.18 | 5.5 | 0.190 |
| Dry 18 | F1 | 1.6L Comp C' | C1 | 3.38 | 16.36 | 4.9 | 0.117 |
| Dry 19 | F1 | 1.6L Comp C' | C1 | 1.99 | 11.42 | 5.7 | 0.127 |
| Comp 1 | F2 | Stg 2 | C3 | 2.45 | 12.71 | 5.2 | 0.207 |
| Comp 2 | F2 | Stg 2 | C3 | 1.73 | 8.63 | 5.0 | 0.165 |
| Comp 3 | F2 | Stg 2 | C3 | 1.84 | 10.02 | 5.5 | 0.163 |
| Comp 4 | F2 | Stg 2 | C3 | 2.37 | 14.19 | 6.0 | 0.224 |
| Comp 5 | F2 | Stg 2 | C3 | 2.32 | 13.83 | 6.0 | 0.174 |
| Comp 6 | F3 | Stg 2 | C3 | 1.60 | 8.86 | 5.5 | 0.171 |
| Comp 7 | F1 | Stg 2 | C1 | 3.21 | 17.18 | 5.4 | 0.175 |

TABLE 8-continued

| Sample | Formula | Compounding method | Cure | M100 (MPa) | M300 (MPa) | M300/ M100 | Max tan δ |
|---|---|---|---|---|---|---|---|
| Comp 8 | F1 | Stg 2 | C1 | 2.95 | 16.88 | 5.7 | 0.182 |
| Comp 9 | F1 | Stg 2 | C1 | 2.20 | 11.49 | 5.2 | 0.123 |
| Comp 10 | F1 | Stg 2 | C1 | 3.12 | 16.46 | 5.3 | 0.190 |
| LMB 1 | F1 | 1.6L Comp A | C1 | 2.23 | 14.40 | 6.5 | 0.161 |
| LMB 2 | F1 | 1.6L Comp A | C1 | 2.5 | 15.67 | 6.3 | 0.149 |
| LMB 3 | F1 | 1.6L Comp A | C1 | 2.88 | 17.83 | 6.2 | 0.178 |
| Ex. 1 | F2 | 1.6L Comp C | C3 | 2.64 | 15.97 | 6.1 | 0.191 |
| Ex. 2 | F3 | 1.6L Comp C | C3 | 2.67 | 16.06 | 6.0 | 0.192 |
| Ex. 3 | F2 | 1.6L Comp C | C3 | 2.54 | 15.94 | 6.3 | 0.195 |
| Ex. 4 | F3 | 1.6L Comp C | C3 | 2.06 | 12.46 | 6.1 | 0.127 |
| Ex. 5 | F3 | 1.6L Comp C | C3 | 2.60 | 15.08 | 5.8 | 0.178 |
| Ex. 6 | F3 | 1.6L Comp C | C3 | 2.08 | 12.78 | 6.1 | 0.101 |
| Ex. 7 | F3 | 1.6L Comp C | C3 | 2.62 | 16.32 | 6.2 | 0.132 |
| Ex. 8 | F3 | 1.6L Comp C | C3 | 3.73 | 19.95 | 5.4 | 0.200 |
| Ex. 9 | F3 | 1.6L Comp C | C3 | 2.83 | 16.03 | 5.7 | 0.129 |
| Ex. 10 | F1 | 1.6L Comp A | C1 | 2.95 | 17.17 | 5.8 | 0.163 |
| Ex. 11 | F1 | 1.6L Comp A | C1 | 2.94 | 17.58 | 6.0 | 0.166 |
| Ex. 12 | F1 | 1.6L Comp B | C1 | 2.84 | 17.31 | 6.1 | 0.149 |
| Ex. 13 | F3 | 1.6L Comp C | C2 | 3.21 | 17.70 | 5.5 | 0.184 |
| Ex. 14 | F1 | 1.6L Comp A | C1 | 2.34 | 15.38 | 6.6 | 0.129 |
| Ex. 15 | F1 | 1.6L Comp B | C1 | 2.32 | 15.08 | 6.5 | 0.137 |
| Ex. 16 | F1 | 1.6L Comp A | C1 | 2.56 | 15.69 | 6.1 | 0.206 |
| Ex. 17 | F1 | 1.6L Comp B | C1 | 2.51 | 15.32 | 6.1 | 0.206 |
| Ex. 18 | F1 | 1.6L Comp A | C1 | 2.72 | 16.81 | 6.2 | 0.210 |
| Ex. 19 | F1 | 1.6L Comp B | C1 | 2.76 | 16.56 | 6.0 | 0.210 |
| Ex. 20 | F1 | 1.6L Comp A | C1 | 2.40 | 15.19 | 6.3 | 0.077 |
| Ex. 21 | F1 | 1.6L Comp B | C1 | 2.44 | 15.66 | 6.4 | 0.073 |
| Ex. 22 | F1 | 1.6L Comp A | C1 | 2.74 | 17.28 | 6.3 | 0.166 |
| Ex. 23 | F1 | 1.6L Comp A | C1 | 2.67 | 15.96 | 6.0 | 0.135 |
| Ex. 24 | F1 | 1.6L Comp A | C1 | 2.91 | 18.10 | 6.2 | 0.159 |
| Ex. 25 | F1 | 1.6L Comp A | C1 | 4.29 | 23.63 | 5.5 | 0.192 |
| Ex. 26 | F1 | 1.6L Comp A | C1 | 3.20 | 16.82 | 5.3 | 0.099 |
| Ex. 27 | F1 | 1.6L Comp A | C1 | 2.10 | 13.00 | 6.2 | 0.100 |
| Ex. 28 | F1 | 1.6L Comp A | C1 | 2.29 | 14.44 | 6.3 | 0.117 |

C'-smalls added in composite; no smalls added during compounding

The composites as discharged from the wet mix comparative process either displayed high moisture content when the carbon black was wetted with greater than 20% water, or high loss yields of carbon black, either of which produced composites with poorly dispersed filler. For example, comparative samples Comp 1, Comp 5, and Comp 6 of Table 4 were discharged with greater than 10% water content. Comparative samples Comp 2 and Comp 3 visibly presented loose carbon black on its surface and the carbon black yield loss was measured to be greater than 15%. It should be noted that the max tan δ values for Comparatives Comp 2 and Comp 3 are low as these values result from the high amount of carbon black yield loss of greater than 15% (see Table 14). For Comp 4, mixing for 30 minutes resulted in a small temperature or torque increase after 30 minutes and did not reach suitable discharge temperature. To obtain a composite that could be vulcanized, Comp 4 was mixed for an additional hour at 60° C. Comp 5 had visible loose carbon black on its surface with a yield loss of 3 phr. Comp 1 and Comp 5 were subjected to additional vacuum drying to reduce the moisture content in the composites. For comparative wet mix process with $T_z$ lower than 65° C., it was found that composites having less than 10% moisture content were achieved only by decreasing the initial water content in the filler to 10%, as demonstrated by comparatives Comp 7 to Comp 10. Comp 6 was subjected to an additional stage of mixing to reduce moisture as described in Example X and the results of the second stage composite are shown in Table 8. The dried Comp 6 composite, after $2^{nd}$ stage of drying i.e. Comp 6 SG2, when compared to Dry 5, did not show any improvement in tan delta and with poor mechanical properties, as seen by the dramatic reduction in M300 value. In contrast, Ex. 4 showed improvement in both tensile stress ratio (M300/M100) and tan δ versus Dry 5.

In contrast, the composites formed from the presently claimed process, i.e., Examples Ex. 1 to Ex. 28, all had a moisture content of less than 2% upon discharging even with at least 50% water present in the filler. Such low moisture amounts were achieved by the claimed mixing process alone, without added steps such as additional vacuum drying (and with a total mixing time of no more than 35 minutes).

It can be seen that the rubber properties of the wet mix comparative composites were no better than the properties of dry mixes of comparable composition. From the data of Table 8, it can be seen that vulcanizates prepared from the composites prepared by the claimed processes show: (a) improvement in at least one of tan δ and tensile stress ratio (M300/M100) compared to the dry mix and wet mix comparative samples, and (b) similar tan δ and tensile stress ratio properties to the composites made from liquid masterbatch processes (see LMB 1 to LMB 3). It is believed that the liquid that wets the filler renders the filler easier to disperse in the solid elastomer. The wet filler enables longer mixing times compared to dry mix, which provides more time to disperse the filler in the elastomer.

This Example demonstrates that the claimed process, including the use of wet carbon black and the application of certain input variables, e.g., higher TCU temperatures ($T_z$), provide optimal mixing conditions to improve filler dispersion and ultimately improved rubber properties. The wet mix comparatives demonstrate that with TCU temperatures of 60° C., the mixing time can lengthen compared to dry mix but the liquid is removed at a slower rate, resulting in a composite with either a high moisture content or long mixing times (greater than 1 h) to achieve low moisture content.

Comparative Samples Comp 11, Comp 12, and Comp 13 were mixes of natural rubber with wet carbon black performed under conditions where no TCU temperature was set, i.e., the temperature of the mixer surfaces was not controlled. Comp 11 and Comp 12 were identical in formulation and mixing method. Due to the high fill factor of 85%, the ram deflection was very high. The resulting composites had a significant amount of moisture as well as unincorporated carbon black on the surface of the composite. Comp 13 was prepared with a fill factor of 75%. After 600 s of mixing, Comp 13 still had a significant amount of moisture and unincorporated carbon black on the composite surface. Due to the poor quality of these composites, Comp 11, 12, and 13 were not cured. Without controlled mixer surface temperatures, the mixer conditions were constantly changing after every batch of mixing. The temperature of the mixer wall and rotors increased with time due to the accumulated heat and lack of effective cooling. For example, for Comp 11, the rubber was masticated for 100 s to reach 91° C.; for Comp 12, which was mixed after Comp 11, mastication only took 58 s to reach 91° C. Without the use of cooling water, the mixer surface temperatures were not consistent, resulting in significant variations between batches.

The present processes generally resulted in a greater time average release rate of liquid per composite weight (ranging from 0.01 to 0.07 kg liquid/kg composite-min) relative to the comparative wet mix samples performed with a TCU of 60° C. With such higher liquid release rates, the moisture content values were reduced to suitable amounts over optimal mixing times.

The claimed energy efficiency values reflected the increased energy input to a system driving the rotors (contributing to total specific energy) to achieve a dry composite. The exemplary energy efficiencies, ranging from 20% to 80%, were generally higher than those of the comparative wet mix processes performed at a TCU of 60° C. While Comp 1, Comp 5, and Comp 6 provided energy efficiencies within the 20% to 80% range, these comparative composites had water content values of greater than 10% by weight.

Example II: Natural Rubber/Carbon Black (16 L and 66 L Capacities)

This Example describes the preparation of composites and corresponding vulcanizates, in which the composites were prepared according to the claimed processes with variations in mixer types, rotor types, and other operating variables such as rotor speeds, tip speed, and TCU temperatures ("$T_z$"). Rubbers used were standard grade natural rubber RSS1, RSS3, SMR5, and SMR20 natural rubber (Hokson Rubber, Malaysia). Technical descriptions of these natural rubbers are widely available, such as in Rubber World Magazine's Blue Book published by Lippincott and Peto, Inc. (Akron, Ohio, USA).

Specifically, all samples were prepared with V7H carbon black that was milled and rewetted as described in Example I to provide wet carbon black pellets having a moisture content ranging from 55-60%. The present example composites, i.e., Ex. 29-76, incorporated wet carbon black having a moisture content ranging from 55-60%. Dry mix samples were also prepared (Dry 20 to Dry 23). Comparative wet mix examples were not prepared due to handling and safety issues with the larger scale mixes as it had been demonstrated in Example I that the comparative mixes would not result in adequately dry and/or dispersed composites.

Mixing and compounding were performed with the BR1600, the BB-16, and the BB-72 mixers. In certain instances, compounding was performed with a BB2 tangential mixer (Kobelco Kobe Steel Group) operated with two 4-wing, tangential rotors, providing a capacity of 1.5 L. Table 9 shows the mixing protocols where "Var" refers to a range of values that are disclosed in Table 10.

TABLE 9

| Method | 16 L<br>H | 16 L<br>I | 16 L<br>J | 16 L<br>K | 66L<br>L |
|---|---|---|---|---|---|
| ram pressure (bar) | 6.6 | 6.6 | 112 | 112 | 155 |
| Elastomer added | 0 s | 0 s | 0 s | 0 s | 0 s |
| Filler added | 2/3 filler at 30 s; 1/3 filler at 60 s (126° C.) | 1/2 filler at 110° C.; 1/4 filler at 130° C.; 1/4 filler at 130° C.; | 2/3 filler at 30 s; 1/3 filler at 125° C. | 1/2 filler at 110° C.; 1/4 filler at 130° C.; 1/4 filler at 130° C.; | 1/2 filler at 110° C.; 1/4 filler at 130° C.; 1/4 filler at 130° C.; |
| smalls added | 108 s | for some mixes, added w/ 6PPD or elastomer | 140° C. | | |
| 2 phr 6 PPD added | 108 s | 140° C. | 140° C. | 140° C. | 155° C. |
| Sweep | 90 s; 168 s | | 30 s after last CB addition; 60 s after smalls addition | | |
| Dump | 232 s (rpm reduced to 13) | Var | 150° C. | Var | Var |

For mixing protocols 16L H and 16L I, the composites were roll-milled in the same manner as described in Example I but with five pass throughs. For mixing protocols 16L J, 16L K, and 66L L, the dumped composite was passed through a TSR-125 twin-screw discharge extruder fitted with a roller-head (Kobelco Kobe Steel Group). Mixing conditions and properties are listed in Table 10.

For each of Ex. 29-76, the carbon black yield loss was less than 5% by weight based on total weight of the composite.

Vulcanizates were formed by compounding the composites with rubber chemicals. The rubber chemicals formulation is shown in Table 11 and compounding protocols are described in Table 12.

TABLE 10

| Sample | CB phr | Rotor | Rubber | Mixing method | FF (%) | TCU temp | Mix time (s) | dump temp (° C.) | Rotor speed (rpm) | Tip speed (m/s) | Composite Moisture % | Energy Efficiency % | Avg Liquid Release Rate (kg/kg * min) | Specific Energy kJ/kg |
|---|---|---|---|---|---|---|---|---|---|---|---|---|---|---|
| Dry 20 | 50 | 2W | SMR20 | 16L H | 72 | 50 | 232 | — | 50 | 0.62 | — | — | — | — |
| Dry 21 | 51 | 4WN | RSS3 | 16L J | 72 | 50 | 201 | 150 | 50 | 0.62 | 0.7 | — | — | 823 |
| Dry 22 | 46 | 4WN | RSS3 | 16L J | 72 | 50 | 219 | 150 | 50 | 0.62 | 0.6 | — | — | 843 |
| Dry 23 | 56 | 4WN | RSS3 | 16L J | 72 | 50 | 206 | 150 | 50 | 0.62 | 0.5 | — | — | 792 |
| Ex. 29 | 50 | 2WL | SMR5 | 1.6L G' | 70 | 90 | 586 | 160 | 105 | 0.56 | 0.9 | 61 | 0.044 | 1699 |
| Ex. 30 | 50 | 2WL | RSS1 | 1.6L G' | 70 | 90 | 660 | 160 | 105 | 0.56 | 0.7 | 53 | 0.039 | 1962 |
| Ex. 31 | 50 | 2W | SMR5 | 16L I | 66 | 90 | 2023 | 165 | 50 | 0.62 | 1.1 | 36 | 0.012 | 2982 |
| Ex. 32 | 50 | 6W | SMR5 | 16L I | 68 | 90 | 691 | 165 | 70 | 0.87 | 1.3 | 47 | 0.037 | 2244 |
| Ex. 33 | 51 | 4WH | SMR5 | 16L I | 68 | 90 | 843 | 160 | 60 | 0.74 | 1.3 | 50 | 0.031 | 2135 |
| Ex. 34 | 51 | 4WH | SMR5 | 16L I | 68 | 90 | 568 | 160 | 80 | 0.99 | 2.0 | 52 | 0.046 | 2004 |
| Ex. 35 | 51 | 4WH | SMR5 | 16L I | 66 | 90 | 1067 | 160 | 50 | 0.62 | 1.0 | 47 | 0.024 | 2300 |
| Ex. 36 | 51 | 4WH | SMR5 | 16L I | 66 | 90 | 516 | 160 | 70 | 0.87 | 2.0 | 58 | 0.050 | 1819 |
| Ex. 37 | 51 | 4WN | SMR5 | 16L I | 68 | 90 | 1211 | 160 | 60 | 0.74 | 2.1 | 40 | 0.021 | 2650 |
| Ex. 38 | 51 | 4WN | SMR5 | 16L I | 68 | 90 | 829 | 160 | 60 | 0.74 | 2.2 | 49 | 0.030 | 2122 |
| Ex. 39 | 51 | 6W | SMR5 | 16L I | 68 | 90 | 929 | 165 | 60 | 0.74 | 1.0 | 43 | 0.028 | 2519 |
| Ex. 40 | 51 | 4WN | RSS1 | 16L I | 68 | 75 | 974 | 165 | 60 | 0.74 | 1.2 | 40 | 0.026 | 2705 |
| Ex. 41 | 51 | 4WN | RSS1 | 16L I | 68 | 65 | 1800 | 165 | 60 | 0.74 | 0.9 | 26 | 0.014 | 4144 |
| Ex. 42 | 51 | 4WN | SMR5 | 16L I | 68 | 75 | 1203 | 165 | 60 | 0.74 | 1.0 | 37 | 0.021 | 2900 |
| Ex. 43 | 50 | 6W | SMR5 | 16L I | 68 | 90 | 1772 | 160 | 50 | 0.62 | 1.3 | 31 | 0.014 | 3432 |
| Ex. 44 | 51 | 4WN | SMR5 | 16L I | 68 | 90 | 486 | 160 | 80 | 0.99 | 2.7 | 57 | 0.053 | 1794 |
| Ex. 45 | 51 | 4WN | SMR5 | 16L I | 70 | 90 | 573 | 160 | 70 | 0.87 | 3.0 | 56 | 0.044 | 1821 |
| Ex. 46 | 51 | 4WN | SMR5 | 16L I | 70 | 90 | — | 160 | 70 | 0.87 | 2.6 | — | — | — |
| Ex. 47 | 51 | 4WN | SMR5 | 16L I | 72 | 90 | — | 160 | 60 | 0.74 | 2.3 | — | — | — |
| Ex. 48 | 51 | 4WN | SMR5 | 16L I | 72 | 90 | 494 | 160 | 80 | 0.99 | 3.4 | 57 | 0.051 | 1787 |
| Ex. 49[1] | 51 | 6W | SMR5 | 16L I | 68 | 90 | 567 | 160 | 60 | 0.74 | 0.7 | 64 | 0.047 | 1699 |
| Ex. 50 | 51 | 6W | SMR5 | 16L I | 68 | 90 | 929 | 165 | 60 | 0.74 | 1.0 | 43 | 0.028 | 2519 |
| Ex. 51[1] | 51 | 4WH | SMR5 | 16L I | 66 | 90 | 480 | 143 | 60 | 0.74 | 1.4 | 71 | 0.055 | 1491 |
| Ex. 52 | 51 | 4WH | SMR5 | 16L I | 66 | 90 | 746 | 160 | 60 | 0.74 | 1.8 | 54 | 0.034 | 1963 |
| Ex. 53[2] | 50 | 2W | SMR5 | 16L I | 71 | 90 | 1724 | 165 | 60 | 0.74 | 0.9 | 39 | 0.015 | 2746 |
| Ex. 54[2] | 50 | 2W | SMR5 | 16L I | 71 | 90 | 1609 | 165 | 60 | 0.74 | 1.1 | 40 | 0.017 | 2646 |
| Ex. 55 | 50 | 2W | SMR5 | 16L I | 68 | 90 | 1931 | 160 | 60 | 0.74 | 0.9 | 35 | 0.014 | 3047 |
| Ex. 56 | 50 | 2W | SMR5 | 16L I | 68 | 90 | 1668 | 160 | 60 | 0.74 | 0.7 | 39 | 0.015 | 2725 |
| Ex. 57 | 51 | 4WN | RSS3 | 16L K | 68 | 90 | 1046 | 165 | 60 | 0.74 | 1.0 | 46 | 0.027 | 2332 |
| Ex. 58 | 51 | 4WN | RSS3 | 16L K | 68 | 90 | 1007 | 160 | 60 | 0.74 | 1.8 | 46 | 0.027 | 2314 |
| Ex. 59 | 51 | 4WN | RSS3 | 16L K | 68 | 90 | 1159 | 170 | 60 | 0.74 | 0.5 | 41 | 0.023 | 2635 |
| Ex. 60 | 51 | 4WN | RSS3 | 16L K | 68 | 90 | 756 | 165 | 80 | 0.99 | 1.3 | 44 | 0.038 | 2436 |
| Ex. 61 | 51 | 4WN | RSS3 | 16L K | 68 | 90 | 488 | 170 | 80 | 0.99 | 0.7 | 49 | 0.056 | 2216 |
| Ex. 62 | 46 | 4WN | RSS3 | 16L K | 68 | 75 | 657 | 165 | 80 | 0.99 | 1.4 | 40 | 0.037 | 2516 |
| Ex. 63 | 56 | 4WN | RSS3 | 16L K | 68 | 75 | 651 | 165 | 80 | 0.99 | 1.1 | 45 | 0.045 | 2523 |
| Ex. 64 | 56 | 4WN | RSS3 | 16L K | 68 | 75 | 607 | 165 | 80 | 0.99 | 1.1 | 44 | 0.046 | 2582 |
| Ex. 65 | 51 | 4WN | RSS3 | 16L K | 68 | 75 | 672 | 165 | 80 | 0.99 | 1.9 | 44 | 0.039 | 2415 |
| Ex. 66 | 51 | 4WN | RSS3 | 66L L | 66 | 90 | 656 | 165 | 60 | 1.19 | 2.7 | 51 | 0.037 | 2019 |
| Ex. 67 | 51 | 4WN | RSS3 | 66L L | 66 | 90 | 895 | 170 | 60 | 1.19 | 1.4 | 41 | 0.028 | 2606 |
| Ex. 68 | 51 | 4WN | RSS3 | 66L L | 66 | 75 | 682 | 175 | 80 | 1.59 | 1.9 | 43 | 0.037 | 2450 |
| Ex. 69 | 51 | 4WN | RSS3 | 66L L | 66 | 90 | 1168 | 170 | 60 | 1.19 | 1.6 | 33 | 0.021 | 3264 |
| Ex. 70 | 51 | 4WN | RSS3 | 66L L | 66 | 90 | 482 | 175 | 80 | 1.59 | 0.9 | 51 | 0.053 | 2139 |
| Ex. 71 | 51 | 4WN | RSS3 | 66L L | 66 | 90 | 1090 | 175 | 60 | 1.19 | 1.0 | 26 | 0.023 | 3057 |
| Ex. 72 | 51 | 4WN | RSS3 | 66L L | 66 | 90 | 618 | 170 | 70 | 1.39 | 1.6 | 52 | 0.041 | 2060 |
| Ex. 73 | 46 | 4WN | RSS3 | 66L L | 66 | 75 | 1921 | 170 | 60 | 1.19 | 0.7 | 23 | 0.012 | 4328 |
| Ex. 74 | 51 | 4WN | RSS3 | 66L L | 66 | 75 | 1039 | 165 | 60 | 1.19 | 1.9 | 36 | 0.024 | 2929 |
| Ex. 75 | 51 | 4WN | RSS3 | 66L L | 66 | 75 | 1131 | 175 | 60 | 1.19 | 0.9 | 36 | 0.022 | 3014 |
| Ex. 76 | 51 | 4WN | RSS3 | 66L L | 66 | 75 | 622 | 170 | 70 | 1.39 | 1.7 | 53 | 0.045 | 2007 |

1.6L G' = 1.6L G with TCU temp = 90° C.
[1] smalls added at 140° C.;
[2] smalls added with elastomer

TABLE 11

|  |  | Formulation 4 |
|---|---|---|
| "smalls" | NR | 100 |
|  | CB | var |
|  | 6 PPD | 2.5 |
|  | TMQ | 1.5 |
|  | Zinc Oxide | 3 |
|  | Stearic Acid | 2 |
|  | wax beads | 1.5 |
| Curatives | TBBS | 1.4 |
|  | Sulfur | 1.2 |

TABLE 12

|  | 1.6 L Compounding D | 1.5 L Compounding E |
|---|---|---|
| Stage 1 |  |  |
| fill factor (%) | 68 | 65 |
| TCU (° C.) | 50 | 60 |
| rotor speed (rpm) | 80 | 60 |
| ram pressure (bar) | 2.8 | 2.9 |
| Composite added | 0 s | 0 s |
| Smalls added | 30 s | 30 s |
| Sweep | 90 s | 90 s |
| Dump | 150 s, not exceed 130° C. | 150 s, not exceed 130° C. |
| Stage 2 |  |  |
| fill factor (%) | 65 | 63 |
| TCU (° C.) | 50 | 50 |
| rotor speed (rpm) | 60 | 50 |
| ram pressure (bar) | 2.8 | 2.9 |
| Composite added | 0 s | 0 s |
| Curatives | 0 s | 0 s |
| Sweep | 30 s | 30 s |
| Dump | 90 s | 90 s |

Samples Dry 20 and Ex. 29 to Ex. 56 were compounded according to protocol 1.6L Compounding D. After each compounding stage, the compounds were sheeted on a 2-roll mill operated at 50° C. and about 37 rpm, followed by six end-rolls with a nip gap about 5 mm, with a rest time before next stage of mixing of at least 3 hours.

Compounding of Dry 21 to Dry 23 and Ex. 57 to Ex. 76 was performed according to 1.5L Compounding E. After compounding, the compounds were sheeted to 2.4 mm thickness on a 2-roll mill operated at 60° C. Curing for all samples was performed at 150° C. for 30 min at a pressure of 100 kg/cm². Vulcanizate properties are listed in Table 13.

TABLE 13

| Sample | M100 (MPa) | M300 (MPa) | M300/M100 | Max tan δ |
|---|---|---|---|---|
| Dry 20 | 2.63 | 14.56 | 5.5 | 0.196 |
| Dry 21 | 2.58 | 14.20 | 5.5 | 0.212 |
| Dry 22 | 2.36 | 13.10 | 5.6 | 0.195 |
| Dry 23 | 2.97 | 15.90 | 5.4 | 0.237 |
| Ex. 29 | 2.62 | 15.27 | 5.8 | 0.172 |
| Ex. 30 | 2.72 | 15.61 | 5.7 | 0.156 |
| Ex. 31 | 3.03 | 17.85 | 5.9 | 0.182 |
| Ex. 32 | 3.02 | 17.66 | 5.9 | 0.169 |
| Ex. 33 | 2.78 | 16.67 | 6.0 | 0.174 |
| Ex. 34 | 3.14 | 18.18 | 5.8 | 0.174 |
| Ex. 35 | 2.89 | 17.33 | 6.0 | 0.181 |
| Ex. 36 | 2.83 | 16.71 | 5.9 | 0.178 |
| Ex. 37 | 2.73 | 16.68 | 6.1 | 0.169 |
| Ex. 38 | 2.74 | 16.38 | 6.0 | 0.178 |
| Ex. 39 | 2.58 | 15.71 | 6.1 | 0.177 |
| Ex. 40 | 2.98 | 17.39 | 5.8 | 0.176 |
| Ex. 41 | 2.93 | 17.29 | 5.9 | 0.169 |

TABLE 13-continued

| Sample | M100 (MPa) | M300 (MPa) | M300/M100 | Max tan δ |
|---|---|---|---|---|
| Ex. 42 | 2.97 | 17.08 | 5.8 | 0.179 |
| Ex. 43 | 2.91 | 17.62 | 6.1 | 0.169 |
| Ex. 44 | 3.04 | 17.49 | 5.8 | 0.170 |
| Ex. 45 | 2.90 | 16.72 | 5.8 | 0.178 |
| Ex. 46 | 2.85 | 16.86 | 5.9 | 0.176 |
| Ex. 47 | 2.79 | 16.42 | 5.9 | 0.182 |
| Ex. 48 | 2.75 | 15.97 | 5.8 | 0.184 |
| Ex. 49 | 2.49 | 14.50 | 5.8 | 0.189 |
| Ex. 50 | 2.58 | 15.71 | 6.1 | 0.177 |
| Ex. 51 | 2.60 | 14.89 | 5.7 | 0.184 |
| Ex. 52 | 2.51 | 15.04 | 6.0 | 0.176 |
| Ex. 53 | 2.63 | 14.70 | 5.6 | 0.210 |
| Ex. 54 | 2.72 | 15.10 | 5.6 | 0.207 |
| Ex. 55 | 2.95 | 17.40 | 5.9 | 0.177 |
| Ex. 56 | 2.50 | 15.39 | 6.2 | 0.170 |
| Ex. 57 | 2.61 | 15.20 | 5.8 | 0.194 |
| Ex. 58 | 2.80 | 15.70 | 5.6 | 0.206 |
| Ex. 59 | 2.43 | 14.30 | 5.9 | 0.189 |
| Ex. 60 | 2.75 | 15.50 | 5.6 | 0.212 |
| Ex. 61 | 2.71 | 15.40 | 5.7 | 0.209 |
| Ex. 62 | 2.24 | 13.00 | 5.8 | 0.183 |
| Ex. 63 | 2.91 | 16.50 | 5.7 | 0.218 |
| Ex. 64 | 2.93 | 16.50 | 5.6 | 0.214 |
| Ex. 65 | 2.50 | 14.70 | 5.9 | 0.191 |
| Ex. 66 | 2.58 | 15.20 | 5.9 | 0.176 |
| Ex. 67 | 2.52 | 15.00 | 6.0 | 0.192 |
| Ex. 68 | 2.45 | 14.60 | 6.0 | 0.192 |
| Ex. 69 | 2.34 | 14.00 | 6.0 | 0.183 |
| Ex. 70 | 2.43 | 15.00 | 6.2 | 0.185 |
| Ex. 71 | 2.56 | 14.80 | 5.8 | 0.197 |
| Ex. 72 | 2.71 | 15.90 | 5.9 | 0.210 |
| Ex. 73 | 2.08 | 13.20 | 6.4 | 0.160 |
| Ex. 74 | 2.43 | 14.30 | 5.9 | 0.180 |
| Ex. 75 | 2.43 | 14.10 | 5.8 | 0.184 |
| Ex. 76 | 2.50 | 14.60 | 5.8 | 0.177 |

It can be seen from Table 13, that vulcanizates prepared from the composites made from the presently claimed process show: (a) improvement in at least one of tan δ and tensile stress ratio (M300/M100) such as present composite Ex. 70 (51 phr), Ex. 73 (46 phr), and Ex. 64 (56 phr), compared to the dry mix comparative samples with the same formulation, such as example Dry 21 (51 phr), Dry 22 (46 phr), Dry 23 (56 phr), and (b) similar properties to the composites made from liquid masterbatch processes (see present Ex. 43 (50 phr) and Ex. 70 (51 phr) compared to liquid masterbatch LMB 3 (50 phr)). These results, achieved with the larger mixer volumes of 16 L and 66 L, are similar to those demonstrated in Example I, which were performed with a mixer volume of 1.6 L.

In general, the data of Examples 1 and 2 show that additional energy (as indicated by resulting total specific energy) inputted into the mixing process when compared to the comparative wet mix processes enhanced the mixing of the wet filler and dry elastomer, allowing a sufficient amount of moisture to be removed in a shorter period of time while incorporating filler into the elastomer. The data of Table 4 and Table 10 show that the presently claimed processes attain higher specific energies and energy efficiencies when compared to the comparative wet mix counterparts, resulting in composites with low moisture content, specifically, moisture contents of 4% or less, and resulting vulcanizates with improved properties.

As shown by the wet mix comparative, TCU temperatures below 65° C. did not result in sufficient temperature increase to release the water. Comp 1 to Comp 6 (Comp 7 to Comp 10 had water content in the carbon black of 10%). In contrast, at Tz temperatures greater than 65° C., the mixture experiences the appropriate temperature increase for water removal. As the temperature rises, the temperature control acts as a coolant, which allowed longer mix times. Eventually, the temperature increases to mixer temperatures of at least 140° C. to discharge the composite.

As with Example I, the energy efficiencies ranged from 20% to 80% and the average liquid release rate per kg composite ranged from 0.01 to 0.07 kg liquid/kg composite-min. Such values were not obtained from the comparative wet mix processes in forming low moisture content composites.

Increasing the tip speed can also increase the shear forces experienced by the mixture. Table 10 shows increasing tip velocities with the increase of rotor speed and mixer chamber volume. Such specific energies and tip velocities are typically not optimal with dry mix as high shear conditions can cause the elastomer to heat up quickly and degrade before the filler can adequately disperse in the elastomer. Use of the rotors having at least four wings allows energy efficiencies of at least 40%.

The data of Examples 1 and 2 also show that the currently claimed processes enable the preparation of composites without the presence of rubber chemicals. In the mixing of Ex. 53 and Ex. 54, smalls were charged to the mixer at the same time as the elastomer in which smalls included rubber chemicals. For Ex. 49 and Ex. 51, the smalls were added after charging of the elastomer and filler was complete and the mixture reached a temperature of 140° C. Ex. 39, Ex. 52, Ex. 55, and Ex. 56 were mixed with only antioxidant present in the initial wet filler/elastomer mixture. All of these mixes were performed in the same mixer with the same carbon black type and loading under essentially the same conditions. The data for Ex. 49, Ex. 51, Ex. 39, Ex. 52, Ex. 55, and Ex. 56 in Table 13 shows that more optimal rubber properties were obtained for the mixes in which no rubber chemicals were present at the start of mixing.

In the wet mixing processes, it has been discovered that the mixture swells in the presence of water and swelling can interfere with carbon black distribution. It has been discovered that reducing the fill factor mitigates this swelling and, surprisingly, improves the vulcanizate rubber properties, as shown in Table 14.

TABLE 14

| Sample | FF (%) | CB yield loss % | max ram deflection (% of rotor diameter) | M300/ M100 | Max tan δ |
|---|---|---|---|---|---|
| Comp 1 | 75 | 2.8 | 32.3 | 5.2 | 0.207 |
| Comp 2 | 85 | 18.2 | 60.0 | 5.0 | 0.165 |
| Comp 3 | 85 | 15.8 | 71.8 | 5.5 | 0.163 |
| Ex. 1 | 70 | 0.2 | 3.8 | 6.1 | 0.191 |
| Ex. 2 | 70 | 0 | 5.0 | 6.0 | 0.192 |
| Ex. 3 | 70 | 0.8 | 4.0 | 6.3 | 0.195 |
| Ex. 37 | 68 | | 4.3 | 6.1 | 0.169 |
| Ex. 44 | 68 | | 3.2 | 5.8 | 0.17 |
| Ex. 45 | 70 | | 5.4 | 5.8 | 0.178 |
| Ex. 46 | 70 | | 16.1 | 5.9 | 0.176 |
| Ex. 47 | 72 | | 21.4 | 5.9 | 0.182 |
| Ex. 48 | 72 | | 21.4 | 5.8 | 0.184 |

Prior data on the samples of Table 14 can be found in Table 4, Table 8, Table 10, and Table 13, and portions of the data are reproduced in Table 14. Additionally, Table 14 lists carbon black yield loss and maximum ram deflection. The comparative wet mixing processes Comp 1, Comp 2, and Comp 3 were performed at fill factors of 75% or 85%. The resulting maximum ram deflection values are high, greater than 30% of the rotor diameter. In contrast, the present wet mix processes were run at lower fill factors ranging from 68% to 72%. As the fill factor was reduced, the corresponding ram deflection decreased with respect to the comparative wet mixing processes. Moreover, as the fill factor decreased from 72% to 68% for the present processes, the ram deflection values decreased from 21% to values less than 10% of the rotor diameter. At least one of tensile stress ratio M300/M100 and tan δ improved with lower fill factors.

Example III: Natural Rubber/Silica

This example describes the preparation of natural rubber/silica composites and vulcanizates. The silica used was ZEOSIL® Z1165 MP precipitated silica from Solvay USA Inc., Cranbury, N.J. The coupling agent was Si-69 silane coupling agent ("Si69"; Evonik Industries). The silane coupling agent was added together with the first portion of silica.

The silica pellets, with an initial moisture content of 5-7%, were placed in a container and wetted by slowly combining with additional water with stirring. The mixture was then further mixed in a rotating drum overnight. Composites of silica and natural rubber (RSS1) were prepared with the BR1600 mixer according to the protocol of Table 15 and under the conditions of Table 16.

TABLE 15

| Dry Mix Fill factor 70%; Tz = 50°C; 80 rpm; ram pressure = 2.8 bar | | Wet Mix Fill factor 70%; Tz = 105° C.; 80 rpm; ram pressure = 2.8 bar | |
|---|---|---|---|
| Time (s) | Description | Time (s) | Description |
| 0 | Add Polymer | 0 | Add Polymer |
| 30 | Add ⅔ Filler | 30 | Add ¾ Filler |
| 90 | Sweep/Add Remaining Filler | 150 | Add Remaining Fillers (125° C. or 150 s mix time) |
| 180 | Sweep/Add Smalls | | Sweep/Add 6 PPD at 140° C. |
| 240 | Scrape/Sweep | | Scrape/Sweep at 145° C. |
| 300 | Dump-Adjust RPM < 160° C. | | Dump at 160° C. |

TABLE 16

| Sample | Si69 phr | SiO₂ phr | H₂O in SiO₂ (%) | mix time (s) | Composite moisture (%) | Energy Efficiency (%) | Specific Energy (kJ/kg) | Avg Liquid Release Rate (kg/kg * min) |
|---|---|---|---|---|---|---|---|---|
| Dry 24 | 50 | 5 | 6 | 300 | 2.4 | N/A | 1252 | — |
| Dry 25 | 50 | 5 | 6 | 300 | 2.2 | N/A | 1252 | — |
| Ex. 77 | 50 | 5 | 53 | 732 | 1.7 | 36 | 2268 | 0.027 |
| Ex. 78 | 50 | 5 | 53 | 680 | 1.9 | 36 | 2296 | 0.029 |
| Dry 26 | 56 | 5.6 | 6 | 300 | 2.3 | N/A | 1346 | — |
| Dry 27 | 56 | 5.6 | 6 | 300 | 2.4 | N/A | 1346 | — |
| Ex. 79 | 56 | 5.6 | 53 | 762 | 2.0 | 37 | 2372 | 0.028 |
| Ex. 80 | 56 | 5.6 | 53 | 840 | 1.9 | 31 | 2824 | 0.025 |

Vulcanizates were compounded with the formulation of Table 17 and the mixing protocol of Table 18. The vulcanizates were then cured for 30 min. at 150° C.

TABLE 17

| | phr |
|---|---|
| NR | 100 |
| SiO₂ | var |
| Si69 | var |
| 6PPD | 1.5 |

TABLE 17-continued

|  | phr |
|---|---|
| Antioxidant DQ (TMQ) | 1.5 |
| Zinc Oxide | 3 |
| Stearic Acid | 2 |
| wax beads | 1.5 |
| TBBS | 2.0 |
| Sulfur | 1.6 |

TABLE 18

| Fill factor 68%; Tz = 50° C.; 80 rpm; ram pressure = 2.8 bar | | Fill factor 65%; Tz = 50° C.; 60 rpm; ram pressure = 2.8 bar | |
|---|---|---|---|
| Time (s) | Stage 1 | Time (s) | Stage 2 |
| 0 | Add composite | 0 | Add ½ stage 1 MB/curatives/remaining stage 1 MB |
| 30 | Wet mix-add smalls Dry mix-sweep | 30 | Sweep |
| 90 | Scrape/Sweep | 90 | Dump |
| 180 | Dump at 180 s or 150° C. | | |

Vulcanizate properties are shown in Table 19.

TABLE 19

| Sample | M100 (MPa) | M300 (MPa) | M300/M100 | Max tan δ |
|---|---|---|---|---|
| Dry 24 | 3.62 | 13.38 | 3.7 | 0.126 |
| Dry 25 | 3.53 | 13.32 | 3.7 | 0.121 |
| Ex. 77 | 3.23 | 14.92 | 4.6 | 0.089 |
| Ex. 78 | 3.30 | 15.83 | 4.8 | 0.091 |
| Dry 26 | 3.79 | 13.67 | 3.6 | 0.134 |
| Dry 27 | 4.33 | 15.59 | 3.6 | 0.132 |
| Ex. 79 | 3.51 | 16.31 | 4.7 | 0.104 |
| Ex. 80 | 3.64 | 17.61 | 4.8 | 0.105 |

It can be seen that compared to dry mixing, the natural rubber/silica composites prepared by the claimed process yield vulcanizates having reduced tan δ values and increased tensile stress ratio.

Example IV: Natural Rubber/Carbon Black-Silica

This example describes the preparation of composites and vulcanizates comprising natural rubber and a blend of silica and carbon black fillers. Two different filler ratios were used: carbon black/silica=35:15 or 15:35. The silica used was ZEOSIL® Z1165 MP precipitated silica from Solvay USA Inc., Cranbury, N.J. The coupling agent was Si-69 silane coupling agent ("Si69"; Evonik Industries) and was added together with the first portion of silica. Never-dried Propel® X25 carbon black was used (see Table 1). The silica pellets were wetted as described for the natural rubber/silica composites of Example III.

The natural rubber (RSS1), carbon black, and wet silica were mixed in the BR1600 mixer according to protocol of Table 20 and under the mixing conditions of Table 21.

TABLE 20

| Dry Mix Fill factor 70%; Tz = 50° C.; 80 rpm; ram pressure = 2.8 bar | | Wet Mix Fill factor 70%; Tz = 105° C.; 80 rpm; ram pressure = 2.8 bar | |
|---|---|---|---|
| Time | Description | Time (s) | Description |
| 0 | Add Polymer | 0 | Add Polymer |
| 30 | Add ⅔ Filler | 30 | Add ¾ Filler + Si69 |
| 90 | Add Remaining Fillers | 150 | Add Remaining Fillers (125° C. or 150 s mix time) |
| 180 | Sweep/Add Smalls | | Sweep and Add 6PPD at 140° C. |
| 240 | Scrape/Sweep | | Scrape/Sweep at 145° C. |
| 300 | Dump-Adjust RPM < 160° C. | | Dump at 160° C. |

TABLE 21

| Sample | CB/SiO₂ Phr | Si69 phr | H₂O in SiO₂/CB (%) | mix time (s) | Composite moisture (%) | Energy Efficiency (%) | Specific Energy (kJ/kg) | Avg Liquid Release Rate (kg/kg * min) |
|---|---|---|---|---|---|---|---|---|
| Dry 28 | 35/15 | 1.5 | 6 | 300 | 1.6 | N/A | 1182 | — |
| Dry 29 | 35/15 | 1.5 | 6 | 300 | 1.5 | N/A | 1182 | — |
| Ex. 81 | 35/15 | 1.5 | 53/55 | 590 | 1.4 | 48 | 2008 | 0.040 |
| Ex. 82 | 35/15 | 1.5 | 53/55 | 545 | 1.4 | 47 | 2066 | 0.044 |
| Dry 30 | 15/30 | 3.5 | 6 | 300 | 2.0 | N/A | 1317 | — |
| Dry 31 | 15/30 | 3.5 | 6 | 300 | 1.8 | N/A | 1317 | — |
| Ex. 83 | 15/30 | 3.5 | 53/55 | 726 | 2.4 | 36 | 2454 | 0.029 |
| Ex. 84 | 15/30 | 3.5 | 53/55 | 575 | 1.9 | 44 | 1992 | 0.037 |

Vulcanizates were produced by compounding with the formulation of Table 22 according to the protocol of Table 23 followed by curing for 30 min. at 150° C.

TABLE 22

|  | Dry Mix (phr) | Wet Mix (phr) |
| --- | --- | --- |
| NR | 100 | 100 |
| CB/Si | var | var |
| Si69 | var | var |
| 6PPD | 1.5 | 1.5 |
| Antioxidant DQ (TMQ) | 1.5 | 1.5 |
| Zinc Oxide | 3 | 3 |
| Stearic Acid | 2 | 2 |
| wax beads | 1.5 | 1.5 |
| TBBS | 1.46 | 1.54 |
| Sulfur | 1.32 | 1.48 |

TABLE 23

| Fill factor 68%; Tz = 50° C.; 80 rpm; ram pressure = 2.8 bar | | Fill factor 65%; Tz = 50° C.; 60 rpm; ram pressure = 2.8 bar | |
| --- | --- | --- | --- |
| Time (s) | Stage 1 | Time (s) | Stage 2 |
| 0 | Add masterbatch/composite | 0 | Add ½ stage 1 MB/curatives/remaining stage 1 MB |
| 30 | Wet mix-add smalls Dry mix-sweep | 30 | Sweep |
| 90 | Scrape/Sweep | 90 | Dump |
| 180 | Dump at 180 s or 150° C. | | |

Vulcanizate properties are shown in Table 24.

TABLE 24

| Sample | Max tan δ | M100 (MPa) | M300 (MPa) | M300/M100 |
| --- | --- | --- | --- | --- |
| Dry 28 | 0.157 | 3.41 | 15.61 | 4.6 |
| Dry 29 | 0.156 | 3.60 | 16.97 | 4.7 |
| Ex. 81 | 0.150 | 3.15 | 17.70 | 5.5 |
| Ex. 82 | 0.151 | 3.08 | 17.61 | 5.7 |
| Dry 30 | 0.133 | 3.18 | 12.94 | 4.1 |
| Dry 31 | 0.129 | 3.33 | 13.30 | 4.0 |
| Ex. 83 | 0.110 | 2.77 | 14.37 | 5.2 |
| Ex. 84 | 0.110 | 2.53 | 13.63 | 5.4 |

It can be seen that compared to dry mix, the composite made from a blend of wetted carbon black/silica fillers, at two different filler ratios, yielded vulcanizates having reduced tan δ values and increased tensile stress ratio when comparing similar filler ratios.

Example V: Styrene-Butadiene Rubber/Silica

This example describes the preparation of composites and vulcanizates comprising solution styrene butadiene rubber (BUNA® VSL 4526-0 HM S-SBR, Lanxess, Germany) and silica. The silica used was ZEOSIL® Z1165 MP precipitated silica from Solvay USA Inc., Cranbury, N.J. The silica pellets were wetted as described for the natural rubber/silica composites. The silane coupling agent, X50S (Evonik Industries), was added together with the first portion of silica.

The SBR and silica were mixed in the BR1600 mixer according to protocol of Table 25 and under the mixing conditions of Table 26.

TABLE 25

| Dry Mix Fill factor 70%; Tz = 50° C.; 80 rpm; ram pressure = 2.8 bar | | Wet Mix Fill factor 70%; Tz = 105° C.; 80 rpm; ram pressure = 2.8 bar | |
| --- | --- | --- | --- |
| Time (s) | Description | Time (s) | Description |
| 0 | Add Polymer | 0 | Add Polymer |
| 30 | Add ⅔ filler + X50S | 30 | Add ⅔ Filler + X50s |
| 90 | Sweep/add remaining filler | | Sweep/Add Remaining Fillers (at 125° C.- |
| 180 | Sweep/add smalls | | |
| 240 | Scrape/Sweep at 140° C. | | Scrape/Sweep-add 6PPD at 140° C. |
| 300 | Dump, Adjust rpm < 160° C. | | Scrape/Sweep at 145° C. Dump at 160° C. |

TABLE 26

| Sample | SiO₂ phr | X50S phr | H₂O in SiO₂ (%) | mix time | Composite moisture (%) |
| --- | --- | --- | --- | --- | --- |
| Dry 32 | 50 | 8 | 7 | 8 min | 1.9 |
| Ex. 85 | 50 | 8 | 53 | 16 min, 50 s | 1.9 |

Vulcanizates were compounded with the formulation of Table 27 for both samples according to the protocol of Table 28, followed by curing for 30 min. at 150° C. For Ex. 85, 6PPD was only added in stage 1 and TMQ, ZnO, stearic acid, and wax were added in stage 2 whereas for Dry 32, all the smalls i.e. 6PPD, TMQ, ZnO, stearic acid, and wax were added in stage 1. N,N'-diphenyl guanidine ("DPG" powder) is a vulcanization accelerator.

TABLE 27

|  | phr |
| --- | --- |
| s-SBR | 100 |
| SiO₂ | 50 |
| X50S | 8 |
| 6PPD | 1.5 |
| Antioxidant DQ (TMQ) | 1.0 |
| Zinc Oxide | 3 |
| Stearic Acid | 2 |
| wax beads | 2.5 |
| CBS | 1.6 |
| DPG Powder | 1.7 |
| Sulfur | 1.4 |

TABLE 28

| Fill factor 70%; Tz = 50 °C.; 80 rpm; ram pressure = 2.8 bar | | Fill factor 62.5% (Dry 28) & 65% for Ex 92; Tz = 50° C.; 60 rpm; ram pressure = 2.8 bar | |
| --- | --- | --- | --- |
| Time (s) | Stage 1 | Time (s) | Stage 2 |
| 0 | Add composite | 0 | Add ½ composite/curatives/remaining composite |
| 30 | For wet-Add smalls, for dry-sweep | 30 | Sweep |
| 90 | Scrape/Sweep | 90 | Dump |
| 240 | Dump earliest of 240 s or 160° C. | | |

Vulcanizate properties are shown in Table 29.

TABLE 29

| Sample | Max tan δ | M100 (MPa) | M300 (MPa) | M300/ M100 |
|---|---|---|---|---|
| Dry 32 | 0.140 | 3.00 | 15.92 | 5.30 |
| Ex. 85 | 0.117 | 3.32 | 18.68 | 5.63 |

It can be seen that compared to dry mixing, the composite made from wet silica yielded vulcanizates having reduced tan δ values and increased tensile stress ratio.

Example VI: Natural Rubber:Butadiene Rubber (80:20)/Carbon Black

This example describes the preparation of composites and vulcanizates comprising an 80/20 blend of natural rubber (RSS1) and butadiene rubber (Buna® CB 22 butadiene rubber (Lanxess, Germany) with carbon black fillers. The carbon black used was never-dried VULCAN® 7H carbon black and Propel® X25 carbon black.

The natural rubber (NR), butadiene rubber (BR), and carbon black (50 phr for dry and wetted CB) were charged separately and mixed in the BR1600 mixer according to protocol of Table 30 and under the mixing conditions of Table 31.

TABLE 30

| Dry Mix Fill factor 70%; Tz = 50° C.; 80 rpm; ram pressure = 2.8 bar | | Wet Mix Fill factor 70%; Tz = 85° C.; 105 rpm; ram pressure = 2.8 bar | |
|---|---|---|---|
| Time (s) | Description | Time (s) | Description |
| 0 | Add Polymers | 0 | Add Polymer |
| 60 | Add 2/3 Filler | 30 | Add 3/4 Filler |
| 120 | Sweep/Add Remaining Filler | 150 | Sweep/Add Remaining Filler at 125° C. or 150 s |
| 150 | /Sweep | | Add 6PP at 140° C. |
| 180 | Sweep/Add smalls | | Scrape/sweep at 145° C. |
| 240 | Scrape/Sweep | | Dump at 160° C. |
| 300 | Dump-Adjust rpm < 160° C. | | |

TABLE 31

| Sample | CB | H₂O in CB (%) | mix time (s) | Composite moisture (%) | Energy Efficiency (%) | Avg Liquid Release Rate (kg/kg * min) | Specific Energy (kJ/kg) |
|---|---|---|---|---|---|---|---|
| Dry 33 | V7H | — | 300 | 0.9 | N/A | — | 1278 |
| Dry 34 | V7H | — | 300 | 1.0 | N/A | — | 1249 |
| Ex. 86 | V7H | 59 | 1243 | 1.3 | 44 | 0.022 | 2610 |
| Ex. 87 | V7H | 59 | 1219 | 1.0 | 43 | 0.022 | 2698 |
| Dry 35 | X25 | — | 300 | 0.9 | N/A | — | 1133 |
| Dry 36 | X25 | — | 300 | 0.8 | N/A | — | 1162 |
| Ex. 88 | X25 | 58 | 835 | 1.4 | 48 | 0.032 | 2346 |
| Ex. 89 | X25 | 58 | 784 | 1.5 | 50 | 0.035 | 2288 |

Vulcanizates were compounded with the formulation of Table 32 according to the protocol of Table 33. The compounds were then cured for 30 min. at 150 C.

TABLE 32

| | phr |
|---|---|
| NR/BR | 80/20 |
| CB | var |
| 6PPD | 1.5 (Dry 33-36) 2.0 (Ex. 86-89)-1.5 phr in stage 1 and 0.5 in stage 2) |
| Antioxidant DQ (TMQ) | 1.5 |
| Zinc Oxide | 3 |
| Stearic Acid | 2 |
| wax beads | 1.5 |
| TBBS | 1.4 |
| Sulfur | 1.2 |

TABLE 33

| Fill factor 68%; Tz = 50° C.; 80 rpm; ram pressure = 2.8 bar | | Fill factor 65%; Tz = 50° C.; 60 rpm; ram pressure = 2.8 bar | |
|---|---|---|---|
| Time (s) | Stage 1 | Time (s) | Stage 2 |
| 0 | Add composite | 0 | Add 1/2 composite/curatives/ remaining composite (add sulfur and accelerator) |
| 30 | Wet mix - add smalls Dry mix - sweep | 30 | Sweep |
| 90 | Scrape/Sweep | 90 | Dump |
| 180 | Dump earliest of 18 0 s or 145° C. | | |

*Note:
Ex. 88 and Ex. 89 were processed by using stage 1 protocol twice.

Vulcanizate properties are shown in Table 34.

TABLE 34

| Sample | max tan δ | M100 (MPa) | M300 (MPa) | M300/ M100 |
|---|---|---|---|---|
| Dry 33 | 0.192 | 3.1 | 15.27 | 4.97 |
| Dry 34 | 0.179 | 3.0 | 15.45 | 5.12 |
| Ex. 86 | 0.147 | 2.8 | 16.15 | 5.77 |
| Ex. 87 | 0.155 | 2.8 | 16.35 | 5.80 |
| Dry 35 | 0.196 | 3.2 | 17.46 | 5.43 |
| Dry 36 | 0.199 | 3.0 | 16.35 | 5.43 |
| Ex. 88 | 0.178 | 3.1 | 17.77 | 5.70 |
| Ex. 89 | 0.178 | 3.1 | 18.09 | 5.81 |

It can be seen that compared to composites prepared by dry mixing the same fillers, the composite made from wetted carbon black yielded vulcanizates having reduced tan δ values and increased tensile stress ratio.

Example VII: Natural Rubber/Carbon Black-Reduced Graphene Oxide

This example describes the preparation of composites and vulcanizates comprising natural rubber and a filler blend comprising wet carbon black and reduced graphene oxide (rGO). Specifically, the reduced graphene oxide is in the form of densified reduced graphene oxide, which can be prepared as disclosed in U.S. Prov. Appl. No. 62/857,296, filed Jun. 5, 2019, the disclosure of which is incorporated by reference herein. The densified reduced graphene oxide comprises water in a ratio of 1:4 rGO to water by mass.

A reference mixture was prepared from a natural rubber (SMR 20)/rGO masterbatch that was mixed with additional SMR 20 rubber and dry Vulcan® J carbon black. A first Example was prepared similarly to the reference except a wet carbon black was incorporated. In a second Example, the elastomer was directly compounded with wet carbon black (prepared by adding water to carbon black pellets in a container; 50% moisture by weight) and rGO. The final compound formulation is provided in Table 35. Mixing protocols for the NR/rGO masterbatch is provided in Table 36 and protocols for the NR/CB-rGO composite are found in Table 37.

TABLE 35

| Ingredient | Loading (PHR) |
| --- | --- |
| Natural rubber | 100 |
| Carbon black | 40 |
| rGO | 2 |
| Zinc oxide | 3 |
| Stearic acid | 2 |
| TMQ | 0.5 |
| 6PPD | 1.5 |
| Sulfur | 1.9 |
| TBBS | 1.4 |

TABLE 36

| BR1600 Fill factor 70%; Tz = 105° C.; 80 rpm; ram pressure = 2.8 bar | |
| --- | --- |
| Time (s) | Stage 1 Description |
| 0 | Add Polymer |
| 30 | Reduce RPM to 40, reduce ram pressure to 1.5 and add 8 phr rGO Once ram seated and rGO ingested, raise ram and add remaining polymer. Then increase ram pressure to 2.8 and ram down. Once ram seated increase rpms to 80. Raise Lower Ram - No Sweep (Leave Chute Closed) at 130° C. Add 6PPD at 140° C. Dump at 160° C. |

| Fill factor 70%; Tz = 80° C.; 80 rpm; ram pressure = 2.8 bar | |
| --- | --- |
| Time (s) | Stage 2 &3 Description |
| 0 | Add composites Dump at 300s, adjust RPM not exceed 160° C. |

TABLE 37

| Reference: Stage 1 Brabender fitted with cam blade Fill factor 65%; Tz = 50° C.; 60 rpm | | Reference Stage 2 Brabender fitted with cam blade Fill factor 60%; Tz = 50° C.; 50 rpm | |
| --- | --- | --- | --- |
| Time (s) | Description | Time (s) | Description |
| 0 | Add NR/rGO Masterbatch and NR | 0 | Add Stage 1 Masterbatch |
| 30 | Add 2/3 Carbon Black | | |
| 90 | Add remaining CB | | |
| 120 | Sweep | | |
| 180 | Add smalls | | |
| 240 | Sweep, adjust rpm to control temperature below 145° C. | | |
| 300 | Dump at 300 s, adjust rpm to control temperature below 145° C. | 240 | Adjust rpm to get temperature below 145 C. Dump at 240 s. |

| Ex. 90 Stage 1 BR1600 Fill factor 70%; Tz = 85° C.; 105 rpm; ram pressure = 2.8 bar | | Ex. 90 Stage 2 BR1600 Fill factor 70%; Tz = 50° C.; 80 rpm; ram pressure = 2.8 bar | |
| --- | --- | --- | --- |
| Time (s) | Description | Time (s) | Description |
| 0 | Add NR/rGO Masterbatch and NR | 0 | Add Stage 1 Masterbatch |
| 30 | Add 3/4 Wet Carbon Black | 30 | Add smalls |
| 150 | Sweep/Add Remaining Filler @ 150" or 125° C. | 90 | Sweep |
| 180 | Sweep Add 6PPD at 140° C. Sweep at 145° C. Dump at 160° C. | 180 | Dump at 180 s or 160° C. |

TABLE 37-continued

| | Ex. 91 Stage 1<br>BR1600<br>Fill factor 70%; Tz = 85° C.; 105 rpm;<br>ram pressure = 2.8 bar | | Ex. 91 Stage 2<br>BR1600<br>Fill factor 70%; Tz = 50° C.; 80 rpm;<br>ram pressure = 2.8 bar |
|---|---|---|---|
| | | Time (s) | Description |
| 0 | Add NR | 0 | Add Stage 1 Masterbatch |
| 30 | Add ¾ Wet Carbon Black and 2 phr rGO | 30 | Add smalls |
| 150 | Sweep/Add Remaining Filler at 150 s or 125° C. | | |
| 180 | Sweep<br>Add 6PPD at 140° C.<br>Sweep at 145° C.<br>Dump at 160° C. | 90<br>180 | Sweep<br>Dump at 180 s or 160° C. |

After each mixing stage, the composites were sheeted on an end roll operated at 50° C. and about 37 rpm, followed by six end-rolls with a nip gap about 5 mm, with a rest time before next stage of mixing of at least 3 hours.

Vulcanizates were compounded according to the method of Table 38.

TABLE 38

| Reference (Brabender)<br>Fill factor 60%; Tz =<br>50° C.; 50 rpm | | Examples (BR1600)<br>Fill factor 65%; Tz = 50° C.;<br>60 rpm; ram pressure = 2.8 bar | |
|---|---|---|---|
| Time (s) | Stage 1 | Time (s) | Stage 2 |
| 0 | Add composite | 0 | Add 1/2 composite/<br>curatives/<br>remaining composite |
| 30 | Add curatives | 30 | Sweep |
| 60 | Sweep | 90 | Dump |
| 120 | Dump | | |

Vulcanizate properties are shown in Table 39.

TABLE 39

| Properties | Reference | Example 90 | Example 91 |
|---|---|---|---|
| G' @ 10% (MPa) | 2.26 | 2.16 | 2.03 |
| Maximum tan δ | 0.133 | 0.122 | 0.105 |
| M100 (MPa) | 5.98 | 5.82 | 5.67 |

TABLE 39-continued

| Properties | Reference | Example 90 | Example 91 |
|---|---|---|---|
| M300 (MPa) | 22.50 | 23.78 | 23.59 |
| M300/M100 | 3.8 | 4.1 | 4.2 |

It can be seen that compared to the reference, the composites prepared from wet fillers yielded vulcanizates having lower tan δ values and higher tensile stress ratio.

Example VIII: Styrene-Butadiene Rubber/Silicon-Treated Carbon Black

This example describes the preparation of composites and vulcanizates comprising solution styrene butadiene rubber (BUNA® VSL 4526-0 HM S-SBR, Lanxess, Germany) and Ecoblack™ CRX4210 silicon-treated carbon black obtained from Cabot Corporation prepared as described in U.S. Pat. No. 6,028,137, the disclosure of which is incorporated herein by reference. This silicon-treated carbon black has an STSA of 119 m²/g, a COAN of 109 mL/100 g, and a silicon content of 10.2%. The coupling agent was Si69 and was blended with V3 in a 1:1 mass ratio. The Si69/V3 blend was added together with the first portion of silicon-treated carbon black. The silicon-treated carbon black pellets were wetted as described for the natural rubber/silica composites of Example III.

The SBR and silicon-treated carbon black were mixed in the BR1600 mixer according to protocol of Table 40 and under the mixing conditions of Table 41.

TABLE 40

| Dry Mix<br>Fill factor 70%; Tz = 50° C.;<br>80 rpm; ram pressure = 2.8 bar | | Wet Mix<br>Fill factor 70%; Tz = 105° C.;<br>80rpm; ram pressure = 2.8 bar | |
|---|---|---|---|
| Time (s) | Description | Time (s) | Description |
| 0 | Add Polymer | 0 | Add Polymer |
| 30 | Add 2/3 Filler and Si69/V3 | 30 | Add 2/3 Filler and Si69/V3 |
| 90 | Sweep/Add Remaining Filler | 90 | Sweep/Add Remaining Filler |
| | Scrape/Sweep and Add Smalls at 140° C. | | Scrape/Sweep and Add Smalls at 140° C. |
| | Scrape/Sweep at 145° C. | | Scrape/Sweep at 145° C. |
| | Adjust RPM to Maintain 150° C. for 120 Sec. | | Adjust RPM to Maintain 150° C. for 120 Sec. |
| | Dump at 150° C. after 120 s holding at 150° C. | | Dump at 150° C. after 120 s holding at 150° C. |

TABLE 41

| Sample | CB (phr) | Si60/V3 (phr) | H₂O in (%) | mix time (min) |
|---|---|---|---|---|
| Dry 37 | 50 | 4 | — | 8.2 |
| Dry 38 | 50 | 4 | — | 8.3 |
| Ex. 92 | 50 | 4 | 56 | 15.8 |
| Ex. 93 | 50 | 4 | 56 | 15.7 |

Vulcanizates were compounded with the formulation of Table 42 for both samples according to the protocol of Table 43. The compounds were cured for t90+10% at 160° C.

TABLE 42

| | phr |
|---|---|
| S-SBR | 100 |
| Si-treated CB | 50 |
| Si69/V3 (1:1) | 4 |
| 6PPD | 1.0 |
| Antioxidant DQ (TMQ) | 1.0 |
| Zinc Oxide | 3 |
| Stearic Acid | 2 |
| wax beads | 2.5 |
| CBS | 1.5 |
| DPG Powder | 0.6 |
| Sulfur | 1.4 |

TABLE 43

| Fill factor 70%; Tz = 50° C.; 80 rpm; ram pressure = 2.8 bar | | Fill factor 65%; Tz = 50° C.; 50 rpm; ram pressure = 2.8 bar | |
|---|---|---|---|
| Time (s) | Stage 1 | Time (s) | Stage 2 |
| 0 | Add Masterbatch/Composite | 0 | Add 1/2 Masterbatch/Composite/Curatives/Remaining Masterbatch/Composite |
| 240 | Dump at 240 s or 150° C. | 60 | Sweep |
| | | 120 | Dump |

Vulcanizate properties are shown in Table 44.

TABLE 44

| Sample | max tan δ | M100 (MPa) | M300 (MPa) | M300/M100 |
|---|---|---|---|---|
| Dry 37 | 0.141 | 3.34 | 17.76 | 5.3 |
| Dry 38 | 0.141 | 3.31 | 17.89 | 5.4 |
| Ex. 92 | 0.134 | 3.11 | 18.19 | 5.9 |
| Ex. 93 | 0.134 | 3.00 | 18.98 | 6.3 |

It can be seen that compared to dry mix, the composite made from the wet silicon-treated carbon black yielded vulcanizates having reduced tan δ values and increased tensile stress ratio.

Example IX: Styrene-Butadiene Rubber/Modified Carbon Black

This example describes the preparation of composites and vulcanizates comprising solution styrene butadiene rubber (BUNA® VSL 4720-0 HM S-SBR from Lanxess) and carbon black modified with an organic group. The base carbon black was VULCAN® 7H and modification was performed according to Example 49 of U.S. Pat. No. 8,975,316, the disclosure of which is incorporated herein by reference. The modified carbon black pellets were wetted as described for the natural rubber/silica composites.

SBR and modified carbon black were mixed in the BR1600 mixer according to protocol of Table 45 and under the mixing conditions of Table 46.

TABLE 45

| Dry Mix Fill factor 70%; Tz = 50° C.; 80 rpm; ram pressure = 2.8 bar | | Wet Mix Fill factor 70%; Tz = 105° C.; 80 rpm; ram pressure = 2.8 bar | |
|---|---|---|---|
| Time (s) | Description | Time (s) | Description |
| 0 | Add Polymer | 0 | Add Polymer |
| 30 | Add 2/3 Filler | 30 | Add 2/3 Filler |
| 90 | Sweep/Add Remaining Filler | | At 130° C. Sweep/Add Remaining Filler |
| | Scrape/Sweep and Add Smalls at 140° C. | | Scrape/Sweep and Add Smalls at 140° C. |
| | Scrape/Sweep at 145° C. | | Scrape/Sweep at 145° C. |
| 300 | Dump at 300 sec, or 150° C. | | Dump at 150° C. |

TABLE 46

| Sample | CB phr | H₂O in (%) | mix time (min) | Masterbatch/composite moisture (%) |
|---|---|---|---|---|
| Dry 39 | 50 | — | 5.1 | 0.7 |
| Dry 40 | 50 | — | 5.2 | 0.8 |
| Ex. 94 | 50 | 54 | 15.5 | 1.1 |
| Ex. 95 | 50 | 54 | 16.4 | 0.8 |

Vulcanizates were compounded with the formulation of Table 47 for both samples according to the method of Table 48. The compound was cured for t90+10% at 160° C.

TABLE 47

| | (phr) |
|---|---|
| 6PPD | 1.0 |
| Antioxidant DQ (TMQ) | 1.0 |
| Zinc Oxide | 3 |
| Stearic Acid | 2 |
| wax beads | 2.5 |
| CBS | 1.5 |
| TBZTD | 1.0 |
| Sulfur | 1.6 |

TABLE 48

| Fill factor 70%; Tz = 50° C.; 80 rpm; ram pressure = 2.8 bar | | Fill factor 65%; Tz = 50° C.; 50 rpm; ram pressure = 2.8 bar | |
|---|---|---|---|
| Time (s) | Stage 1 | Time (s) | Stage 2 |
| 0 | Add Masterbatch/Composite | 0 | Add 1/2 Masterbatch/Composite/Curatives/Remaining Masterbatch/Composite |
| 240 | Dump at 240 s or 150° C. | 60 | Sweep |
|  |  | 120 | Dump |

Vulcanizate properties are shown in Table 49.

TABLE 49

| Sample | max tan δ | M100 (MPa) | M300 MPa) | M300/M100 |
|---|---|---|---|---|
| Dry 39 | 0.179 | 2.87 | 12.53 | 3.8 |
| Dry 40 | 0.178 | 3.00 | 12.69 | 3.9 |
| Ex. 94 | 0.126 | 3.83 | 19.52 | 5.5 |
| Ex. 95 | 0.129 | 4.13 | 20.19 | 5.7 |

It can be seen that compared to dry mix, the composite made from wet modified carbon black yielded vulcanizates having reduced tan δ values and increased tensile stress ratio.

Example X: Natural Rubber/Carbon Black Multi-Stage Processes

This Example describes the preparation of composites via a two-stage mixing process and corresponding vulcanizates. Four composite/vulcanizate pairs were analyzed in which a composite was initially formed in a first stage mix. A portion of the composite discharged in the first stage was compounded to form vulcanizates. Some of the remaining portion of the composite was then subjected to a second stage mix and the resulting composite was also compounded to form vulcanizates.

Comp 6 incorporated V10HD carbon black at a loading of 40 phr. As previously described in Example I, Comp 6 SG1 composite was prepared according to the comparative wet mixing process (Table 4). Because the resulting moisture content was high (12%), Comp 6 SG2 was further mixed under the conditions given in Table 51 to produce composite COMP 6 SG2, which was compounded as described in Example I.

Dry 21 incorporated dry V7H carbon black at a loading of 51 phr. Ex. 65 and Ex. 68 were prepared with V7H carbon black at a target loading of 51 phr that was milled and rewetted as described in Example I to provide wet carbon black pellets having a moisture content ranging from 55-60%.

Ex. 96 incorporated V10HD carbon black at a loading of 50 phr. Ex. 96 SG1 composite was prepared in the same manner as Comp 6 (see Table 4). The resulting moisture content was high (15.3%). This composite was then charged to the BR1600 mixer with a TCU of 100° C. and mixed for 680 s to produce composite Ex. 96 SG2. Then the composite was compounded in the same manner as Comp 6, as described in Example I.

Mixing conditions and properties are shown in Table 51 for both first and second stages. The mixing protocols of the first stage refer to those outlined in Table 9 and Table 50 in which the mixer chamber volume used is indicated by the mixing protocol.

TABLE 50

| | Protocol |
|---|---|
| 16L M | add elastomer (35 rpm) over 20 s; mix for 60 s (35 rpm) with ram raised; mix for additional 180 s (30 rpm) with ram raised and dump |
| 16L N | add elastomer (35 rpm), over 20 s; mix for 90 s (35 rpm) with ram raised; switch the mixer to temperature control mode to target 127° C. and mix for 150 s and dump |
| 16L O | add elastomer (35 rpm) over 20 s; mix for 90 s (35 rpm) with ram raised; switch the mixer to temperature control mode to target 132° C. and mix for 270 s with ram raised and dump |

After the first stage for samples Dry 21 SG1, Ex. 65 SG1, and Ex. 68 SG1, the composite was passed through a twin-screw discharge extruder fitted with a roller-head (TSR-125, Kobelco Kobe Steel Group). Such an extruder is designed to minimize the energy input into the composite. The resulting sheet was manually cut up and fed to the corresponding second stage (Dry 21 SG2, Ex. 65 SG2, and Ex. 68 SG2). The second stage mixing of these batches was performed in a ram-less mode (ram set at highest position). This ensured the ram did not apply pressure to the composite, thus reducing the possibility of excessive temperature increase. The time delay between the first and second stage batches was limited to less than an hour, to limit the extent of carbon black flocculation and composite storage hardening.

With the exception of Comp 6 SG1, Comp 6 SG2, Ex. 96 SG1, and Ex. 96 SG2, first and second stage composites were compounded with the rubber chemicals of Formulation 3 (Table 5) according to the protocol "1.5L Compounding E" (Table 12), followed by curing at 150° C. for 30 min. at a pressure of 100 kg/cm$^2$.

With the exception of Comp 6 SG2 and Ex. 96 SG2, the second stage mix was performed at a significantly lower fill factor to minimize excessive temperature rise that could occur in the second stage mix due to the lower moisture content in the composite. As mentioned in Example I, Comp 6 SG2 did not experience a temperature increase after 30 min., and thus, decreasing fill factor was unnecessary. For both the comparative dry and wet mixes, the TCU temperatures were the same for both first and second stage mixes. For the stage 1 mixes performed according to the claimed processes, the TCU temperatures of the second stage were lowered for the reason of reducing the possibility of excessive temperature increase.

As expected, each second stage composite ("SG2") had a lower moisture content than the corresponding first stage composite ("SG1"). However, for the composites prepared according to the claimed processes, both the tensile stress ratio M300/M100 and tan δ, improved with the second stage mix. Notably, both first and second stage composites made from presently claimed processed showed improved rubber properties compared to the second stage wet mix comparative Comp 6 SG2. In comparing the rubber properties for the first and second stage dry mix from the data of Table 51, there was a minimal change in tensile stress ratio and a higher tan δ value for the second stage composite. This may be indicative of degraded elastomer due to excessive mixing.

It is also observed that, a higher TCU temperature for SG2 is desirable if there is high moisture (e.g. >10%) in SG1 composites. Compared with Comp 6 SG2, the present composite Ex. 96 SG2 was mixed at a higher TCU temperature, and it had much shorter SG2 mixing time, indicating a much more efficient drying. Ex. 96 SG2 had a CB yield loss of 6.8%. The resulting vulcanizate had higher M300/M100 ratio than Comp 6 SG2, indicating less rubber degradation.

Example XI: Natural Rubber/Carbon Black (Rotor Tip Speeds)

This Example demonstrates the advantage of mixing at higher rotor speeds. Rotor speeds can be compared across different mixer sizes, by expressing them as the tip speed of the rotor i.e. the speed of the rotor at its largest diameter.

This example utilizes never dried version Propel® X25 carbon black (STSA 155 m$^2$/g), that was collected at the outlet of the carbon black pelletizer, prior to the dryer in a carbon black manufacturing process. The carbon black had a moisture level of about 54% by weight.

The carbon black was incorporated into RSS1 natural rubber at 50 phr (dry basis) in the BR1600 mixer. Antioxidant (1.5 phr of 6PPD) was also added to mix. Three samples were mixed, each using a different mixer speed. The mixing conditions and the resulting vulcanizate properties are shown in Table 54. The mixing protocols refer to those outlined in Table 3.

TABLE 51

| Sample | Mixing protocol | Time between stages (mins) | Composite Moisture (%) | Mixer rotor | rubber | FF (%) | TCU temp (° C.) | Mix Time (s) | Rotor speed (rpm) | dump temp (° C.) | SE (kJ/kg) | M300/ M100 | Max tan δ |
|---|---|---|---|---|---|---|---|---|---|---|---|---|---|
| Dry 21 SG1 | 16L J | NA | 0.7 | 4WN | RSS3 | 72 | 50 | 201 | 50 | 150 | 770 | 5.6 | 0.205 |
| Dry 21 SG2 | 16L M | 3 | 0.4 | 6WI | RSS3 | 45 | 50 | 240 | 30-35 | 133 | 710 | 5.7 | 0.212 |
| Comp 6 SG1 | 1.6L F | NA | 12.0 | 2WL | SMR20 | 75 | 60 | 208 | 77 | 94 | 611 | — | — |
| Comp 6 SG2 | 1.6L F' | 5 | 1.0 | 2WL | SMR20 | 75 | 60 | 6510 | 77 | 125 | 12050 | 5.5 | 0.171 |
| Ex. 65 SG1 | 16L K | NA | 1.9 | 4WN | RSS3 | 68 | 75 | 672 | 80 | 165 | 2415 | 5.9 | 0.191 |
| Ex. 65 SG2 | 16L N | 4 | 0.8 | 6WI | RSS3 | 40 | 50 | 240 | 35-46 | 128 | 591 | 6.0 | 0.186 |
| Ex. 68 SG1 | 66L L | NA | 1.9 | 4WN | RSS3 | 66 | 75 | 682 | 80 | 175 | 2450 | 6.0 | 0.192 |
| Ex. 68 SG2 | 16L O | 17 | 0.7 | 6WI | RSS3 | 40 | 50 | 360 | 35-55 | 132 | 1107 | 6.1 | 0.189 |
| Ex. 96 SG1 | 1.6 L F | NA | 15.3 | 2WL | SMR20 | 75 | 60 | 208 | 77 | 97 | 674 | — | — |
| Ex. 96 SG2 | 1.6 L F" | NA | 1.8 | 2WL | SMR20 | 75 | 100 | 680 | 77 | 167 | 1728 | 5.9 | 0.196 |

1.6L F' = dump at 125° C. (maximum temperature achieved)
1.6 L F" = use 100° C. TCU temperature, dump at 167° C. (maximum temperature achieved)
Dry 21 SG1 & Ex. 65 SG1: 6PPD added at 1$^{st}$ stage at 140° C.
Ex. 68 SG1: 6PPD added at 1$^{st}$ stage at 155° C.

The resulting composites were compounded with the rubber chemicals in the same BR1600 Mixer, as per the formulation in Table 52 and the compounding protocol in Table 53. This compounding was followed by curing at 150° C. for 30 min. at a pressure of 100 kg/cm$^2$.

From the data of Table 54, it can be seen that increasing the rotor speed (and rotor tip speed) reduces the batch time, which is beneficial, while the compound properties (e.g. M300/M100 and tan δ) were equal or better.

TABLE 52

| | Formulation | |
|---|---|---|
| "smalls" | NR | 100 |
| | CB | 50 |
| | 6PPD | 1.5 |
| | TMQ | 1.5 |
| | Zinc Oxide | 3 |
| | Stearic Acid | 2 |
| | wax beads | 1.5 |
| Curatives | TBBS | 1.4 |
| | Sulfur | 1.2 |

TABLE 53

| | 1.6L Compounding F |
|---|---|
| Fill factor (%) | 68 |
| TCU (° C.) | 50 |
| rotor speed (rpm) | 80 |
| ram pressure (bar) | 2.8 |
| Composite added | 0 s |
| Smalls added | 30 s |
| Sweep | 90 s |
| Dump | 240 s, not to exceed 150° C. |
| fill factor (%) | 65 |
| TCU (° C.) | 50 |
| rotor speed (rpm) | 60 |
| ram pressure (bar) | 2.8 |
| Composite added | 0 s |
| Curatives | 0 s |
| Sweep | 30 s |
| Dump | 90 s |

TABLE 54

| Sample | Mixing Method | FF (%) | TCU temp (° C.) | rotor speed (rpm) | rotor tip speed (m/s) | Mixer dump temp (° C.) | Mix time (s) | Specific Energy (kJ/kg) | Composite Moisture (%) | M300/ M100 | Max Tan δ |
|---|---|---|---|---|---|---|---|---|---|---|---|
| Ex. 97 | 1.6L G | 70 | 85 | 80 | 0.43 | 148 | 1007 | 2956 | 0.6 | 5.9 | 0.156 |
| Ex. 98 | 1.6L G | 70 | 85 | 105 | 0.56 | 146 | 690 | 2833 | 1.0 | 6.0 | 0.158 |
| Ex. 99 | 1.6L G | 70 | 85 | 120 | 0.64 | 146 | 582 | 2078 | 0.6 | 6.1 | 0.150 |

Example XII: Natural Rubber/Carbon Black Multi-Stage Processes

The following Example illustrates the preparation of composites comprising natural rubber (RSS3) and carbon black ("V7H") via a two-stage mix, as well as the corresponding vulcanizates. The carbon black was wetted as described in Example I for a moisture content ranging from 54% to 60% by weight. The weight of the filler and natural rubber were selected to target a carbon black loading of 51 phr in the final composite.

First stage mixing was conducted on the BB-16 mixer fitted with 4WN rotors (16 L capacity) with a ram pressure of 112 bar, and is outlined in the protocol of Table 55.

TABLE 55

| Rotor speed (rpm) | Description |
|---|---|
| 50 | Add rubber to mixer |
| Rpm 1 | Masticate rubber until earlier of 120 s and 110° C. |
| 60 | Add 3/4 filler (75%) |

TABLE 55-continued

| Rotor speed (rpm) | Description |
|---|---|
| Rpm 2 | Mix until earliest of 120 s and 130° C. |
| 60 | Add 1/4 filler and mix for 20 s |
| Rpm3 | Mix until targeted dump temp |

Second stage mixing was conducted on the BB-16 mixer fitted with 6WI rotors (14 L capacity) following the protocol of Table 56. The mixing was performed with the ram raised to its highest position. After initial mastication, mixing was performed under PID control (proportional integral differential), which allows automated control of the batch temperature via a feedback loop. A thermocouple inserted through the mixer drop door measures the batch temperature, which is transmitted to a PID controller. The output of the controller is used to control the speed of the mixer rotors.

TABLE 56

| Mixer RPM | Mixing Protocol Description |
|---|---|
| 35 | Add composite to mixer |
| Rpm1 | Masticate with ram raised for 90 s |
| Rpm2 (var) | batch temperature automatically controlled via PID control, using a set point of 135° C. 6PPD added 150 s after addition of composite to mixer was completed batch dumped 547 seconds after addition of composite to mixer was completed |

Composites were compounded with the formulation of Table 11, Formulation 4 (2 phr 6PPD was charged during the $2^{nd}$ stage), according to the method of Table 12, 1.5L Compounding E. The compound was cured at 150° C. for 30 min at a pressure of 100 kg/cm². Additional conditions as well as composite and vulcanizate properties are listed in Table 57. Mix time for $1^{st}$ stage mixing was calculated from total ram down time. Mix time for $2^{nd}$ stage mixing was total mixing time as the mixing was performed with the ram raised.

Prior to compounding, Ex. 100 SG1 was first masticated in the BB2 mixer to remove moisture. Mastication was performed at a TCU temperature of 60° C., rotor speed of 60 RPM and 65% fill factor. The composite was charged into the mixer with a sweep after 30 s, and then dumped at 130° C.

TABLE 57

| | Composite Moisture (%) | FF (%) | TCU (° C.) | Mix Time (s) | Rpm 1 | Rpm 2 | Rpm 3 | Tip speed (m/s) | Dump Temp (° C.) | Probe Temp (° C.) | SE (kJ/kg) | M300 | M300/ M100 | Max tan δ |
|---|---|---|---|---|---|---|---|---|---|---|---|---|---|---|
| Ex. 100 SG1 | 9.0 | 66 | 90 | 453 | 60 | 85 | 85 | 1.05 | 160 | 121 | 1396 | 12.1 | 5.9 | 0.165 |
| Ex. 100 SG2 | 1.4 | 35 | 50 | 547 | 35 | 35-60 | NA | NA | 130 | 131 | 1663 | 14.7 | 6.2 | 0.152 |

The data of Table 57 is compared to the dry mix and Comparative Samples of Table 51. Similar to the results of Table 51, the second stage composite, Ex. 100 SG2 had a lower moisture content than the corresponding first stage composite, Ex. 100 SG1. Moreover, for the composites prepared according to the claimed processes, both the tensile stress ratio M300/M100 and tan δ, improved with the second stage mix. Both first and second stage composites made from presently claimed process showed improved rubber properties compared to the second stage wet mix comparative Comp 6 SG2 and the dry mix comparative Dry 21 SG2 of Table 51.

Example XIII: Natural Rubber/Carbon Black (Continuous Mixing)

These Examples describe the preparation of composites comprising natural rubber (SMR 10 supplied by FGV Rubber, Malaysia) and carbon black (never-dried V10HD, 42% water content) via a continuous mixing process. Preparation of the corresponding vulcanizates is also described.

Ex. 101: In a first Example, mixing was performed with an FCM™ 6 mixer (Farrel continuous mixer from Farrel Pomini equipped with #7 and #15 rotors). A conveyer carried lumps of dry rubber, manually loaded, at a constant rate of 210 kg/h to the mixer. A hopper fed the wet carbon black pellets to a screw feeder, which in turn charged the mixer with the wet carbon black pellets at a rate of 164 kg/h (translating to a dry rate of 95 kg/h). 6PPD was charged simultaneously at a rate of 2 kg/h. After exiting the continuous mixer, the composite was conveyed to a 2-roll mill, where it was homogenized and cooled for about 5 min. The material was then sheeted. The composite was removed from the roll mill as strips. The moisture content of the composite was 4.2% by weight.

Ex. 102: In a second example, the wet carbon black was first combined with the natural rubber using a 100 L tangential Banbury mixer operating at 25 rpm for 5 min. Very little dispersion of carbon black or mastication of rubber occurred during this stage as the purpose was to get the materials into a state that could be easily fed to the continuous mixer. The mixture was dumped at 75° C. to 85° C. A conveyer carried lumps of the carbon black/rubber mixture at a constant rate of 360 kg/h to the FCM™ 6 mixer. 6PPD was charged simultaneously at a rate of 2 kg/h. After exiting the continuous mixer, the composite was conveyed to a 2-roll mill, where it was homogenized and cooled for about 5 min. The composite was removed from the roll mill as strips. The moisture content of the composite was 2.8% by weight.

Ex. 103: In a third Example, a conveyor carried lumps of natural rubber, manually loaded, to a dewatering screw press (French Oil Mill Machinery Company, Piqua, OH) at a constant rate of 300 kg/h. A hopper fed the wet carbon black pellets to a screw feeder, which in turn charged the dewatering screw press with the wet carbon black pellets at a rate of 241 kg/h (translating to a dry rate of 140 kg/h). Upon exiting the dewatering screw press, the material was transported continuously by conveyor to the FCM™ 6 mixer. 6PPD was charged to an FCM mixer at a rate of 3 kg/h. After exiting the continuous mixer, the composite was conveyed to a 2-roll mill, where it was homogenized and cooled for about 5 min. The composite was removed from the roll mill as strips. The moisture content of the composite was 0.9% by weight.

Operating parameters for the continuous mixer and the 2-roll mill are given in Table 58.

TABLE 58

| | | Ex. 101 | Ex. 102 | Ex. 103 |
|---|---|---|---|---|
| FCM TCU setting for two zones: Tz1, Tz2 | deg C. | Tz1 = 84, Tz2 = 90 | Tz1 = 94, Tz2 = 100 | Tz1 = 50, Tz2 = 60 |
| FCM Average Outlet product temp | deg C. | 117 | 134 | 160 |
| FCM Power Range | kW | 120-227 | 116-205 | 170-230 |
| FCM speed Range | rpm | 290-335 | 282-325 | 297-298 |
| FCM Tip speed Range | m/s | 2.2-2.6 | 2.2-2.5 | 2.3 |
| Roll Mill TCU Temp | deg C. | 53 | 50 | 56 |
| Roll Mill speed | rpm | 13 | 13 | 14 |
| Roll Mill Average power | kW | 61 | 71 | 60 |

To produce a vulcanized compound for testing, Ex. 101-103 composites were mixed in a batch process using the BR1600 mixer and the procedure outlined in Table 59 below:

TABLE 59

| Fill factor 70%; TCU = 50° C.; 60 rpm; ram pressure = 2.8 bar | |
|---|---|
| Time (s) | Description |
| 0 | Add composite |
| 15 | Add 6PPD, ZnO and stearic acid |
| 90 | Add curatives |
| 120 | Scrape/Sweep |
| 150 | Dump |

Comparative dry mix examples ("Dry 41 to 43") were prepared with natural rubber (SMR10) and carbon black (V10HD) at a loading to match the respective Examples 101 to 103. The dry mix examples were mixed as a batch process in a BR1600 mixer in two stages according to the procedures outlined in Table 60 and Table 61:

TABLE 60

| Fill factor 70%; TCU = 50° C.; 80 rpm; ram pressure = 2.8 bar | |
|---|---|
| Time (s) | Description |
| 0 | Add Polymer |
| 30 | Add 3/4 Filler |
| 60 | Add 1/4 Filler |

TABLE 60-continued

Fill factor 70%; TCU = 50° C.; 80 rpm;
ram pressure = 2.8 bar

| Time (s) | Description |
|---|---|
| 180 | Add 6PPD, ZnO and stearic acid |
| 240 | Scrape/Sweep |
| 300 | Dump |

TABLE 61

Fill factor 70%; TCU = 50° C.; 60 rpm;
ram pressure = 2.8 bar

| Time (s) | Description |
|---|---|
| 0 | Add composite from stage 1 and curatives |
| 30 | sweep |
| 90 | Dump |

The formulation of all the composites Ex. 101-103 and Dry 41-43 are given in Table 62. Table 63 provides properties of the composites prior to compounding and rubber properties of the corresponding vulcanizates.

TABLE 62

| | | Formulation |
|---|---|---|
| "smalls" | NR | 100 |
| | CB | var |
| | 6PPD | 2 |
| | Zinc Oxide | 3 |
| | Stearic Acid | 2.5 |
| Curatives | CBS | 1.2 |
| | Sulfur | 1.2 |

TABLE 63

| | Ex. 101 | Dry 41 | Ex. 102 | Dry 42 | Ex. 103 | Dry 43 |
|---|---|---|---|---|---|---|
| Water content of Carbon Black (%) | 42 | <1 | 42 | <1 | 42 | <1 |
| Water content of composite after stage 1 (%) | 4.2 | 0.5 | 2.8 | 0.9 | 1.2 | 0.9 |
| Total number of mixing stages | 2 | 2 | 2 | 2 | 3 | 2 |
| Final CB content (phr) | 38 | 38 | 55 | 55 | 46 | 46 |
| M100 (MPa) | 2.1 | 1.8 | 3.0 | 2.8 | 2.4 | 2.3 |
| M300 (MPa) | 12.6 | 10.3 | 18.7 | 16.8 | 15.4 | 13.5 |
| M300/M100 | 6.16 | 5.74 | 6.24 | 6.01 | 6.40 | 5.86 |
| Tan δ(max) | 0.127 | 0.138 | 0.194 | 0.216 | 0.180 | 0.175 |
| Total Specific Energy (kJ/kg) | 1440 | 1200 | | | | |

From the data of Table 63, it can be seen that vulcanizate prepared from the composite prepared by the claimed process shows: (a) higher tensile stress ratio (M300/M100), and/or (b) lower tan δ values compared to the dry mix comparative examples.

Example XIV: Natural Rubber/Silicon-Treated Carbon Black

The following Examples illustrate the preparation of composites comprising natural rubber (RSS3) and wet silicon-treated carbon black, as well as the corresponding vulcanizates. These Examples were compared with a dry mix sample. The filler used was Ecoblack™ CRX2125 silicon-treated carbon black ("EB2125") obtained from Cabot Corporation and prepared as described in U.S. Pat. No. 6,028,137, the disclosure of which is incorporated herein by reference. This silicon-treated carbon black has an STSA of 132 $m^2$/g, a COAN of 110 mL/100 g, and a silicon content of 5%. The weight of the filler and natural rubber were selected to target a loading of 56 phr or 50 phr in the final composite. The coupling agent was Si-69 silane coupling agent ("Si69"; Evonik Industries) and was added together with the first portion of the filler. The wet filler was prepared as described in Example I for a target moisture of 52-53% by weight. For Ex. 106 and Ex. 107, a 1:1 EB2125 and water by weight were blended in a container for 12 h prior to use for a moisture content of 50% by weight.

A dry mix composite was prepared in a BB-16 mixer with a 4WN rotor with smalls present at the beginning of the mixing according to the protocol outlined in Table 64. The composites with wet silicon-treated carbon black were mixed with the elastomer in a BR-1600 mixer according to the protocol of Table 65. Additional conditions are outlined in Table 66 as well as composite properties.

TABLE 64

Mixing Protocol 16L P: Dry Mix (BB-16, 4WN rotor)
Fill factor 72%; Tz = 50° C.; 50 rpm; ram pressure = 6.6 bar

| Time (s) | Description |
|---|---|
| 0 | Add polymer |
| 30 | Add 3/4 filler + Si69 |
| 60 | Add remaining filler |
| 90 | Add 6PPD only, or smalls where indicated |
| var | Dump |

TABLE 65

| Mixing Protocol 1.6L W: BR1600, 2WL ram pressure = 2.8 bar | | Mixing Protocol 1.6L V: BR1600, 2WL ram pressure = 2.8 bar | |
|---|---|---|---|
| Time or Temp | | Time or Temp | |
| 0 s | Add polymer | 0 s | Add polymer |
| 30 s | Add 3/4 filler | 30 s | Add 3/4 filler |
| 150 s or 125° C. | Add 1/4 filler | 150 s or 125° C. | Add 1/4 filler |
| 150° C. | Add 6PPD, or smalls where indicated | 140° C. | Add 6PPD |
| 155° C. | Sweep | 145° C. | Sweep |
| var | Dump | after hold at 160° C. for 2 min | Dump |

TABLE 66

| Sample | Mixing | (phr) | H₂O in filler | FF (%) | TCU temp (° C.) | Mix time (s) | dump temp (° C.) | Rotor speed (rpm) | Tip speed (m/s) | Composite Moisture % | Energy Efficiency % | Avg Liquid Release Rate (kg/kg * min) | Specific Energy kJ/kg |
|---|---|---|---|---|---|---|---|---|---|---|---|---|---|
| Dry 44[1] | 16L P | 56 | — | 72 | 50 | 149 | 133 | 133 | 50 | 0.4 | — | — | 668 |
| Dry 45 | 16L P | 56 | — | 72 | 50 | 148 | 140 | 140 | 50 | 0.4 | — | — | 704 |
| Ex. 104 | 1.6L W | 56 | 54 | 70 | 80 | 1001 | 160 | 160 | 90 | 1.3 | 38.8 | 0.022 | 2413 |
| Ex. 105[1] | 1.6L W | 56 | 54 | 70 | 90 | 669 | 160 | 160 | 90 | 1.3 | 41.5 | 0.033 | 2156 |
| Ex. 106 | 1.6L V | 50 | 50 | 70 | 80 | 835 | 160 | 160 | 105 | 0.9 | 31.1 | 0.024 | 2635 |
| Ex. 107 | 1.6L V | 50 | 50 | 70 | 80 | 863 | 160 | 160 | 105 | 0.9 | 31.2 | 0.023 | 2606 |

[1]added smalls

Composites were compounded with the formulation of Table 67 (Formulation F9) according to the method of Table 6, 1.6L Compounding C (except stage 1 fill factor=68%), or the formulation of Table 68 (Formulation F6) (except 1 phr silane added for Ex. 106 and 2 phr silane for Ex. 107), and the method of Table 53, 1.6L Compounding F. The compound was cured according to the method of Table 7, C2 or C3.

TABLE 67

Formulation F9

| | | phr |
|---|---|---|
| | NR | 100 |
| | Filler | 56 |
| | Silane | 1 |
| "Smalls" | 6PPD | 2.5 |
| | TMQ | 1.5 |
| | Zinc Oxide | 3 |
| | Stearic Acid | 2 |
| | Wax beads | 1.5 |
| Curatives | TBBS | 1.4 |
| | Sulfur | 1.2 |

TABLE 68

Formulation F6

| | | phr |
|---|---|---|
| | NR | 100 |
| | Filler | 50 |
| | Silane | 5 |
| "Smalls" | 6PPD | 2.5 |
| | TMQ | 1.5 |
| | Zinc Oxide | 3 |
| | Stearic Acid | 2 |
| | Wax beads | 1.5 |
| Curatives | TBBS | 2 |
| | Sulfur | 1.6 |

Vulcanizate properties are shown in Table 69.

TABLE 69

| Sample | Formulation | Compound | Cure | max tan δ | M100 (MPa) | M300 (MPa) | M300/M100 |
|---|---|---|---|---|---|---|---|
| Dry 44 | F9 | 1.6L Comp C | C2 | 0.149 | 2.99 | 17.50 | 5.8 |
| Dry 45 | F9 | 1.6L Comp C | C2 | 0.133 | 3.07 | 17.90 | 5.8 |
| Ex. 104 | F9 | 1.6L Comp C | C2 | 0.131 | 3.37 | 21.56 | 6.4 |
| Ex. 105 | F9 | 1.6L Comp C | C2 | 0.142 | 2.66 | 17.17 | 6.5 |
| Ex. 106 | F6 | 1.6L Comp F | C2 | 0.096 | 3.74 | 22.12 | 5.9 |
| Ex. 107 | F6 | 1.6L Comp F | C2 | 0.097 | 3.99 | 22.81 | 5.7 |

It can be seen that compared to dry mixing comparatives Dry 44 and Dry 45, the composite made from wet silicon-treated carbon black filler yielded vulcanizates having reduced tan δ values and/or increased tensile stress ratio.

Example XV: Natural Rubber/Silicon-Treated Carbon Black Multi-Stage Processes

The following Examples illustrate the preparation of composites comprising natural rubber (RSS3) and wet silicon-treated carbon black via a two-stage mix, as well as the corresponding vulcanizates. The filler used was Ecoblack™ CRX2125 silicon-treated carbon black ("EB2125") obtained from Cabot Corporation and prepared as described in U.S. Pat. No. 6,028,137, the disclosure of which is incorporated herein by reference. This silicon-treated carbon black has an STSA of 132 m²/g, a COAN of 110 mL/100 g, and a silicon content of 5%. The weight of the filler and natural rubber were selected to target a loading of 56 or 61 phr in the final composite. The wet filler was prepared as described in Example I for a moisture content of 52% to 53% by weight.

For some of the wet filler pellets, partial drying occurred during subsequent handling, reducing the moisture content to 47% to 49% by weight. This moisture content was the basis for calculating the targeted final composite filler loading of 61 phr. Ex. 108 SG1 had a revised target of 58 phr and 51% filler moisture.

Two silane coupling agents were used: all of the composites incorporated Si-69 silane coupling agent ("Si69"; Evonik Industries), with the exception of Ex. 111 and Ex. 112, which incorporated SCA-985 coupling agent (Struktol). The silane coupling agents were added together with the first portion of filler. These Examples were compared with the dry mix samples Dry 44 and Dry 45 of Example XIV, Table 69.

First stage mixes were conducted on the BB-16 mixer fitted with 4WN rotors, which has a capacity of 16 L, and ram pressure of 112 bar, following the protocol outlined in Table 70.

TABLE 70

| rotor speed (rpm) | Description |
|---|---|
| 50 | Add rubber to mixer |
| Rpm 1 | Masticate rubber until earlier of 120 secs and 110° C. |
| 60 | Add 3/4 filler + silane coupling agent |
| Rpm 2 | Mix until earliest of 120 secs and 130 C. |
| 60 | Add 1/4 filler and mix for 20 s |
| Rpm 3 | Mix |
| 60 | Add 6PPD at dump temperature minus 5° C. |
| Rpm 3 | Mix until targeted dump temperature |

After the first stage mix, the composite was processed in a TSR-125 twin-screw discharger extruder fitted with stationary knives (Kobelco Kobe Steel Group). Second stage mixes were conducted on the BB-16 mixer fitted with 6WI rotors (14.4 L capacity) according to the protocol outlined in Table 71 (16L Y). After initial mastication, mixing was performed under PID control in the same manner as discussed in Example XII. The rotor speed was automatically varied to maintain recipe temperature target for step duration. The composites from the second stage mix were dumped when the composite was estimated to be dry, based on the time, the energy used and the speed of the mixer.

TABLE 71

| Mixer RPM | Mixing Protocol 16L Y Description |
|---|---|
| 35 | Add composite |
| Rpm1 | Masticate with ram raised for 90 s |
| Rpm2 | Masticate under PID control with ram raised. Mix until earliest of target time and energy (kWh). |
| 30 | Dump |

The resulting composite was processed in a TSR-125 twin-screw discharger extruder fitted with a roller die (Kobelco Kobe Steel Group). The resulting sheet was cooled under ambient air. Filler yield loss was lower than 10 wt %, as ascertained by TGA measurements.

Vulcanizates were compounded with the formulation of Table 67 (Formulation F9), according to the method of Table 12, 1.5L Compounding E (except compounding stage 1 mixed until 180 s). The compound was cured for 30 min at a pressure of 100 kg/cm². Additional conditions as well as composite are listed in Table 72. Average specific power is reported for the first stage mix, in which average specific power for the mixing stage=specific energy/mix time, wherein mix time is the ram down time.

It can be seen that vulcanizates prepared from composites of the claimed processes showed improved tensile stress ratio over the dry mix comparatives Dry 44 and Dry 45 of Example XIV, Table 69.

Example XVI: Natural Rubber/Silicon-Treated Carbon Black Multi-Stage Processes (66L)

The following Examples illustrate the preparation of composites comprising natural rubber (RSS3) and wet silicon-treated carbon black via a two-stage mix, as well as the corresponding vulcanizates. The filler used was Ecoblack™ CRX2125 silicon-treated carbon black ("EB2125") obtained from Cabot Corporation and prepared as described in U.S. Pat. No. 6,028,137, the disclosure of which is incorporated herein by reference. This silicon-treated carbon black has an STSA of 132 m²/g, a COAN of 110 mL/100 g, and a silicon content of 5%. The wet filler was prepared as described in Example I for a target moisture content of 52% to 53% by weight. Partial drying occurred during subsequent handling, reducing the moisture content to 47% to 49% by weight. This moisture content was the basis for calculating the targeted final composite filler loading of 61 phr. Si-69 silane coupling agent ("Si69"; Evonik Industries) was used and added with the first portion of filler.

First stage mixes were conducted in the BB-72 mixer fitted with 4WN rotors (66 L capacity) and containing a heated ram heated to the same temperature as the mixer wall. The ram pressure was 155 bar. The protocol of Table 74 (66L Z) or Table 75 (66L ZZ) was used.

TABLE 72

| Example | Composite (phr) | Moisture (%) | FF | TCU (° C.) | Mix Time (s) | Rpm 1 | Rpm 2 | Rpm 3 | Tip speed (m/s) | Dump temp (° C.) | Probe Temp (° C.) | SE (kJ/kg) | Energy Efficiency % | Avg Liquid Release Rate (kg/kg * min) | Average Specific Power (kW/kg) |
|---|---|---|---|---|---|---|---|---|---|---|---|---|---|---|---|
| Ex. 108 SG1 | 58 | 7.6 | 66 | 90 | 514 | 60 | 75 | 70 | 0.85 | 150 | 124 | 1613 | 37.9 | 0.029 | 3.1 |
| Ex. 108 SG2 | | 1.1 | 35 | 50 | 498 | 35 | 35-60 | NA | NA | 136 | 137 | 1490 | | | 3.1 |
| Ex. 109 SG1 | 61 | 6.6 | 66 | 60 | 636 | 60 | 100 | 90 | 1.09 | 155 | 125 | 1984 | 33.6 | 0.026 | 3.1 |
| Ex. 109 SG2 | | 1.0 | 35 | 50 | 358 | 35 | 35-60 | NA | NA | 136 | 137 | 1179 | | | 3.1 |
| Ex. 110 SG1 | 61 | 1.5 | 66 | 75 | 536 | 60 | 80 | 90 | 1.09 | 165 | 134 | 2180 | 37.1 | 0.037 | 4.1 |
| Ex. 110 SG2 | | 0.5 | 35 | 50 | 272 | 35 | 35-47 | NA | NA | 135 | 141 | 1055 | | | 3.9 |
| Ex. 111 SG1 | 61 | 3.1 | 66 | 75 | 514 | 60 | 100 | 90 | 1.09 | 165 | 134 | 1836 | 41.8 | 0.037 | 3.6 |
| Ex. 111 SG2 | | 1.2 | 35 | 50 | 269 | 35 | 35-49 | NA | NA | 133 | 139 | 993 | | | 3.7 |
| Ex. 112 SG1 | 61 | 7.2 | 66 | 75 | 452 | 60 | 100 | 90 | 1.09 | 155 | 120 | 1402 | 46.3 | 0.036 | 3.1 |
| Ex. 112 SG2 | | 1.0 | 35 | 50 | 505 | 35 | 35-51 | NA | NA | 136 | 139 | 1552 | | | 3.1 |
| Ex. 113 SG1 | 55 | 0.8 | 66 | 75 | 527 | 60 | 100 | 90 | 1.21 | 165 | 153 | 2079 | 37.2 | 0.036 | 3.9 |
| Ex. 113 SG2 | | 0.5 | 35 | 50 | 152 | 35 | 35-47 | NA | NA | 135 | 141 | 546 | | | 3.6 |
| Ex. 114 SG1 | 55 | 5.4 | 66 | 75 | 445 | 60 | 100 | 90 | 1.09 | 160 | 130 | 1618 | 40.0 | 0.036 | 3.6 |
| Ex. 114 SG2 | | 1.0 | 35 | 50 | 317 | 35 | 35-53 | NA | NA | 136 | 135 | 1061 | | | 3.3 |

Vulcanizate properties are listed in Table 73.

TABLE 73

| Example | M300 | M300/M100 | Max tan δ |
|---|---|---|---|
| Ex. 108 SG2 | 17.9 | 6.5 | 0.161 |
| Ex. 109 SG2 | 19.3 | 6.2 | 0.154 |
| Ex. 110 SG2 | 19 | 6.2 | 0.178 |
| Ex. 111 SG1 | 17.5 | 6.0 | 0.189 |
| Ex. 111 SG2 | 18.5 | 6.2 | 0.174 |
| Ex. 112 SG2 | 18.5 | 6.2 | 0.17 |
| Ex. 113 SG2 | 19.4 | 6.2 | 0.135 |
| Ex. 114 SG2 | 17.8 | 6.2 | 0.139 |

TABLE 74

| rotor speed (rpm) | Protocol 66L Z Description |
|---|---|
| 50 | Add rubber to mixer |
| Rpm 1 | Masticate rubber until earlier of 120 secs and 110° C. |
| 60 | Add 3/4 filler |
| Rpm 2 | Mix until earliest of 120 secs and 130 C. |
| 60 | Add 1/4 filler and mix for 20 s |
| Rpm 3 | Mix |
| 60 | Add 6PPD at dump temperature minus 5° C. |
| Rpm 3 | Mix until targeted dump temperature |

TABLE 75

| Mixer RPM | Protocol 66L ZZ Description |
|---|---|
| 50 | Add rubber to mixer |
| Rpm1 | Masticate rubber until earlier of 120 s and 110° C. |
| 60 | Add 1/2 filler |
| Rpm2 | Mix until earlier of 120 s and 130° C. |
| 60 | Add 1/4 filler |
| Rpm2 | Mix until earlier of 120 s and 130° C. |
| 60 | Add 1/4 filler and mix for 20 s |
| Rpm3 | Mix |
| 60 | Add 6PPD at dump temperature minus 5° C. |
| Rpm3 | Mix until targeted dump temperature |

After the first stage mix, the composite was processed in a TSR-125 twin-screw discharge extruder fitted with stationary knives (Kobelco Kobe Steel Group). Second stage mixes were conducted on the BB-16 mixer fitted with 6WI rotors (14.4 L capacity) according to the protocol outlined in Table 71 (16L Y).

Vulcanizates were compounded with the formulation of Table 67 (Formulation F9), according to the method of Table 12, 1.5L Compounding E (except compounding stage 1 mixed until 180 s). The compound was cured for 30 min at a pressure of 100 kg/cm². Additional conditions as well as composite are listed in Table 76.

carbon black), achieving a moisture content of 57%. The butadiene rubber used was Buna® CB 22 butadiene rubber ("CB22"), Buna® Nd 22 EZ ("CB22EZ") butadiene rubber, both from Lanxess, Germany, and Zeon-Nipol®1250H BR, Zeon Europe GmBH, Germany ("1250H").

Natural rubber, butadiene rubber, and carbon black were charged separately into a BB-16 mixer. Table 78 provides the protocols for the dry mixing (16L Q) and mixing with wet filler (16L R and 16L S).

TABLE 78

| Method | Protocol 16L Q (Dry) 6WI rotor ram pressure = 6.6 bar | Protocol 16L R 4WN rotor ram pressure = 112 bar | Protocol 16L S 6WI rotor ram pressure = 6.6 bar |
|---|---|---|---|
| Elastomer added | 0 s | 0 s | 0 s |
| Filler added | 1/2 filler at 30 s; 1/2 filler at 60 s | 3/4 filler at 120 s/110° C.; 1/4 filler at 120 s or 125° C.-130°C | 3/4 filler at 120 s/110° C.; 1/4 filler at 120 s or 125° C.-130° C. |
| smalls added | 120° C. | | |
| Dump | var | var | var |

TABLE 76

| Example | Mixing Protocol | Composite Moisture (%) | FF | TCU temp (° C.) | Mix Time (s) | Rpm 1 | Rpm 2 | Rpm 3 | Tip Vel (m/s) | Dump temp (° C.) | Probe Temp (° C.) | SE (kJ/kg) | Energy Efficiency % | Avg Liquid Release Rate (kg/kg * min) | Average Specific Power (kW/kg) |
|---|---|---|---|---|---|---|---|---|---|---|---|---|---|---|---|
| Ex. 115 SG 1 | 66L Z | 10.2 | 66 | 60 | 365 | 60 | 85 | 100 | 1.85 | 160 | 105 | 1487 | 39.8 | 0.041 | 4.1 |
| Ex. 115-1 SG2 | 16L Y | 0.8 | 35 | 50 | 823 | 35 | 35-56 | NA | NA | 135 | 137 | 2172 | — | — | 2.6 |
| Ex. 115-2 SG2 | 16L Y | 0.5 | 35 | 50 | 926 | 35 | 34-55 | NA | NA | 136 | 141 | 2495 | — | — | 2.7 |
| Ex. 115-3 SG2 | 16L Y | 0.7 | 35 | 50 | 777 | 35 | 35-57 | NA | NA | 135 | 137 | 2104 | — | — | 2.7 |
| Ex. 116 SG1 | 66L ZZ | 8.3 | 66 | 60 | 424 | 60 | 80 | 100 | 1.85 | 165 | 110 | 1817 | 35.8 | 0.039 | 4.3 |
| Ex. 116-1 SG2 | 16L Y | 0.6 | 35 | 50 | 501 | 35 | 35-51 | NA | NA | 136 | 141 | 1546 | — | — | 3.1 |
| Ex. 116-2 SG2 | 16L Y | 1.3 | 35 | 50 | 217 | 35 | 35-51 | NA | NA | 136 | 133 | 1483 | — | — | 2.9 |

Vulcanizate properties are listed in Table 77.

TABLE 77

| Example | M300 | M300/M100 | Max tan δ |
|---|---|---|---|
| Ex. 115 SG 1 | — | — | — |
| Ex. 115-1 SG2 | 18.9 | 6.5 | 0.148 |
| Ex. 115-2 SG2 | 19.4 | 6.4 | 0.149 |
| Ex. 115-3 SG2 | 18.9 | 6.5 | 0.151 |
| Ex. 116 SG1 | — | — | — |
| Ex. 116-1 SG2 | 19.7 | 6.1 | 0.168 |
| Ex. 116-2 SG2 | 19.6 | 6.3 | 0.164 |

It can be seen that vulcanizates prepared from composites of the claimed processes showed improved tensile stress ratio over the dry mix comparatives Dry 44 and Dry 45 of Example XIV, Table 69.

Example XVII: Natural Rubber:Butadiene Rubber (60:40)/Carbon Black

This example describes the preparation of composites and vulcanizates comprising a 60/40 blend of natural rubber (RSS3) and butadiene rubber with carbon black fillers at a target loading of 51 phr. The carbon black used was VULCAN®10HD carbon black. Wet carbon black was prepared by the rewetting method of Example I (rewetted Certain composites were subjected to an additional mixing stage. Prior to the second mixing stage, the composite discharged from the first stage was passed either through a twin-screw discharge extruder fitted with a roller-head (TSR-125, Kobelco Kobe Steel Group), where the resulting sheet was manually cut up, or through a twin-screw discharge extruder with stationary knives (TSR-125, Kobelco Kobe Steel Group), which was used to process the composite. The time period between the first and second stage mixes was limited to less than two hours. Second stage mixes were conducted on the BB-16 mixer fitted with 6WI rotors (14 L capacity) according to the protocol Table 71 (16L Y). 6PDD in 2$^{nd}$ stage batches was added at mixer temperatures of 120-130° C.

Additional conditions are outlined in Table 79 as well as composite properties. For Ex. 122, partial drying of the wet filler resulted in a filler loading of 54 phr.

TABLE 79

| Sample | BR Type | Mixing Protocol | FF % | TCU temp (° C.) | Mix time (s) | demp temp (° C.) | Rotor speed (rpm) | Tip speed (m/s) | Composite Moisture % | Energy Efficiency % | Avg Liquid Release Rate (kg/kg * min) | Specific Energy kJ/kg | Average Specific Power |
|---|---|---|---|---|---|---|---|---|---|---|---|---|---|
| Dry 46 | CB22 | 16L Q | 72 | 50 | 135 | 140 | 50 | 0.62 | — | — | — | 635 | 4.7 |
| Ex. 117 | CB22 | 16L R | 68 | 90 | 542 | 160 | 80 | 0.99 | 2.3 | 65.4 | 0.049 | 1646 | 3.0 |
| Ex. 118 | CB22 | 16L R | 68 | 75 | 624 | 160 | 90 | 1.12 | 1.87 | 59.3 | 0.043 | 1836 | 2.9 |
| Ex. 119* | CB22 | 16L R/ 16L Y | 68/35 | 90/50 | 446/458 | 165/135 | 80/35-60 | 0.99 | 2.67/— | 61.4/— | 0.061/— | 1774/1406 | 4.0/— |
| Ex. 120* | CB22 | 16L S/ 16L Y | 68/35 | 90/50 | 591/494 | 160/120 | 75/40-120 | 0.93 | 1.99/— | 56.2/— | 0.046/— | 1972/1854 | 3.3/— |
| Ex. 121* | CB22EZ | 16L R/ 16L Y | 68/35 | 90/50 | 547/411 | 160/129 | 80/35-37 | 0.99 | 2.66/— | 66.6/— | 0.049/— | 1637/1360 | 3.0/— |
| Ex. 122* | 1250H | 16L R/ 16L Y | 68/35 | 90/50 | 495/418 | 160/129 | 80/35-60 | 0.99 | 4.14/— | 72.9/— | 0.053/— | 1438/1122 | 2.9/— |

*two-stage mixes
all values refer to 1st stage mix except for values atfer "/" indicating second stage mix conditions or results Vulcanizates were compounded with the formulation of Table 11 according to the method of Table 12, 1.6L Compounding D (except for an initial mastication stage with the BR-1600 mixer for 150 s at TCU temperature=50° C., rotor speed of 80 rpm, at 70% fill factor, for Ex. 117 and Ex. 118). The compounds were cured according to the method of Table 7, C2.

Vulcanizate properties are shown in Table 80.

TABLE 80

| Sample | BR Type | max tan δ | M100 (MPa) | M300 (MPa) | M300/M100 |
|---|---|---|---|---|---|
| Dry 46 | CB22 | 0.162 | 3.7 | 16.9 | 4.6 |
| Ex. 117 | CB22 | 0.156 | 2.7 | 14.3 | 5.3 |
| Ex. 118 | CB22 | 0.16 | 3.1 | 16.0 | 5.3 |
| Ex. 119 | CB22 | 0.153 | 2.7 | 14.8 | 5.4 |
| Ex. 120 | CB22 | 0.143 | 3.1 | 15.6 | 5.1 |
| Ex. 121 | CB22EZ | 0.153 | 2.9 | 15.6 | 5.4 |
| Ex. 122 | Nipol 1250H | 0.157 | 2.9 | 15.9 | 5.6 |

Compared to Dry 46, the composite made from wet carbon black filler, whether by a single stage or two-stage process, yielded vulcanizates having reduced tan δ values and increased tensile stress ratio.

Example XVIII: Natural Rubber:Butadiene (80:20)/Carbon Black

This example describes the preparation of composites and vulcanizates comprising an 80/20 blend of natural rubber (RSS3) and butadiene rubber with carbon black fillers to target a loading of 51 phr or 46 phr. The carbon black used was VULCAN® 10HD carbon black. Wet carbon black was prepared by the rewetting method of Example I (rewetted carbon black), achieving a moisture content of 57%. The butadiene rubber used was Buna® CB 22 butadiene rubber, Lanxess, Germany.

Natural rubber, butadiene rubber, and carbon black were charged separately into a BB-16 mixer. Mixing was performed according to the protocol of Table 78 (16L Q for non-wet carbon black, and 16L R and 16L S for wet carbon black). Certain composites were subjected to an additional mixing stage as described in Example XIV. Additional conditions are outlined in Table 81 and Table 82 as well as composite properties. Filler yield loss was <10%, as ascertained by TGA measurements.

TABLE 81

| Sample | phr | Mixing Protocol | FF % | TCU temp (° C.) | Mix time (s) | dump temp (° C.) | Composite Moisture % | Rotor speed (rpm) | Tip speed (m/s) | Energy Efficiency % | Avg Liquid Release Rate (kg/kg * min) | Specific Energy kJ/kg | Average Specific Power (kW/kg) |
|---|---|---|---|---|---|---|---|---|---|---|---|---|---|
| Dry 47 | 51 | 16 L Q | 72 | 50 | 149 | 140 | — | 50 | 0.62 | — | — | 751 | 5.0 |
| Ex. 123 | 51 | 16 L R | 68 | 90 | 491 | 160 | 4.55 | 80 | 0.99 | 62.9 | 0.045 | 1616 | 3.3 |
| Ex. 124* | 51 | 16 L R/ 16 L Y | 68/ 35 | 90/ 50 | 491/ 469 | 160/ 122 | 4.55/ 0.65 | 80/ 35-60 | 0.99/ — | —/ — | —/ — | 1616/ 1371 | 3.3/ — |

*two-stage mix; all values refer to single stage or 1st stage mix except for values after "/" indicating second stage mix conditions or results

TABLE 82

| Sample | phr | Mixing protocol | FF | TCU temp (° C.) | Mix Time (s) | Dump Temp (° C.) | Composite Moisture (%) | Rpm 1 | Rpm 2 | Rpm 3 | Probe Temp (° C.) | Energy Efficiency % | Avg Liquid Release Rate (kg/kg * min) | SE (kJ/kg) | Average Specific Power (kW/kg) |
|---|---|---|---|---|---|---|---|---|---|---|---|---|---|---|---|
| Dry 48 | 46 | 16 L Q | 72 | 50 | 108 | 142 | NA | 50 | 50 | 50 | 170 | NA | NA | 647 | 6.0 |
| Ex. 125* | 51 | 16 L S/ 16 L Y | 66/ 35 | 75/ 75 | 538/ 410 | 157/ 125 | 3.01/ 0.78 | 80/ 45 | 100/ 45-60 | 100/ NA | 121/ 134 | 47.0 | 0.050 | 2300/ 1102 | 4.3/ — |
| Ex. 126 | 46 | 16 L S/ *16 L Y | 66/ 35 | 90/ 50 | 553/ 492 | 160/ 121 | 2.59/ 0.34 | 80/ 60 | 80/ 60-90 | 80/ NA | 119/ 134 | 46.4 | 0.044 | 2109/ 1770 | 3.8/ — |

*two-stage mix; all values refer to single stage or 1st stage mix except for values after "/" indicating second stage mix conditions or results Vulcanizates were compounded with the formulation of Table 11 according to the method of Table 12, 1.6L Compounding D (except with an initial mastication stage for 150 s at TCU temperature=50° C., and rotor speed of 80 rpm for Ex. 123). The compound was cured according to the method of Table 7, C2.

Vulcanizate properties are shown in Table 83.

TABLE 83

| Sample | BR Type | max tan δ | M100 (MPa) | M300 (MPa) | M300/M100 |
|---|---|---|---|---|---|
| Dry 47 | CB22 | 0.166 | 3.7 | 17.9 | 4.8 |
| Ex. 123 | CB22 | 0.181 | 2.8 | 15.8 | 5.7 |
| Ex. 124 | CB22 | 0.177 | 2.9 | 16.6 | 5.7 |
| Dry 48 | CB22 | 0.158 | 3.1 | 15.4 | 4.9 |
| Ex. 125 | CB22 | 0.148 | 3.1 | 16.8 | 5.4 |
| Ex. 126 | CB22 | 0.139 | 2.8 | 15.3 | 5.5 |

Compared to Dry 47 and Dry 48, the composites made from wet carbon black filler yielded vulcanizates having increased tensile stress ratio and/or reduced tan δ.

Example XIX: Natural Rubber:Butadiene:Styrene-Butadiene Rubber (60:20:20)/Carbon Black This example describes the preparation of composites and vulcanizates comprising a 60/20/20 blend of natural rubber (RSS3), butadiene rubber, and s-styrene butadiene rubber with carbon black fillers to target a loading of 51 phr. The carbon black used was VULCAN® 10HD carbon black. Wet carbon black was prepared by the rewetting method of Example I (rewetted carbon black), achieving a moisture content of 57%. The butadiene rubber used was Buna® CB 22 butadiene rubber ("CB22") or Zeon-Nipol®1250H BR, Zeon Europe GmBH, Germany ("1250H"), and s-SBR used was BUNA® VSL 4525-0 S-SBR, Lanxess, Germany ("4525"). Filler yield loss was <10%, as ascertained by TGA measurements.

Natural rubber, butadiene rubber, s-SBR, and carbon black were charged separately into a BB-16 mixer. Mixing was performed according to the protocol of Table 78 (16L Q for non-wet carbon black, and 16L R or 16L S for wet carbon black). Certain composites were subjected to an additional mixing stage as described in Example XIV, except 2$^{nd}$ stage TCU temperature is indicated in Table 84. Additional conditions are outlined in Table 84 as well as composite properties.

Composites were compounded with the formulation of Table 11 according to the method of Table 12, 1.6L Compounding D (except with an initial mastication stage with the BR-1600 mixer for 150 s at TCU temperature=50° C., fill factor of 70%, and rotor speed of 80 rpm for the wet filler single-stage mixes, Ex. 127 and Ex. 128). The compound was cured according to the method of Table 7, C2. Vulcanizate properties are shown in Table 85.

TABLE 85

| Sample | BR Type | max tan δ | M100 (MPa) | M300 (MPa) | M300/M100 |
|---|---|---|---|---|---|
| Dry 49 | CB22 | 0.199 | 3.3 | 16.1 | 4.9 |
| Ex. 127 | CB22 | 0.184 | 2.7 | 14.6 | 5.4 |
| Ex. 128 | 1250H | 0.175 | 2.6 | 14.2 | 5.4 |
| Ex. 129 | CB22 | 0.182 | 2.7 | 14.5 | 5.5 |
| Ex. 130 | 1250H | 0.168 | 2.6 | 14.7 | 5.7 |

It can be seen that compared to Dry 49, the composite made from wet carbon black filler yielded vulcanizates having reduced tan δ values and increased tensile stress ratio.

Example XX: Natural Rubber/Carbon Black Composites and Vulcanizates—Characteristics This Example describes the characteristics of carbon-containing filler dispersed in natural rubber composites and corresponding vulcanizates. The characteristics include Payne effect and macrodispersion.

Additional carbon black/natural rubber samples were prepared as follows. The natural rubber used was standard grade natural rubber RSS3 or SMR20 (Ex. 140), and the carbon black used was V7H carbon black. The carbon black was milled and rewetted as described in Example I to provide wet carbon black pellets having a moisture content ranging from 55-60%, by weight.

Composites were mixed according to the first stage protocols of Table 3 (1.6L G, with the BR-1600, Ex. 140), Table 86 (BB-72 mixer, Ex. 131), Table 87 (BB-72 mixer, Ex. 141, Ex. 142, Ex. 143, and Ex. 144) below. Certain composites were subjected to a second stage mix according to the protocol of Table 71 (16L Y) as described in Example XV. Additional conditions and targeted loadings are outlined in Table 88 as well as composite properties.

TABLE 84

| Sample | BR Type | Mixing protocol | FF % | TCU temp (° C.) | Mix time (s) | dump temp (° C.) | Rotor speed (rpm) | Tip speed (m/s) | Composite Moisture % | Energy Efficiency % | Avg Liquid Release Rate (kg/kg * min) | Specific Energy kJ/kg | Average Specific Power (kW/kg) |
|---|---|---|---|---|---|---|---|---|---|---|---|---|---|
| Dry 49 | CB22 | 16 L Q | 72 | 50 | 115 | 141 | 50 | 0.62 | — | — | — | 595 | 5.2 |
| Ex. 127 | CB22 | 16 L R | 68 | 90 | 530 | 160 | 80 | 0.99 | 5.21 | 64.2 | 0.046 | 1551 | 2.9 |
| Ex. 128 | 1250H | 16 L R | 68 | 90 | 485 | 160 | 80 | 0.99 | 6.04 | 70.2 | 0.050 | 1385 | 2.9 |
| Ex. 129 | CB22 | 16 L R/ | 68/ | 90/ | 530/ | 160/ | 80/ | 0.99 | 5.21/ | 64.2/ | 0.046/ | 1551/ | 2.9/ |
|  |  | 16 L Y | 35 | 50 | 431 | 122 | 35-60 |  | 1.17 | — | — | 1210 | — |
| Ex. 130[1] | 1250H | 16 L S/ | 66/ | 90/ | 407/ | 157/ | 80/ | 0.99 | 5.92/ | 59.0/ | 0.045/ | 1739/ | 4.3/ |
|  |  | 16 L Y | 35 | 75 | 488 | 125 | 35-60 |  | 2.76 | — | — | 898 | — |

*two-stage mixes; all values refer to single stage or 1$^{st}$ stage mix except for values after "/" indicating second stage mix conditions or results

[1]1$^{st}$ stage performed at ram pressure = 6.6 bar

TABLE 86

| mixer rpm | Description |
|---|---|
| 60 | Add rubber to mixer |
| Rpm1 | Masticate rubber until earlier of 120 s and 110° C. |
| 60 | Add 1/2 filler |
| Rpm2 | Mix until earlier of 120 s and 130° C. |
| 60 | Add 1/4 filler |
| Rpm2 | Mix until earlier of 120 s and 130° C. |
| 60 | Add 1/4 filler |
| Rpm3 | Mix until 155° C. |
| 60 | Add 6PPD |
| Rpm3 | Mix until target dump temperature |

TABLE 87

| Mixer RPM | Description |
|---|---|
| 45 | Add rubber to mixer |
| Rpm1 | Masticate rubber until earlier of 120 s and 110° C. |
| 60 | Add 1/2 filler |
| Rpm2 | Mix until earlier of 120 s and 130° C. |
| 60 | Add 1/4 filler |
| Rpm2 | Mix until earlier of 120 s and 130° C. |
| 60 | Add 1/4 filler and mix for 20 seconds |
| Rpm3 | Mix until 155° C. |
| 60 | Add 6PPD |
| Rpm3 | Mix until target dump temperature |

TABLE 88

| Sample | phr | Mixing Protocol | Rotor | FF % | TCU temp (° C.) | Mix time (s) | dump temp (° C.) | Probe Temp | Rpm 1 | Rpm 2 | Rpm 3 | Tip speed (m/s) | Composite Moisture % | Specific Energy kJ/kg | Average Specific Power kW/kg |
|---|---|---|---|---|---|---|---|---|---|---|---|---|---|---|---|
| Ex. 131 SG1 | 51 | Table 86 | 4WN | 66 | 90 | 649 | 170 | | 80 | 80 | 80 | 1.49 | 2.7 | 2281 | 3.5 |
| Ex. 131-1 SG2 | 51 | 16 L Y | 6WI | 40 | 50 | 240 | 128 | 117 | 35 | 35-45 | N.A | 0.42-0.56 | 1.6 | 539 | 2.2 |
| Ex. 131-2 SG2 | 51 | 16 L Y | 6WI | 40 | 50 | 360 | 132 | 126 | 35 | 35-45 | N.A | 0.42-0.62 | 0.7 | 1085 | 3.0 |
| Ex. 140 | 62 | 1.6 L G | 2WL | 70 | 85 | 487 | 160 | 160 | 105 | 105 | 105 | 0.56 | 0.7 | 1793 | 3.7 |
| Ex. 141* | 51 | Table 87/ 16 L Y | 4WN/ 6WI | 66/ 40 | 90/ 50 | 392/ 480 | 175/ 138 | 128/ 134 | 45/ 35 | 80/ 35-55 | 80/ NA | 1.49/ 0.42-0.66 | 3.0/ 1.2 | 1730/ 1272 | 4.4/ 3.2 |
| Ex. 142* | 56 | Table 87/ 16 L Y | 4WN/ 6WI | 66/ 40 | 75/ 50 | 517/ 480 | 175/ 136 | 126/ 142 | 45 35 | 70 35-50 | 70 NA | 1.30/ 0.42-0.62 | 3.3/ 0.5 | 2024/ 1324 | 3.9/ 2.5 |
| Ex. 143* | 51 | Table 87/ 16 L Y | 4WN/ 6WI | 66/ 40 | 75/ 50 | 620/ 480 | 175/ 137 | 141 146 | 45 35 | 70 35-50 | 70 NA | 1.30/ 0.42-0.62 | 0.6/ 0.5 | 2455/ 1455 | 3.9/ 2.3 |
| Ex. 144* | 51 | Table 87/ 16 Y | 4WN/ 6WI | 66/ 40 | 75/ 50 | 508/ 480 | 175/ 137 | 128 138 | 45 35 | 80 35-50 | 80 NA | 1.49/ 0.42-0.62 | 2.7/ 1.0 | 2115/ 1545 | 3.5/ 2.5 |

*two-stage mixes; all values after "/" indicate second stage mix conditions or results Composites were compounded to form vulcanizates with the formulation of Table 11 and protocol indicated in Table 12, 1.5L Compounding E (exception of Ex. 140, which was compounded with protocol of Table 6, 1.6L Comp A). Vulcanizate properties are shown in Table 89.

TABLE 89

| Sample | max tan δ | M100 (MPa) | M300 (MPa) | M300/ M100 |
|---|---|---|---|---|
| Ex. 131 SG1 | — | — | — | — |
| Ex. 131-1 SG2 | 0.195 | 2.35 | 14.20 | 6.0 |
| Ex. 131-2 SG2 | 0.191 | 2.36 | 14.70 | 6.2 |
| Ex. 140 | 0.192 | 4.29 | 23.63 | 5.5 |
| Ex. 141 | 0.185 | 2.50 | 15.00 | 6.0 |
| Ex. 142 | 0.207 | 2.84 | 17.00 | 6.0 |
| Ex. 143 | 0.197 | 2.64 | 15.50 | 5.9 |
| Ex. 144 | 0.174 | 2.62 | 16.10 | 6.1 |

Ex. 190: Silicon-treated carbon black filler, (EB2125), which was wetted as described in Example XIV with 52-53% moisture, was mixed at target loading of 56 phr in natural rubber. First stage mix was conducted on the BB-16 mixer fitted with 4WN rotors and ram pressure of 6.6 bar. A TCU temperature of 50° C., fill factor of 66% was used. Natural rubber was first added to the mixer at 60 rpm, ¾ of wet filler and Si69 were added at 110° C. and the rotor speed was increased to 120 rpm for mixing. The remaining ¼ filler was then added at 130° C. 6PPD was added at 154° C. and dumped at 166° C. The mix time was 642 s, the resulting composite had a moisture of 3.8%. A mastication stage was applied with the BR-1600 mixer at TCU temperature of 50° C., fill factor of 70%, rotor speed of 80 rpm, and dumped at 150° C. The composite was then compounded with the formulation of Table 67 (Formulation F9) according to the method of Table 6, 1.6L Compounding C (except stage 1 fill factor=68%). The compound was cured according to the method of Table 7, C2.

Additional Liquid Masterbatch ("LMB") comparative examples were prepared by mixing a carbon black slurry with a natural rubber latex based on the methods disclosed in U.S. Pat. No. 8,586,651. Fillers and loadings are shown in Table 90.

TABLE 90

| Sample | CB | phr |
|---|---|---|
| LMB 4 | N772 | 58 |
| LMB 5 | N550 | 52 |

Composite Characteristics

Composite characteristics were determined from a combination of rheological properties (Payne Effect) and macrodispersion properties Rheological properties were determined with a rubber process analyzer (RPA; D-RPA 3000, MonTech Rubber Testing Solutions). A sample (5 g) was cut from rubber composites. Temperature was set at 100° C. and 1 Hz shear frequency was used throughout the test procedure. The test program was static for 5 min, then 10 cycles of shearing at 100% strain followed by 60 min at 0.1% strain, and finally a strain sweep from 0.1-200% strain. The Payne ratio was calculated from the ratio of dynamic storage modulus (G') at 0.1% strain to G' at 200% strain, i.e., G'(0.1%)/G'(200%). G' at 50% strain, G'(50%), was also recorded. Payne Difference was calculated from the difference of dynamic storage modulus (G') at 0.1% strain and G' at 200% strain, i.e., G'(0.1%)-G'(200%).

Macrodispersion characteristics were determined as follows. Composites were stored at 4° C. for 10-14 days. Cryo-microtome slices (1 μm thickness) were cut with a diamond knife on a PTPC PowerTome ultramicrotome instrument (RMC Boeckeler). The slices were laid flat on a glass slide for transmission optical imaging at a resolution of 0.65 μm/pixel with a field of view of 0.55 mm². At least 10 optical images were acquired for each sample with each image taken from a different slice of the same sample.

The images were processed by first correcting the uneven background of the image with a pseudo flat-field correction based on Gaussian blur. The image noises are reduced using an edge-preserving bilateral filter and the image contrast enhancement is applied when needed. The dark objects and bright objects in the image represent particles and voids, respectively. The term "particle" with respect to macrodispersion is intended to represent an area coverage of carbon black agglomerates and is differentiated from "primary particles" that form a single carbon black aggregate. The objects were separated from the image with segmentation of the image by using a suitable global or local thresholding method, which created two binary images representing the particles and voids, respectively. Image filtering and segmentation were optimized to ensure that the boundaries of the voids and particles were well defined by visual comparisons between the segmented images and the original images. The size distributions of the particles were then analyzed from their respective binary images. The size of particles were determined using area equivalent diameter of the corresponding object in the binary image, where area equivalent diameter is:

Area Equivalent Diameter=(4*Area of Dark objects/π)$^{1/2}$

The smallest area equivalent diameter that can be resolved is 2 microns. Both number weighted distribution and area weighted distribution of the particles were calculated. The absolute number of particles per unit image area as well as percentage of the areas of particles in the image were computed. In addition, the statistical analysis of the distributions of the particles were performed after all images from the same samples were analyzed. The reported particle size at a defined cumulative percentile (e.g. d90) of the size distribution was reported as the average value of all the individual distributions measured for the same sample.

Composite characteristics were assessed by Payne ratio, Payne Difference, G'(50%), % area from particles >2 μm (as determined by [total area of particles having an area-equivalent diameter of ≥2 μm]/[total imaging area]×100), and $d_{90}$ particle size, area weighted (as determined by $d_{90}$ of the area-equivalent diameter (μm) of filler particles in the composite). The characteristics of the measured composites are shown in Table 91.

TABLE 91

| Sample | Elastomer | % area from particles >2 μm (B) | 1.25 * B | $d_{90}$ particle size (μm), area weighted (A) | G'(0.1%) (kPa) | G'(50%) (kPa) | G'(200%) (kPa) | 0.1 * G'(50%) | Payne ratio | Payne difference (kPa) |
|---|---|---|---|---|---|---|---|---|---|---|
| Dry 1 | SMR20 | 15.80 | 19.75 | 30.70 | N/A | N/A | N/A | N/A | N/A | N/A |
| Dry 4 | SMR20 | 7.62 | 9.53 | 27.20 | N/A | N/A | N/A | N/A | N/A | N/A |
| Dry 12 | SMR20 | 5.66 | 7.08 | 20.45 | 1627.2 | 168.7 | 57.5 | 16.9 | 28.3 | 1569.7 |
| Dry 13 | SMR20 | 11.07 | 13.84 | 30.13 | 1838.9 | 192.3 | 64.6 | 19.2 | 28.5 | 1774.3 |
| Dry 14 | SMR20 | 10.68 | 13.35 | 23.15 | 2282.4 | 206.3 | 65.6 | 20.6 | 34.8 | 2216.8 |
| Dry 15 | SMR20 | 10.82 | 13.53 | 25.45 | 2446.7 | 220.4 | 76.5 | 22.0 | 32.0 | 2370.2 |
| Dry 16 | SMR20 | 4.38 | 5.48 | 15.40 | 355.8 | 164.8 | 36.1 | 16.5 | 9.9 | 319.7 |
| Dry 17 | SMR20 | 4.63 | 5.79 | 21.49 | 1469.7 | 164.6 | 54.5 | 16.5 | 27.0 | 1415.2 |
| Dry 18 | SMR20 | 1.48 | 1.85 | 15.63 | 633.7 | 179.8 | 47.4 | 18.0 | 13.4 | 586.3 |
| Dry 19 | SMR20 | 10.88 | 13.60 | 24.96 | 446.4 | 142.8 | 43.0 | 14.3 | 10.4 | 403.4 |
| Dry 21 | RSS3 | 33.89 | 42.36 | 50.81 | 1831.2 | 270.4 | 79.2 | 27.0 | 23.1 | 1752.0 |
| Dry 47 | RSS3/CB22 80/20 | N/A | N/A | N/A | 1681.9 | 232.9 | 48.2 | 23.3 | 34.9 | 1633.7 |
| Dry 46 | RSS3/CB22 60/40 | N/A | N/A | N/A | 1839.7 | 224.3 | 47.1 | 22.4 | 39.1 | 1792.6 |
| Dry 49 | RSS3/CB22/ VSL 4525-0 60/20/20 | N/A | N/A | N/A | 1765.1 | 228.7 | 46.2 | 22.9 | 38.2 | 1718.9 |
| Comp 1 | SMR20 | 6.22 | 7.78 | 30.00 | N/A | N/A | N/A | N/A | N/A | N/A |
| Comp 2 | SMR20 | 12.09 | 15.11 | 59.50 | N/A | N/A | N/A | N/A | N/A | N/A |
| Comp 7 | SMR20 | 4.04 | 5.05 | 40.71 | 1295.4 | 193.4 | 80.1 | 19.3 | 16.2 | 1215.3 |
| Comp 8 | SMR20 | 10.95 | 13.69 | 36.49 | 1099.0 | 187.3 | 78.8 | 18.7 | 14.0 | 1020.2 |
| Comp 9 | SMR20 | 2.48 | 3.10 | 27.67 | 438.2 | 158.3 | 37.5 | 15.8 | 11.7 | 400.7 |
| Comp 10 | SMR20 | 3.31 | 4.14 | 28.66 | 1030.3 | 277.4 | 82.9 | 27.7 | 12.4 | 947.4 |
| Ex. 14 | SMR20 | 12.71 | 15.89 | 13.23 | 1129.4 | 320.1 | 90.0 | 32.0 | 12.6 | 1039.4 |
| Ex. 15 | SMR20 | 8.24 | 10.30 | 11.54 | 1133.6 | 294.5 | 86.5 | 29.5 | 13.1 | 1047.1 |
| Ex. 16 | SMR20 | 5.82 | 7.28 | 12.71 | 1896.1 | 322.2 | 108.8 | 32.2 | 17.4 | 1787.3 |
| Ex. 17 | SMR20 | 6.00 | 7.50 | 12.80 | 2063.8 | 337.3 | 114.3 | 33.7 | 18.1 | 1949.5 |
| Ex. 18 | SMR20 | 6.59 | 8.24 | 13.78 | 2220.5 | 366.8 | 131.6 | 36.7 | 16.9 | 2088.9 |
| Ex. 19 | SMR20 | 6.94 | 8.68 | 17.21 | 2244.6 | 366.3 | 129.2 | 36.6 | 17.4 | 2115.4 |
| Ex. 20 | SMR20 | 2.50 | 3.13 | 9.41 | 511.3 | 223.6 | 47.1 | 22.4 | 10.9 | 464.2 |
| Ex. 21 | SMR20 | 2.74 | 3.43 | 9.74 | 519.0 | 228.3 | 47.0 | 22.8 | 11.0 | 472.0 |
| Ex. 22 | SMR20 | 9.84 | 12.30 | 13.66 | 1477.4 | 327.1 | 103.0 | 32.7 | 14.3 | 1374.4 |
| Ex. 23 | SMR20 | 8.19 | 10.24 | 12.87 | 1045.7 | 281.6 | 84.5 | 28.2 | 12.4 | 961.2 |
| Ex. 24 | SMR20 | 9.79 | 12.24 | 15.93 | 1549.1 | 335.9 | 106.0 | 33.6 | 14.6 | 1443.1 |
| Ex. 26 | SMR20 | 3.12 | 3.90 | 11.04 | 716.4 | 261.4 | 69.5 | 26.1 | 10.3 | 646.9 |
| Ex. 27 | SMR20 | 6.78 | 8.48 | 11.79 | 589.4 | 230.9 | 57.7 | 23.1 | 10.2 | 531.7 |
| Ex. 28 | SMR20 | 7.87 | 9.84 | 11.33 | 745.7 | 248.5 | 66.0 | 24.9 | 11.3 | 679.7 |
| Ex. 68 | RSS3 | 7.85 | 9.81 | 18.26 | 1615.7 | 315.1 | 100.9 | 31.5 | 16.0 | 1514.8 |

TABLE 91-continued

| Sample | Elastomer | % area from particles >2 μm (B) | 1.25 * B | d$_{90}$ particle size (μm), area weighted (A) | G'(0.1%) (kPa) | G'(50%) (kPa) | G'(200%) (kPa) | 0.1 * G'(50%) | Payne ratio | Payne difference (kPa) |
|---|---|---|---|---|---|---|---|---|---|---|
| Ex. 71 | RSS3 | 24.85 | 31.06 | 35.30 | 1990.9 | 386.7 | 120.7 | 38.7 | 16.5 | 1870.2 |
| Ex. 131 SG1 | RSS3 | 25.85 | 32.31 | 33.16 | 1761.7 | 369.1 | 114.3 | 36.9 | 15.4 | 1647.4 |
| Ex. 131-1 SG2 | RSS3 | 11.94 | 14.93 | 23.16 | 1708.6 | 364.0 | 108.7 | 36.4 | 15.7 | 1599.9 |
| Ex. 131-2 SG2 | RSS3 | 6.72 | 8.40 | 19.99 | 1658.3 | 351.6 | 104.1 | 35.2 | 15.9 | 1554.2 |
| Ex. 140 | SMR20 | 8.68 | 10.85 | 21.80 | 1905.2 | 336.5 | 120.6 | 33.7 | 15.8 | 1784.6 |
| Ex. 141 | RSS3 | 11.54 | 14.43 | 13.92 | 1579.0 | 354.5 | 112.3 | 35.5 | 14.1 | 1466.7 |
| Ex. 142 | RSS3 | 10.38 | 12.98 | 14.79 | 2306.0 | 365.6 | 120.6 | 36.6 | 19.1 | 2185.4 |
| Ex. 143 | RSS3 | 31.55 | 39.44 | 32.52 | 1806.5 | 318.0 | 91.7 | 31.8 | 19.7 | 1714.8 |
| Ex. 144 | RSS3 | 16.56 | 20.70 | 11.87 | 1716.2 | 323.2 | 101.8 | 32.3 | 16.9 | 1614.4 |
| Ex. 124 | RSS3/CB22 80/20 | N/A | N/A | N/A | 2581.3 | 341.7 | 112.7 | 34.2 | 22.9 | 2468.6 |
| Ex. 122 | RSS3/NIPOL 1250H 60/40 | 13.96 | 17.45 | 17.12 | 1862.5 | 301.7 | 109.0 | 30.2 | 17.1 | 1753.5 |
| Ex. 130 | RSS3/NIPOL 1250H/VSL 4525-0 60/20/20 | N/A | N/A | N/A | 1628.5 | 296.5 | 99.5 | 29.7 | 16.4 | 1529.0 |
| LMB 1 | | 0.20 | | 8.06 | 1620.3 | 204.5 | 81.5 | 20.5 | 19.9 | 1538.8 |
| LMB 2 | | 0.39 | | 9.82 | 1013.7 | 278.6 | 93.9 | 27.9 | 10.8 | 919.8 |
| LMB 3 | | 0.34 | | 8.58 | 1301.4 | 295.6 | 106.0 | 29.6 | 12.3 | 1195.4 |
| LMB 4 | | 0.24 | | 8.49 | 349.4 | 178.4 | 39.2 | 17.8 | 8.9 | 310.2 |
| LMB 5 | | 0.64 | | 6.59 | 812.0 | 281.3 | 86.0 | 28.1 | 9.4 | 726.0 |

The composites prepared by the claimed processes show rheological behavior distinct from dry-mixed composites. More specifically, the rheological behavior can be summarized by following relationship:

$$G'(0.1\%)/G'(200\%) \leq 0.1 \cdot G'(50\%) - y$$

The value y can range from 7 to 10. From the data of Table 91, it can be seen that at a similar level of reinforcement, as indicated by G'(50%), the exemplary composites show a lower Payne Ratio at any of the recited y values. Moreover, when comparing similar levels of Payne Ratio, the exemplary composites shows higher reinforcement than the dry mix composites.

The macrodispersion characteristics can be summarized by the following relationship:

$$A \leq 1.25 \cdot B + x$$

wherein:

A is d$_{90}$ of the area-equivalent diameter (μm) of filler particles in the composite, and $$B \text{ is } \frac{[\text{total area of particles having an area - equivalent diameter of} \geq 2\ \mu m]}{[\text{total imaging area}]} \times 100\%$$

wherein B≥1% and x is a number ranging from 15 to 20.

At any of the recited values for B and x, the data of Table 91 shows that the exemplary composites have a higher concentration of particles that are larger than 2 μm compared to the liquid masterbatch samples. Nonetheless, the exemplary composites show M300/M100 and max tan δ properties that are comparable to those of the liquid masterbatch samples, as can be seen by the data of Table 8 and Table 13.

The comparative examples have distinctly different macrodispersion than the exemplary composites, showing larger particle size d$_{90}$ at equal % of area from particles that are larger than 2 μm; i.e. for similar % of area from particles that are larger than 2 μm, the sizes (area-equivalent diameter) of the particles in the comparatives are significantly larger.

Vulcanizate Characteristics

Vulcanizate characteristics were determined from a combination of resistivity and macrodispersion properties. Electrical resistivity, R, (ohm·cm) was measured following ASTM D991 (Rubber Property Volume Resistivity of Electrically Conductive Antistatic Products). Equipment used included a Model 831 Volume Resistivity Test Fixture (Electro-tech Systems, Inc.; Perkasie, PA), designed to measure standard 3"×5" samples, and an Acopian Power Supply, model P03.5HA8.5 with output 0-3500 V and up to 8.5 mA. Two Tenma multimeters (TENMA® 72-1055 Bench Digital Multimeter; Newark, Mississauga, Ontario) were used to measure voltage and current respectively for the 4-point resistance measurement setup as described in the test method. Macrodispersion properties for the vulcanizates were obtained as described for the composites except that the samples were measured at room temperature and did not require cold storage temperatures.

Table 92 lists the resistivity and macrodispersion properties of the vulcanizates.

TABLE 92

| Sample | Elastomer | CB (phr) | COAN | BET (m²/g) | STSA (m²/g) | BET/ STSA | δ (nm) | Ln(R) | (Ln(R) − 3.8)/ (0.28 * δ) | No. particles/mm² >4 μm (v) | 0.0004 * v |
|---|---|---|---|---|---|---|---|---|---|---|---|
| Dry 1 | SMR20 | 50 | 101 | 140 | 129 | 1.1 | 7.3 | 5.5 | 0.83 | 297 | 0.12 |
| Dry 4 | SMR20 | 50 | 101 | 140 | 129 | 1.1 | 7.3 | 4.9 | 0.54 | 154 | 0.06 |
| Dry 12 | SMR20 | 50 | 101 | 140 | 129 | 1.1 | 7.3 | 5.1 | 0.64 | 46 | 0.02 |
| Dry 13 | SMR20 | 50 | 100 | 166 | 150 | 1.1 | 6.2 | 5.1 | 0.75 | 80 | 0.03 |

TABLE 92-continued

| Sample | Elastomer | CB (phr) | COAN | BET (m²/g) | STSA (m²/g) | BET/ STSA | δ (nm) | Ln(R) | (Ln(R) − 3.8)/ (0.28 * δ) | No. particles/mm² >4 μm (v) | 0.0004 * v |
|---|---|---|---|---|---|---|---|---|---|---|---|
| Dry 17 | SMR20 | 50 | 102 | 124 | 112 | 1.1 | 8.2 | 5.0 | 0.52 | 15 | 0.01 |
| Dry 19 | SMR20 | 40 | 88 | 83 | 76 | 1.1 | 19.5 | 9.0 | 0.95 | 326 | 0.13 |
| Dry 21 | RSS3 | 51 | 102 | 124 | 112 | 1.1 | 8.2 | 4.8 | 0.42 | 7 | 0.00 |
| Dry 47 | RSS3/CB22 80/20 | 51 | 101 | 140 | 129 | 1.1 | 7.0 | 4.9 | 0.58 | 2667 | 1.07 |
| Dry 46 | RSS3/CB22 60/40 | 51 | 101 | 140 | 129 | 1.1 | 7.0 | 4.8 | 0.53 | 2180 | 0.87 |
| Dry 49 | RSS3/CB22/ VSL 4525-0 60/20/20 | 51 | 101 | 140 | 129 | 1.1 | 7.0 | 4.4 | 0.30 | 1029 | 0.41 |
| Comp 1 | SMR20 | 50 | 101 | 140 | 129 | 1.1 | 7.8 | 5.8 | 0.92 | 424 | 0.17 |
| Comp 2 | SMR20 | 50 | 101 | 140 | 129 | 1.1 | 10.7 | 5.4 | 0.53 | 451 | 0.18 |
| Comp 7 | SMR20 | 50 | 101 | 140 | 129 | 1.1 | 7.3 | 4.8 | 0.49 | 142 | 0.06 |
| Comp 8 | SMR20 | 50 | 100 | 166 | 150 | 1.1 | 6.2 | 5.5 | 0.98 | 337 | 0.13 |
| Comp 10 | SMR20 | 50 | 102 | 124 | 112 | 1.1 | 8.2 | 4.2 | 0.17 | 56 | 0.02 |
| Ex. 14 | SMR20 | 41 | 100 | 166 | 150 | 1.1 | 9.0 | 8.1 | 1.70 | 1149 | 0.46 |
| Ex. 15 | SMR20 | 41 | 100 | 166 | 150 | 1.1 | 9.0 | 8.2 | 1.74 | 544 | 0.22 |
| Ex. 22 | SMR20 | 50 | 102 | 124 | 112 | 1.1 | 8.2 | 6.8 | 1.31 | 688 | 0.28 |
| Ex. 23 | SMR20 | 43 | 102 | 124 | 112 | 1.1 | 11.1 | 7.7 | 1.26 | 215 | 0.09 |
| Ex. 24 | SMR20 | 50 | 102 | 124 | 112 | 1.1 | 8.2 | 6.9 | 1.35 | 406 | 0.16 |
| Ex. 27 | SMR20 | 40 | 88 | 83 | 76 | 1.1 | 19.5 | 11.6 | 1.43 | 521 | 0.21 |
| Ex. 28 | SMR20 | 45 | 88 | 83 | 76 | 1.1 | 16.3 | 10.2 | 1.40 | 488 | 0.20 |
| Ex. 68 | RSS3 | 51 | 102 | 124 | 112 | 1.1 | 8.2 | 6.1 | 1.01 | 76 | 0.03 |
| Ex. 71 | RSS3 | 51 | 102 | 124 | 112 | 1.1 | 8.2 | 6.6 | 1.22 | 228 | 0.09 |
| Ex. 131 SG1* | RSS3 | 51 | 102 | 124 | 112 | 1.1 | 8.2 | N/A | N/A | N/A | N/A |
| Ex. 131-1 SG2 | RSS3 | 51 | 102 | 124 | 112 | 1.1 | 8.2 | 6.2 | 1.07 | 86 | 0.03 |
| Ex. 131-2 SG2 | RSS3 | 51 | 102 | 124 | 112 | 1.1 | 8.2 | 6.4 | 1.16 | 168 | 0.07 |
| Ex. 140 | SMR20 | 62 | 102 | 124 | 112 | 1.1 | 4.4 | 5.3 | 1.23 | 679 | 0.27 |
| Ex. 141 | RSS3 | 51 | 102 | 124 | 112 | 1.1 | 8.2 | 6.6 | 1.23 | 181 | 0.07 |
| Ex. 142 | RSS3 | 56 | 102 | 124 | 112 | 1.1 | 6.1 | 6.2 | 1.42 | 318 | 0.13 |
| Ex. 143 | RSS3 | 51 | 102 | 124 | 112 | 1.1 | 8.2 | 6.8 | 1.30 | 272 | 0.11 |
| Ex. 144 | RSS3 | 51 | 102 | 124 | 112 | 1.1 | 8.2 | 6.8 | 1.32 | 95 | 0.04 |
| Ex. 124 | RSS3/CB22 80/20 | 51 | 101 | 140 | 129 | 1.1 | 7.0 | 6.7 | 1.47 | 391 | 0.16 |
| Ex. 122 | RSS3/NIPOL 1250H 60/40 | 51 | 101 | 140 | 129 | 1.1 | 7.0 | 7.0 | 1.65 | 267 | 0.11 |
| Ex. 130 | RSS3/NIPOL 1250H/VSL 4525-0 60/20/20 | 51 | 101 | 140 | 129 | 1.1 | 7.0 | 6.7 | 1.51 | 98 | 0.04 |
| LMB 1 | | 41 | 100 | 166 | 150 | 1.1 | 9.0 | 7.0 | 1.26 | 53 | |
| LMB 2 | | 43 | 102 | 124 | 112 | 1.1 | 11.1 | 6.4 | 0.84 | 26 | |
| LMB 3 | | 50 | 102 | 124 | 112 | 1.1 | 8.2 | 6.0 | 0.96 | 43 | |

*Stage 1 intermediate was not cured

It was observed that for vulcanizates prepared from the inventive composites, the resistivity and macrodispersion properties had the following relationship:

$$[\ln(R) - 3.8]/[0.28 \cdot \delta] \geq 0.0004 \cdot v + 0.9, \text{ wherein}$$

Delta (δ) was calculated according to the following equation:

$$\delta = (6000 \cdot [0.806 \cdot \phi^{-1/3} \beta^{-1/3} - 1]/\rho S) \times \beta^{1.43}$$

wherein:
ϕ=volume fraction of carbon black in the composite,
S=BET surface area of the carbon black in m²/g,
ρ=carbon black density, assumed to be 1.8 g/cm³,
β=$\phi_{eff}/\phi$,
$\phi_{eff}$ is the effective volume fraction of carbon black taking into account occluded rubber calculated from: $\phi_{eff}=\phi$ [1+(0.0181*COAN)]/1.59, wherein COAN is the compressed oil absorption number of the carbon black as determined by ASTM D3493.

The concentration of large particles in the vulcanizates is indicated by v, the number of particles/mm² having an area equivalent diameter >4 μm. It can be seen that the (Ln(R)−3.8)/(0.28*δ) values of the exemplary vulcanizates is greater than those of the dry mix and comparative vulcanizates for any of the recited v values. The liquid masterbatch examples show properties comparable to those of the exemplary vulcanizates. The value of v>=65 separating these two groups of vulcanizates was determined by the upper limit of 95% confidence interval of (v) for liquid masterbatch example.

Resistivity index values have been calculated to demonstrate that the electrical resistivity of vulcanizates made from the inventive composites are higher compared to vulcanizates made from dry-mixed composites having the same carbon black, filler loading, polymer type, and compound formulation (dry-mixed equivalent). The resistivity index, or $\ln(R)_{index}$ value, is expressed as a ratio of the ln(R) of vulcanizates from the inventive composites over the ln(R) value of the comparable dry-mixed equivalent multiplied by 100.

$$\text{Ln}(R)_{index} = [\ln(R) \text{ of example}]/[\ln(R) \text{ of dry-mixed equivalent}] * 100$$

An index value greater than 100 indicates that the exemplary vulcanizate has higher electrical resistivity than a dry-mixed vulcanizate of similar composition. The ln(R) values for the comparative and present vulcanizates, and their respective index values are shown in Table 93 below.

It can be seen that each of the present vulcanizates has a resistivity index of at least 105, or at least 110, and in many cases at least 120, indicating a ln(R) improvement of at least 5%, 10%, or at least 20%, over the dry mix equivalent.

TABLE 93

| Sample | CB Type | CB (phr) | Rubber | Formula | Compounding | Cure | M300/ M100 | Max tan δ | Ln(R) | Ln(R)$_{index}$ |
|---|---|---|---|---|---|---|---|---|---|---|
| Dry 17 | V7H | 50 | SMR20 | F1 | 1.6 L Comp C' | C1 | 5.5 | 0.190 | 5.0 | 100 |
| Ex. 22 | V7H | 50 | SMR20 | F1 | 1.6 L Comp A | C1 | 6.3 | 0.166 | 6.8 | 136 |
| Dry 19 | N330 | 40 | SMR20 | F1 | 1.6 L Comp C' | C1 | 5.7 | 0.127 | 9.0 | 100 |
| Ex. 27 | N330 | 40 | SMR20 | F1 | 1.6 L Comp A | C1 | 6.2 | 0.100 | 11.6 | 129 |
| Dry 21 | V7H | 51 | RSS3 | F4 | 1.5 L Comp E | C2' | 5.5 | 0.212 | 4.8 | 100 |
| Ex. 68 | V7H | 51 | RSS3 | F4 | 1.5 L Comp E | C2' | 6.0 | 0.192 | 6.1 | 128 |
| Ex. 71 | V7H | 51 | RSS3 | F4 | 1.5 L Comp E | C2' | 5.8 | 0.197 | 6.6 | 138 |
| Ex. 131-1 SG2 | V7H | 51 | RSS3 | F4 | 1.5 L Comp E | C2' | 6.0 | 0.195 | 6.2 | 131 |
| Ex. 131-2 SG2 | V7H | 51 | RSS3 | F4 | 1.5 L Comp E | C2' | 6.2 | 0.191 | 6.4 | 135 |
| Ex. 144 | V7H | 51 | RSS3 | F4 | 1.5 L Comp E | C2' | 6.1 | 0.174 | 6.8 | 143 |
| Dry 18 | N550 | 52 | SMR20 | F1 | 1.6 L Comp C' | C1 | 4.8 | 0.117 | 8.4 | 100 |
| Ex. 26 | N550 | 52 | SMR20 | F1 | 1.6 L Comp A | C1 | 5.3 | 0.099 | 11.6 | 138 |
| Dry 47 | V10HD | 51 | RSS3/CB22 80/20 | F4 | 1.6 L Comp D | C2 | 4.8 | 0.166 | 4.9 | 100 |
| Ex. 124 | V10HD | 51 | RSS3/CB22 80/20 | F4 | 1.6 L Comp D | C2 | 5.7 | 0.177 | 6.7 | 135 |
| Dry 46 | V10HD | 51 | RSS3/CB22 60/40 | F4 | 1.6 L Comp D | C2 | 4.6 | 0.162 | 4.8 | 100 |
| Ex. 122 | V10HD | 51 | RSS3/NIPOL 1250H 60/40 | F4 | 1.6 L Comp D | C2 | 5.6 | 0.157 | 7.0 | 145 |
| Dry 49 | V10HD | 51 | RSS3/CB22/ VSL 4525-0 60/20/20 | F4 | 1.6 L Comp D | C2 | 4.9 | 0.199 | 4.4 | 100 |
| Ex. 130 | V10HD | 51 | RSS3/NIP0L 1250H/VSL 4525-0 60/20/20 | F4 | 1.6 L Comp D | C2 | 5.7 | 0.168 | 6.7 | 154 |
| Dry 44 | EB2125 | 56 | RSS3 | F9 | 1.6 L Comp C | C2 | 5.8 | 0.149 | 8.3 | 100 |
| Ex. 190 | EB2125 | 56 | RSS3 | F9 | 1.6 L Comp C | C2 | 6.6 | 0.138 | 10.6 | 129 |
| Dry 14 | CRX1490 | 50 | SMR20 | F1 | 1.6 L Comp C' | C1 | 5.6 | 0.221 | 3.7 | 100 |
| Ex. 16 | CRX1490 | 50 | SMR20 | F1 | 1.6 L Comp A | C1 | 6.1 | 0.206 | 4.0 | 108 |
| Ex. 17 | CRX1490 | 50 | SMR20 | F1 | 1.6 L Comp B | C1 | 6.1 | 0.206 | 4.1 | 111 |
| Dry 15 | CRX1483 | 50 | SMR20 | F1 | 1.6 L Comp C' | C1 | 5.6 | 0.236 | 3.0 | 100 |
| Ex. 18 | CRX1483 | 50 | SMR20 | F1 | 1.6 L Comp A | C1 | 6.2 | 0.210 | 3.6 | 120 |
| Ex. 19 | CRX1483 | 50 | SMR20 | F1 | 1.6 L Comp B | C1 | 6.0 | 0.210 | 3.4 | 113 |

C2' = cure at 150° C. for 30 min at 100 kg/cm$^2$

It can be seen that each of the present vulcanizates has a resistivity index of at least 105, or at least 110, and in many cases at least 120, indicating a ln(R) improvement of at least 5%, 10%, and at least 20%, over the dry mix equivalent.

Example XXI: Energy after Filler Addition

As disclosed herein, mixing with wet fillers results in higher specific energies compared to typical mixing processes with dry fillers. Table 94 lists total specific energies for total mixing time (total specific energy), after 75% of filler addition ($E_{75\%\ Filler}$), and after 100% of filler addition ($E_{100\%\ Filler}$). Specific energy after 75% or 100% filler addition was determined time after the respective addition steps until discharge.

TABLE 94

| Sample ID | Total specific energy (kJ/kg) | $E_{100\% \ Filler}$ (kJ/kg) | $E_{75\% \ Filler}$ (kJ/kg) | Composite Moisture % |
|---|---|---|---|---|
| Comp 1 | 916 | 471 | 895 | 14.9 |
| Comp 2 | 1287 | 1028 | | 4.5 |
| Comp 3 | 1430 | 964 | | 8.0 |
| Comp 5 | 674 | 339 | | 15.6 |
| Comp 7 | 1488 | 1036 | | 0.8 |
| Comp 8 | 1217 | 444 | | 0.7 |
| Comp 9 | 1115 | 648 | 1030 | 1.8 |
| Comp 10 | 1352 | 797 | 1249 | 1.1 |
| Comp 11 | 1335 | | | 11.4 |
| Comp 12 | 1239 | | | 6.5 |
| Comp 13 | 1617 | | | 7.3 |
| Ex. 4 | 2046 | 1547 | | 1.1 |
| Ex. 5 | 1844 | 1352 | 1745 | 1.3 |
| Ex. 6 | 1925 | 1581 | | 1.1 |
| Ex. 7 | 1727 | 1352 | 1654 | 0.9 |
| Ex. 8 | 1629 | 1330 | | 1.5 |
| Ex. 9 | 1698 | 1380 | | 0.7 |
| Ex. 10 | 1699 | 1223 | | 1.3 |
| Ex. 11 | 1640 | 1255 | | 1.1 |
| Ex. 12 | 1699 | 1279 | | 1.2 |
| Ex. 13 | 1757 | 1618 | | 1.5 |
| Ex. 14 | 2160 | 1661 | | 1.3 |
| Ex. 15 | 2070 | 1553 | | 0.9 |
| Ex. 16 | 1933 | 1457 | 1845 | 1.3 |
| Ex. 17 | 1992 | 1537 | 1939 | 1.6 |
| Ex. 18 | 2285 | 1749 | 2156 | 0.8 |
| Ex. 19 | 2314 | 1767 | 2200 | 1.1 |
| Ex. 20 | 1810 | 1400 | 1502 | 0.4 |
| Ex. 21 | 1666 | 1342 | 1496 | 0.8 |
| Ex. 22 | 1640 | 1232 | | 0.7 |
| Ex. 23 | 1821 | 1404 | | 0.7 |
| Ex. 24 | 1933 | 1500 | | 0.9 |
| Ex. 25 | 1793 | 1356 | | 0.7 |
| Ex. 26 | 1691 | 1385 | 1614 | 0.4 |
| Ex. 27 | 1836 | 1417 | 1646 | 0.5 |
| Ex. 28 | 1810 | 1390 | | 0.6 |
| Ex. 31 | 2809 | 1372 | 1970 | 1.1 |
| Ex. 32 | 2243 | 1510 | 1821 | 1.3 |
| Ex. 33 | 2135 | 1355 | 1715 | 1.3 |
| Ex. 34 | 2007 | 1319 | 1599 | 2.0 |
| Ex. 35 | 2300 | 1456 | 1834 | 1.0 |
| Ex. 36 | 1819 | 1340 | 1479 | 2.0 |
| Ex. 37 | 2650 | 1761 | 2128 | 2.1 |
| Ex. 38 | 2122 | 1357 | 1730 | 2.2 |
| Ex. 39 | 2515 | 1762 | 2192 | 1.0 |
| Ex. 40 | 2705 | 1941 | 2299 | 1.2 |
| Ex. 41 | 4144 | 3314 | 3570 | 0.9 |
| Ex. 42 | 2899 | 2047 | 2353 | 1.0 |
| Ex. 43 | 3334 | 2529 | 2888 | 1.3 |
| Ex. 44 | 1794 | 1184 | 1467 | 2.7 |
| Ex. 45 | 1821 | 1195 | 1476 | 3.0 |
| Ex. 48 | 1787 | 1255 | 1475 | 3.4 |
| Ex. 50 | 2515 | 1762 | 2192 | 1.0 |
| Ex. 52 | 1974 | 1260 | 1602 | 1.8 |
| Ex. 55 | 3047 | 1751 | 2376 | 0.9 |
| Ex. 56 | 2725 | 1516 | 2180 | 0.7 |
| Ex. 57 | 2332 | 1559 | 1859 | 1.0 |
| Ex. 58 | 2314 | 1420 | 1794 | 1.8 |
| Ex. 59 | 2635 | 1610 | 2008 | 0.5 |
| Ex. 60 | 2436 | 1458 | 1883 | 1.3 |
| Ex. 61 | 2216 | 1669 | 1859 | 0.7 |
| Ex. 62 | 2517 | 1650 | 2038 | 1.4 |
| Ex. 63 | 2492 | 1556 | 2037 | 1.1 |
| Ex. 64 | 2582 | 1493 | 2015 | 1.1 |
| Ex. 65 | 2415 | 1527 | 1960 | 1.9 |
| Ex. 66 | 2002 | 1445 | 1621 | 2.7 |
| Ex. 67 | 2597 | 1759 | 2065 | 1.4 |
| Ex. 68 | 2441 | 1693 | 1904 | 1.9 |
| Ex. 69 | 3245 | 2611 | 2824 | 1.6 |
| Ex. 70 | 2132 | 1543 | 1721 | 0.9 |
| Ex. 71 | 3050 | 2053 | 2442 | 1.0 |
| Ex. 72 | 2053 | 1424 | 1605 | 1.6 |
| Ex. 73 | 4321 | 3467 | 3777 | 0.7 |
| Ex. 74 | 2921 | 2059 | 2456 | 1.9 |
| Ex. 75 | 3008 | 2303 | 2546 | 0.9 |
| Ex. 76 | 2000 | 1406 | 1593 | 1.7 |
| Ex. 49 | 1607 | 1005 | 1277 | 0.7 |
| Ex. 51 | 1477 | 877 | 1156 | 1.4 |
| Ex. 190 | 3181 | 2668 | 2925 | 3.8 |
| Ex. 106 | 2635 | 2111 | 2500 | 0.9 |
| Ex. 107 | 2606 | 2067 | 2477 | 0.9 |
| Ex. 101 | 1440 | 1440* | | 4.2 |

*for continuous mix, filler and elastomer are mixed at start of the mixing cycle It can be seen that, a specific energy of at least 1100 kJ/kg is required after 100% filler addition and at least 1300 kJ/kg is required after 75% filler addition to obtain a composite with a moisture content, less than 10 wt %, and preferably less than 5 wt %, relative to the total weight of the composite. For the Examples in which smalls were added at the beginning of the mix (Ex. 49 and Ex. 51), it was not possible to achieve these higher energy values. However, an improvement in rubber properties was seen for such batches compared to the comparative examples, albeit lower than for the composites in which no smalls were present during the mix.

Example XXII: Natural Rubber/Silica-Carbon Black

The following Examples describe the preparation of composites comprising natural rubber and a wet filler comprising a blend of silica and carbon black in a 10:1 ratio, as well as the corresponding vulcanizates. The silica used was ZEO-SIL® Z1165 MP precipitated silica from Solvay USA Inc., Cranbury, N.J. The carbon black used was an industry reference black #9 ("IRB-9" carbon black, ASTM N330).

The wet filler blend was prepared by adding the silica and carbon black in 10:1 weight ratio to a FEECO Batch Pin pelletizer, and demineralized water was added to achieve a range of target moistures. The mixture was pelletized and moisture of the blend verified by gravimetric means on a moisture balance. The target weight of the filler and filler loadings as measured by TGA are listed in Table 98. The silane coupling agent was Si-69 silane coupling agent ("Si69"; Evonik Industries), which was added together with the first portion of silica.

The dry filler blend was prepared by manually blending the silica and carbon black (10:1 ratio) before addition to the mixer. The native moisture content of 7% for silica was included in the calculation for targeting a dry filler loading of 52 phr, as ascertained by TGA analysis.

Dry mix composites, one with smalls present and another with only antioxidant, were prepared with a 16L mixer (BB-16, 4WN rotor) according to the protocol outlined in Table 95 (16L P). The dry filler was the blend described above prior to wetting. Protocols for mixing wet silica with natural rubber are outlined in Table 96 (1.6L W, BR-1600 mixer, 2WL rotor) and Table 97 (16L BB-16 mixer, 4WN rotor), with and without smalls present. After mixing, the composite was manually roll-milled for 3-5 passes, to produce a sheet form for subsequent compounding. Filler yield loss was <10%, as ascertained by TGA measurements. Additional conditions are outlined in Table 98 as well as composite properties. Unless indicated otherwise, smalls were added at time of compounding.

TABLE 95

Dry Mix Protocol 16L P
Fill factor 72%; Tz = 50° C.; 50 rpm;
ram pressure = 6.6 bar

| Time (s) | Description |
|---|---|
| 0 | Add polymer |
| 30 | Add 3/4 filler + Si69 |
| 60 | Add remaining filler |
| 90 | Add 6PPD only, or smalls where indicated |
| var | Dump |

TABLE 96

Protocol 1.6L W: BR1600, 2WL
ram pressure = 2.8 bar

| Time or Temp | |
|---|---|
| 0 s | Add polymer |
| 30 s | Add 3/4 filler + Si69 |
| 150 s or 125° C. | Add 1/4 filler and optionally smalls where indicated |
| 150° C. | Add 6 PPD only, or smalls where indicated |
| 155° C. | Sweep |
| 160° C. | Dump |

TABLE 97

| Mixer RPM | Description |
|---|---|
| Rpm1 | Add rubber to mixer |
| Rpm1 | Masticate rubber until earlier of 120 s and 110° C. |
| Rpm1 | Add 1/2 filler and silane |
| Rpm2 | Mix until earlier of 120 s and 130° C. |
| Rpm2 | Add 1/4 filler |
| Rpm2 | Mix until earlier of 120 s and 130° C. |
| Rpm2 | Add 1/4 filler |
| Rpm3 | Mix until 154 Deg C (160° C. for Ex. 151) |
| Rpm3 | Add 6PPD & any remaining chemicals |
| Rpm3 | Mix until target dump temperature |

TABLE 98

| Sample | Mixing Protocol | $H_2O$ in filler (phr) | Target TGA (PHR) | FF % | TCU temp (° C.) | Mix time (s) | dump temp (° C.) | Rotor speed (rpm) | Tip speed (m/s) | Composite Moisture % | Energy Efficiency % | Avg Liquid Release Rate (kg/kg * min) | Specific Energy kJ/kg | Average Specific Power kW/kg |
|---|---|---|---|---|---|---|---|---|---|---|---|---|---|---|
| Dry 50[1] | 16 L P | 6 | 52 | 52 | 72 | 50 | 146 | 141 | 50 | 0.6 | 0.6 | — | — | 689 | 4.7 |
| Dry 51 | 16 L P | 6 | 52 | 52 | 72 | 50 | 176 | 141 | 50 | 0.6 | 0.5 | — | — | 793 | 4.5 |
| Ex. 145 | Table 97 | 15 18 | 55 | 53.1 | 66 | 50 | 460 | 166 | 50 | 0.6 | 1.3 | 8.5 | 0.007 | 1410 | 3.1 |
| Ex. 146 | Table 97 | 20-24 | 55 | 52.2 | 66 | 50 | 433 | 166 | 50 | 0.6 | 1.4 | 11.5 | 0.011 | 1579 | 3.6 |
| Ex. 147 | Table 97 | 29-30 | 55 | 55.4 | 66 | 50 | 657 | 166 | 50 | 0.6 | 1.9 | 13.0 | 0.011 | 2358 | 3.6 |
| Ex. 148 | Table 97 | 55-56 | 55 | 56.6 | 66 | 50 | 479 | 166 | 90 | 1.09 | 1.2 | 37.2 | 0.054 | 2785 | 5.8 |
| Ex. 149 | Table 97 | 29-30 | 55 | 55.2 | 66 | 60 | 501 | 166 | 50 | 0.6 | 1.4 | 16.8 | 0.016 | 1910 | 3.8 |
| Ex. 150 | Table 97 | 30-32 | 55 | 53.4 | 66 | 65 | 425 | 166 | 50 | 0.6 | 1.4 | 19.8 | 0.020 | 1708 | 4.0 |
| Ex. 151[4] | Table 97 | 53-54 | 52 | 52.2 | 66 | 90 | 296 | 160 | 60-70* | 0.73-0.85 | 0.4 | 62.3 | 0.093 | 1704 | 5.8 |
| Ex. 152[1] | Table 97 | 53-54 | 52 | 51.1 | 66 | 90 | 295 | 160 | 60-70* | 0.73-0.85 | 0.5 | 62.7 | 0.093 | 1688 | 5.7 |
| Ex. 153 | Table 97 | 20-23 | 55 | 53 | 66 | 65 | 278 | 160 | 50 | 0.6 | 1.6 | 14.6 | 0.017 | 1208 | 4.3 |
| Ex. 154 | Table 97 | 20-25 | 50 | 48.4 | 66 | 40 | 285 | 166 | 60 | 0.73 | 1.7 | 14.4 | 0.015 | 1117 | 3.9 |
| Ex. 155 | Table 97 | 25-30 | 50 | 48.2 | 66 | 40 | 168 | 166 | 60 | 0.73 | 1.4 | 23.6 | 0.040 | 1003 | 6.0 |
| Ex. 156 | Table 97 | 35-37 | 50 | 49.5 | 66 | 40 | 214 | 166 | 60 | 0.73 | 1.5 | 31.2 | 0.051 | 1288 | 6.0 |
| Ex. 157 | Table 97 | 53-55 | 55 | 55 | 66 | 40 | 326 | 166 | 90 | 0.73 | 1.1 | 40.6 | 0.075 | 2354 | 7.2 |
| Ex. 158 | 1.6 L W | 49-51 | 55 | | 70 | 90 | 866 | 160 | 90 | 0.48 | | 24.6 | 0.021 | 3014 | 3.5 |
| Ex. 159[2] | 1.6 L W | 49-51 | 55 | | 70 | 90 | 1192 | 160 | 90 | 0.48 | | 18.3 | 0.014 | 3832 | 3.2 |
| Ex. 160[3] | 1.6 L W | 49-51 | 55 | | 70 | 90 | 840 | 160 | 90 | 0.48 | | 23.2 | 0.021 | 3141 | 3.7 |

[1]added smalls

[2]added smalls with $2^{nd}$ filler addition

[3]added smalls at 150° C.

[4]6PPD and rubber chemicals added at 160 C.

*Increased mixer rpm from 60 to 70 at 120 seconds after last filler addition

Vulcanizates were compounded with the formulation of Table 99 according to the method of Table 6, 1.6L Compounding C (except stage 1 fill factor=68%). The compound was cured according to the method of Table 7, C2.

TABLE 99

Formulation F6

|  |  | phr |
|---|---|---|
|  | NR | 100 |
|  | Filler | var |
|  | Silane | 5.6 |
| "Smalls" | 6PPD | 2 |
|  | TMQ | 1.5 |
|  | Zinc Oxide | 3 |
|  | Stearic Acid | 2 |
|  | Wax beads | 1.5 |
| Curatives | TBBS | 2 |
|  | Sulfur | 1.6 |

Vulcanizate properties are shown in Table 100.

TABLE 100

| Sample | max tan δ | M100 (MPa) | M300 (MPa) | M300/M100 |
|---|---|---|---|---|
| Dry 50 | 0.153 | 2.07 | 9.70 | 4.7 |
| Dry 51 | 0.143 | 1.97 | 9.55 | 4.8 |
| Ex. 145 | 0.096 | 3.04 | 15.92 | 5.2 |
| Ex. 146 | 0.092 | 3.08 | 16.20 | 5.3 |
| Ex. 147 | 0.086 | 3.31 | 17.75 | 5.4 |
| Ex. 148 | 0.104 | 3.73 | 18.33 | 4.9 |
| Ex. 149 | 0.091 | 3.45 | 18.29 | 5.3 |
| Ex. 150 | 0.085 | 3.27 | 17.49 | 5.4 |
| Ex. 151 | 0.093 | 3.15 | 16.31 | 5.2 |
| Ex. 152 | 0.096 | 3.20 | 15.82 | 4.9 |
| Ex. 153 | 0.096 | 3.16 | 16.53 | 5.2 |
| Ex. 154 | 0.090 | 2.73 | 14.54 | 5.3 |
| Ex. 155 | 0.082 | 2.56 | 13.85 | 5.4 |
| Ex. 156 | 0.077 | 2.85 | 16.12 | 5.7 |
| Ex. 157 | 0.094 | 3.59 | 17.73 | 4.9 |
| Ex. 158 | 0.093 | 2.96 | 16.10 | 5.4 |
| Ex. 159 | 0.106 | 2.79 | 14.88 | 5.3 |
| Ex. 160 | 0.104 | 2.87 | 15.49 | 5.4 |

It can be seen that compared to the comparatives Dry 50 and Dry 51, the composite made from wet silica-carbon black filler yielded vulcanizates having reduced tan δ values and increased tensile stress ratio.

Example XXIII: Natural Rubber/Silica-Carbon Black Multi-Stage Processes

The following Examples describe the preparation of composites comprising natural rubber and a wet filler comprising a blend of silica and carbon black in a 10:1 ratio, as well as the corresponding vulcanizates. The silica used was ZEOSIL® Z1165 MP precipitated silica from Solvay USA Inc., Cranbury, N.J. The carbon black used was IRB-9 carbon black, ASTM N330. The filler blend was wetted according to the method described in Example XXII, resulting in moisture contents ranging from 48% to 51%. This filler blend was combined with the natural rubber (RSS3) in which the average moisture content was used to calculate the targeted final composite filler loading of 46 phr or 51 phr. The silane coupling agent was Si-69 silane coupling agent ("Si69"; Evonik Industries), which was added together with the first portion of silica.

The wet silica was mixed with natural rubber in the BB-16 mixer (16.2L, 4WN rotor, ram pressure=112 bar) using the protocol of Table 101 (16L Z), or the BB-72 mixer (66.2 L) fitted with a 4WN rotor according to the protocol of Table 75 (66L ZZ) at a ram pressure of 155 bar. The resulting mixture was transferred into a TSR-125 twin-screw discharge extruder fitted with stationary knives for further processing. The second stage of mixing was done in a Kobelco BB-16 Tangential Mixer fitted with 6WI rotors (14.4 L capacity), using the mixing protocol of Table 71 (16L Y). The resulting mixture was transferred into another twin screw discharge extruder fitted with a roller die, for conversion into sheet form. The time period between the first and second stage batches was limited to less than 3 hours. Filler yield loss was <10%, as ascertained by TGA measurements.

TABLE 101

| Mixer RPM | Mixing Protocol 16 L Z Description |
|---|---|
| Rpm1 | Add rubber to mixer |
| Rpm1 | Masticate rubber until earlier of 120 s and 110° C. |
| 60 | Add 1/2 filler and silane |
| Rpm2 | Mix until earlier of 120 s and 130° C. |
| 60 | Add 1/4 filler |
| Rpm2 | Mix until earlier of 120 s and 130° C. |
| 60 | Add 1/4 filler and mix for 20 s |
| Rpm3 | Mix until 6PPD addition temperature = target dump temperature minus 5 Deg C (Batch 11016 was an exception @ 145 Deg C) |
| Rpm3 | Add 6PPD & any remaining chemicals |
| Rpm3 | Mix until target dump temperature |

Additional conditions are outlined in Table 102 and Table 103 as well as composite properties. Unless indicated otherwise, smalls were added at time of compounding.

TABLE 102

| Sample | Mixing protocol | Target (phr) | Composite Moisture (%) | FF % | TCU temp (° C.) | Mix Time (s) | Rpm 1 | Rpm 2 | Rpm 3 | Tip speed (m/s) | Dump Temp (° C.) | Probe Temp (° C.) | SE (kJ/kg) | E. Efficiency % | Average Fluid Release Rate (kg/kg · min) | Average Specific Power (kW/kg) |
|---|---|---|---|---|---|---|---|---|---|---|---|---|---|---|---|---|
| Ex. 161 SG1 | 16 L Z | 46 | 2.68 | 66 | 75 | 281 | 60 | 75 | 85 | 1.03 | 145.1 | 136.8 | 1599 | 40.2 | 0.060 | 5.7 |
| Ex. 161 SG2 | 16 L Y | 46 | 0.32 | 35 | 50 | 321 | 35 | 35-60 | NA | NA | 135.4 | 139.2 | 1068 |  |  | 3.3 |
| Ex. 162 SG1 | 16 L Z | 46 | 1.52 | 66 | 75 | 259 | 60 | 75 | 95 | 1.15 | 150.1 | 143.7 | 1611 | 41.9 | 0.069 | 6.2 |
| Ex. 162 SG2 | 16 L Y | 46 | 1.22 | 35 | 50 | 417 | 35 | 35-60 | NA | NA | 133.3 | 141.1 | 540 |  |  | 1.3 |
| Ex. 163 SG1 | 16 L Z | 51 | 6.01 | 66 | 60 | 492 | 60 | 75 | 75 | 0.93 | 142.6 | 132 | 2013 | 29.9 | 0.030 | 4.1 |
| Ex. 163 SG2 | 16 L Y | 51 | 1.14 | 35 | 50 | 372 | 35 | 35-60 | NA | NA | 132.7 | 138 | 1328 |  |  | 3.6 |
| Ex. 164 SG1 | 16 L Z | 51 | 1.61 | 66 | 90 | 380 | 60 | 75 | 85 | 1.03 | 155 | 154 | 1797 | 40.3 | 0.048 | 4.7 |
| Ex. 164 SG2 | 16 L Y | 51 | 0.58 | 35 | 50 | 267 | 35 | 35-56 | NA | NA | 134.8 | 140 | 937 |  |  | 3.5 |
| Ex. 165 SG1 | 16 L Z | 51 | 1.52 | 66 | 75 | 364 | 60 | 75 | 75 | 0.93 | 155.1 | 154.2 | 1966 | 37.0 | 0.051 | 5.4 |

TABLE 102-continued

| Sample | Mixing protocol | Target (phr) | Composite Moisture (%) | FF % | TCU temp (°C.) | Mix Time (s) | Rpm 1 | Rpm 2 | Rpm 3 | Tip speed (m/s) | Dump Temp (°C.) | Probe Temp (°C.) | SE (kJ/kg) | E. Efficiency % | Average Fluid Release Rate (kg/kg·min) | Average Specific Power (kW/kg) |
|---|---|---|---|---|---|---|---|---|---|---|---|---|---|---|---|---|
| Ex. 165 SG2 | 16 L Y | 51 | 0.76 | 35 | 50 | 231 | 35 | 35-60 | NA | NA | 136.2 | 146 | 819 | | | 3.5 |
| Ex. 166 SG1 | 16 L Z | 51 | 1.36 | 66 | 90 | 245 | 60 | 75 | 95 | 1.15 | 160.1 | 159 | 1661 | 44.0 | 0.079 | 6.8 |
| Ex. 166 SG2 | 16 L Y | 51 | 0.63 | 35 | 50 | 251 | 35 | 35-55 | NA | NA | 135.1 | 139 | 881 | | | 3.5 |
| Ex. 167 SG1 | 16 L Z | 51 | 1.88 | 66 | 75 | 380 | 60 | 75 | 75 | 0.93 | 150 | 149.2 | 1880 | 38.2 | 0.048 | 4.9 |
| Ex. 167 SG2 | 16 L Y | 51 | 0.68 | 35 | 50 | 212 | 35 | 35-60 | NA | NA | 137.2 | 142.6 | 726 | | | 3.4 |

Note:
6PPD addition temperature was 5 Deg C. below the Dump Temperature in SG1, with the exception of Ex. 163, for which the 6PPD was added at 145 C.

TABLE 103

| Sample | Mixing Protocol | (phr) | Composite Moisture (%) | FF % | TCU temp (°C.) | Mix Time (sec) | Rpm 1 | Rpm 2 | Rpm 3 | Tip speed (m/s) | Dump Temp (°C.) | Probe Temp (°C.) | SE (kJ/kg) | E. Efficiency % | Average Fluid Release Rate (kg/kg·min) | Average Specific Power (kW/kg) |
|---|---|---|---|---|---|---|---|---|---|---|---|---|---|---|---|---|
| Ex. 168 SG1 | 66 L ZZ | 51 | 12.62 | 66 | 60 | 856 | 50 | 50 | 50 | 0.93 | 138.2 | 114 | 2353 | 16.8 | 0.011 | 2.7 |
| Ex. 168-1 SG2 | 16 L Y | 51 | 4.24 | 35 | 50 | 660 | 35 | 35-70 | NA | NA | 121 | 119 | 2117 | | | 3.2 |
| Ex. 168-2 SG2 | 16 L Y | 51 | 2.07 | 35 | 50 | 601 | 35 | 35-80 | NA | NA | 130 | 126 | 2172 | | | 3.6 |
| Ex. 168-3 SG2 | 16 L Y | 51 | 1.39 | 35 | 50 | 651 | 35 | 35-80 | NA | NA | 139 | 140 | 2414 | | | 3.7 |
| Ex. 168-4 SG2 | 16 L Y | 51 | 1.3 | 35 | 50 | 664 | 35 | 35-80 | NA | NA | 134 | 135 | 2390 | | | 3.6 |
| Ex. 169 SG1 | 66 L ZZ | 51 | 2.29 | 66 | 60 | 808 | 50 | 50 | 50-70* | 0.93-1.30 | 155 | 132 | 2522 | 28.0 | 0.021 | 3.1 |
| Ex. 169-1 SG2 | 16 L Y | 51 | 0.98 | 35 | 50 | 189 | 35 | 35-68 | NA | NA | 138 | 141 | 664 | | | 3.5 |
| Ex. 169-2 SG2 | 16 L Y | 51 | 1.39 | 35 | 50 | 350 | 35 | 35-60 | NA | NA | 135 | 135 | 1179 | | | 3.4 |

Note:
6PPD addition temperature was 145° C. for Batch Ex. 168 SG1 and 155° C. for Ex. 169 SG1.

*Mixer speed increased from 50 to 60 rpm 2:00 minutes after last filler addition. It was then increased to 70 rpm after 6PPD addition at 150 C. indicated batch temperature.

Vulcanizate properties are shown in Table 104.

TABLE 104

| Sample | M300 (MPa) | M300/M100 | Max tan δ |
|---|---|---|---|
| Ex. 161 SG2 | 18.1 | 4.9 | 0.074 |
| Ex. 162 SG2 | 17.3 | 5.1 | 0.068 |
| Ex. 163 SG2 | 17.9 | 5 | 0.087 |
| Ex. 164 SG2 | 17.5 | 4.9 | 0.093 |
| Ex. 165 SG2 | 17.5 | 5.3 | 0.064 |
| Ex. 166 SG2 | 15.6 | 5 | 0.079 |
| Ex. 167 SG2 | 17.5 | 5.2 | 0.093 |
| Ex. 168-1 SG2 | 16.2 | 4.7 | 0.113 |
| Ex. 168-2 SG2 | 16.8 | 5.2 | 0.099 |
| Ex. 168-3 SG2 | 16.8 | 4.9 | 0.112 |
| Ex. 168-4 SG2 | 17.4 | 5.5 | 0.076 |
| Ex. 169-1 SG2 | 16.8 | 5.3 | 0.1 |
| Ex. 169-2 SG2 | 17.2 | 5.3 | 0.079 |

It can be seen that compared to dry mixing comparable fillers (e.g., Dry 50 of Table 100), the composite made from wet silica-carbon black filler yielded vulcanizates having reduced tan δ values and increased tensile stress ratio. Composite from Stage 1 with a moisture of 2%-13% can be used in Stage 2. Preferred probe temperatures in Stage 2 were below 140° C. Typically, higher stage 1 moisture content allows more energy to be put into the second stage mixer, which results in reduced tan δ values and increased tensile stress ratio, consistent with the observations for the single stage process.

Example XXIV: Styrene-Butadiene Rubber/Silica-Carbon Black

The following Examples describe the preparation of composites comprising solution styrene-butadiene (s-SBR) rubber and a wet filler comprising a blend of silica and carbon black in a 10:1 ratio, as well as the corresponding vulcanizates. These Examples were compared with dry mix samples. The wet filler was prepared as described in Example XXII, and the dry filler was the blend prior to wetting. The following s-SBR types were used: BUNA® VSL 4525-0 S-SBR, Lanxess, Germany ("4525"); SL553R SSBR, JSR Corporation ("SL553R"); SL563R SSBR, JSR Corporation ("SL563R"). The filler was 56 phr. The silane coupling agent was Si-69 silane coupling agent ("Si69"; Evonik Industries), which was added together with the first portion of silica.

All composites were prepared according to one of the following protocols outlined in Table 105 (A-D). Additional conditions are outlined in Table 106 as well as composite properties. Unless indicated otherwise, smalls were added at time of compounding.

TABLE 105

| Table 105A ram pressure = 6.6 bar | | Table 105B ram pressure = 2.8 bar | | Table 105C ram pressure = 6.6 bar | | Table 105D ram pressure = 2.8 bar | |
|---|---|---|---|---|---|---|---|
| Time (s) | | Time (s) or Temp | | Time or Temp | | Time or Temp | |
| 0 | Add polymer | 0 s | Add polymer | 0 s | Add polymer | 0 s | Add polymer |
| 30 | Add ¾ filler | 30 s | Add ⅔ filler | 110° C. | Add ½ filler | 30 s | Add ¾ filler |
| 60 | Add ¼ filler | 90 s | Add ⅓ filler | 120 s or 130° C. | Add ¼ filler | 150 s or 125° C. | Add ¼ filler |
|  |  |  |  | 130° C. | Add ¼ filler |  |  |
| 90 | Add 6PPD only, or smalls where indicated | 180 s | Add smalls; sweep | 154° C. | Add 6PPD only, or smalls where indicated | 150° C. | Add 6PPD |
|  |  | 240 s | sweep |  |  | 155° C. | Sweep |
| var | Dump | 160° | Dump | var | Dump | 160° C. | Dump |

TABLE 106

| Sample | H₂O in filler | Rubber | Mixing Protocol Table 105 | FF % | TCU temp (° C.) | Mix time (s) | dump temp (° C.) | Rotor speed (rpm) | Tip speed (m/s) | Composite Moisture % | Energy Efficiency % | Avg Liquid Release Rate (kg/kg * min) | Specific Energy kJ/kg |
|---|---|---|---|---|---|---|---|---|---|---|---|---|---|
| Dry 52[1] | 6 | 4525 | Table 105A | 72 | 50 | 237 | 141 | 50 | 0.60 | 0.6 | — | — | 725 |
| Dry 53 | 6 | 4525 | Table 105A | 72 | 50 | 128 | 160 | 50 | 0.60 | 0.5 | — | — | 716 |
| Ex. 170 | 20 | 4525 | Table 105C | 70 | 50 | 592 | 160 | 50 | 0.62 | 0.9 | 11.9 | 0.008 | 1652 |
| Ex. 171 | 30 | 4525 | Table 105C | 70 | 50 | 587 | 160 | 55 | 0.68 | 3.4 | 18.3 | 0.012 | 1565 |
| Ex. 172 | 50 | 4525 | Table 105C | 70 | 50 | 1188 | 165 | 70 | 0.87 | 2.0 | 19.1 | 0.017 | 4354 |
| Ex. 173 | 50 | 4525 | Table 105C | 72 | 75 | 1038 | 165 | 100 | 1.24 | 1.9 | 19.5 | 0.019 | 4273 |
| Ex. 174 | 50 | 4525 | Table 105C | 70 | 90 | 606 | 160 | 45 | 0.56 | 2.4 | 37.5 | 0.033 | 2173 |
| Ex. 175[1] | 50 | 4525 | Table 105C | 70 | 90 | 601 | 160 | 45 | 0.56 | 0.5 | 37.7 | 0.034 | 2226 |
| Ex. 176 | 20 | 4525 | Table 105C | 70 | 65 | 456 | 165 | 50 | 0.62 | 1.7 | 15.6 | 0.010 | 1117 |
| Ex. 177 | 30 | 4525 | Table 105C | 70 | 60 | 415 | 165 | 60 | 0.74 | 2.0 | 25.0 | 0.020 | 1292 |
| Dry 54 | 6 | SL553R | Table 105B | 70 | 80 | 262 | 160 | 80 | 0.43 | 1.7 | — | — | 1209 |
| Ex. 178 | 50 | SL553R | Table 105D | 66 | 90 | 1234 | 150 | 105 | 0.56 | 8.8 | 15.1 | 0.011 | 3622 |
| Dry 55 | 6 | SL563R | Table 105B | 70 | 80 | 258 | 160 | 80 | 0.43 | 1.4 | — | — | 1116 |
| Ex. 179 | 50 | SL563R | Table 105D | 66 | 90 | 888 | 143 | 105 | 0.56 | 11.4 | 21.0 | 0.013 | 2208 |

[1]added smalls

Vulcanizates were compounded with the formulation of Table 107 according to the method of Table 6, 1.6L Compounding C (except stage 1 fill factor=68%). The compound was cured according to the method of Table 7, C3.

TABLE 107

| Formulation F7 | | | phr |
|---|---|---|---|
|  |  | S-SBR | 100 |
|  |  | Filler | 56 |
|  |  | Silane | 5 |
| "Smalls" |  | 6PPD | 2.5 |
|  |  | TMQ | 1.5 |
|  |  | Zinc Oxide | 3 |
|  |  | Stearic Acid | 2 |
|  |  | Wax beads | 1.5 |
| Curatives |  | TBBS | 2 |
|  |  | Sulfur | 1.6 |

Vulcanizate properties are shown in Table 108.

TABLE 108

| Sample | Rubber | max tan δ | M100 (MPa) | M300 (MPa) | M300/ M100 |
|---|---|---|---|---|---|
| Dry 52 | 4525 | 0.209 | 2.45 | 8.89 | 3.6 |
| Dry 53 | 4525 | 0.204 | 2.57 | 9.55 | 3.7 |
| Ex. 170 | 4525 | 0.202 | 2.81 | 11.31 | 4.0 |
| Ex. 171 | 4525 | 0.202 | 2.68 | 10.55 | 3.9 |
| Ex. 172 | 4525 | 0.145 | 3.09 | 12.38 | 4.0 |
| Ex. 173 | 4525 | 0.132 | 3.31 | 12.69 | 3.8 |
| Ex. 174 | 4525 | 0.183 | 3.50 | 14.10 | 4.0 |
| Ex. 175 | 4525 | 0.174 | 3.55 | 12.77 | 3.6 |
| Ex. 176 | 4525 | 0.189 | 2.88 | 11.47 | 4.0 |
| Ex. 177 | 4525 | 0.185 | 3.41 | 13.17 | 3.9 |
| Dry 54 | SL553R | 0.139 | 3.71 | 14.14 | 3.8 |
| Ex. 178 | SL553R | 0.081 | 3.06 | 15.09 | 4.9 |
| Dry 55 | SL563R | 0.155 | 4.02 | 15.27 | 3.8 |
| Ex. 179 | SL563R | 0.090 | 3.44 | 14.00 | 4.1 |

It can be seen that compared to dry mixing comparable fillers, the composite made from wet silica-carbon black filler yielded vulcanizates having reduced tan δ values and/or increased tensile stress ratio.

Example XXV: Styrene-Butadiene Rubber/Silica-Carbon Black Multi-Stage Processes

The following Examples describe the preparation of composites comprising solution styrene-butadiene (s-SBR) rubber and a wet filler comprising a blend of silica and carbon black in a 10:1 ratio, as well as the corresponding vulcanizates. BUNA® VSL 4525-0 S-SBR, Lanxess, Germany ("4525) was used. The filler loading was 56 phr. The silane coupling agent was Si-69 silane coupling agent ("Si69"; Evonik Industries), which was added together with the first portion of filler. The wet filler was prepared as described in Example XXII.

The wet silica-carbon black filler was mixed with s-SBR in the 16L mixer (BB-16, 6WI rotor, ram pressure=112 bar) according to the protocol of Table 101 (16L Z). The first stage composite was passed through a twin-screw discharge extruder fitted with a roller-head (TSR-125, Kobelco Kobe Steel Group). The resulting composite was manually cut up and fed to the corresponding second stage mixer (BB-16). The time period between the first and second stage batches was limited to less than 1 hour. The second stage mix followed the protocol of Table 71 (16L Y). Unless indicated otherwise, smalls were added at time of compounding. Filler yield loss was <10%, as ascertained by TGA measurements.

Vulcanizates were compounded with the formulation of Table 107 (Formulation F7) according to the method of Table 6, 1.6L Compounding C (except stage 1 fill factor=68%). The compound was cured according to the method of Table 7, C3.

Additional conditions are outlined in Table 109 as well as composite properties.

TABLE 109

| Sample | Mixing protocol | Composite Moisture (%) | FF (%) | TCU temp (° C.) | Mix Time (s) | Rpm 1 | Rpm 2 | Rpm 3 | Tip speed (m/s) | Dump Temp (° C.) | Probe Temp (° C.) | SE (kJ/kg) | Energy Efficiency % | Release Rate (kg/kg · min) | Average Specific Power (kW/kg) |
|---|---|---|---|---|---|---|---|---|---|---|---|---|---|---|---|
| Ex. 180 SG1 | 16 L Z | 5.33 | 70 | 60 | 863 | 50 | 50 | 60 | 0.73 | 155 | 115 | 2718 | 25.2 | 0.019 | 3.1 |
| Ex. 180 SG2 | 16 L Y | 1.04 | 35 | 50 | 247 | 35 | 35-60 | NA | NA | 125 | 128 | 832 | | | 3.4 |
| Ex. 181 SG1 | 16 L Z | 2.91 | 70 | 90 | 402 | 50 | 50 | 50 | 0.60 | 155 | 114 | 1667 | 45.2 | 0.047 | 4.1 |
| Ex. 181 SG2 | 16 L Y | 1.04 | 35 | 50 | 190 | 35 | 35-60 | NA | NA | 138 | 145 | 801 | | | 4.2 |
| Ex. 182 SG1 | 16 L Z | 2.58 | 70 | 60 | 672 | 60 | 60 | 70 | 0.85 | 160 | 112 | 2396 | 31.8 | 0.028 | 3.6 |
| Ex. 182 SG2 | 16 L Y | 0.89 | 35 | 50 | 238 | 35 | 35-60 | NA | NA | 136 | 137 | 934 | | | 3.9 |
| Ex. 183 SG1 | 16 L Z | 2.4 | 70 | 90 | 510 | 50 | 50 | 50 | 0.60 | 155 | 123 | 2019 | 38.0 | 0.037 | 4.0 |
| Ex. 183 SG2 | 16 L Y | 0.72 | 35 | 50 | 210 | 35 | 35-60 | NA | NA | 137 | 144 | 857 | | | 4.1 |

Note:
6PPD addition temperature was 5° C. below the dump temperature in stage 1.

Vulcanizate properties are listed in Table 110.

TABLE 110

| Sample | M300 (MPa) | M300/ M100 | Max tan δ |
|---|---|---|---|
| Ex. 180 SG2 | 11.0 | 4.1 | 0.138 |
| Ex. 181 SG2 | 11.5 | 4.0 | 0.165 |
| Ex. 182 SG2 | 11.2 | 4.1 | 0.136 |
| Ex. 183 SG2 | 11.1 | 4.0 | 0.162 |

It can be seen that a two-stage process can be operated with s-SBR.

Example XXVI: Oil-Extended Styrene-Butadiene Rubber/Silica-Carbon Black

The following Examples illustrate the preparation of composites comprising oil-extended solution styrene-butadiene rubber (OESBR) and a wet filler comprising a blend of silica and carbon black in a 10:1 ratio, as well as the corresponding vulcanizates. These Examples were compared with dry mix samples mixed in the BB-16 mixer with a 4WN rotor. The wet filler was prepared as described in Example XXII, and the dry filler was the blend prior to wetting. The filler was combined with OESBR (Buna 4526-2HM OESBR, Lanxess, Germany) at a loading of 81 phr. The silane coupling agent was Si-69 silane coupling agent ("Si69"; Evonik Industries), which was added together with the first portion of silica.

Dry mix composites, one with smalls present at the beginning of the mixing, were prepared according to the protocol outlined in Table 95 (16L P), except that a second dry mix composite was prepared by adding antioxidant 30 s after the last filler addition. The composites with wet filler were mixed according to the protocol of Table 105C for the BB-16 mixer. Additional conditions are outlined in Table 111 as well as composite properties. Unless indicated otherwise, smalls were added at time of compounding.

TABLE 111

| Sample | H₂O in filler | FF % | TCU temp (° C.) | Mix time (s) | dump temp (° C.) | Rotor speed (rpm) | Tip speed (m/s) | Composite Moisture % | Energy Efficiency % | Avg Liquid Release Rate (kg/kg * min) | Specific Energy kJ/kg | Average Specific Power (kW/kg) |
|---|---|---|---|---|---|---|---|---|---|---|---|---|
| Dry 56[1] | 6 | 72 | 50 | 234 | 141 | 50 | 0.62 | 0.6 | — | — | 522 | 2.2 |
| Dry 57 | 6 | 72 | 50 | 196 | 160 | 50 | 0.62 | 0.7 | — | — | 548 | 2.8 |
| Ex. 184 | 20 | 68 | 50 | 680 | 165 | 60 | 0.74 | 1.1 | 11.5 | 0.007 | 1742 | 2.6 |
| Ex. 185 | 30 | 68 | 50 | 570 | 165 | 70 | 0.87 | 1.5 | 19.3 | 0.015 | 1824 | 3.2 |
| Ex. 186 | 50 | 68 | 50 | 934 | 165 | 90 | 1.12 | 0.9 | 23.4 | 0.023 | 3843 | 4.1 |
| Ex. 187 | 50 | 68 | 90 | 905 | 160 | 60 | 0.74 | 1.1 | 32.9 | 0.025 | 2801 | 3.1 |
| Ex. 188[1] | 50 | 68 | 90 | 936 | 160 | 70 | 0.87 | 1.0 | 32.0 | 0.022 | 2740 | 2.9 |
| Ex. 189 | 50 | 68 | 65 | 287 | 165 | 80 | 0.99 | 1.3 | 33.0 | 0.081 | 2687 | 9.4 |

[1]added smalls

Vulcanizates were compounded with the formulation of Table 112 (Formulation F8) according to the method of Table 6, 1.6L Compounding C (except stage 1 fill factor=68%). The compound was cured according to the method of Table 7, C3.

TABLE 112

| Formulation F8 | | phr |
|---|---|---|
| | OESBR | 137.5 |
| | Filler | 81 |
| | Silane | 5 |
| "Smalls" | 6PPD | 2.5 |
| | TMQ | 1.5 |
| | Zinc Oxide | 3 |
| | Stearic Acid | 2 |
| | Wax beads | 1.5 |
| Curatives | CBS | 2 |
| | DPG | 2 |
| | Sulfur | 1.6 |

Vulcanizate properties are shown in Table 113.

TABLE 113

| Sample | max tan δ | M100 (MPa) | M300 (MPa) | M300/M100 |
|---|---|---|---|---|
| Dry 56 | 0.189 | 2.48 | 9.98 | 4.0 |
| Dry 57 | 0.195 | 2.29 | 8.75 | 3.8 |
| Ex. 184 | 0.175 | 2.81 | 13.05 | 4.6 |
| Ex. 185 | 0.173 | 2.85 | 12.91 | 4.5 |
| Ex. 186 | 0.175 | 2.56 | 11.40 | 4.5 |
| Ex. 187 | 0.205 | 2.81 | 13.06 | 4.6 |
| Ex. 188 | 0.183 | 2.51 | 10.50 | 4.2 |
| Ex. 189 | 0.188 | 3.07 | 14.64 | 4.8 |

It can be seen that compared to Dry 56 and Dry 57, the composite made from wet silica-carbon black filler yielded vulcanizates having reduced tan δ values and/or increased tensile stress ratio.

Example XXVII: Silica/Natural Rubber Composite Characteristics

This Example describes microdispersion properties of composites comprising a filler that is primarily silica (silica: carbon black=10:1) dispersed in natural rubber (RSS3). Specifically, this Example demonstrates that rheological properties, namely the Payne Difference, show a measurable distinction between the present composites and composites of the same composition made by dry mixing methods. The preparation of these composites have been described in Examples XXII or Example XXIII.

The rheological properties of composites comprising RSS3 natural rubber and filler (blend of silica and carbon black in a 10:1 ratio) were measured by RPA method described previously. The dynamic storage modulus (G') at 0.1% and 200% strain were recorded. The Payne difference is calculated as G'(0.1%)-G'(200%).

The Payne difference value of the present invention is normalized to the Payne difference value of the dry-mixed equivalent, which is a composite having the same filler type (e.g., carbon black, silica, etc.), filler loading, polymer type, and compound formulation (Dry 51). This is termed Payne difference index (Payne Diff Index). An index value greater than 100 indicates that the composite has lower Payne difference value than a dry-mixed composite of similar composition. Payne Diff Index is calculated by the following equation:

Payne Diff Index=100+100*[1−(Payne Diff of Example)/(Payne Diff of Ref)]

wherein "Ref" is the dry-mixed equivalent.

Payne Difference is a measure of the state of the filler network in the elastomer. A lower Payne difference indicates a more well distributed, less connected network of filler particles. Data for the Payne difference and the index are shown in Table 114.

TABLE 114

| Sample | Table | G'(0.1%) (kPa) | G'(200%) (kPa) | Payne ratio | Payne difference (kPa) | Payne difference index |
|---|---|---|---|---|---|---|
| Dry 51 | Table 100 | 1939 | 123 | 15.7 | 1816 | 100 |
| Ex. 145 | Table 100 | 1305 | 133 | 9.8 | 1172 | 135 |
| Ex. 146 | Table 100 | 1242 | 129 | 9.6 | 1113 | 139 |
| Ex. 151 | Table 100 | 1256 | 110 | 11.4 | 1145 | 137 |
| Ex. 164 SG2 | Table 102 | 846 | 94 | 9.0 | 752 | 159 |
| Ex. 166 SG2 | Table 102 | 795 | 89 | 8.9 | 706 | 161 |
| Ex. 163 SG2 | Table 102 | 946 | 79 | 11.9 | 867 | 152 |

TABLE 114-continued

| Sample | Table | G'(0.1%) (kPa) | G'(200%) (kPa) | Payne ratio | Payne difference (kPa) | Payne difference index |
|---|---|---|---|---|---|---|
| Ex. 165 SG2 | Table 102 | 763 | 90 | 8.4 | 672 | 163 |
| Ex. 167 SG2 | Table 102 | 811 | 92 | 8.8 | 720 | 160 |
| Ex 169-1 SG2 | Table 104 | 791 | 84 | 9.4 | 707 | 161 |
| Ex 169-2 SG2 | Table 104 | 760 | 85 | 8.9 | 675 | 163 |

The inventive composites have filler loading variation within +/−2 phr (less than 5% variation) of the reference sample Dry 51 (52 phr), as determined by TGA.

The present composites have lower Payne difference values compared to the dry mix composite. For example, the present composites have a Payne difference index ranging from 135 to greater than 160, indicating a 30% to 60% lower Payne difference value, respectively, than the dry mix comparative Dry 51. Such an improved distribution is generally believed to be advantageous to lower dynamic losses in the resulting rubber (e.g. tan δ). It can also be seen that the composites prepared via multi-stage processes generally have lower Payne difference values compared to the composites prepared by single-stage processes.

The invention claimed is:

1. A composite comprising a filler dispersed in an elastomer, wherein the filler comprises carbon black in an amount of at least 50% by weight relative to the total weight of the filler and the elastomer comprises at least 50% by weight of natural rubber relative to the total weight of the elastomer, and the composite has the following properties:

(a) the filler has a state of dispersion in the elastomer according to equation (1):

$$A \leq 1.25 * B + x \quad (1)$$

wherein:

A is $d_{90}$ of the area-equivalent diameter (μm) of filler particles in the composite, and B is $\dfrac{\text{[total area of particles having an area-equivalent diameter of} \geq 2\ \mu m\text{]}}{\text{[total imaging area]}} \times 100\%$ wherein B≥1%, A and B are determined by optical microscopy in transmission mode of microtomed sections, and x is a number ranging from 15 to 20; and (b) the composite has a property according to equation (2):

$$G'(0.1\%)/G'(200\%) \leq 0.1 * G'(50\%) - y \quad (2)$$

wherein G'(0.1%) is a dynamic storage modulus measured at 0.1% strain amplitude, G'(200%) is a dynamic storage modulus measured at 200% strain amplitude, G'(50%) is a dynamic storage modulus measured at 50% strain amplitude, the dynamic storage modulus is measured at 100° C. at a frequency of 1 Hz, and y is a number ranging from 7 to 10.

2. The composite of claim 1, wherein the elastomer further comprises at least one rubber selected from polybutadiene rubber and styrene-butadiene rubber.

3. The composite of claim 1, wherein x=15.

4. The composite of claim 1, wherein y=10.

5. The composite of claim 1, wherein the carbon black has an STSA of at least 60 m²/g.

6. The composite of claim 1, wherein the carbon black has a COAN of at least 75 mL/100 g.

7. The composite of claim 1, wherein the carbon black has a ratio of BET/STSA ranging from 1 to 1.2.

8. The composite of claim 1, wherein the composite has a carbon black loading of 60 phr or less.

9. The composite of claim 1, wherein the filler further comprises silica.

* * * * *